United States Patent
Dury et al.

(10) Patent No.: US 10,390,064 B2
(45) Date of Patent: Aug. 20, 2019

(54) PARTICIPANT REWARDS IN A SPECTATING SYSTEM

(71) Applicant: Amazon Technologies, Inc., Seattle, WA (US)

(72) Inventors: Christopher Paul Dury, Bellevue, WA (US); David Hendrik Verfaillie, Laguna Beach, CA (US); Hok Peng Leung, Redmond, WA (US); Patrick Gilmore, Agoura Hills, CA (US); Ethan Zane Evans, Snoqualmie, WA (US); Michael Anthony Willette, Lake Forest, CA (US); Collin Charles Davis, Seattle, WA (US); Richard Bantegui, Irvine, CA (US); Francis Xavier Surjo-Subagio, Irvine, CA (US); Michael Anthony Frazzini, Seattle, WA (US); Michael Martin George, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/755,955

(22) Filed: Jun. 30, 2015

(65) Prior Publication Data
US 2017/0006322 A1    Jan. 5, 2017

(51) Int. Cl.
*A63F 13/49* (2014.01)
*A63F 13/85* (2014.01)
(Continued)

(52) U.S. Cl.
CPC ............ *H04N 21/254* (2013.01); *A63F 13/49* (2014.09); *A63F 13/85* (2014.09); *A63F 13/86* (2014.09);
(Continued)

(58) Field of Classification Search
CPC .......... A63F 13/00; G05B 2219/32334; G06Q 30/0233; G06Q 30/0236; G07F 17/32; G07F 17/3258
See application file for complete search history.

(56) References Cited

U.S. PATENT DOCUMENTS

| 5,261,820 A | 11/1993 | Slye et al. |
| 5,395,242 A | 3/1995 | Slye et al. |

(Continued)

FOREIGN PATENT DOCUMENTS

| JP | 2012065831 | 4/2012 |
| JP | 2013533000 | 8/2013 |

(Continued)

OTHER PUBLICATIONS

Wang, Jinjun, et al., "Sports highlight detection from keyword sequences using HMM", Multimedia and Expo, 2004, ICME'04, IEEE International Conference, pp. 1-5, vol. 1.

(Continued)

*Primary Examiner* — Nasser M Goodarzi
*Assistant Examiner* — Adil Ocak
(74) *Attorney, Agent, or Firm* — Robert C. Kowert; Meyertons, Hood, Kivlin, Kowert & Goetzel, P.C.

(57) ABSTRACT

A spectating system that leverages game metadata and/or broadcast metadata to provide rewards to or otherwise acknowledge participants in broadcasts. The system may analyze the metadata to detect events or other information about broadcasts, and may recognize and/or reward participants based at least in part on the analysis. Spectators may be rewarded for participating in broadcasts, or in particular events in broadcasts. Broadcasters may be rewarded for in-game achievements or for achieving levels of audience participation or support. Participants may select or vote on other participants to receive rewards. Rewards may, for (Continued)

example, include acknowledgement of participants via the user interface, virtual items such as in-game virtual gear, physical items such as game-related merchandise, and granting of benefits or privileges by the spectating system and/or game system such as special content for a broadcaster's channel.

30 Claims, 49 Drawing Sheets

(51) Int. Cl.
      *A63F 13/86*       (2014.01)
      *H04N 21/81*       (2011.01)
      *H04N 21/254*       (2011.01)
      *H04N 21/443*       (2011.01)
      *H04N 21/478*       (2011.01)
      *H04N 21/4784*       (2011.01)

(52) U.S. Cl.
      CPC ..... *H04N 21/4431* (2013.01); *H04N 21/4781* (2013.01); *H04N 21/4784* (2013.01); *H04N 21/8173* (2013.01); *A63F 2300/5566* (2013.01)

(56) References Cited

U.S. PATENT DOCUMENTS

| | | | |
|---|---|---|---|
| 5,682,196 | A | 10/1997 | Freeman |
| 6,173,260 | B1 | 1/2001 | Slaney |
| 6,275,806 | B1 | 8/2001 | Pertrushin |
| 7,451,079 | B2 | 11/2008 | Oudeyer |
| 7,606,701 | B2 | 10/2009 | Degani et al. |
| 7,803,052 | B2 | 9/2010 | Multerer et al. |
| 7,940,914 | B2 | 5/2011 | Pertrushin |
| 8,078,470 | B2 | 12/2011 | Levanon et al. |
| 8,096,863 | B2 | 1/2012 | Annunziata |
| 8,308,562 | B2 | 11/2012 | Patton |
| 8,606,872 | B1 * | 12/2013 | Reitnour ............ G06F 15/17306 709/203 |
| 2002/0034980 | A1 * | 3/2002 | Lemmons ............... A63F 3/081 463/40 |
| 2002/0108125 | A1 * | 8/2002 | Joao ................... H04N 7/17309 725/139 |
| 2006/0058103 | A1 * | 3/2006 | Danieli ................. A63F 13/12 463/42 |
| 2007/0167210 | A1 * | 7/2007 | Kelly ...................... G07F 17/32 463/16 |
| 2008/0300700 | A1 | 12/2008 | Hammer et al. |
| 2009/0208181 | A1 * | 8/2009 | Cottrell ............... G11B 27/034 386/278 |
| 2012/0052476 | A1 | 3/2012 | Graesser et al. |
| 2014/0004951 | A1 * | 1/2014 | Kern ....................... A63F 13/86 463/42 |
| 2014/0171039 | A1 | 6/2014 | Bjontegard |
| 2015/0139610 | A1 | 5/2015 | Syed et al. |

FOREIGN PATENT DOCUMENTS

| | | |
|---|---|---|
| KR | 2013-0122523 | 11/2013 |
| WO | 2007098560 | 9/2007 |
| WO | 1999022364 | 4/2014 |
| WO | 2014061015 | 4/2014 |
| WO | 2014122416 | 8/2014 |

OTHER PUBLICATIONS

Ren, et al., "Affective sports highlight detection", 15th European Signal Processing Conference, Sep. 3-7, 2007, pp. 728-732.
Isao Otsuka, et al., "A Highlight Scene Detection and Video Summarization System Using Audio Feature for a Personal Video Recorder", Consumer Electronics, IEEE Transactions on 51.1, Dec. 2005, pp. 112-116.
Changsheng Xu, et al., "Live Sports Even Detection Based on Broadcast Video and Web-casting Text", Proceedings of the 14th annual ACM international conference on Multimedia, ACM, 2006, pp. 221-230.
U.S. Appl. No. 14/754,584, filed Jun. 29, 2015, Michael Anthony Willette, et al.
U.S. Appl. No. 14/754,575, filed Jun. 29, 2015, Michael Anthony Willette, et al.
U.S. Appl. No. 14/732,580, filed Jun. 5, 2015, Ethan Zane Evans, et al.
U.S. Appl. No. 14/732,582, filed Jun. 5, 2015, Ethan Zane Evans, et al.
U.S. Appl. No. 14/755,922, filed Jun. 30, 2015, David Hendrik Verfaillie et al.
U.S. Appl. No. 14/755,905, filed Jun. 30, 2015, Michael Anthony Willette et al.
U.S. Appl. No. 14/755,944, filed Jun. 30, 2015, Robert Harvey Oates.
U.S. Appl. No. 14/755,934, filed Jun. 30, 2015, Rohit Garg et al.
U.S. Appl. No. 14/755,967, filed Jun. 30, 2015, Patrick Gilmore et al.
U.S. Appl. No. 14/755,974, filed Jun. 30, 2015, Hok Peng Leung et al.
U.S. Appl. No. 14/318,093, filed Jun. 27, 2014, Michael Martin George.
U.S. Appl. No. 14/318,083, filed Jun. 27, 2014, Michael Martin George.
U.S. Appl. No. 14/318,117, filed Jun. 27, 2014, Michael Martin George.
U.S. Appl. No. 14/318,042, filed Jun. 27, 2014, Gerald Joseph Heinz et al.
Mehdi Kaytoue, et al. "Watch me playing, I am a professional: a first study on video game live streaming", Proceedings of the 21st international conference companion on World Wide Web, ACM, 2012, pp. 1-8.
Gifford Cheung, et al., "Starcraft from the stands: understanding the game spectator", Proceedings of the SIGCHI Conference on Human Factors in Computing Systems, ACM, 201, pp. 1-10.
Thomas P. B. Smith, et al."Live-streaming changes the (video) game." Proceedings of the 11th European conference on Interactive TV and video. ACM, 2013, pp. 131-138.
William A. Hamilton, et al., "Streaming on twitch: fostering participatory communities of play within live mixed media." Proceedings of the SIGCHI Conference on Human Factors in Computing Systems. ACM, 2014, pp. 1-10.
Amazon Web Services, Amazon AppStream Developer Guide, 2014, pp. 1-195.
Ben Medler, "Generations of Game Analytics, Achievements and High Scores", Eludamos Journal for Computer Game Culture, 2009, pp. 177-194, vol. 3, No. 2.
Wang, Jue, et al. "Interactive video cutout." ACM Transactions on Graphics (TOG). vol. 24. No. 3. ACM, 2005, pp. 585-594.
Smolic, Aljoscha, et al. "3d video and free viewpoint video-technologies, applications and mpeg standards." Multimedia and Expo, 2006 IEEE International Conference on. IEEE, 2006, pp. 1-56.
Karsten Muller, et al. "View synthesis for advanced 3D video systems." EURASIP Journal on Image and Video Processing 2008 (2009), pp. 1-11.
Ballan, Luca, et al. "Unstructured video-based rendering: Interactive exploration of casually captured videos." ACM Transactions on Graphics (TOG) 29.4 (2010): 87, pp. 1-10.
Smolic, Aljoscha, Hideaki Kimata, and Anthony Vetro. "Development of MPEG standards for 3D and free viewpoint video." Optics East 2005. International Society for Optics and Photonics, 2005, pp. 1-13.
Amazon Web Services, "Amazon AppStream Developer Guide", Nov. 13, 2013, pp. 1-200.
M.A. Anusuya, et al., "Speech Recognition by Machine: A Review", International Journal of Computer Science and Information Security, 2009, pp. 181-205, vol. 6, No. 3.

(56) References Cited

OTHER PUBLICATIONS

Frank Dellaert, et al., "Recgonizing Emotion in Speech", IEEE, Spoken Language, 1996, pp. 1-4 Proceedings., Fourth International Conference on. vol. 3.

Santosh K. Gaikwad, et al., "A Review on Speech Recognition Technique", International Journal of Computer Applications, Nov. 2010, pp. 16-24, vol. 10, No. 3.

Kiel Mark Gilleade, et al., "Afftective Videogames and Modes of Affectived Gaming: Assist me, Challenge Me, Emote Me", Proceedings of DiGRA 2005 Conference, 2005, pp. 1-7.

Eva Hudlicka, "Affective Game Engines: Motivation and Requirements", Proceeding of the 4th International Conference on Foundations of Digital Games, ACM, Apr. 26-30, 2009, pp. 1-9, Orlando, Florida, USA.

Christian Martyn Jones, et al., "Creating an emotionally reactive computer game responding to affective cues in speech", HCI Proceedings, 2005, pp. 1-2, vol. 2.

Paul P.A.B. Merkx, et al., "Inducing and Measuring Emotion through a Multiplayer First-Person Shooter Computer Game", Proceedings of the Computer Games Workshop, 2007, pp. 1-12.

Alan Murphy, Dr. Sam Redfern. "Utilizing Bimodal Emotion Recognition for Adaptive Artificial Intelligence." International Journal of Engineering Science and Innovative Technology (IJESIT), Jul. 2013, pp. 167-173, vol. 2, Issue 4.

Bjorn Schuller, et al., "Acoustic Emotion Recognition: A Benchmark Comparison of Performances", IEEE, ASRU 2009, pp. 552-557.

Norman Makoto Su, et al., "Virtual Spectating: Hearing Beyond the Video Arcade", Proceedings of the 25th BCS conference on human-computer interaction. British Computer Society, 2011, pp. 269-278.

Thurid Vogt, et al., "Automatic Recognition of Emotions from Speech: A Review of the Literature and Recommendations for Practical Realisation", . Affect and emotion in HCI, LNCS 4868, Springer Berlin Heidelberg, 2008, pp. 75-91.

Greg Wadley, et al., "Towards a Framework for Designing Speech-Based Player Interaction in Multiplayer Online Games", Proceedings of the second Australasian conference on Interactive entertainment. Creativity & Cognition Studios Press, 2005, pp. 1-4.

\* cited by examiner

PARTICIPANT REWARDS IN A SPECTATING SYSTEM

BACKGROUND

Evolution of the Internet, Web-based computing, and mobile computing, including the increasingly widespread availability of broadband connections, support for high-resolution video, and the availability and capabilities of consumer computing devices including but not limited to mobile computing devices such as pad/tablet devices and smartphones, has led to continuing evolution and growth of online gaming. Online games may include everything from relatively simple, two-dimensional (2D) casual games to more complex 2D or three-dimensional (3D) action, sports, or strategy games that may involve one or more players in a game session, to multiplayer online battle arena (MOBA) games, to world-building multiplayer games, to complex 3D massively multiplayer online games (MMOGs) such as massively multiplayer online role-playing games (MMORPGs) that may support hundreds or thousands of active players in a persistent online "world".

The continued evolution and growth of online gaming has in turn led to the rise in popularity of video game spectating, or virtual spectating. In virtual spectating, one or more viewers or spectators may watch the game play of one or more other players actively participating in an online game without themselves actively participating in the game play. For example, in a multiplayer online game, spectators may watch one or more players or teams of players involved in a battle or otherwise participating in game play. Broadband Internet, high-resolution video, and video streaming technologies have led to the development of live broadcasting technologies that may be leveraged to provide online virtual spectating for online games. For example, a game spectating system may allow players to broadcast live or recorded streams of their game play to tens, hundreds, or thousands of spectators, while allowing the spectators to select the live or recorded broadcasts of particular players for viewing.

Figure 1A:
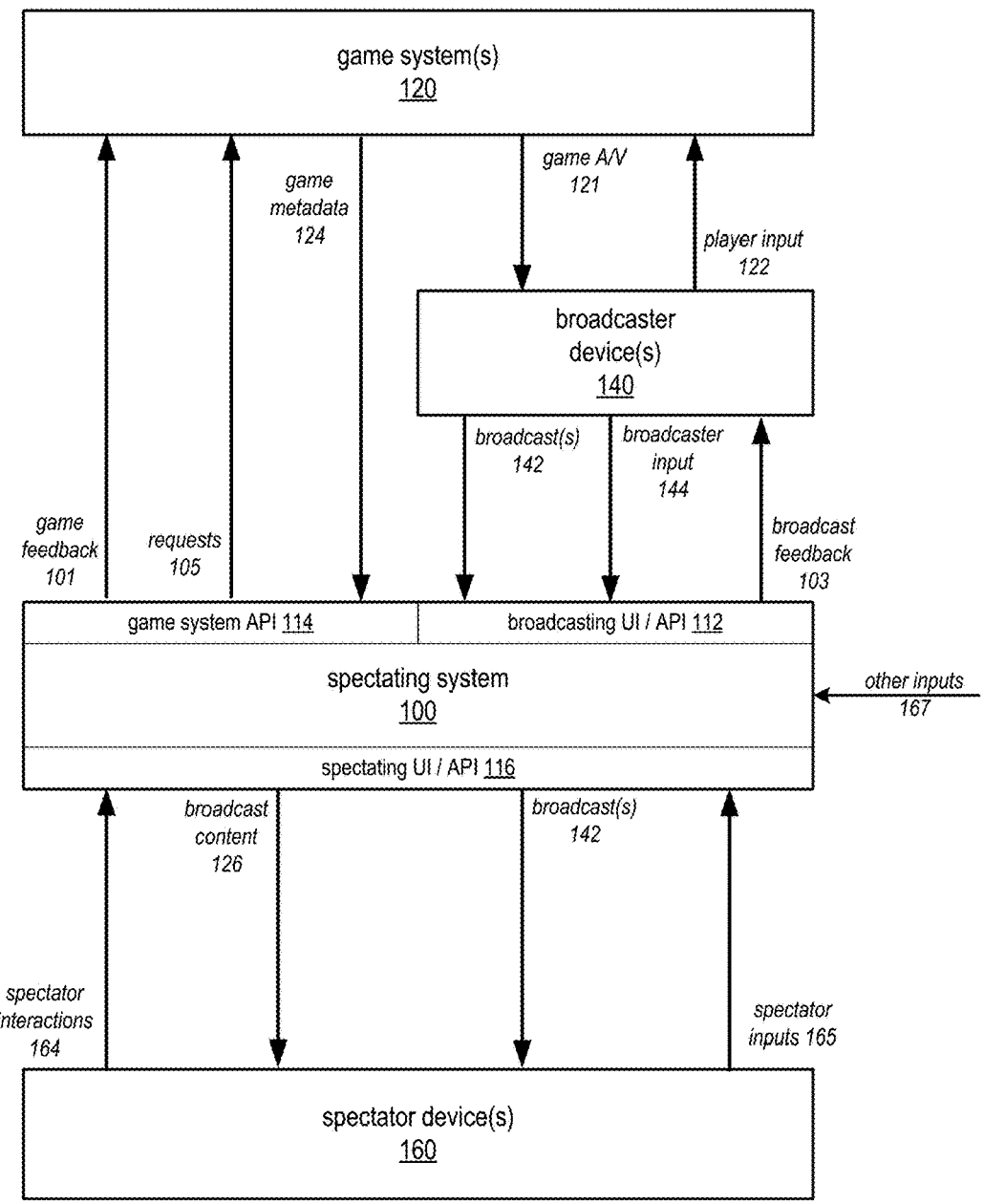
FIG. 1A is a block diagram that illustrates integrating game systems with a game spectating system in a game spectating environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Introduction

Various embodiments of methods and apparatus for integrating game systems with a game spectating system in a game spectating environment are described. In a game spectating environment, a game spectating system may receive broadcasts of players' game play from broadcaster devices and stream the broadcasts to spectator devices for viewing by respective viewers, referred to herein as spectators. A broadcast may include video showing game play of a respective broadcaster participating as a player in a game executing on a game system. Embodiments may include methods and apparatus for game systems to provide game metadata to the game spectating system in addition to the broadcast streams. Embodiments may also include methods and apparatus for providing content to spectators via the spectating system interface based at least in part on the game metadata acquired or obtained from the game system(s). Embodiments may also include methods and apparatus for enabling spectator participation to affect the games being broadcast via the spectating system interface.

Game spectating systems may include network-based video streaming systems or services that may allow game players to broadcast live streams of their game play to tens, hundreds, thousands or more spectators, while allowing the spectators to select the broadcasts of particular players (also referred to as channels) for viewing. A game spectating system may support live streaming of broadcast from tens, hundreds, or thousands of players simultaneously. A game spectating system may record at least some live broadcasts and allow the recorded broadcasts to be played back for viewing by spectators. A game spectating system may support live and recorded broadcasts for one, two, or more different online games.

Online games are network-based games that may allow one, two, or more players, in some cases even thousands of players, to simultaneously participate in a game from consumer devices coupled to a network. Online games that may be implemented in game spectating environments as described herein may vary from tightly scripted games to games that introduce varying amounts of randomness to the game play. An online game may, for example, be a game in which the players attempt to achieve some goal or overcome some obstacle, and may include multiple levels that the players have to overcome. An online game may, for example, be a game in which the players cooperate to achieve goals or overcome obstacles, or a game in which one or more of the players compete against one or more other players, either as teams or as individuals. Alternatively, an online game may be a game in which the players may more passively explore and make discoveries within a complex game universe without any particular goals in mind, or a "world-building" online game in which the players may actively modify their environments within the game universe. Online games may include everything from relatively simple, two-dimensional (2D) casual games to more complex 2D or three-dimensional (3D) action, sports, or strategy games, to multiplayer online battle arena (MOBA) games, to complex 3D massively multiplayer online games (MMOGs) such as massively multiplayer online role-playing games (MMORPGs) that may simultaneously support hundreds or thousands of players in a persistent online "world".

In this document, the term "player" is generally used to refer to an actual human that actively participates in an online game, the term "broadcaster" is generally used to refer to a player who broadcasts a stream of their game play via the game spectating system, the terms "viewer" or "spectator" are generally used to refer to an actual human that watches live or recorded game play online without directly participating in the game as a player, the term "participant" is generally used to collectively refer to players (active participants) and spectators (passive participants), the term "client" (as in "client device", "game client", "broadcasting client", and "spectating client") is generally used to refer to a hardware and/or software interface to a game system or streaming system via which a participant interacts with the game system and/or spectating system, and the term "character" or "game character" is generally used to refer to a player's in-game presence or "avatar" that the player may control via a game client on a client device to interact with other game characters, other game entities, and other objects within the game environment during a game session.

While embodiments are primarily described herein in the context of spectating systems that broadcast game play in multiplayer online gaming environments in which two or more players remotely participate in online game sessions, it is to be noted that embodiments may also be applied to single-player online games, as well as to single-player and multiplayer games that are not necessarily online, such as single-player and multiplayer console games that may be played locally/offline. Further, while embodiments are primarily described with examples of streaming live or recorded broadcasts of games involving players with in-game characters or avatars such as action, sports, MOBA, and MMOG games, embodiments may be applied to live and recorded streams of any type of game, for example card games or strategy games such as chess, with any number of players from single-player games to MMOGs. In addition, in some embodiments, a spectating system may support broadcasts or streams of live and/or recorded digital media content from sources other than game systems, for example from live sports games, competitions, concerts, talk shows, and other events or activities including but not limited to live streams from electronic spectator sports (eSports) competitions, and embodiments may also be applied to these broadcasts or streams. Further, while embodiments are primarily described in the context of live streams or video, embodiments may also be applied to previously recorded streams or video.

In some embodiments of a spectating system, spectators may be divided into two or more groups, tiers, or levels. As non-limiting examples of groupings for spectators, spectators may be divided into subscribers and non-subscribers, or viewers, followers, and subscribers. A subscriber is a viewer or spectator who has signed up for (and generally but not necessarily pays for) at least some of the services spectating system as a service. A viewer or non-subscriber is someone who may view at least some content from the spectating system, but that has not necessarily registered with, subscribed to, or paid for the service to receive additional or full content or services provided to subscribers. A follower may be a person who has registered with the spectating system, that has registered as a "follower" of spectating system content (broadcast, broadcaster, channel, game, etc.), that may participate as a spectator in broadcasts, and that may receive some benefits (e.g., notifications via social media channels for events in broadcasts) as a follower, but that has not subscribed to the spectating system to receive full subscription benefits. In addition, there may be multiple levels or tiers for groups or subscribers, such as a first (e.g., "silver") membership level that provides some amount of content and services, and a second (e.g., "gold") membership that provides more (or all) content and services, for example for a higher membership fee or as a reward for participating in broadcasts. Note that spectators may be grouped according to any of various other criteria. As non-limiting examples, spectators may be grouped by geographic region, affiliations, age, length of participation with the spectating system, or any of various demographic and profile metrics.

In some embodiments, in addition to broadcaster/players and spectators, participants in an online gaming environment may include commentators. A commentator may be a spectator who watches live or recorded game play without directly participating in the game. However, a commentator may generally be someone that is knowledgeable about the game and that provides audio commentary on the game being watched, for example game analysis, player analysis, and play-by-play commentary. One or more commentators may provide audio and/or textual commentary for a given game being broadcast in a spectating system, and the commentary may be added to the broadcasts streamed to the spectators.

In at least some embodiments, a game spectating system may obtain game metadata from game systems for which broadcasts are being streamed, generate content (referred to as broadcast content) for respective broadcasts at least in part from the game metadata, and present the broadcast content with the respective broadcasts to spectators via spectator interfaces on the spectators' devices. The broadcast content may be targeted to particular spectators or groups of spectators, for example according to the spectators' current selections, profiles, or preferences. In some embodiments, the spectating system may obtain and process spectator interactions with the broadcast content to affect broadcast presentation in the spectating system and/or game execution and game play in the game system in various ways.

In some embodiments, the game metadata may be received according to an application programming interface (API) presented to the game systems by the spectating system, referred to herein as a game system API. The game system API allows game developers to program games to interact with spectating system functionality as described herein. In some embodiments, a software development kit (SDK) may be provided that assists game developers in developing and programming games to support the spectating system's game system API. In some embodiments, the game metadata for a given game system may include one or more of, but is not limited to, game state(s) for the game executing on the game system, indications and descriptions of events in the game, player inputs to the game, and data describing or representing objects, players/characters, locations, levels, and other content or aspects of the game. In some embodiments, at least some of the game metadata, for example game states, may be provided in response to requests from the spectating system. In some embodiments, the spectating system may also obtain or receive game metadata from other sources, including but not limited to broadcast devices and data stores of game-related data.

A game state may be a point-in-time record of game information and game data that represents a particular game at a particular point on the game timeline within the game universe. A game state may include game data that represents and that can be used, for example by a game client executing on a device, to reconstruct the game at the particular point on the game timeline within the game. In at least some embodiments, game states may be received according to a game system API presented to the game systems by the spectating system. In some embodiments, one or more game states may be used to regenerate the game session universe, for example to begin or resume game play at the respective point in the game session timeline. Note that format and content of a game state may be different for different types, titles, or versions of games.

In at least some embodiments, indications of game events may be received from the game systems according to a game system API presented to the game systems by the spectating system. Game events may include events that are common across two or more games. However, at least some game events may be game-specific events as defined by a respective game systems. Examples of game events may include, but are not limited to: particular achievements by particular players or teams of players; level starts and completions; beginnings, endings, or other significant moments of battles, bouts, challenges, or other in-game events; in-game character entrances, exits, deaths, etc.; acquisitions or loss of items, objects, powers, etc. by in-game characters or players; or in general any event or moment that may be of interest within a game executing on a game system.

In at least some embodiments, indications of player inputs to the game for at least some of the players in the game may be received from the game systems according to the game system API presented to the game systems by the spectating system. A player input may be a single command or action input to the game from a respective player's game client or game controller. A player input or a combination of player inputs may cause, be involved in, or be associated with a game event. In some embodiments, player inputs to a game may be stored as part of a game record with one or more game states and other game information to form a record of a particular game session (referred to as a game record) that may, for example, be vended to clients including but not limited to spectators. A game record including player inputs may be replayed, and in some embodiments a viewer of a replay may "step into" the replay as described later in this document.

In addition to receiving and processing game metadata from the game system(s) to generate broadcast content, in some embodiments the spectating system may obtain and analyze various inputs from participants (players, broadcasters, and/or spectators) in the game spectating environment to detect events in or determine other information about the broadcasts and/or games executing on the game systems. The events and other information determined from analyzing the participant inputs may collectively be referred to as broadcast metadata. The spectating system may generate broadcast content for respective broadcasts at least in part from the broadcast metadata, and may present the broadcast content with the respective broadcasts to participants including but not limited to spectators via interfaces on respective devices. The various participant inputs may include one or more of, but are not limited to: audio or voice inputs such as in-game vocal communications or broadcast vocal channels; video or image inputs (e.g., video or images of a participant's facial expressions or eyes); text input such as in-game or broadcast text chat; biometric inputs from the players; and participant inputs to a broadcast via spectating user interfaces (UIs), for example inputs indicating or voting on in-game or broadcast events as highlights for the broadcasts and/or games.

The generated broadcast content that may be presented with the respective broadcasts to spectators via spectator interfaces on the spectators' devices may include one or more of various user interface (UI) elements (e.g., buttons, dialogs, lists, tabs, menus, images, video clips, links, text, panes that include one or more other UI elements, etc.) that may be presented on a UI with the broadcast video, and/or one or more overlays (e.g., overlay video, text, etc.) that may be added to the broadcast video. At least some of the UI elements may be or may include active UI elements that initiate or perform some action when selected.

In some embodiments, spectator interactions with the broadcast content may be tracked, processed, and recorded as additional broadcast metadata or as spectating data. The spectator interactions may include one or more of, but are not limited to, selecting a UI element, manipulating a UI element (e.g., by scrolling, clicking, sliding, turning, etc.), hovering (e.g., with a cursor) over or near a UI element, inputting to a UI element (e.g., entering text in a text box), and focusing on one or more UI elements (e.g., as detected via eye tracking technology).

In some embodiments, the broadcast content may be presented to the spectators via spectating system client instances on the spectators' devices as provided by the spectating system. In some embodiments, the broadcast content may instead or also be provided to various applications executing on the spectators' devices according to an application programming interface (API) presented to the applications by the spectating system.

In some embodiments, instead of or in addition to the spectating system adding broadcast content to a broadcast, a system, module, or service (referred to herein as a broadcast content service) may logically lie between the spectating system and spectator devices. The broadcast content service may receive broadcast streams, broadcast metadata, and game metadata from the spectating system, and may add or modify broadcast content to the broadcast streams based at least in part on the game metadata and/or broadcast metadata.

In some embodiments, the spectating system may leverage the game metadata to provide a virtual storefront for game-related content via which spectators may view, select, and order, purchase, or otherwise obtain game-related content. The game-related content may include virtual game items or objects (e.g., digital representations of physical objects) such as in-game gear, clothing, weapons, characters, avatars, powers, and so on, that may be acquired for use within the games, physical items such as physical representations of virtual objects from within the games (e.g., physical swords, action figures, toys, etc.), and/or game-related physical merchandise such as t-shirts, posters, videos, or hats. In some embodiments, the spectating system may provide, or may provide access to, a "print on demand" service whereby 3D printing technology may be used to print physical objects based on input designs or specifications of game-related objects or items (e.g., in-game characters, weapons, vehicles, monsters, etc.). The designs or specifications for the objects may be obtained from the game systems in the game metadata, or may be otherwise obtained. The virtual storefront may provide a user interface (UI) whereby spectators can view information about the in-game content, for example statistics on which characters/players use an item, how they use it, the item's history or success, and so on. The spectating system may provide text and/or voice chat channels via which the spectators and broadcasters may discuss the game-related items available via the virtual storefront. In some embodiments, a broadcaster may select or specify particular items or objects that are advertised or sold via the virtual storefront UI on the broadcaster's channel.

In some embodiments, the spectating system may leverage the game metadata to allow spectators to join or "step into" games being broadcast via the spectating system. In some embodiments, the broadcast content presented to the spectators on a spectating UI may include user interface elements via which spectators can order, purchase, or otherwise obtain demo or full versions of games. In some embodiments, game client software and game data for participating in demo or full versions of online games may be obtained and downloaded to the spectator's devices via the spectating system interfaces and broadcast streams. In some embodiments, the broadcast content presented to the spectators on a spectating UI may include user interface elements via which spectators can order, purchase, or otherwise obtain characters, avatars, gear, and other items for participation in particular games. The obtained characters and game items may be downloaded to the spectators' devices via the spectating system interfaces and broadcast streams. In some embodiments, using the spectating UI to obtain the game client software, game data, characters, and gear via the broadcast streams, the spectators may join live game sessions of online games, start new game sessions, and/or replay previously recorded game sessions or portions of game sessions.

In some embodiments, the spectators may use the spectating UI to obtain the game client software, game data, characters, and gear via the broadcast streams, and may also obtain, "step into", and replay previous game sessions or portions of game sessions. In some embodiments, game states can be purchased or otherwise obtained via the spectating system interfaces and broadcast streams. In some embodiments, the broadcast content presented to the spectators on a spectating UI may include user interface elements via which one or more game states, for example the game states provided with the game metadata, may be advertised, obtained by the spectator, and used to regenerate the game session universe and start or resume game play at the respective point in the game session timeline, with the spectator becoming a player and stepping into the game session universe and timeline, either using their own in-game character or avatar or stepping into and taking control of a character that is already in the game session. In some embodiments, the broadcast content presented to the spectators on a spectating UI may include user interface elements via which spectators can view, order, purchase, or otherwise obtain characters, avatars, and gear of players who participate in particular games. Thus, in some embodiments, a spectator can obtain an in-game character and "load out" or equip the character, obtain an executable version of the game, obtain and "step into" game states, and step into or become characters or clones of characters in the game sessions, all via the spectating system interfaces and streams.

In some embodiments, a "ghosting" mode may be supported when replaying game sessions from obtained game states or game records. In ghosting mode, a player may jump into a game being broadcast, or replay a previously recorded game session of a broadcaster/player, via the spectating system interface. The original player's character/gear (e.g., racecar) may still be visible as a "ghost" to the new player. Thus, the new player may compare their performance to that of the original player by viewing the original player's "ghost" during replay. In addition, the original player's broadcast commentary (video, audio, and/or text) may be played or displayed to the new player. As an example, the new player may use the ghosting mode as a training tool to learn how a skilled or accomplished broadcaster/player has played a difficult level or challenge within the game.

In some embodiments, the spectating system may leverage the game metadata and/or broadcast metadata to provide rewards or otherwise acknowledge spectating system participants (broadcaster/players, spectators, and/or commentators). In some embodiments, spectators may be rewarded for participating in broadcasts or in particular events in broadcasts or games being broadcast. In some embodiments, the spectating system may analyze the game metadata and/or broadcast metadata to detect big or significant events or highlights in broadcast streams, and may reward at least some spectators for "being there" or viewing the big events. In some embodiments, spectators may be rewarded for interacting with broadcasters, for example for actively participating in broadcast audio or text chat channels. Examples of spectator rewards may include but are not limited to acknowledgements or "badging" on the game spectating system interface, virtual or digital items such as in-game virtual gear, discounts or free access to spectating system or game content, physical items such as t-shirts or hats, and points that may be collected and used to purchase items or win prizes. In some embodiments, the spectating system may allow broadcasters to reward or promote particular spectators, for example by selecting a spectator who shows good knowledge of the game to be a commentator for the game. In some embodiments, broadcaster/players may be rewarded for particular accomplishments, for example in-game achievements such as performing certain feats in front of crowds of certain sizes, or achieving certain levels of audience participation or support (audience size, enthusiasm, voting, etc.). As non-limiting examples, a broadcaster/player may get an in-game health or strength boost or may be rewarded with in-game powers, gear, weapons, or information based on a growing audience size or audience enthusiasm as expressed through audio and/or textual spectator chat input. As another example, a broadcaster may get special broadcast content added to their broadcast channel display based on their achievements. As another example, a broadcaster may receive monetary rewards for bringing in new followers or subscribers to the spectating system through their broadcast channel.

In some embodiments, the spectating system may enable spectator participation in broadcasts to affect the games being broadcast via the spectating system interface in various ways. In some embodiments, the spectating system may determine information based on spectator participation in broadcasts and provide the information as feedback to the game systems according to a game system API presented to the game systems by the spectating system. Spectator participation metrics that may be used include but are not limited to crowd or audience size for broadcasts or games, and spectator audio and/or text input to broadcast "chat", "crowd noise", or other audio and textual channels. In some embodiments, spectator participation in broadcasts may be used as a randomizing factor in games. For example, one or more aspects or metrics of spectator participation in a broadcast or broadcasts (crowd or audience size, crowd noise, chat level or volume, etc.) may be measured or tracked and provided as feedback to a game system for use as a game randomizing factor. In some embodiments, spectator participation in broadcasts may be used to non-randomly affect the game players and/or games being broadcast in various ways. As a non-limiting example, the size of a crowd or audience watching a broadcast or broadcasts of an event in a game may be fed back to the game and may dictate the size or appearance of the stadium, arena or other event venue, the size of a virtual crowd of spectators shown as viewing the event, and/or the volume of the crowd noise provided as audio output with the broadcast. As another example, the level of crowd enthusiasm or support, for example as measured from the volume, quantity, or content of audio and/or text chat channel inputs to a broadcast, may be fed back to the game and may affect the number of "bad guys" or monsters that appear at the current level that the broadcaster/player is at, or may be used to reward the broadcaster at the level by giving the player access to certain weapons, or may have various other in-game effects. As another example, spectators' audio and/or textual inputs may be analyzed to detect content or emotion (keywords, cheers, boos, happiness, etc.); the analysis may be fed back to the game and used to affect a player's in-game status, health, power, weapons, etc.

In some embodiments, the spectating system may enable spectators to interact with and affect the games being broadcast via the spectating system interface, or the players within the games, in various ways. In some embodiments, individual spectators may interact with the games via the game spectating interface to cause in-game effects. In some embodiments, groups of spectators may cause in-game effects or otherwise influence the game via the game spectating interface, for example based on voting. In some embodiments, the spectating system may leverage the game metadata to provide spectating UI elements with which spectators can interact to provide input to respective games. In some embodiments, the spectating system may provide the spectator interactions as feedback to the game systems according to a game system API presented to the game systems by the spectating system. In some embodiments, spectators may affect or influence the game, objects within the game universe, events within the game, or the players in the game via the UI elements on the game spectating interface. As non-limiting examples, spectators may build buildings, hide weapons, set difficulty levels, select weather or other environmental factors, or otherwise affect game content and events via UI elements presented on the game spectating interface. In some embodiments, spectators may provide game content to or "gift" particular players or teams of players within a game via the game spectating interface, for example with objects, boosts, weapons, medicine, health points, strength levels, etc. In some embodiments, spectators can provide information, for example maps, warnings, or advice, to players or teams of players in a game via the game spectating interface. In some embodiments, spectators may introduce challenges and difficulties to the games or players within the games via the game spectating interface, for example by causing storms or other catastrophes, by increasing difficulty of game levels or tasks, by taking objects from players, by reducing players' strength, and so on.

In some embodiments the spectating system may store at least part of the game metadata and broadcast metadata including but not limited to spectator interactions with respective broadcast content as game spectating data. The game spectating system may provide one or more user interfaces (UIs), query interfaces, and/or application programming interfaces (APIs) via which consumers (e.g., game developers, online merchants, broadcasters, etc.) may obtain or view the game spectating data, for example for use in analyzing online game usage and performance for application in game development, advertising, and/or marketing.

Note that the terms "obtain", "provide", "download", "stream", "provision", and the like (as used in this document in relation to various game-related virtual or physical items including but not limited to games, game streams, game states, game records or recordings, game content, game characters or gear, game-related merchandise, and so on) may, but do not necessarily, involve purchasing, leasing, subscribing to, or otherwise paying for the respective items.

Example Game Spectating Environments

FIG. 1A is a block diagram that illustrates integrating game systems with a game spectating system in a game spectating environment, according to some embodiments. A game spectating environment may include a spectating system 100, one or more game systems 120, and multiple client devices; the client devices may include broadcaster devices 140 and spectator devices 160.

Figure 33:
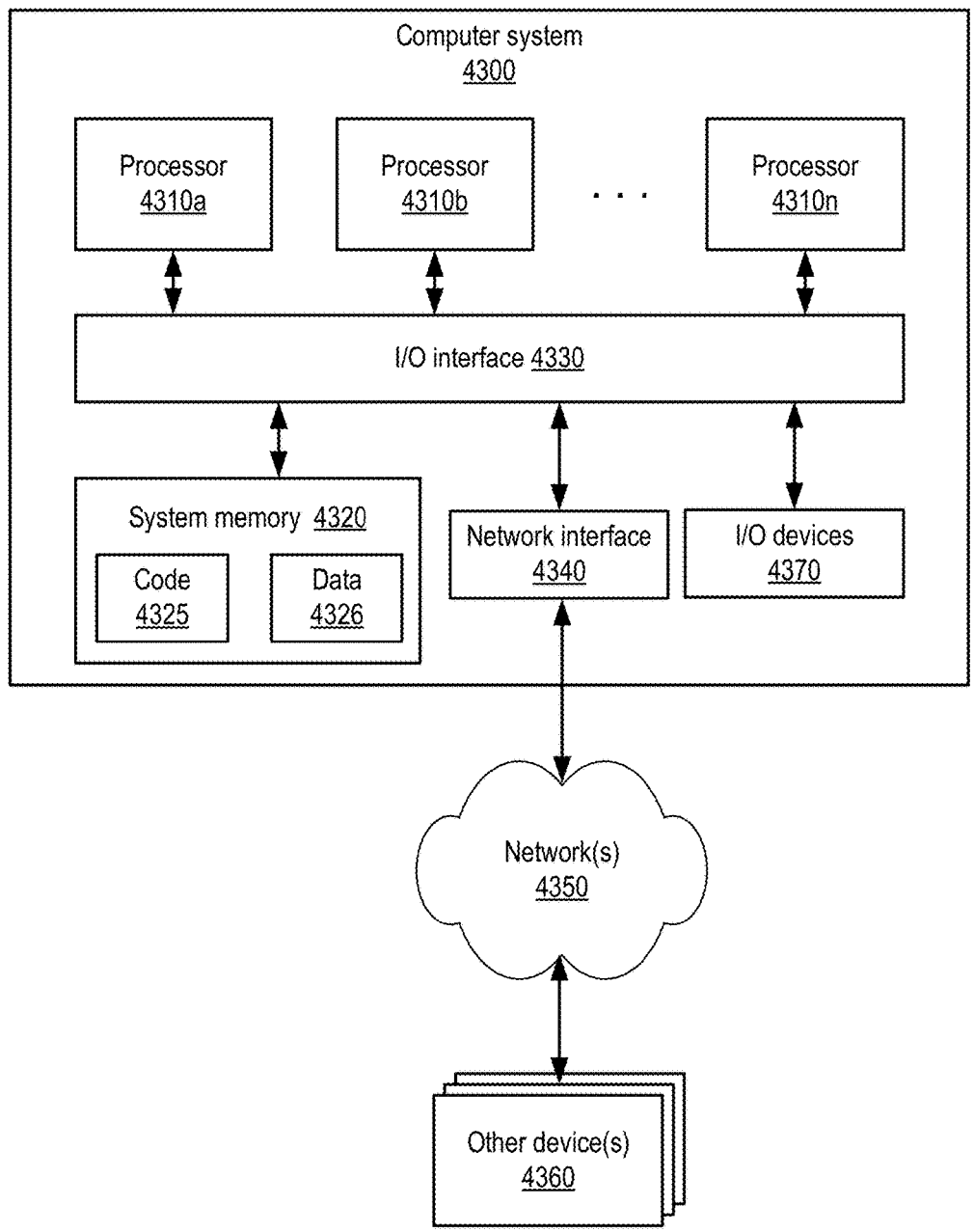
FIG. 33 is a block diagram illustrating an example computer system that may be used in some embodiments.

Client device (e.g., broadcaster devices 140 and spectator devices 160) may include any of a variety of consumer devices including but not limited to desktop computer systems, laptop/notebook computer systems, pad/tablet devices, smartphone devices, game consoles, handheld gaming devices, and wearable devices. Thus, client devices may range from powerful desktop computers configured as gaming systems down to "thin" mobile devices such as smartphones, pad/tablet devices, and wearable devices. A client device may implement an operating system (OS) platform that is compatible with the device. A client device may include, but is not limited to, input and output components and client software. The client software on a particular client device may be tailored to support the configuration and capabilities of the particular device type and the OS platform of the device. An example computing device that may be used as a client device is illustrated in FIG. 33.

A broadcaster device 140 may include, but is not limited to, input and output components (including but not limited to input devices and technologies such as controllers or joysticks, motion tracking systems, gesture-based input systems, etc.) and game client software and/or hardware for at least one game system 120 via which respective players can participate in game sessions currently being executed by the game system(s) 120. A broadcaster device 140 may also include input and output components (e.g., video cameras and microphones) and broadcasting client software and/or hardware for the spectating system 100 via which respective players may generate live A/V streams of their online game play (broadcasts 142) and other broadcaster input 144 including but not limited to audio and textual commentary for broadcasting to spectators via the game spectating system 100. A spectator device 160 may include, but is not limited to, input and output components (including but not limited to input devices and technologies such as controllers or joysticks, motion tracking systems, gesture-based input systems, etc.) and spectating client software and/or hardware via which respective spectators may interact with the spectating system 100 to select, receive, and view broadcasts 142 from the broadcasters or playbacks of previously recorded broadcasts, and via which the spectators may provide spectator inputs 165 including but not limited to audio or textual chat or "crowd noise" for broadcasts 142 and spectator interactions 164 with broadcast content 126 including but not limited to content generated at least in part from game metadata 124 received from game system(s) 120 by the spectating system 100. In some embodiments, spectator inputs 165 may also include inputs from input devices and technologies such as controllers or joysticks, motion tracking systems, gesture-based input systems, and so on.

In some embodiments, spectating system 100 may include one or more computing devices, for example one or more server devices, that implement game spectating functionality. In some embodiments, spectating system 100 may be a network-based video streaming system or service that may allow players to broadcast live streams 142 of their online game play to tens, hundreds, thousands or more spectators, while allowing the spectators to select the broadcasts 142 of particular players (also referred to as channels) for viewing. A spectating system 100 may support live broadcasts 142 for one, two, or more different game systems 120, and may support live streaming of broadcasts 142 from tens, hundreds, or thousands of broadcaster devices 140 to the spectator devices 160. In some embodiments, a spectating system 100 may record at least some broadcasts 142 and allow the recorded broadcasts 142 to be played back to spectator devices 160 for viewing by spectators. A game spectating system 100 may support live and recorded broadcasts 142 for one, two, or more different online games 120.

In some embodiments, spectating system 100 may also include or access other devices, services, or systems including but not limited to storage devices, systems, or services for storing profile, preferences, and other information for participants (players, broadcasters, and/or spectators), recordings of broadcasts 142, and game spectating data including but not limited to game metadata 124. In some embodiments, spectating system 100 may store recordings of at least some broadcasts 142 to a data store, and may allow spectators to select and play back the recordings via spectating client software on the spectator devices 160.

In some embodiments, spectating system 100 may implement one or more UIs and/or one or more APIs to the game spectating system 100 functionality. For example, spectating system 100 may implement a broadcasting UI/API 112 that broadcasters may access via broadcaster devices 140 to broadcast 142 their live game play and other input 144 such as video input and audio or textual commentary or chat. As another example, spectating system 100 may implement a spectating UI/API 116 that spectators may access via spectator devices 150 to select, receive, and view live broadcasts 142 from the broadcasters or playbacks of previously recorded broadcasts 142, and via which the spectators may provide spectator input 165 (e.g. audio or textual commentary or chat) for broadcasts 142, and via which the spectators may interact 164 with broadcast content 126 provided by the spectating system 100. As another example, spectating system 100 may implement a game system API 114 via which game system(s) 120 may communicate game metadata 124 to the spectating system 100, and via which the spectating system 100 may provide feedback to the game system(s) 120. In some embodiments, at least some of the game metadata 124, for example game states, may be provided in response to requests 105 from the spectating system 100.

In some embodiments, a spectating system 100 may support broadcasts of live and/or recorded digital media content via broadcaster devices 120 from sources other than game systems 120. For example, in some embodiments, the spectating system 100 may support live or recorded broadcasts of streams from sports games, competitions, concerts, and other events including but not limited to live streams from electronic spectator sports (eSports) competitions. eSports (also referred to as competitive gaming) generally refers to organized multiplayer video game competitions. For example, video cameras and audio equipment may be installed in an arena or other venue in which an event such as a sports game or an eSports competition is being held. Video and/or audio feeds from the equipment may be input to one or more broadcaster devices 120 that may composite and stream the audio/video (A/V) inputs to the spectating system 100. For eSports events, game A/V 121 may be added to the stream along with the feeds from the cameras and audio equipment. Commentators and/or broadcasters may input their audio, text, and/or video content into the stream as well. The live stream may be broadcast to spectator devices 160 by the spectating system 100, and/or may be recorded for rebroadcast. Spectators may view the broadcast on spectator devices 160, and may also input A/V and/or text input via spectating system clients on their devices 160.

While FIG. 1A shows game systems 120 as separate from spectating system 100 and broadcaster device(s) 140, in some embodiments, at least one game system 120 may be implemented at least in part by or may be a component of a spectating system 100. In some embodiments, at least one game system 120 may be implemented at least in part by or may be a component of a broadcaster device 140. In some embodiments, one or more broadcaster devices 140 may be implemented within spectating system 100. In addition, in some embodiments, a spectating system 100 may be implemented at least in part by or may be a component of a game system 120.

Figure 8:
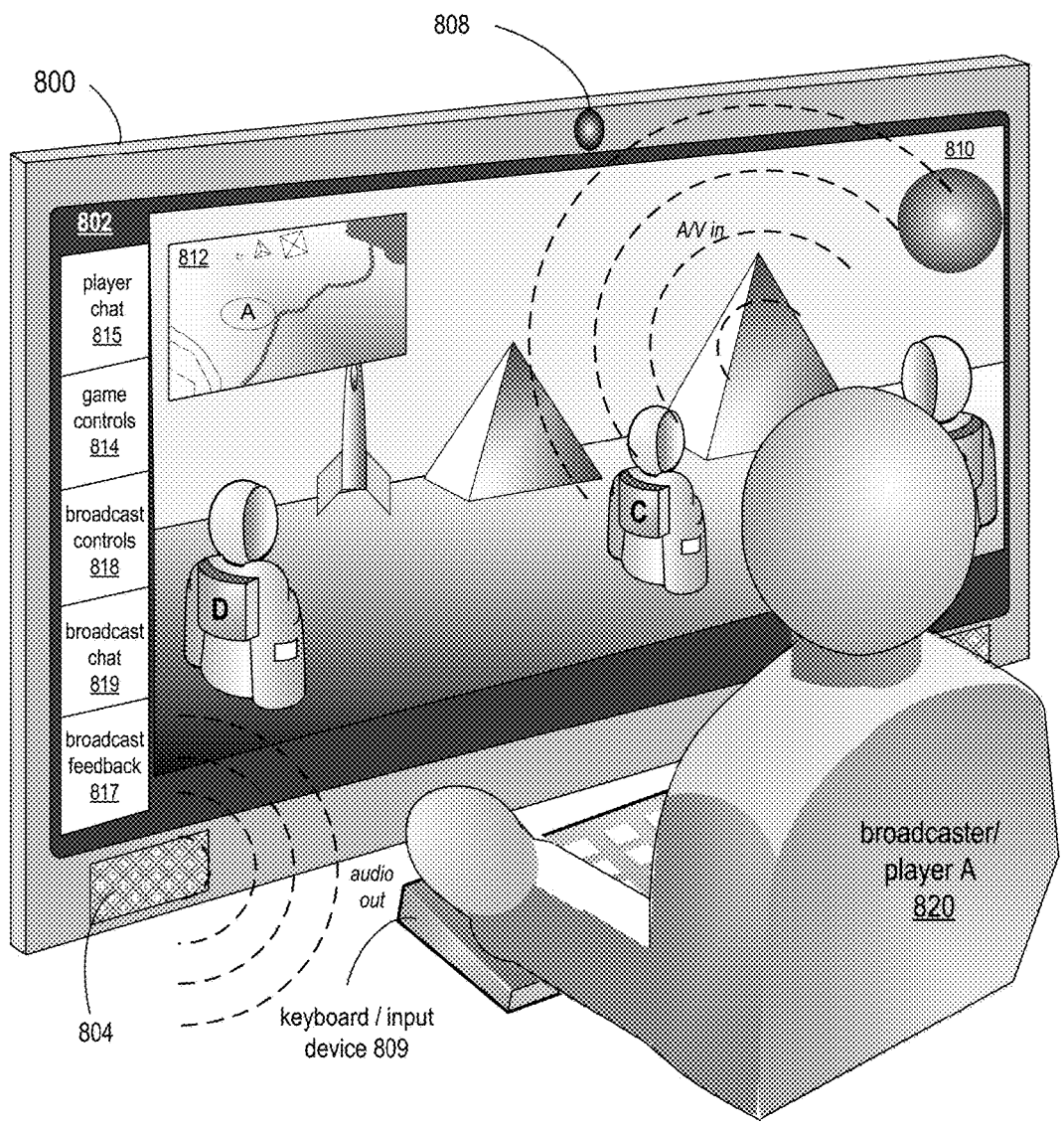
FIG. 8 provides a non-limiting example of a broadcaster user interface for a game spectating system, according to some embodiments.

The following is a broad description of an example method for streaming broadcasts in a game spectating system, and is not intended to be limiting. Typically, a game system 120 may include a game engine that renders a 2D or 3D representation of a game universe based on the current state of the universe, generates video and sound, and sends or streams the video and sound (A/V) output 121 to client devices including but not limited to broadcaster device(s) 140 for display. On a broadcaster device 140, the player/broadcaster interacts with the game system 120 and participates in the game executing on the game system 120 via player input 122 using game client software on device 140, and uses the broadcasting UI/API 112 provided by the spectating system 100 to construct a live stream (broadcast 142) of the broadcaster's game play for broadcast. The live stream may include the game A/V 121 received from the game system 120, and may also include video and audio input of the player captured by A/V components (e.g., a video camera and microphone) of the device 140 either as a separate stream or embedded in the game A/V 121 stream. In some embodiments, the player/broadcaster may also use broadcasting UI/API 112 to provide text input for a broadcast 142, for example text input to a broadcast chat window. FIG. 8 provides a non-limiting example of a broadcaster user interface for a game spectating system, according to some embodiments.

In some embodiments, the live streams of the broadcasts 142 are sent from the broadcaster device(s) 140 to the spectating system 100 according to the broadcasting UI/API 112. Video input may be received by spectating system 100 in any of a variety of video formats. Audio input may, for example, be received by spectating system 100 as audio tracks in video input, as Voice over IP (VoIP), or according to other network formats or protocols that support digital audio transmission. On the spectating system 100, the live streams of the broadcasts 142 are processed for rebroadcast to spectator devices 160. In some embodiments, at least some of the broadcasts 142 may be recorded and stored for playback.

On a spectator device 160, a spectator may select a particular broadcast 142 or channel for viewing via a spectating UI presented on a spectator device 160 according to spectating UI/API 116 provided by the spectating system 100. The spectating system 100 may then stream the selected broadcast 142 to the spectator device 140 via spectating UI/API 116 for display. In some embodiments, the spectator may use A/V components of the device 160 (e.g., a microphone) to provide audio input (e.g., vocal commentary, cheers, crowd noise, or vocal chat) for the current broadcast 142 being viewed as input 164 via spectating UI/API 116. The spectator may also provide text input, for example text input to a broadcast chat window provided by spectating UI/API 116. FIGS. 6A, 6*b*, 7A, 7B, and 9 provide non-limiting examples of spectating user interfaces that may be used to view broadcasts in a game spectating environment, according to some embodiments.

In at least some embodiments, spectating system 100 may obtain game metadata 124 from game system(s) 120 for which broadcasts are being streamed, generate broadcast content 126 for respective broadcast 142 streams received from broadcast device(s) 140 at least in part from the game metadata 124, and present the broadcast content 126 with the respective broadcasts 142 to spectators via spectating client interfaces on the spectators' devices 160. In at least some embodiments, the game metadata 124 may be received according to a game system API 114 presented to the game system(s) 140 by the spectating system 100. In some embodiments, the game metadata 124 for a given game system 120 may include one or more of, but is not limited to, game state(s) for the game executing on the game system, indications and descriptions of events in the game, and data describing or representing objects, players/characters, locations, levels, and other content or aspects of the game. In some embodiments, at least some of the game metadata 124, for example game states, may be provided in response to requests 105 from the spectating system 100.

In some embodiments, in addition to obtaining and processing game metadata 124 from the game system(s) to generate broadcast content, the spectating system 100 may obtain and analyze various inputs 144 and 164 from participants (players, broadcasters, and/or spectators) in the game spectating environment to detect events in or determine other information about the broadcasts 142 and/or games executing on the game system(s) 120. The events and other information determined from analyzing the participant inputs may collectively be referred to as broadcast metadata. In some embodiments, the spectating system 100 may generate broadcast content 126 for respective broadcasts 142 at least in part from the broadcast metadata, and may present the broadcast content 126 with the respective broadcasts 142 to participants including but not limited to spectators via interfaces on respective spectator devices 160. The various participant inputs 144 and 164 may include one or more of, but are not limited to: audio or voice inputs such as in-game vocal communications or broadcast vocal channels; video or image inputs (e.g., video or images of a participant's facial expressions or eyes); text input such as in-game or broadcast text chat; biometric inputs from the participants; and participant inputs to a broadcast via broadcasting and/or spectating user interfaces (UIs), for example inputs indicating or voting on in-game events or broadcast events as highlights for the broadcasts and/or games.

In some embodiments, the generated broadcast content 126 that may be presented with the respective broadcasts 142 to spectators via spectating UIs on the spectators' devices may include one or more of various UI elements that may be presented on a spectating UI with the broadcast 142 video, and/or one or more overlays that may be added to the broadcast 142 video. At least some of the UI elements may be or may include active UI elements that initiate or perform some action when selected.

In some embodiments, the broadcast content 126 may be targeted to particular spectators or groups of spectators, for example according to the spectators' current selections, profiles, or preferences.

Figure 9:
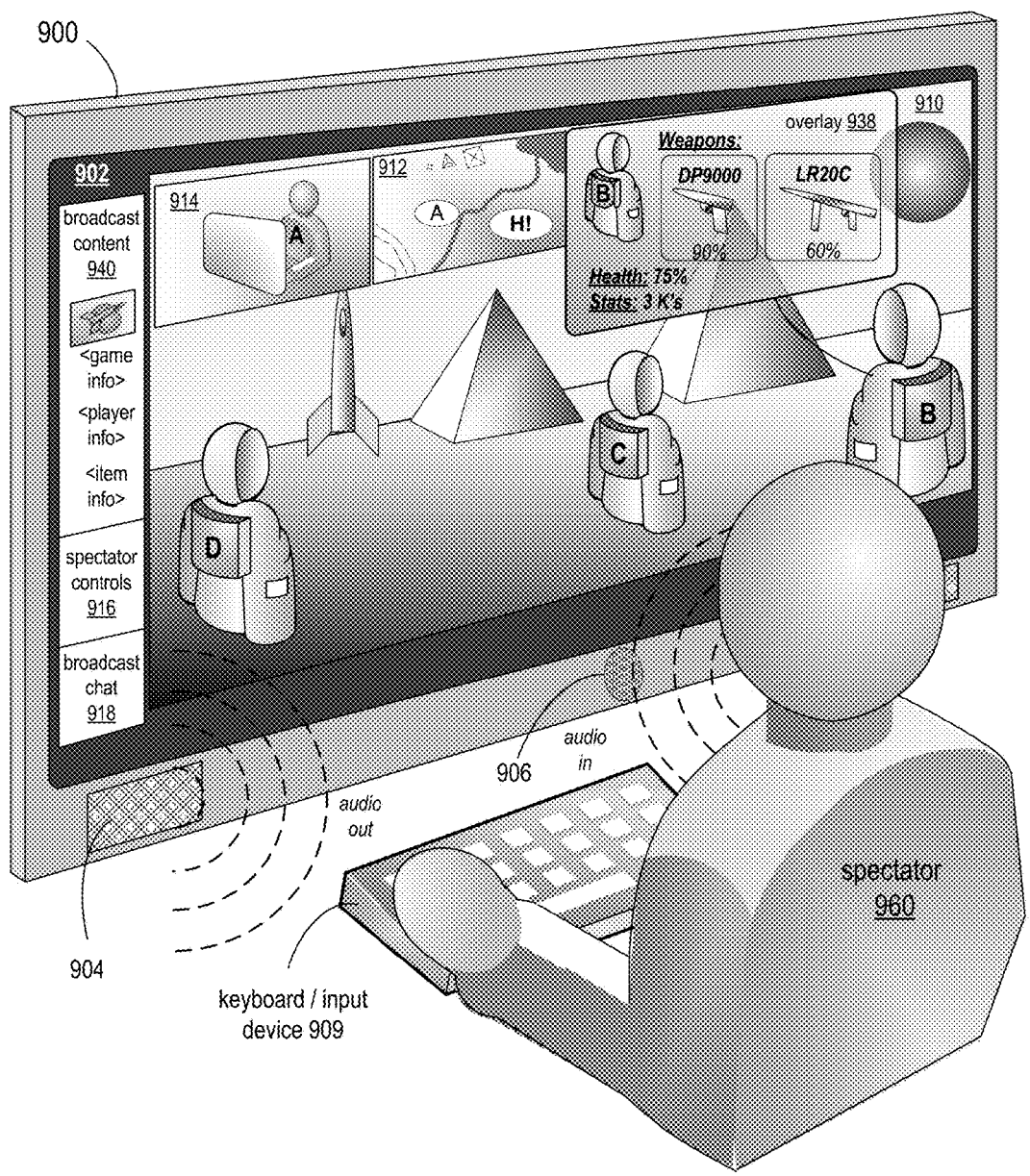
FIG. 9 provides another non-limiting example of a spectating user interface for a game spectating system, according to some embodiments.

In some embodiments, the spectating system 100 may obtain and process spectator interactions 164 with the broadcast content 126 to affect game spectating, broadcast 142 processing, and broadcast content 126 in the spectating system 100 in various ways as described herein. In some embodiments, the spectating system 100 may provide game feedback 101 to the game system(s) 120. The game feedback 101 may be generated at least in part from the spectator interactions 164 with the broadcast content 126. In some embodiments, the game feedback 101 may be provided according to a game system API 114 presented to the game system(s) 140 by the spectating system 100. The game system(s) 120 may apply the game feedback 101 to affect game execution and game play in the game system 120 in various ways. In some embodiments, the spectating system 100 may also provide broadcast feedback 103 to the broadcast device(s) 140 based at least in part on the spectator interactions 164 with the broadcast content 126. In some embodiments, the broadcast feedback 103 may be provided to the broadcasters via a broadcasting UI/API 112 presented to the broadcast devices 140 by the spectating system 100, for example as illustrated in FIG. 9.

In some embodiments, the spectating system 100 may include one or more interfaces that can obtain, process, display, and analyze inputs from other input 167 sources or channels, including but not limited to inputs from social media channels such as "tweets" or instant messaging (IMs). In some embodiments, inputs from the other sources 167, such as text inputs to a social media chat channel, may be obtained, processed, and analyzed to affect broadcast content 126, game feedback 101, and/or broadcast feedback 103 in various ways as described herein.

Figure 1B:
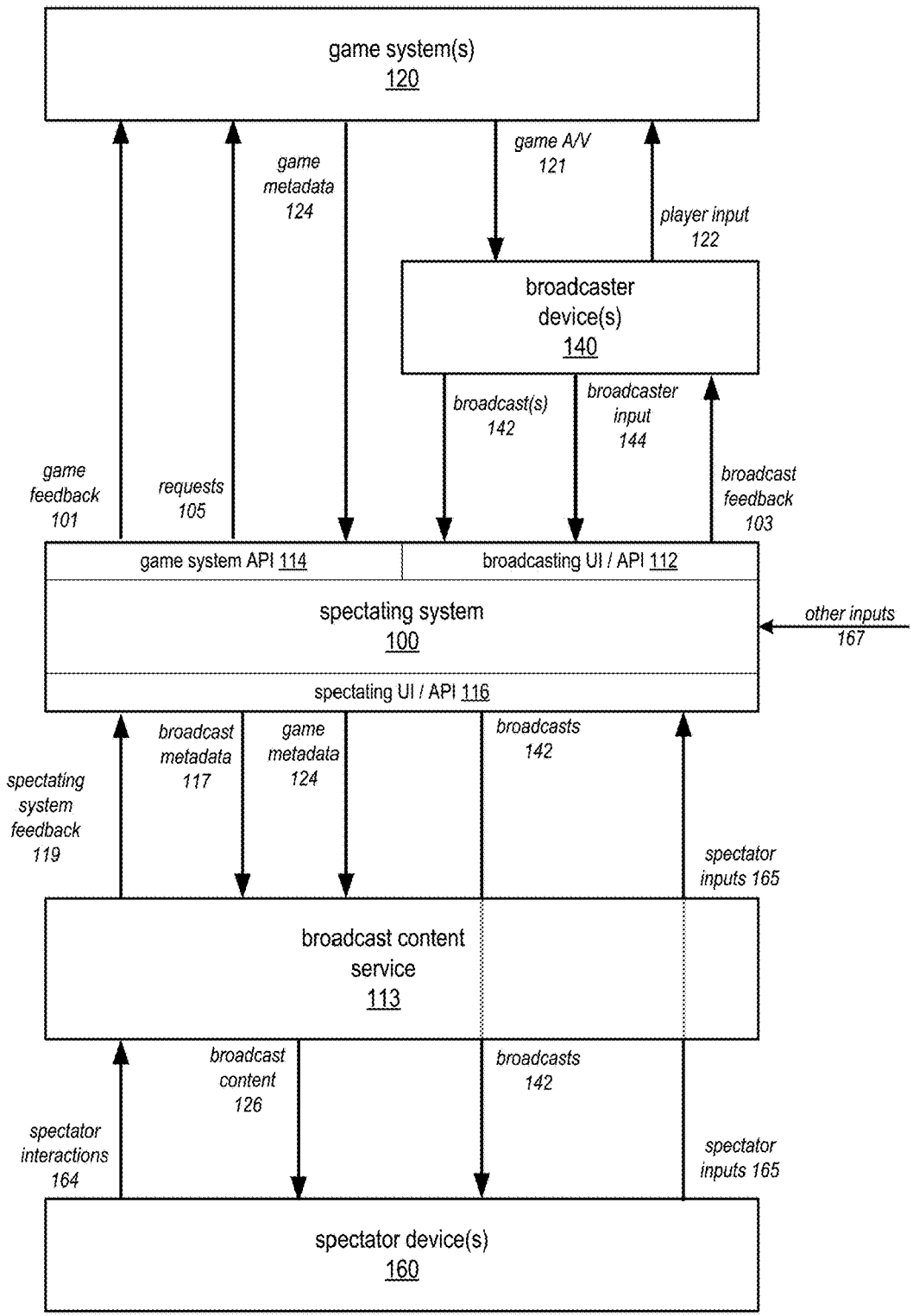
FIG. 1B is a block diagram that illustrates an example broadcast content service in a game spectating environment, according to some embodiments.

FIG. 1B is a block diagram that illustrates a broadcast content service in a game spectating environment, according to some embodiments. In some embodiments, instead of or in addition to the spectating system 100 adding broadcast content 126 to the broadcasts 142 received from the broadcast device(s) 120, a module, system, or service (referred to herein as a broadcast content service 113) may logically lie between the spectating system 100 and the spectator device(s) 160. Note that the broadcast content service 113 may be implemented as a module or service of the spectating system 100, or may be implemented as a separate service. In some embodiments, the broadcast content service 113 may receive broadcasts 142, game metadata 124, and broadcast metadata 117 from the spectating system 100, and may generate and add broadcast content 126 based at least in part on the game metadata 124 and/or broadcast metadata 117. In some embodiments, at least some of the game metadata 124, for example game states, may be provided in response to requests 105 from the spectating system 100.

In some embodiments, the broadcast content service 113 may obtain and process spectator interactions 164 with the broadcast content 126 to affect broadcasts 142 and broadcast content 126 presentation and processing in the game spectating environment in various ways as described herein. In some embodiments, the broadcast content service 113 may generate feedback 119 to the spectating system 100 that the spectating system 100 may apply to affect the game spectating environment. In some embodiments, the spectating system 100 may provide game feedback 101 to the game system(s) 120 based on the feedback 119; the game system(s) 120 may apply game feedback 101 to affect game execution and game play in the game system 120. In some embodiments, the spectating system 100 may also provide broadcast feedback 103 to the broadcast device(s) 140 based at least in part on the feedback 119 received from the broadcast content service 113. In some embodiments, the broadcast feedback 103 may be provided to the broadcasters via a broadcasting UI/API 112 presented to the broadcast devices 140 by the spectating system 100, for example as illustrated in FIG. 9.

Figure 32:
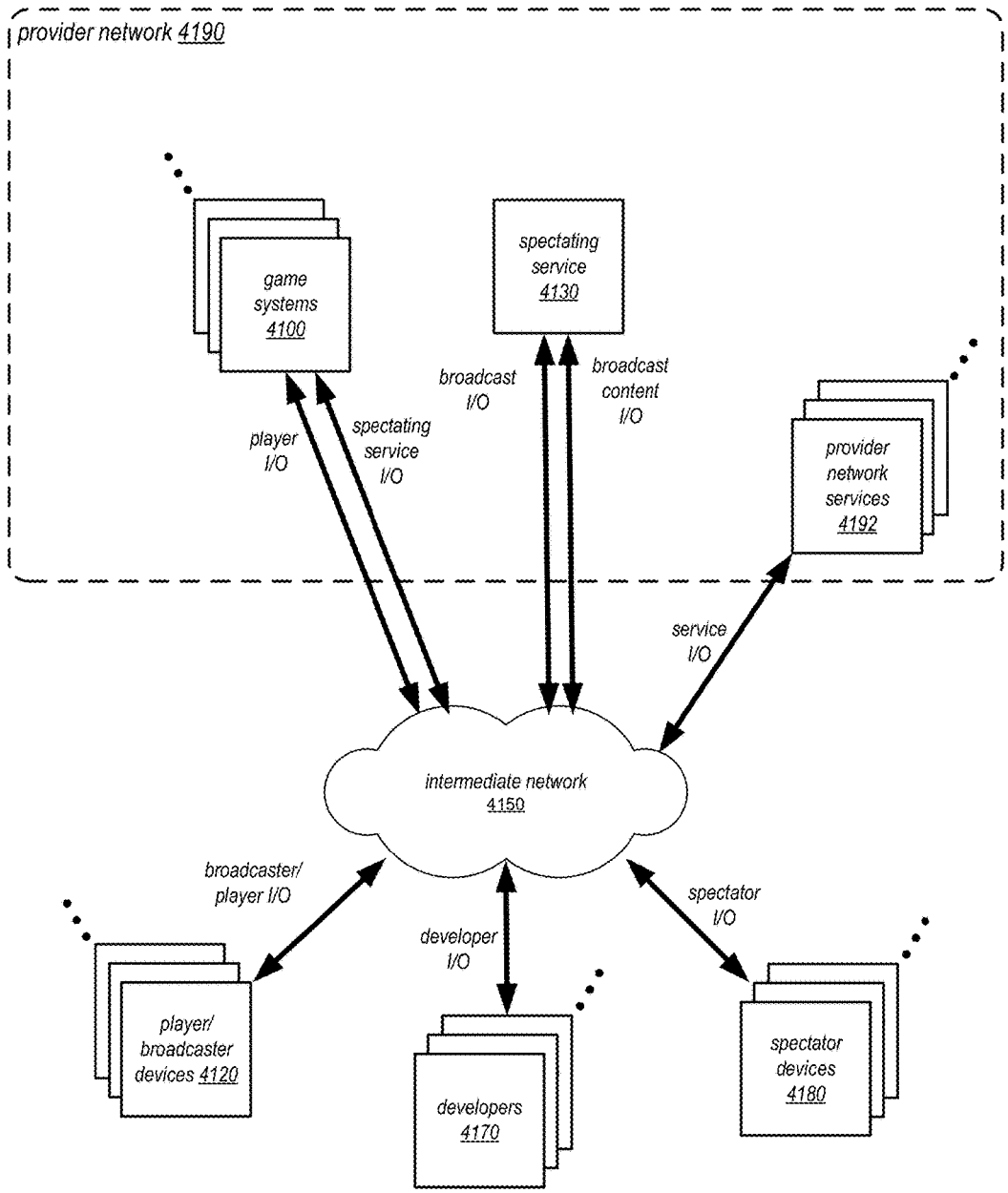
FIG. 32 illustrates example network-based game spectating environments, according to some embodiments.

In some embodiments, at least some components of a game spectating environment as illustrated in FIG. 1A or 1B may be implemented in the context of a service provider that provides virtualized resources on a provider network to clients of the service provider, for example as illustrated in FIG. 32. For example, a spectating system 100 may be implemented as a spectating service on a provider network as illustrated in FIG. 32. As another example, a broadcast content service 113 may be implemented as a service on a provider network as illustrated in FIG. 32. In some embodiments, one or more game systems 120 may be implemented by game providers on the provider network.

While FIG. 1B shows a broadcast content service 113 that logically lies between the spectating system 100 and the spectator device(s) 160, in some embodiments, a broadcast content service 113 may instead logically lie between a broadcast device 140 and the spectating system 100. The broadcast content service 113 may be implemented as a module or service of the spectating system 100, or may be implemented as a separate service. In some embodiments, the broadcast content service 113 may receive broadcasts 142, broadcaster input 144, and game metadata 125, and may generate and add content to the broadcast 142. The added content may be based at least in part on the game metadata 124. The added content may include, but is not limited to, overlays on the game video.

As illustrated in FIG. 1A or 1B, in some embodiments, game metadata 124 may be received by the spectating system 100 from the game system(s) 120 according to game system API 114 in a separate channel from the game A/V 121 stream. However, in some embodiments, at least some of the game metadata 124 may be included as metadata in game A/V 121 content sent to the broadcast devices 120 by the game system(s) 120, and may be included as metadata in the broadcast 142 streams sent from the broadcaster devices 140 to the spectating system 100.

As illustrated in FIG. 1A or 1B, in some embodiments, game metadata 124 may be received by the spectating system 100 from the game system(s) 120 according to game system API 114. However, in some embodiments, spectating system 100 may obtain or receive game metadata 124 from other sources, including but not limited to broadcast device(s) 140. In addition, in some embodiments, a spectator device 160 may obtain or receive game metadata 124 from one or more sources, including but not limited to the game system(s) 120 and broadcast device(s) 140.

Figure 1C:
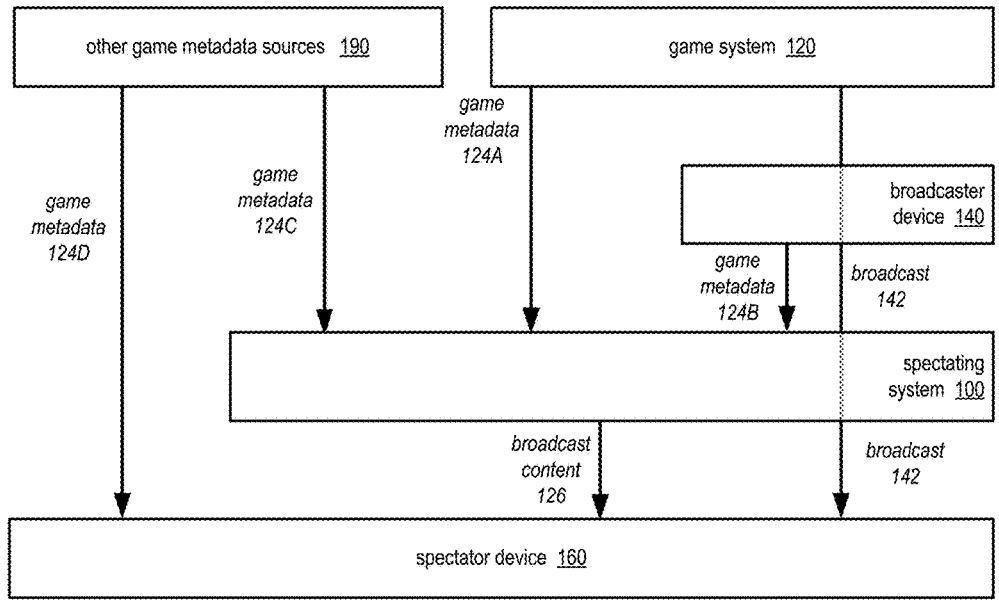
FIG. 1C is a block diagram that illustrates sources for game metadata in a game spectating environment, according to some embodiments.

FIG. 1C is a block diagram that illustrates sources for game metadata in a game spectating environment, according to some embodiments. A spectating system 100 may stream broadcast(s) 142 from broadcaster device(s) 140 to one or more spectator devices 160. The spectating system 100 may receive game metadata 124A from game system 120, as illustrated in FIGS. 1A and 1B. In addition, spectating system 100 may receive game metadata 124B from the broadcaster device 140. Game metadata 124B may include data specific to the broadcaster/player and/or game client associated with the broadcaster device 140, for example identity information. In addition, spectating system 100 may request and receive game metadata 124C from one or more other game metadata sources 190. Other game metadata sources 190 may include one or more of, but are not limited to, game developer systems or third-party systems such as online merchants, game information sites, and data stores or databases of game information including but not limited to historical, statistical, and/or descripting information and data for games, game content, players, and/or broadcasters. For example, spectating system 100 may request information (game metadata 124C) about a player and/or broadcaster based on game metadata 124B received from a broadcaster device 140. Spectating system 100 may generate broadcast content 126 for the broadcast 142 based at least in part on game metadata 124A, 124B, and/or 124C. A spectator may interact with the broadcast content 126 on spectator device 126. In response to the interaction, spectating system 100 may obtain additional game metadata 124 from one or more of its sources, and provide additional or modified broadcast content 126 to the spectator device 160. However, in some cases, a spectator interaction with broadcast content 126 may generate a request to one or more of the other game metadata sources 190, which may respond by providing game metadata 124D to the spectator device 160, for example to be displayed as additional broadcast content. For example, spectator device 160 may request a source 190 for information (game metadata 124D) about a player or game content based on descriptive or identity information provided in broadcast content 126. While not shown in FIG. 1C, in some embodiments a spectator device 160 may instead or also communicate with a game system 140 to obtain game metadata 124.

Figure 1D:
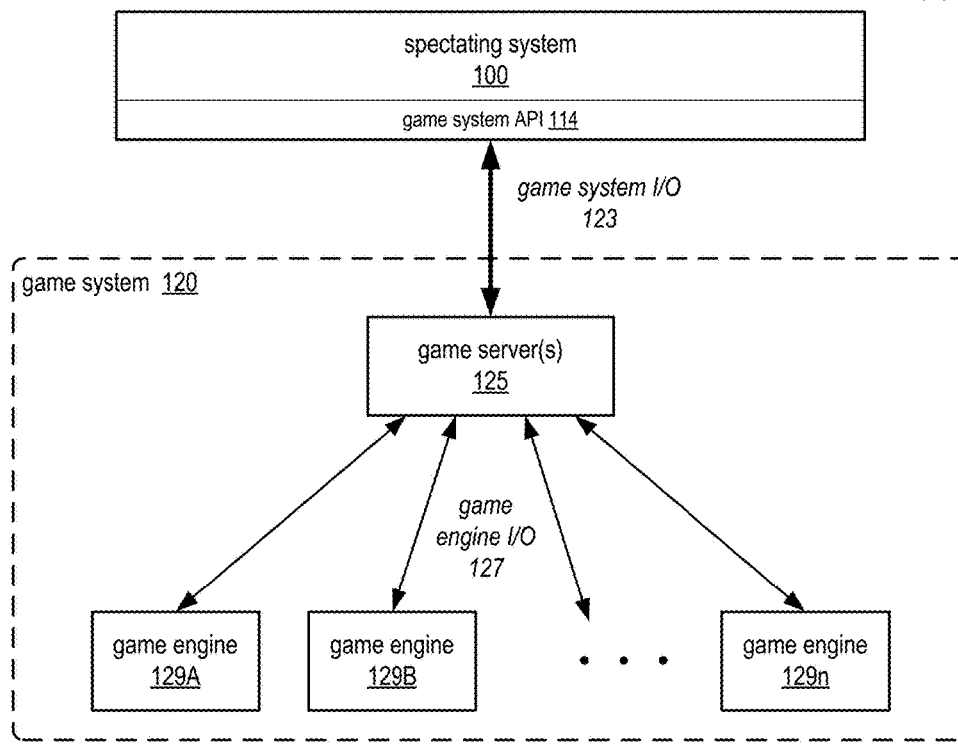
FIG. 1D is a block diagram that illustrates an example game system architecture, according to some embodiments.

FIG. 1D is a block diagram that illustrates an example game system architecture, according to some embodiments. In some embodiments of a game spectating environment as illustrated in FIGS. 1A and 1B, the spectating system 100 may communicate with a game engine of a game system 120 via the game system API 114. However, in some embodiments, the spectating system 100 may instead communicate with one or more game servers 125 of the game system 120 to exchange various game system I/O 123 as described herein, including but not limited to game metadata 124. The game server(s) 125 may in turn communicate game engine I/O 127 to one, two, or more game engine 129 instances, shown as game engines 129A, 129B, . . . , 129n in FIG. 1D. The game engine 129 instances may be instantiated on one or more servers of the game system 120, or alternatively at least some of the game engine 129 instances may be running on the broadcaster devices 140 as illustrated in FIGS. 1A and 1B. In some embodiments, the game system I/O 123 received from spectating system 100 may include at least some data specific to particular game engines 129, and the server(s) 125 may handle distribution of the data to the target engines 129. In at least some embodiments, the spectating system 100 may instantiate one or more processes on one or more server devices to handle processing data for and handling data from particular game engines 129.

Figure 2A:
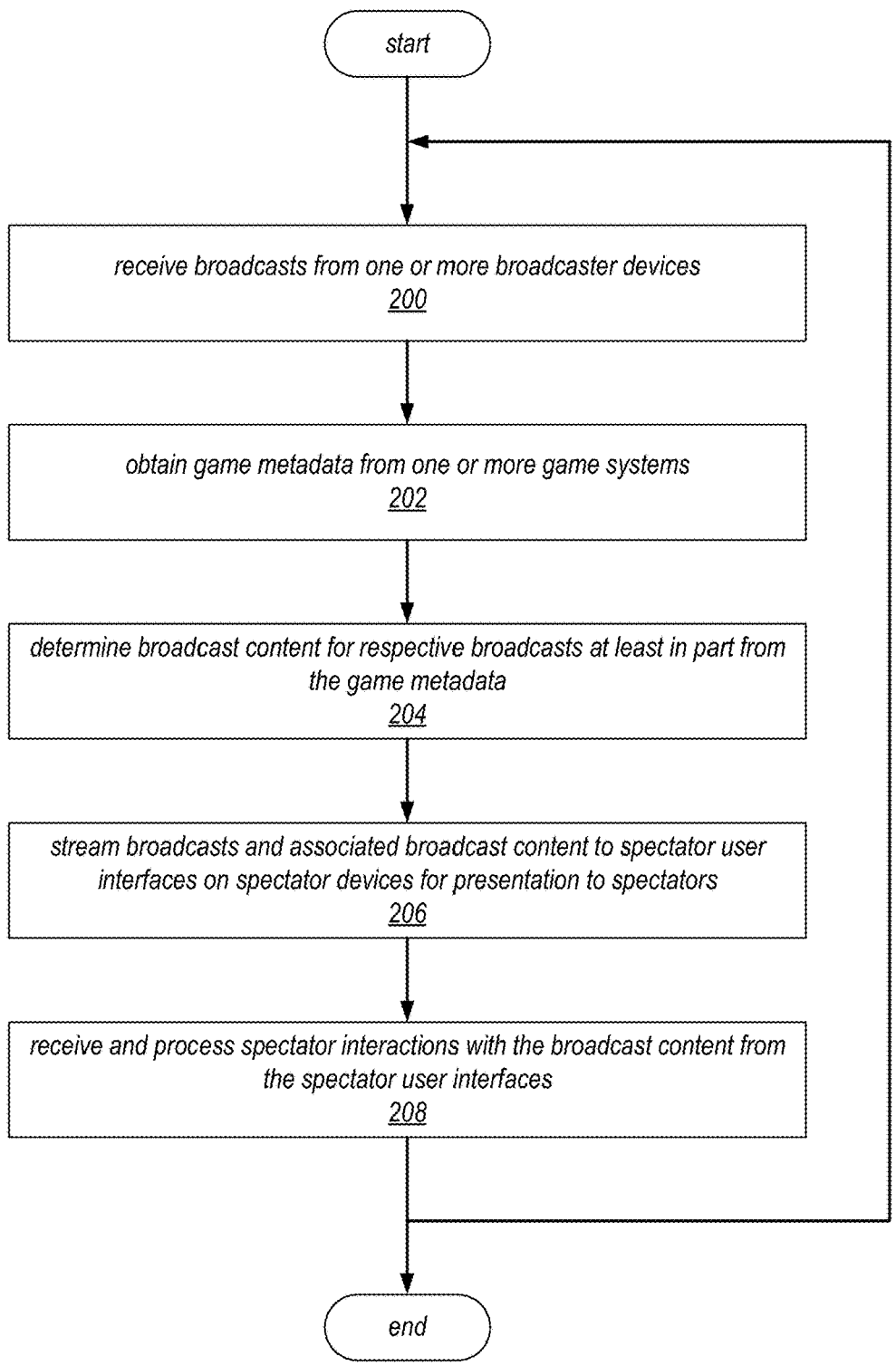
FIG. 2A is a flowchart of a method for determining and presenting broadcast content in a game spectating environment as illustrated in FIG. 1A, according to some embodiments.

FIG. 2A is a flowchart of a method for determining and presenting broadcast content in a game spectating environment, according to some embodiments. The method of FIG. 2A may, for example, be implemented by a spectating system 100 as illustrated in FIG. 1A or FIG. 1B.

As indicated at 200 of FIG. 2A, the game spectating system may receive broadcasts from one or more broadcaster devices. Referring to FIGS. 1A and 1B, a spectating system may receive broadcasts of players' game play from broadcaster devices and stream the broadcasts to spectator devices for viewing by respective spectators. A broadcast may include video showing game play of a respective broadcaster participating as a player in a game executing on a game system.

As indicated at 202 of FIG. 2A, the game spectating system may obtain game metadata from one or more game systems. In at least some embodiments, a game spectating system may obtain game metadata from game systems for which broadcasts are being streamed. In at least some embodiments, the game metadata may be received according to an application programming interface (API) presented to the game systems by the spectating system, referred to herein as a game system API. In some embodiments, the game metadata for a given game system may include one or more of, but is not limited to, game state(s) for the game executing on the game system, indications and descriptions of events in the game, and data describing or representing objects, players/characters, locations, levels, and other content or aspects of the game. The states, events, objects, etc. of a game that may be described in the game metadata may collectively be referred to as game-related content.

As indicated at 204 of FIG. 2A, the game spectating system may determine or generate broadcast content for respective broadcasts at least in part from the game metadata. The spectating system may use the information in the game metadata to generate broadcast content that corresponds to the game-related content represented in the game metadata and that graphically and/or textually represents or describes the respective game-related content. As indicated at 206 of FIG. 2A, the game spectating system may stream the broadcasts and associated broadcast content to spectator user interfaces on spectator devices for presentation to spectators. The broadcast content that may be generated and presented with the respective broadcasts to spectators via spectator interfaces on the spectators' devices may include one or more of various user interface (UI) elements (e.g., buttons, dialogs, lists, tabs, menus, images, video clips, links, text, panes that include one or more other UI elements, etc.) that may be presented on a UI with the broadcast video, and/or one or more game-related overlays (e.g., overlay video, text, etc.) that may be added to the broadcast video. The broadcast content may include UI elements and/or overlays representing or corresponding to game-related content such as virtual game items or objects (e.g., digital representations of physical objects) such as in-game gear, clothing, weapons, characters, avatars, powers, and so on, physical items such as physical representations of virtual objects from within the games (e.g., physical swords, action figures, toys, etc.), and game-related physical merchandise such as t-shirts or hats, and may also include UI elements and/or overlays representing or describing game events and/or game states as indicated in the game metadata.

In some embodiments, in addition to receiving and processing game metadata from the game system(s) to generate broadcast content, the spectating system may obtain and analyze various inputs (e.g., audio, video, and/or text inputs) from participants (players, broadcasters, and/or spectators) in the game spectating environment to detect events in or determine other information about the broadcasts and/or games executing on the game systems. The events and other information determined from analyzing the participant inputs may collectively be referred to as broadcast metadata. The spectating system may generate the broadcast content for respective broadcasts at least in part from the broadcast metadata, and may present the broadcast content with the respective broadcasts to participants including but not limited to spectators via interfaces on respective devices.

As indicated at 208 of FIG. 2A, the game spectating system may receive and process spectator interactions with the broadcast content from the spectator user interfaces. The spectator interactions with the broadcast content may include one or more of, but are not limited to, selecting a UI element, manipulating a UI element (e.g., by scrolling, clicking, sliding, turning, etc.), hovering (e.g., with a cursor) over or near a UI element, inputting to a UI element (e.g., entering text in a text box), and focusing on one or more UI elements (e.g., as detected via eye tracking technology). In some embodiments, the spectating system may process the spectator interactions with the broadcast content to affect broadcast presentation in the spectating system and/or game play in the game system in various ways. In some embodiments, the spectating system may provide feedback to the game system(s) based at least in part on the spectator interactions with the broadcast content. In some embodiments, the game feedback may be provided to the games according to a game system API of the spectating system. The game system(s) may apply the game feedback to affect game execution and game play in the game system in various ways. In some embodiments, the spectating system may also provide feedback to the broadcast device(s) based at least in part on the spectator interactions with the broadcast content.

As indicated by the arrow returning from element 208 to element 200, in at least some embodiments, the method of FIG. 2A may be an iterative process in which game metadata for broadcasts is obtained and used to generate and present broadcast content, and in which interactions with the broadcast content are received and processed to, for example, affect game execution and game play.

Figure 2B:
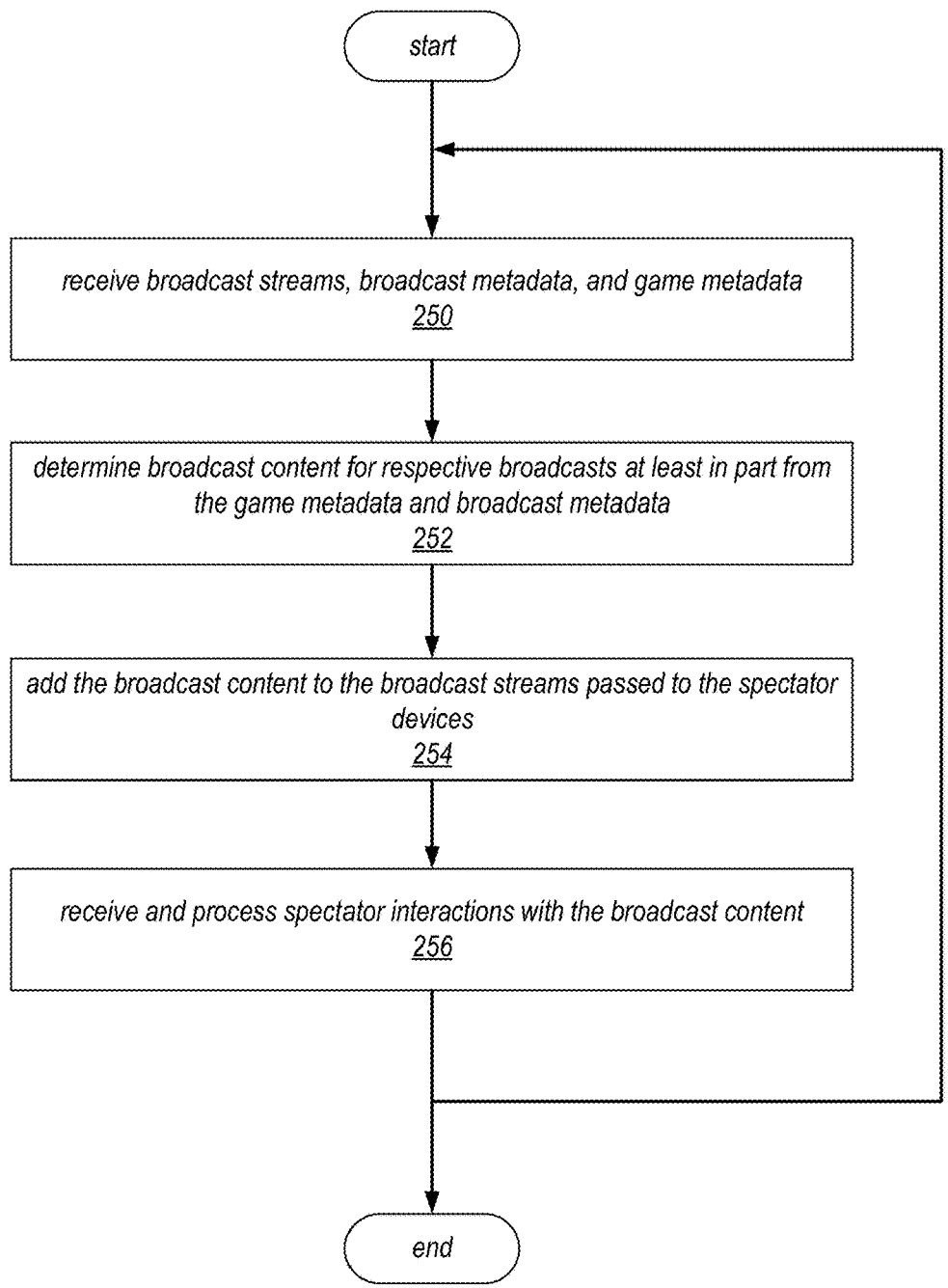
FIG. 2B is a flowchart of a method for determining and presenting broadcast content in a game spectating environment as illustrated in FIG. 1B, according to some embodiments.

FIG. 2B is a high-level flowchart of a method for determining and presenting broadcast content in a game spectating environment, according to some embodiments. The method of FIG. 2B may, for example, be implemented by a broadcast content service 113 as illustrated in FIG. 1B.

As indicated at 250 of FIG. 2B, a broadcast content service may receive broadcast streams, broadcast metadata, and game metadata, for example from a streaming service. As indicated at 252 of FIG. 2B, the broadcast content service may determine broadcast content for respective broadcasts at least in part from the game metadata and broadcast metadata. As indicated at 254 of FIG. 2B, the broadcast content service may add the broadcast content to the broadcast streams passed to the spectator devices. In some embodiments, instead of or in addition to the spectating system adding broadcast content to the broadcasts received from the broadcast device(s) as illustrated in FIG. 2A, a broadcast content service may logically lie between the spectating system and the spectator device(s). In some embodiments, the broadcast content service may receive broadcasts and game metadata from the spectating system, and may generate broadcast content for the broadcast at least in part according to the game metadata, for example as describe in reference to element 204 of FIG. 1A. In some embodiments, the broadcast content service may add the broadcast content as additional content to broadcast content generated by the spectating systems. In some embodiments, the broadcast content service may modify broadcast content generated by the spectating system. In some embodiments, in addition to receiving and processing game metadata to generate broadcast content, the broadcast content service may obtain broadcast metadata generated by the spectating system, and may generate the broadcast content for respective broadcasts at least in part from the broadcast metadata.

As indicated at 256 of FIG. 2B, the broadcast content service may receive and process spectator interactions with the broadcast content. In some embodiments, the broadcast content service may obtain and process spectator interactions with the broadcast content to affect broadcasts and broadcast content presentation and processing in the game spectating environment in various ways as described herein. In some embodiments, the broadcast content service may generate feedback to the spectating system that the spectating system may apply to affect the game spectating environment. In some embodiments, the spectating system may provide game feedback to the game system(s) based on the feedback; the game system(s) 120 may apply the feedback to affect game execution and game play in the game system. In some embodiments, the spectating system may also provide broadcast feedback to the broadcast device(s) based at least in part on the feedback received from the broadcast content service.

As indicated by the arrow returning from element 256 to element 250, in at least some embodiments, the method of FIG. 2B may be an iterative process in which a broadcast content service to generates broadcast content for broadcasts, and in which interactions with the broadcast content are received and processed to, for example, affect game spectating, game execution, and/or game play.

Determining Events in a Game Spectating Environment

In some embodiments, the spectating system may obtain event data indicating events or highlights in broadcasts and/or in games executing on the game systems from one or more sources. The event data may be processed to determine events from the broadcasts. The determined events may be used to determine broadcast content for the broadcasts, or to otherwise affect broadcasts and/or the games being broadcasts.

In some embodiments, the spectating system may receive indications of game events from the game systems as game metadata according to a game system API presented to the game systems by the spectating system. Game events may include events that are common across two or more games, and may also include game-specific events as defined by a respective game system. Examples of game events may include, but are not limited to: particular achievements by particular players or teams of players; level starts and completions; beginnings, endings, or other significant moments of battles, bouts, challenges, or other in-game events; in-game character entrances, exits, deaths, etc.; acquisitions or loss of items, objects, powers, etc. by in-game characters or players; or in general any event or moment that may be of interest within a game executing on a game system.

In some embodiments, instead of or in addition to receiving indications of game events from the game system(s), the spectating system may obtain and analyze various inputs from participants (players, broadcasters, and/or spectators) in the game spectating environment to detect events in the broadcasts and/or games executing on the game systems. The various participant inputs may include one or more of, but are not limited to: audio or voice inputs such as in-game vocal communications or broadcast vocal channels; video or image inputs (e.g., video or images of a participant's facial expressions or eyes); text input such as in-game or broadcast text chat; biometric inputs from the players; and participant inputs to a broadcast via spectating user interfaces (UIs), for example inputs indicating or voting on in-game or broadcast events as highlights for the broadcasts and/or games.

In some embodiments, the participant inputs may be analyzed and mapped to particular events or types of events in an online game that is being broadcast on a broadcaster's channel. Examples of events in an online game that may be detected by analyzing participant inputs may include, but are not limited to: particular achievements by particular players or teams of players; level starts and completions; beginnings, endings, or other significant moments of battles, bouts, challenges, or other in-game events; in-game character entrances, exits, deaths, etc.; acquisitions or loss of items, objects, powers, etc. by in-game characters or players; or in general any event or moment that may be of interest within a game executing on a game system. For example, in a sports game, crowd (spectator) and/or player audio, text, or other inputs may be mapped to big plays, such as scoring plays or great defensive plays. As another example, in a MOBA game, participant inputs may be mapped to the start, end, or highlight moments in big battles. In some embodiments, participant inputs may be analyzed to detect potential upcoming events in an online game session. For example, in a sports game, particular crowd (spectator) and/or player audio patterns, text chat, or other inputs may be mapped to what typically happens prior to a particular big event, such as crowd silence or chanting before an important offensive play in a football game, or very low crowd noise before a big defensive play in a football game. In some embodiments, the information determined from analysis of the participant inputs may also indicate locations and times in the game universe for respective events. For example, analysis of spectator and/or broadcaster audio, text, or other inputs may indicate a particular location or area in an online game universe, and a particular time within the game timeline, for an event in a game session being broadcast by the broadcaster.

In some embodiments, the indications of events received from the game systems and/or determined from analyzing the participant inputs may be used to generate broadcast content for respective broadcasts as described herein.

Figure 5:
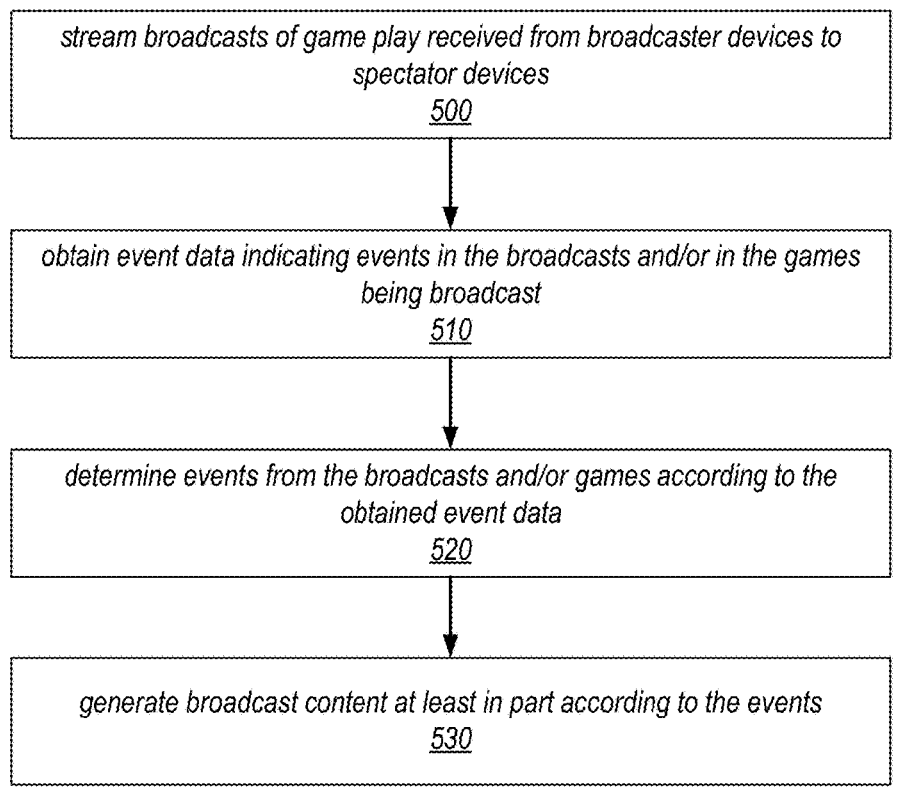
FIG. 5 is a flowchart of a method for determining events in a game spectating environment, according to some embodiments.

FIG. 5 is a flowchart of a method for determining events in a game spectating environment, according to some embodiments. The method of FIG. 5 may, for example, be implemented by a component, module, or service in a game spectating environment as illustrated in FIGS. 1A and 1B. As indicated at 500 of FIG. 5, a spectating system may stream broadcasts of game play received from broadcaster devices to spectator devices. A broadcast may include video showing game play of a respective broadcaster participating as a player in a game executing on a game system. As indicated at 510 of FIG. 5, the spectating system may obtain event data indicating events in the broadcasts and/or games being broadcast. As indicated at 520 of FIG. 5, the spectating system may determine events for the broadcasts and/or games according to the event data. FIGS. 3A through 3D illustrate example methods and apparatus for obtaining event data and for determining events according to the event data. As indicated at 530 of FIG. 5, the spectating system may generate broadcast content for the broadcasts at least in part according to the determined events.

Figure 3A:
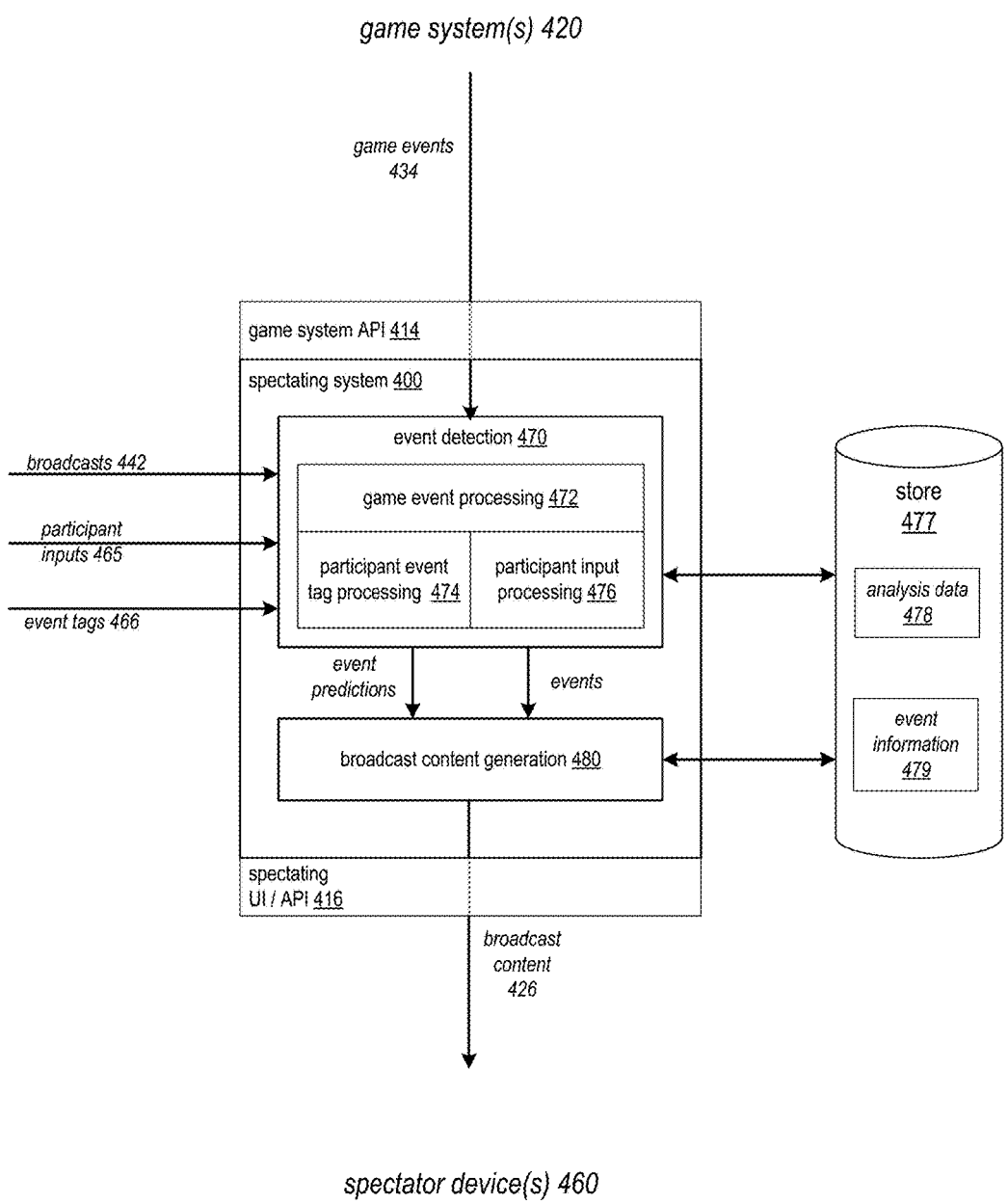
FIG. 3A illustrates event detection and processing in a game spectating system, according to some embodiments.
Figure 3B:
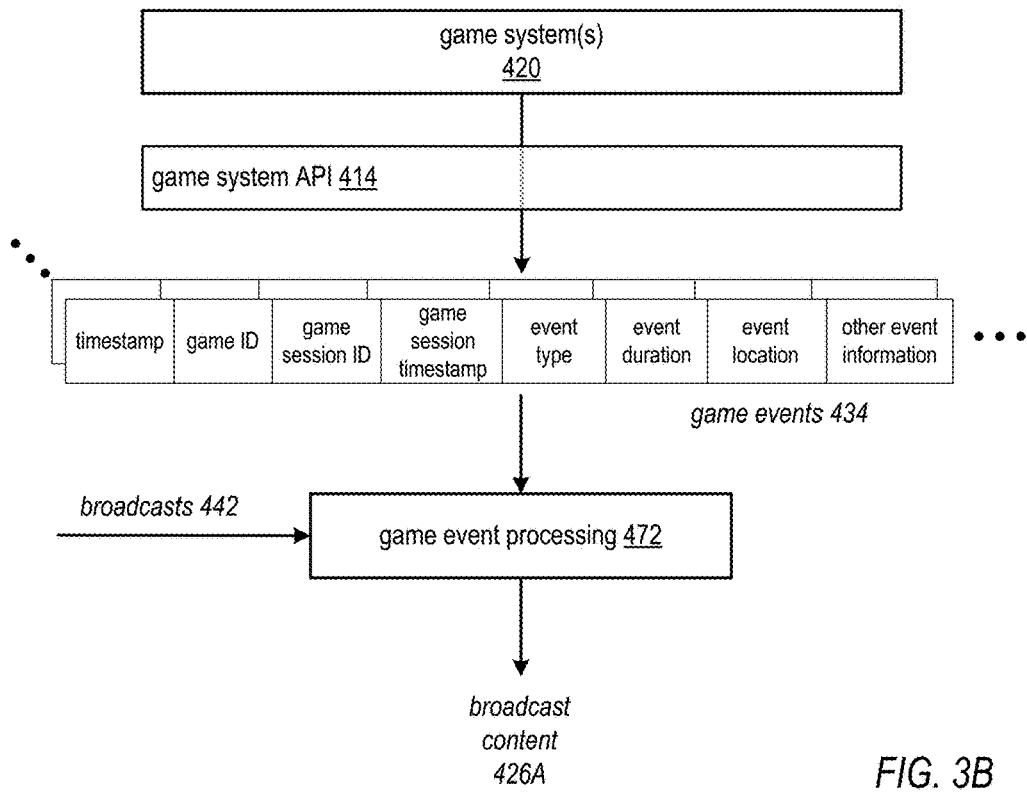
FIG. 3B illustrates game event processing in a game spectating system, according to some embodiments.

In some embodiments, the event data obtained and processed by the spectating system to detect events may include game events received from the game systems. The game events for a given game system may indicate game-specific, in-game events as defined and detected by the respective game system. In some embodiments, the game events may be received as game metadata according to a game system API provided by the spectating system. FIGS. 3A and 3B illustrate receiving and processing game events as provided by a game system, according to some embodiments.

Figure 3C:
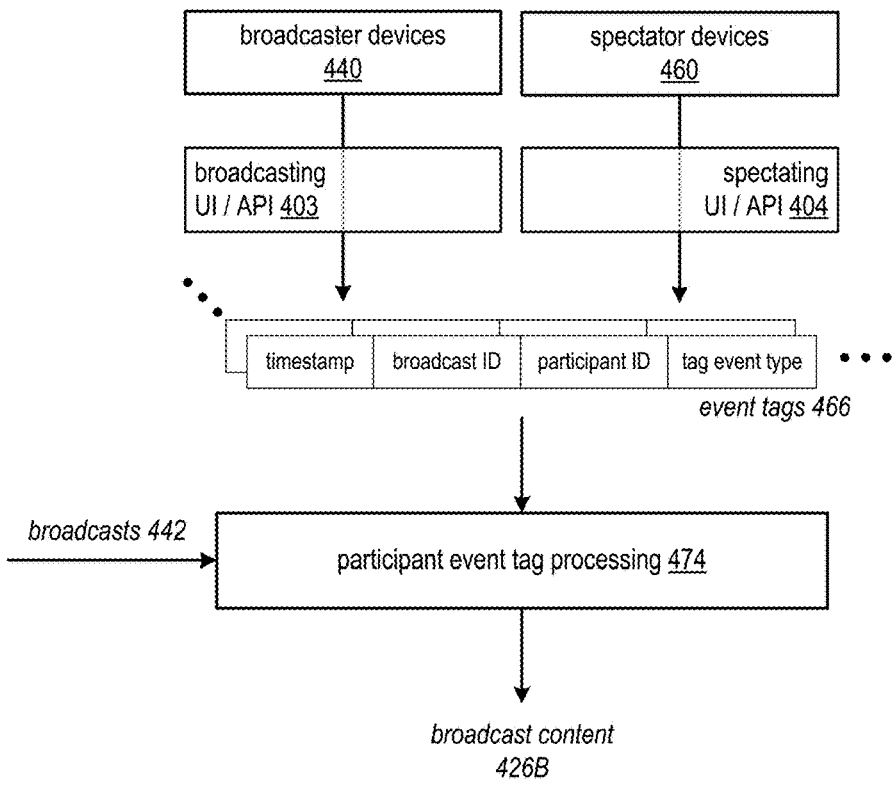
FIG. 3C illustrates participant event tag processing in a game spectating system, according to some embodiments.

In some embodiments, the event data may instead or in addition include event tags indicating spectators' and/or broadcasters' inputs to the spectating system marking or tagging interesting or notable events or highlights in broadcasts. FIGS. 3A and 3C illustrate receiving and processing participants' event tagging inputs to a spectating system that may be used to determine events in broadcasts, according to some embodiments.

Figure 3D:
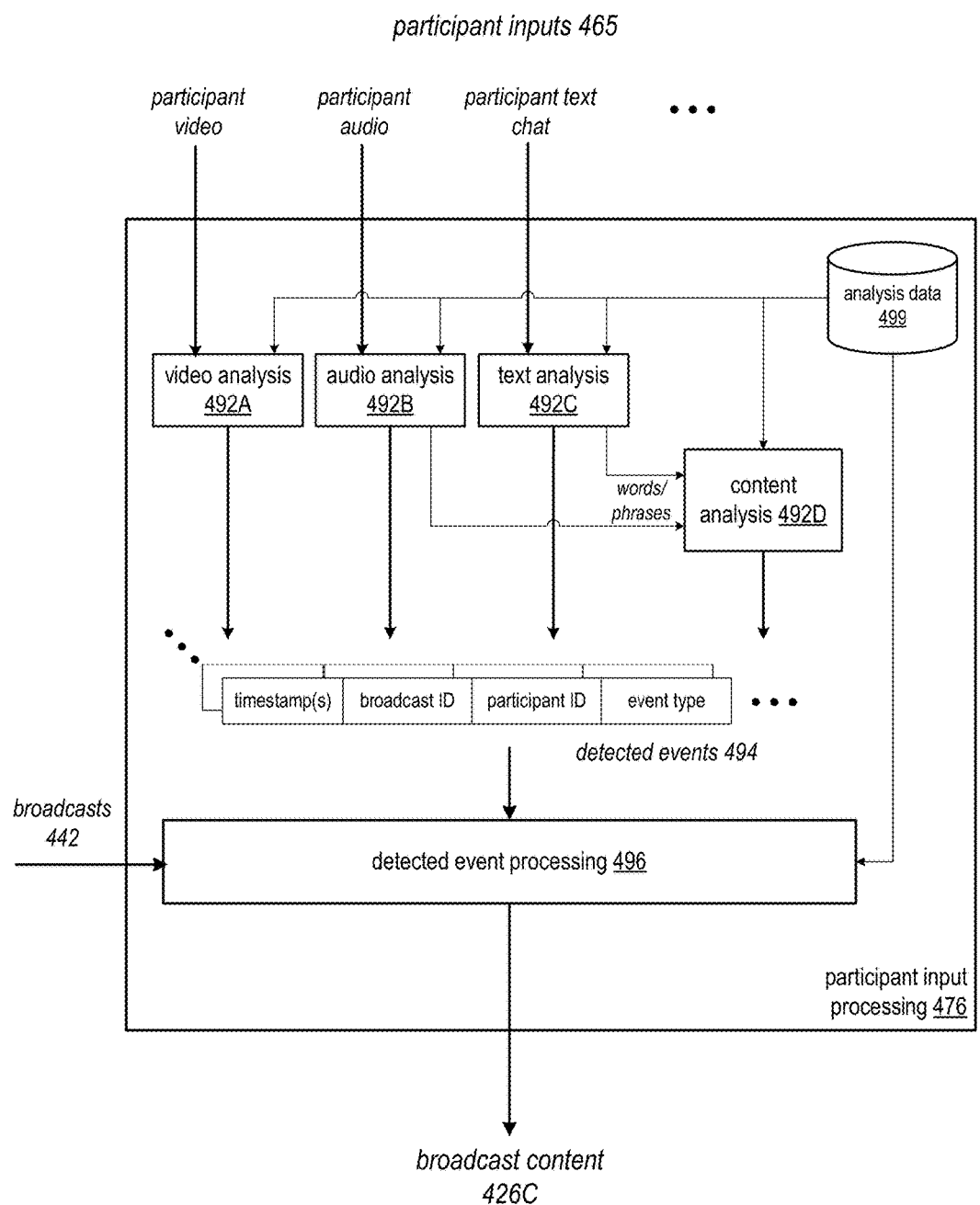
FIG. 3D illustrates processing participant inputs to determine events in a game spectating system, according to some embodiments.

In some embodiments, the event data may instead or in addition include participant (broadcaster and/or spectator) audio and/or text inputs to the spectating system. The participant audio or text inputs may include broadcaster inputs such as broadcaster commentary, in-game voice or text chat, and broadcast text chat, and spectator inputs such as spectator vocal comments, crowd noise, and broadcast text chat. In some embodiments, the spectating system may receive broadcasters' inputs from broadcaster devices according to a broadcasting UI/API, and may receive spectators' inputs from spectator devices according to a spectating UI/API. FIGS. 3A and 3D illustrate receiving and processing participant interactions with a spectating system 100 to determine events or highlights in broadcasts, according to some embodiments.

In addition to analyzing participant audio and/or textual inputs to detect events, some embodiments may also collect and analyze other data from the participants, and may use that analysis alone or in combination with the analysis of the participant audio and/or textual inputs to detect events in games or broadcasts. As an example, some embodiments may obtain and analyze biometric data (e.g., pulse, heartrate, perspiration, etc.) for participants, for example from wearable devices that collect biometrics, and that analysis may be used to determine metrics that may be used alone or in combination with analysis of other inputs such as audio and text inputs to determine events in games and/or broadcasts.

As another example, some embodiments may obtain images of participants' faces (broadcasters, players, commentators and/or spectators) captured during game play or broadcast, for example images captured by cameras attached to or integrated with the participants' respective client devices. The images may be analyzed, for example using facial recognition techniques and techniques that detect emotions via analysis of facial expressions, and that analysis may be used alone or in combination with analysis of other inputs such as audio and text inputs to determine events in games and/or broadcasts.

As another example, some embodiments may obtain images of participants' eyes (broadcasters, players, commentators and/or spectators) captured during game play or broadcast, for example images captured by cameras attached to or integrated with wearable computing devices such as smart glasses, goggles, optical head-mounted displays, virtual reality (VR) headsets, and the like. The images may be analyzed, for example using techniques that detect emotions or other states via tracking and analysis of eye movements, blinking, dilation, and so on, and that analysis may be used alone or in combination with analysis of other inputs such as audio and text inputs to determine events in games and/or broadcasts.

FIG. 3A illustrates event processing in a game spectating system, according to some embodiments. In some embodiments, a spectating system 400 may include one or more computing devices, for example one or more server devices, that implement one or more components or modules of the spectating system 400 and that provide one or more APIs to the spectating system 400 functionality. In some embodiments, the spectating system 400 may include, but is not limited to, an event detection 470 component or module that determines or predicts events in broadcasts 442, and a broadcast content generation 480 component or module that may generate broadcast content 426 from the determined events or event predictions. Spectating system 400 may also include or access other devices including but not limited to storage devices, services, or systems (shown as store 477) for storing data and information, including but not limited to various data 478 used in analyzing participant inputs and other event data sources to detect events, and event information 479 describing the detected events.

In some embodiments, event detection 470 component may include a game event processing 472 module that processes game events 434 to determine game-specified events in broadcasts 442, a participant event tag processing 474 component that processes event tags 466 to determine participant-specified events in broadcasts 442, and a participant input processing 476 component that processes participant inputs 465 to determine events in broadcasts 442 based on participants' inputs (audio, video, text, speech, social media, etc.) during the broadcasts 442. In some embodiments, participant inputs 465 may also include inputs from input devices and technologies such as controllers or joysticks, motion tracking systems, gesture-based input systems, and so on that can be analyzed and used to determine events in respective broadcasts 442.

In some embodiments, in addition to determining events in broadcasts 442, event detection 470 component may process the various inputs to generate information that anticipates or predicts potential upcoming events in game sessions or broadcasts. For example, in a sports game, audio, textual, or other input may be analyzed to generate predictions of upcoming big plays, or in a MOBA or MMOG audio, textual, or other input may be analyzed to generate predictions of upcoming fights or battles. In some embodiments, this information predicting events in broadcasts may be presented to the spectators as broadcast content, for example so that the spectators can view the predicted events in real-time, if desired.

In some embodiments, the spectating system 400 may include or provide a game system API 414 via which game systems or other entities may provide game events 434 to the spectating system 400. The game events 434 may indicate game-specific events as defined and detected by respective game systems 420. In some embodiments, the spectating system 400 may include or provide a spectating UI/API 416 that presents an interface to spectators on respective spectator devices 460. The spectators may interact with the spectating system 400 via inputs 456 to the spectating UI/API 416, for example to interact with broadcast content 426 generated by broadcast content generation 480 module from the events or event predictions generated by event detection 470 component and presented to the spectators on respective spectator devices 460 via the spectating UI/API 416.

FIGS. 3B through 3D further illustrate the components, modules, and operations of an example spectating system 400 as shown in FIG. 3A.

FIG. 3B illustrates game event processing to determine events in a game spectating system, according to some embodiments. In some embodiments, event data that may be received and processed by a spectating system 400 to determine events in broadcasts 442 may include game events 434 generated by game systems 420. The game events 434 for a given game system 420 may, for example, indicate game-specific, in-game highlights as defined and detected by the respective game system 420. In some embodiments, a spectating system 400 may include a game event processing 472 module that processes game events 434 to determine game-specified events for broadcasts 442.

In some embodiments, the spectating system 400 may include or provide a game system API 414 via which game systems 420 can provide game events 434 to the spectating system 400. A game event 434 may indicate a game-defined interesting or notable event or highlight in game play on a respective game system 420. FIG. 3B illustrates a non-limiting example format for game events 434, according to some embodiments. In this example, a game event 434 may be a record that may include one or more of, but is not limited to:

- A timestamp (date/time) that indicates "real world time" for the game event.
- A game ID that may be used to identify the game system 420 that generated the event 434.
- A game session ID that may be used to identify a particular game session executed by the game system 420.
- A game session timestamp (date/time) that indicates time within the game universe/on the game session timeline ("game time") for the game event.
- An event type for the game event. An event type may be common across all game systems 420 or across some game systems 420 (e.g., all games within a genre), or may be specific to/defined by a particular game system 420.
- A duration for the event. The duration may be indicated in real time, in game time, or in both.
- A location within the game universe or game world for the event.
- Other event information. For example, information identifying players or teams of players who are involved in the event, broadcasters who are involved in the event, a summary description of the event, a rating for the event (e.g., event significance on a scale from 1 to 10), or in general any information that may be relevant to an in-game event.

In some embodiments, the game event processing 472 module may receive and process the game events 434 to determine game-specified events or event predictions for broadcasts 442. In some embodiments, the game event processing 472 module may map at least some of the game events 434 to particular broadcasts 442. In some embodiments, for example, a broadcast 442 may include metadata indicating a particular game system 420, game session, and broadcaster/player for the broadcast 442, and the game event processing 472 module may map at least some of the game events 434 to particular broadcasts 442 according to the game ID, game session ID, timestamp, and other event information fields of the game event 434 records. Once a game event 434 is mapped to a broadcast 442, the information within the event 434 record may be used to generate broadcast content 426A for the broadcast 442.

In some embodiments, in addition to indicating events in games, game events 434 may be provided that anticipate or predict potential upcoming events in online game sessions. For example, in a sports game, a game event 434 may be provided prior to an important offensive play, or in a MOBA or MMOG a game event 434 may be provided that indicates an upcoming fight or battle. In some embodiments, this information predicting or anticipating events in games may be presented to the spectators as broadcast content 426A so that the spectators can view broadcasts of the predicted events in real-time, if desired.

FIG. 3C illustrates participant event tag processing to determine events in a game spectating system, according to some embodiments. In some embodiments, event data that may be received and processed by a spectating system 400 to determine events from broadcasts 442 may include event tags 466 generated by broadcasters and/or spectators via respective devices 440 and 460. The event tags 466 for a given broadcast 442 may indicate interesting or notable events in the broadcast 442 as identified by the broadcaster and/or spectators of the broadcast 442. In some embodiments, a spectating system 400 may include a participant event tag processing 474 module that processes event tags 466 to determine participant-specified events from broadcasts 442.

In some embodiments, the spectating system 400 may provide broadcasting and spectating UI/APIs via which broadcasters and/or spectators can provide event tags 466 to the spectating system 400. An event tag 466 may indicate a participant-defined interesting or notable event or highlight in a respective broadcast 442. FIG. 3C illustrates a non-limiting example format for event tags 466, according to some embodiments. In this example, an event tag 466 may be a record that may include one or more of, but is not limited to:

- A timestamp (date/time) for the event tag.
- A broadcast ID that may be used to identify the broadcast 442 for which this tag 466 event was generated.
- A participant ID that may be used to identify a particular broadcaster and/or spectator who generated this tag 466 event.
- An event type for the tag 466. As an example, in some embodiments tag event types may include "start" tags and "stop" tags that indicate the start of an interesting or notable event and the end of the respective event; thus, two tags (a start and stop tag) would define an event in the respective broadcast 442 as indicated by the respective participant.

In some embodiments, event tags 466 may include other information about a participant-specified event. For example, in some embodiments, event tags 466 may indicate a duration for the respective event. In some embodiments, event tags 466 may indicate a location within the game universe or game world for the event. In some embodiments, event tags 466 may include one or more of information identifying players or teams of players who are involved in the event, information identifying broadcasters who are involved in the event, a summary description of the event, or a rating for the event (e.g., event significance on a scale from 1 to 10).

In some embodiments, spectators and/or broadcasters may vote on events in broadcast 442 streams or game sessions via respective UIs, for example to determine if an event is to be considered a significant or notable event or highlight for the broadcast 442. For example, spectators and/or broadcasters may be prompted to respond with an up or down vote for event(s) in broadcast 442 streams or game sessions, and the event tags 466 may include voting information (e.g. up/down vote information) for the events in broadcast 442 streams or game sessions.

In some embodiments, the participant event tag processing 474 module may receive and process the event tags 466 to determine broadcast content 426 for broadcasts 442. In some embodiments, the participant event tag processing 474 module may map at least some of the event tags 466 to particular broadcasts 442 according to the broadcast ID. Once the event tags 466 are mapped to broadcasts 442, the event tags 466 may be used in generating broadcast content 426B for the broadcasts 442. For example, in some embodiments, the event tags 466 may be used to identify and extract highlight segments from the broadcasts 442, and the highlight segments may be provided as broadcast content 426B.

In some embodiments, to identify events in a broadcast 442 from the event tags 466 for the broadcast 442, the participant event tag processing 474 module may analyze the event tags 466 according to information in the tags 466 to determine how many and/or which participants tagged a given event in a broadcast 442 or game session. For example, in some embodiments, the participant event tag processing 474 module may determine that a tagged event is a significant or notable event in a broadcast 442 if at least a threshold number or percentage of spectators tagged the event as and/or voted for the event as a notable event. As another example, a broadcaster's tag 466 may automatically make a respective event a notable event, or alternatively a broadcaster's tagged event may be put up for vote by the spectators to determine if the event is to be considered a notable event. In some embodiments, participant's opinions on events as expressed through the tags 466 may be weighted; for example, a given spectator may be a highly-rated spectator or designated commentator, and the spectator's tags 466 may automatically make a respective event a notable event, or the spectator's tags 466 may be given more weight than those of other spectators when tagging or voting on events as potential notable events.

In some embodiments, in addition to indicating notable events in broadcasts, event tags 466 may be provided that anticipate or predict potential upcoming events in broadcasts. For example, in a sports game, spectators and/or broadcasters may generate event tags 466 in anticipation of an important offensive play, or in a MOBA or MMOG a game event tags 466 may be generated that indicate a potential upcoming fight or battle. In some embodiments, this information predicting or anticipating events in games may be presented to the spectators as broadcast content 426B so that the spectators can view broadcasts of the predicted events in real-time, if desired.

FIG. 3D illustrates processing participant inputs to determine events in a game spectating system, according to some embodiments. In some embodiments, the event data that may be received and processed by a spectating system 400 to determine events in broadcasts 442 may include participant (broadcaster and/or spectator) audio and/or textual inputs to the spectating system 400 (e.g., broadcaster commentary, in-game voice or text chat, broadcast text chat, spectator vocal comments, crowd noise, etc.). In some embodiments, the event data may instead or in addition include video of participants (broadcasters and/or spectators) captured during broadcasts 442. In some embodiments, a spectating system 400 may include a participant input processing 476 component that processes participant inputs 465 to determine events from broadcasts 442 based on participants' various inputs and interactions (e.g., audio, video, text, speech, social media, etc.) during the broadcasts 442.

In some embodiments, participant input processing 476 component may include or have access to one or more analysis modules 492 that analyze and process participants' various inputs (e.g., audio, video, text, speech, etc.) to detect events 494 in broadcasts 442 based on the inputs related to the broadcasts 442. In some embodiments, analysis modules 492 may include, but are not limited to, a video analysis 492A module, an audio analysis 492B module, a text analysis 492C module, and a content analysis 492D module.

In at least some embodiments, generally, an analysis module 492 may perform analysis on its input signal(s) and/or other input data to determine one or more metrics from the inputs, and then may match the determined metrics to known patterns. The patterns may then be mapped to particular types of events that may be output as detected events 494. In some embodiments, in addition to detecting events 494 that indicate interesting or notable events or highlights in broadcasts 442, an analysis module 492 may detect events 494 that anticipate or predict potential upcoming events in game sessions or broadcasts. For example, in a sports game, events 494 may be detected that anticipate upcoming big plays, or in a MOBA or MMOG events 494 may be detected that anticipate upcoming fights or battles.

In some embodiments, participant input processing 476 component may also include or have access to one or more sources of analysis data 499 that may be used in analyzing the participants' interactions to detect events 494. The analysis data 499 may include data that is specific to games and game systems (e.g., mappings of particular audio, text, and/or speech to specific events in games), and may also include data that is specific to particular participants or groups of participants (e.g., audio or speech patterns, facial metrics, etc.).

In some embodiments, participant input processing 476 component may also include a detected event processing 496 module that processes the events 494 detected by the analysis modules 492, for example to determine broadcast content 426C for the broadcasts 442. In some embodiments, the analysis modules 492 may provide detected events 494 to the detected event processing 496 module, for example according to an API for the module 496. The detected events 494 may indicate potentially interesting or notable events in the broadcasts 442 as determined from analysis of the participants' various inputs 465 (audio, video, chat, social media, etc.). FIG. 3D illustrates a non-limiting example format for detected events 494, according to some embodiments. In this example, a detected event 494 may be a record that may include one or more of, but is not limited to:

At least one timestamp (date/time) for the detected event 494. The timestamp(s) may include real-time (broadcast) timestamps and/or "game time" timestamps.

A broadcast ID that may be used to identify the broadcast 442 for which this event 494 was detected.

A participant ID that may be used to identify a particular broadcaster and/or spectator related to this detected event 494.

An event type for the detected event 494. An event type may an in-game event type; a game event may be common or generic across all game systems 420 or across some game systems 420 (e.g., all games within a genre), or may be specific to/defined by a particular game system 420.

In some embodiments, detected event 494 records may include other information about an event. For example, in some embodiments, detected event 494 records may indicate a duration for the respective event. In some embodiments, detected event 494 records may indicate a location within the game universe or game world for the event. In some embodiments, detected event 494 records may include one or more of information identifying players or teams of players who are involved in the event, information identifying broadcasters and/or spectators who are involved in the event, a summary description of the event, or a rating for the event (e.g., event significance on a scale from 1 to 10). In some embodiments, a detected event 494 record may include a confidence level for the event that may indicate how confident the respective analysis module 492 is that the analyzed input data correlates to the indicated event 494.

In some embodiments, participant input processing 476 component may include or have access to a video analysis 492A module. In some embodiments, participant inputs 465 may include video of participants (broadcasters and/or spectators) captured during a broadcast 442, for example by video cameras attached to or integrated with the participants' respective devices 440 or 460. The participant video may be analyzed, for example using facial recognition techniques and techniques that detect emotions via analysis of facial expressions, to determine metrics that may be used in identifying events in respective broadcasts 442. For example, a broadcaster's facial expressions may captured by a live video feed included in a broadcast 442, and the video may be analyzed to detect emotions of the broadcaster during game play. Various emotions such as surprise, fear, happiness, intense concentration, and so on may be detected that may be correlated to in-game events (victories, defeats, startling in-game events, etc.) or to broadcast events (e.g., the broadcaster spilled a drink on his keyboard, fell out of his chair, etc.). As another example, some embodiments may obtain images of participants' eyes (broadcasters, players, commentators and/or spectators) captured during game play or broadcasts 442, for example images captured by cameras attached to or integrated with wearable computing devices such as smart glasses, goggles, optical head-mounted displays, virtual reality (VR) headsets, and the like. The images may be analyzed, for example using techniques that detect emotions or other states via tracking and analysis of eye movements, blinking, dilation, and so on, and that analysis may be used alone or in combination with analysis of other inputs such as audio inputs to determine states of participants that may be correlated to in-game events or to broadcast events.

In some embodiments, participant input processing 476 component may include or have access to an audio analysis 492B module. Online games and game spectating systems may support audio input/output and communications for game players and for game spectators. For example, a player in an online game may communicate game play commands, suggestions, comments, strategy, chat, or other information to other players on their team within the game via audio input to a respective computing device. As another example, a broadcaster may provide vocal commentary to spectators via an audio channel of a game spectating system. As another example, spectators in a game spectating system may provide cheers, comment, chat, or other audio input for broadcasts via audio input channels to the game spectating system. Aggregated participants' (player and/or spectator) audio signals may be used to provide background chatter or "crowd noise" for an online game or broadcast. The participants' audio input signals may be captured by audiovisual (A/V) input components on the participants' respective client devices, digitized, and transmitted over a network to the online game or spectating system. At the online game or spectating system, the participants' audio signals may be aggregated, processed, and transmitted to the players' and/or spectators' respective devices for output as game or broadcast audio.

In some embodiments, audio analysis 492B module may process and analyze the various audio inputs from players, broadcasters, and/or spectators to detect events 494. In some embodiments, the audio analysis 492B module may perform signal analysis, for example time- and frequency-domain analysis, on the audio signals to determine one or more audio signal metrics from the audio signals. The metrics may, for example, include one or more of amplitude, pitch, duration, and frequency metrics, and in general any relevant metric that can be extracted from an audio or voice signal. The audio signal metrics may be analyzed, for example by comparing the metrics to known or learned audio patterns for individual participants or groups of participants, to determine information about the participants and/or the game session.

In some embodiments, the audio signals may be individually analyzed to determine metrics for each audio input, and the metrics may then be normalized, aggregated, and analyzed to determine information about groups of participants (players and/or spectators). In some embodiments, instead of or in addition to separately analyzing the audio signals and then aggregating the metrics for further analysis, the audio signals may be aggregated or combined and analyzed collectively to generate metrics for and information about groups of participants.

In some embodiments, participant information obtained for or with the audio input signals may be used when analyzing the audio input signals to determine information about the spectators and/or players. For example, the participant information may indicate affiliations or team preferences for spectators of a sports game based on the spectators' profile information. The spectator audio signals for a game may be segmented into two or more groups according to the metadata, for example into groups of fans of two opposing teams in a sports game such as football according to the spectators' indicated team affiliations, and analyzed separately according to the groups to determine group-specific information about the current game session or broadcast. For example, the group-specific information may indicate which group of spectators are currently cheering or booing, which group is the loudest and/or quietest, and so on. In some embodiments, player/broadcaster audio signals may also be segmented into groups (e.g., opposing teams) according to player profile information for player group analysis.

In some embodiments, the information determined from the analysis of the participant audio inputs may, for example, indicate an emotional state or states (e.g., excitement, stress, fear, shock, surprise, amusement, etc.) of individual participants (players and/or spectators) based on the analysis of the individual participants' vocalizations or other sounds in the respective audio signals. In some embodiments, the audio analysis information may instead or also indicate a state or states for a group or crowd (e.g., excitement, stress, approval, disapproval, etc.) based on an analysis of the combined audio signal metrics for two or more participants (players and/or spectators). In some embodiments, the information may also indicate a level for a determined state, for example an indication of how excited a crowd of spectators appears to be based on an analysis of aggregated spectator audio input.

In some embodiments, the information determined from the analysis of the participant audio inputs may be used to detect particular events 494 in an online game session or broadcast. For example, in some embodiments, at least some of the audio patterns to which the audio signal metrics are matched may be mapped to particular types of events in a respective online game. For example, in a sports game, particular crowd (spectator) and/or player audio patterns may be mapped to big plays, such as scoring plays or great defensive plays. In some embodiments, the information may anticipate or predict a potential upcoming event in an online game session or broadcast. For example, in a sports game, particular crowd (spectator) and/or player audio patterns may be mapped to what typically happens prior to a particular big event, such as crowd silence or chanting before an important offensive play in a football game, or very low crowd noise before a big defensive play in a football game. In some embodiments, the information may also indicate locations and times within the game universe for particular events to which the analyzed audio signals are mapped. For example, analysis of aggregated spectator or player audio signals and correlated metadata may indicate a particular location or area in the online game universe, and a particular time within the game timeline.

In some embodiments, audio analysis 492B module may identify and extract words, phrases, or other content from the input audio associated with a broadcast 442. In some embodiments, audio analysis 492B module may analyze the content to detect events 494 in the broadcast 442. For example, the audio analysis 492B module may try to match keywords or phrases that it identifies in the audio stream(s) of a broadcast 442 to keywords or phrases associated with events in game play in general, to keywords or phrases associated with particular events in the genre or game that the broadcaster is participating in as a player, and/or to keywords or phrases associated with particular participants (e.g., broadcasters). In some embodiments, audio analysis 492B module may provide the extracted content to another analysis module 492, for example to a content analysis 492D module, which performs analysis of the extracted content to detect events 494 for the broadcast 442.

In some embodiments, participant input processing 476 component may include or have access to a text analysis 492C module. Instead of or in addition to audio input, online games and game spectating systems may support text input/output and communications for game players and for game spectators. For example, players in online games may communicate game play commands, suggestions, comments, strategy, or other information to other players on their team within the game via text input to an in-game chat window. As another example, broadcasters and spectators may participate in chat windows associated with particular broadcasts 442 in a game spectating system 400. In some embodiments, text analysis 492C module may parse the text from one or more sources in a broadcast 442 (e.g., an in-game chat window and a broadcast chat window) to identify and extract words, phrases, or other content from the input text. In some embodiments, the spectating system 100 may instead or also include one or more interfaces that can obtain, process, and analyze text inputs from other input sources or channels, including but not limited to inputs from social media channels such as "tweets" or instant messaging (IMs). In some embodiments, text analysis 492C module may analyze the extracted text content to detect events 494. For example, the text analysis 492C module may try to match keywords or phrases that it identifies from the content of chat windows associated with a broadcast 442 to keywords or phrases associated with events in game play in general, to keywords or phrases associated with particular events in the genre or game that the broadcaster is participating in as a player, and/or to keywords or phrases associated with particular participants (e.g., broadcasters). In some embodiments, text analysis 492C module may provide the extracted content to another analysis module 492, for example a content analysis 492D module, which performs analysis of the extracted content to detect events 494.

In some embodiments, participant input processing 476 component may include or have access to a content analysis 492D module. Content analysis module 492D may receive content (e.g., words and/or phrases) extracted from audio/voice and/or text chat inputs to the broadcasts 442, and may analyze the received content to detect events 494. For example, the content analysis 492D module may try to match keywords or phrases from the extracted content to keywords or phrases associated with events in game play in general, to keywords or phrases associated with particular events in the game or genre of game that the broadcaster is participating in as a player, and/or to keywords or phrases associated with particular participants (e.g., broadcasters). In some embodiments, content analysis 492D module may access one or more analysis data 499 sources to search data sets of keywords or phrases associated with particular genres, games, broadcasters, and so on; the data sets may map the keys to particular events or types of events of interest that may be considered as significant or notable events or highlights in broadcasts.

Figure 4:
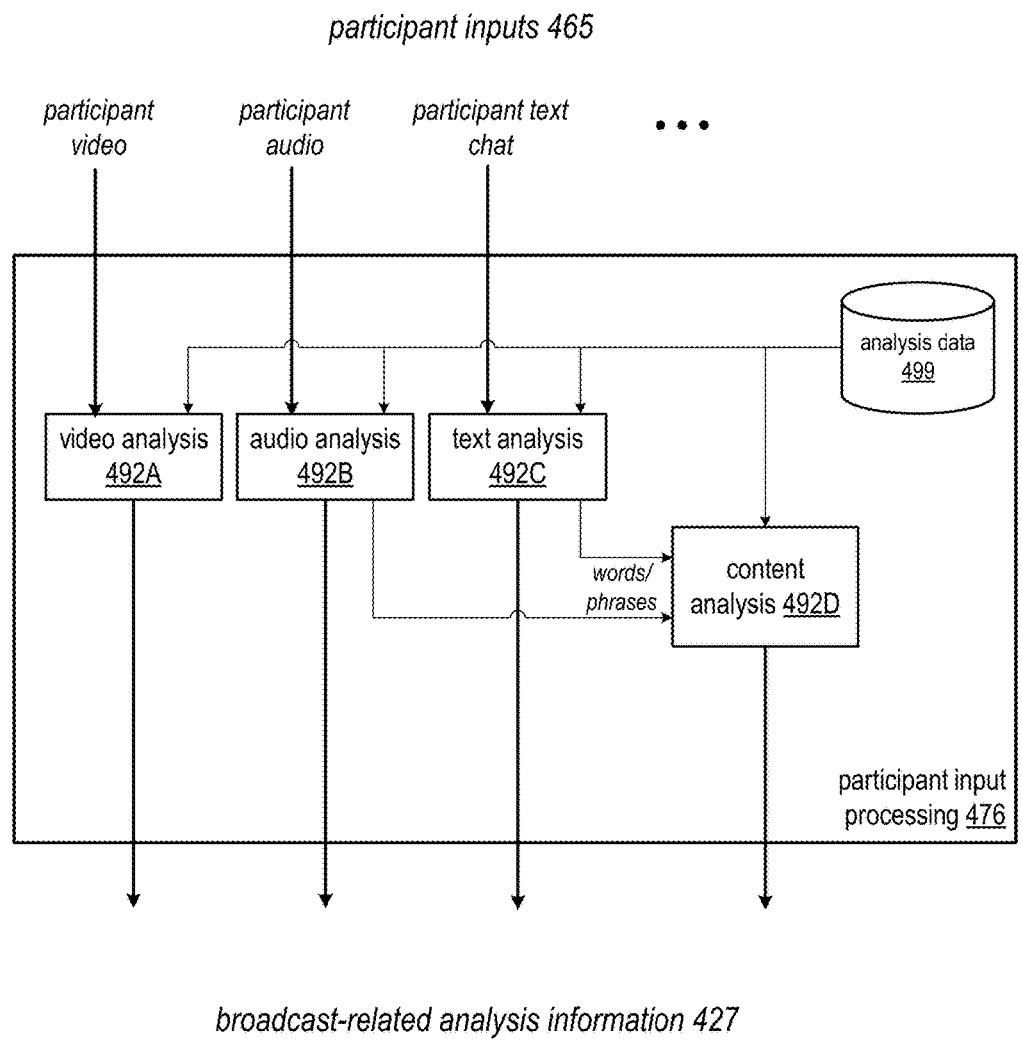
FIG. 4 illustrates processing participant inputs to determine broadcast-related information in a game spectating system, according to some embodiments.
Figure 16:
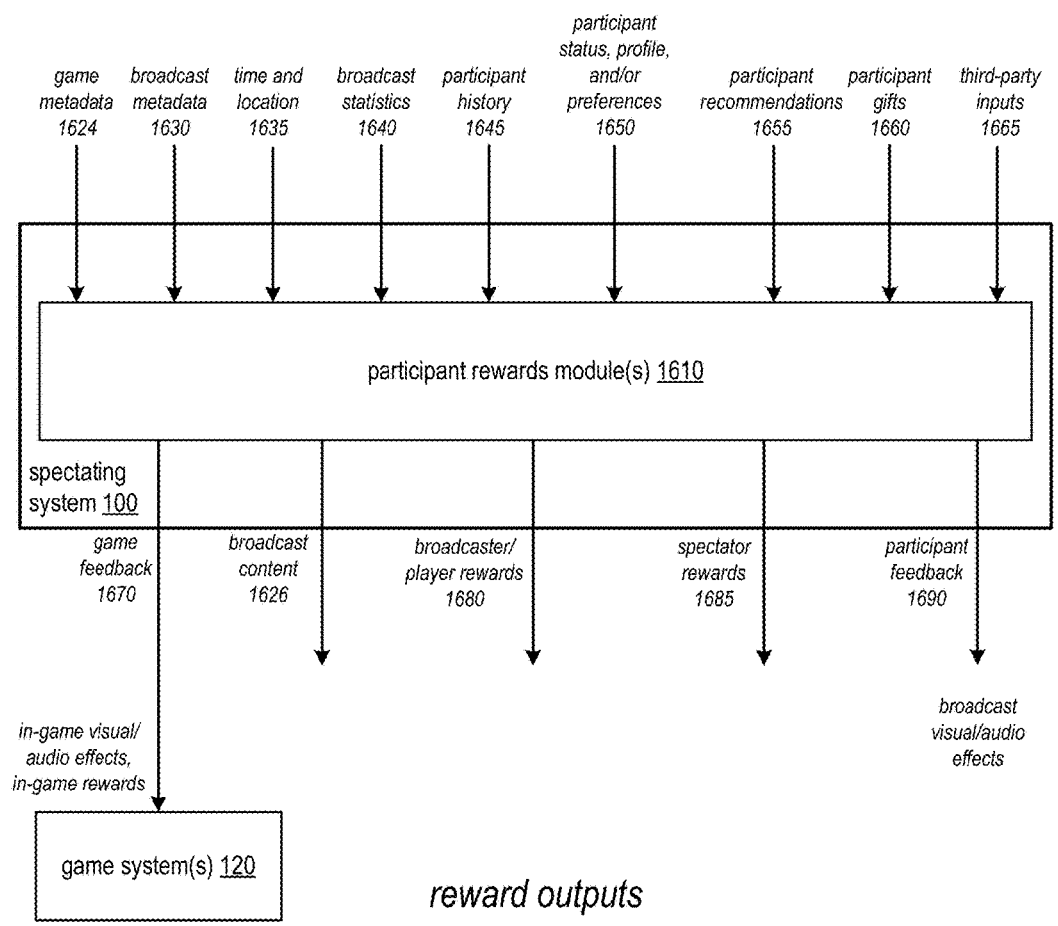
FIG. 16 illustrates an example participant rewards module in a game spectating environment, according to some embodiments.

FIG. 4 illustrates processing participant inputs to determine broadcast-related information in a game spectating system, according to some embodiments. In some embodiments, instead of or in addition to detecting and processing events 494, participant input processing 476 component may process one or more of the participant inputs 465 to generate other broadcast-related analysis information 427 that may be applied in the game spectating environment in various ways as described herein, for example in determining rewards for participants as illustrated in FIG. 16, to generate broadcast content 426 for display to a game spectating interface, or to generate inputs to the game system engine via a game system API of the spectating system to influence game execution and game play as illustrated in FIGS. 19 through 26. In some embodiments, participant inputs 465 may include, but are not limited to, audio, video, and text inputs to the spectating system via a spectating UI 416. In some embodiments, participant inputs 465 also include inputs from input devices and technologies coupled to or included in spectator devices such as controllers or joysticks, motion tracking systems, gesture-based input systems, and so on that can be analyzed and used to generate broadcast-related analysis information 427. In some embodiments, the spectating system 400 may include one or more interfaces that can obtain and process inputs from other input sources or channels, including but not limited to inputs from social media such as "tweets" or instant messaging (IMs), and the inputs to the other input channels may be similarly analyzed to generate broadcast-related analysis information 427. The following provides several examples of detecting and applying broadcast-related analysis information 427 within a game spectating system. However, note that these examples are not intended to be limiting.

As an example of detecting and applying broadcast-related analysis information 427 within a game spectating system, broadcast-related analysis information 427 may be determined for spectators of one or more broadcasts of a particular online game and may be leveraged to identify particular players, locations, areas, or regions within a game world of the online game being broadcast for which activity is "hot", for example as illustrated in FIG. 9. A map or portion of a map of the online game world may be displayed on at least some spectator devices, for example by a spectating UI as illustrated in FIG. 9, and players, teams, areas, regions, or locations that have been identified as active within the game according to analysis of the spectator inputs 495 may be marked or highlighted on the map. In some embodiments, instead of or in addition to a map of active or interesting players and/or locations, textual information may be displayed indicating particularly players and/or locations of interest as determined by analysis of the spectator inputs 495. In some embodiments, audio announcements or sounds may be used to call attention to particular players and/or locations. In some embodiments, the information about players and/or locations of interest within a game world may also be provided to the game players and/or broadcasters, for example via feedback of the broadcast-related analysis information to the broadcaster devices. In some embodiments, the information about players and/or locations of interest within a game world may be used to generate feedback or inputs to the game system, for example as illustrated in FIGS. 19 through 26.

As another example of detecting and applying broadcast-related analysis information 427 within a game spectating system, the analysis information 427 may indicate an emotion or emotional state (e.g., stress, excitement, anger, sadness, happiness, frustration, etc.) for one or more of the broadcasters. The analysis information 427 may be used to generate inputs to the game system engine via the game system API of the spectating system. The players' avatars or online characters in the game universe may be visually or otherwise affected in response to the inputs.

As another example of detecting and applying broadcast-related analysis information 427 within a game spectating system, the analysis information 427 for spectators may be leveraged to affect the game characters and game play of the broadcasters. For example, analysis of the audio and/or text chat inputs 465 for spectators viewing a particular player's broadcast may indicate that the player/broadcaster has spectator backing or is a spectator favorite when compared to other players in the game. This information may be used to generate inputs to the game system engine via the game system API of the spectating system that positively affect or reward the player's avatar or character within the game, for example by boosting player health, providing supplies, providing points, or in various other ways. In some embodiments, teams of players corresponding to broadcasters may be identified, and the teams may be affected by inputs to the game system engine based on the analysis of spectator audio and/or text chat inputs 465 for broadcaster(s) that are on the team.

As another example of detecting and applying broadcast-related analysis information 427 within a game spectating system, aggregated analysis information 427 for spectators of broadcasts of online games may be leveraged to identify particular currently active channels or broadcasts of interest. In some embodiments, the channels of interest may be indicated on at least some of the spectator devices, for example by highlighting the channel(s) on a spectating UI, or adding the channels to a "recommended" or "hot" list for currently active channels. In some embodiments, the information about channels of interest may also be provided to the broadcasters, for example via feedback of the analysis information 427 to the broadcaster devices indicating comparative channel popularity or ranking according to analysis of crowd noise or chat for the respective channels. In some embodiments, the analysis information 427 indicating channels or broadcasts of interest may be used to generate inputs to the game system engine via the game system API of the spectating system rewarding the respective broadcasters, fore example by providing boosts, gear, or other in-game benefits to the broadcasters' in-game characters or avatars.

As another example of detecting and applying broadcast-related analysis information 427 within a game spectating system, aggregated analysis information 427 for spectators of broadcasts of online games may be leveraged to identify particular broadcasters of interest. In some embodiments, the broadcasters of interest may be indicated on at least some of the spectator devices, for example by highlighting the broadcasters and/or the channel(s) associated with the identified broadcasters on the spectating UI, or adding the broadcaster(s) to a "recommended" or "hot" list for broadcasters. In some embodiments, the information about broadcasters may also be provided to the broadcasters, for example via feedback of the analysis information 427 to the broadcaster devices indicating the broadcasters' respective current popularity according to analysis of crowd noise or chat on the broadcasters' respective channels. In some embodiments, the analysis information 427 indicating broadcasters' popularity may be used to generate inputs to the game system engine via the game system API of the spectating system, for example inputs rewarding popular broadcasters by providing boosts, gear, or other in-game benefits to the broadcasters' in-game characters or avatars.

As another example of detecting and applying broadcast-related analysis information 427 within a game spectating system, aggregated analysis information 427 for spectators of broadcasts of online games may be leveraged to identify particular online games of interest, for example games for which activity is currently "hot" or interesting according to the "crowd noise" or chat in broadcasts of the current game. In some embodiments, the games of interest may then be indicated on at least some of the spectator devices, for example by highlighting the games on the spectating UI. In some embodiments, the analysis information 427 indicating games of interest may be used to generate inputs to the game systems via the game system API of the spectating system, for example inputs to a particular game system indicating that the game is currently hot in the spectating environment. The game system may use this input in various ways, for example by rewarding at least some of the players by providing boosts, gear, or other in-game benefits to the players' in-game characters or avatars.

Figure 22:
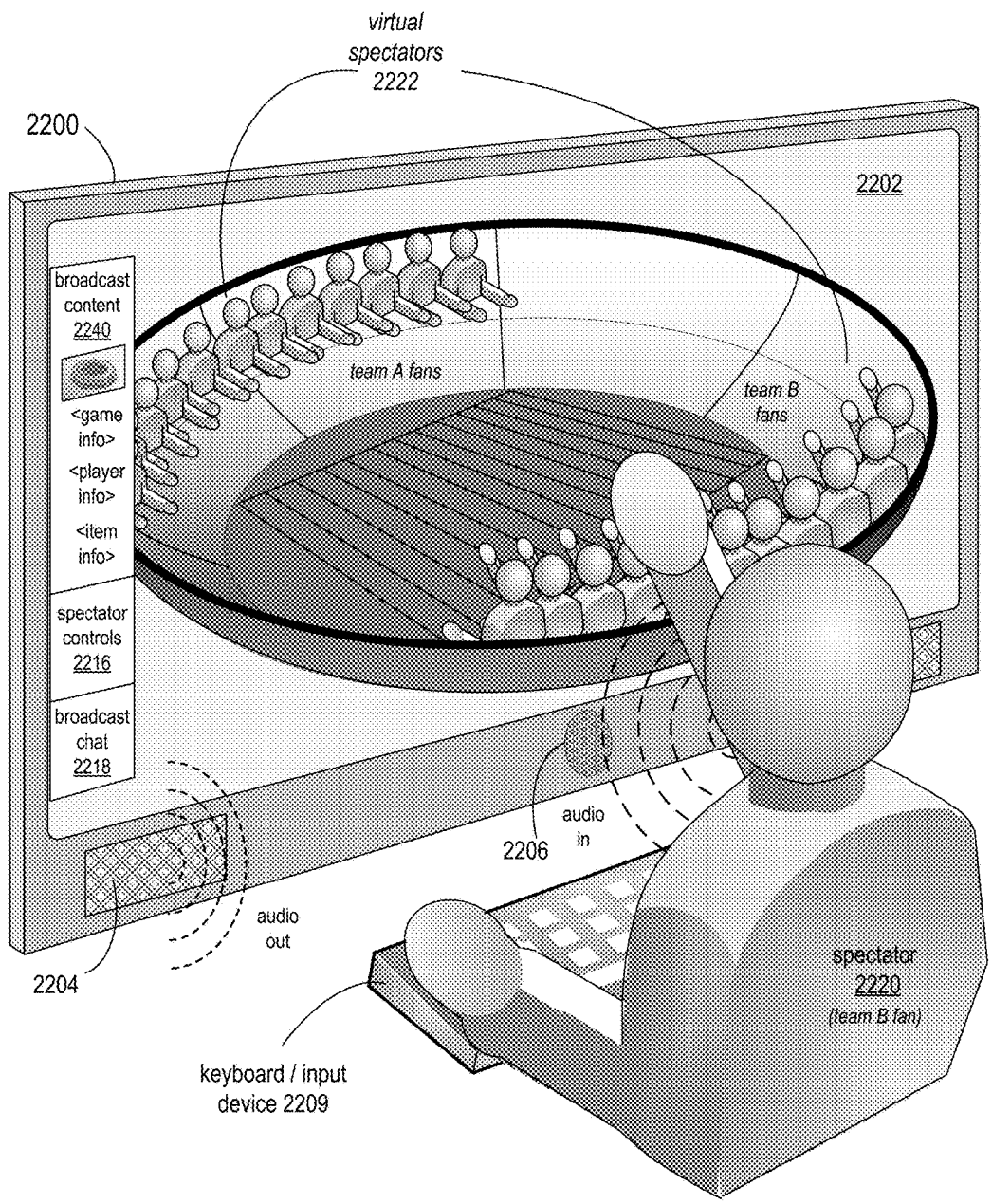
FIG. 22 provides a non-limiting example of spectators' inputs to a broadcast in a game spectating system collectively affecting a game being broadcast via the game spectating system, according to some embodiments.

As another example of detecting and applying broadcast-related analysis information 427 within a game spectating system, the audio and/or text chat inputs 465 for a broadcast or broadcasts may be analyzed to detect affiliations or preferences of spectators. The detected affiliations or preferences may be used to segment the spectators into two or more groups (e.g., fans of particular players or teams). For example, spectators may be detected to be fans of a particular player or team based at least in part on their audio and/or text chat inputs 465 (cheering, booing, loud, quiet, etc.) at particular times or in response to particular events in a game or broadcast. As another example, spectators may be detected to be fans of a particular player or team based at least in part on particular keywords, phrases, or chants recognized in their audio and/or text chat inputs 465 to the broadcast(s). In some embodiments, a spectator's detected affiliations or preferences may be added to their profile information. In some embodiments, the spectator's profile information may be modified over time based upon additional analysis of their audio or other inputs. In some embodiments, the analysis information 427 indicating spectator affiliations or preferences may be used to generate inputs to the game systems via the game system API of the spectating system, for example inputs to a particular game system indicating how many spectators are fans of two or more teams in the current game. The game system may use this input in various ways, for example by rewarding at least some of the players by providing boosts, gear, or other in-game benefits to the players' in-game characters or avatars based on their fan base, or by providing visual and/or audio indications of the spectators' affiliations, for example as illustrated in FIG. 22.

As another example of detecting and applying broadcast-related analysis information 427 within a game spectating system, the audio and/or text chat inputs 465 for a broadcast may be segmented into two or more groups (e.g., fans of particular players or teams), for example based on profile information for the respective spectators or analysis of the spectators' audio and/or text chat inputs 465 to detect affiliations or preferences, and analyzed separately according to the groups to determine group-specific information about games in the spectating system. For example, the group-specific information may indicate which group of spectators are currently cheering or booing, which group is the loudest and/or quietest, and so on. The group-specific information may be used to generate inputs to the game systems via the game system API of the spectating system, for example inputs to a particular game system indicating two or more spectator groups, and the current levels of excitement in the groups supporting opposing teams. The game system may use this input in various ways, for example to provide visual and/or audio feedback to the players and/or spectators in the game spectating system, for example visual and/or audio feedback indicating current levels of excitement in the groups supporting opposing teams. For example, virtual representations of spectators on one side of a stadium or arena in an online sports game may be made to stand up, wave flags, or otherwise visually or audibly respond when spectators who are determined to be fans of a particular team and/or player are cheering or booing loudly, for example as illustrated in FIG. 22.

As another example of detecting and applying broadcast-related analysis information 427 within a game spectating system, spectator audio output may be provided by the game spectating system via audio channel(s) of the broadcast to the spectators, particular groups of the spectators (e.g., to particular fans), and/or to the broadcaster(s) in response to the analysis information 427. For example, when spectators who are determined to be fans of a particular team and/or player are determined to be cheering or booing loudly based on analysis of the spectators' audio and/or text chat inputs 465, spectator audio output of the cheers or boos may be provided by the game spectating system to at least some of the spectators (e.g., to the fans of a particular team) and/or players via audio channel(s) of the broadcast. As another example, analysis of the spectators' audio and/or text chat inputs 465 may detect particularly interesting inputs from individual spectators or groups of spectators (e.g., a particular spectator or group cheering or chanting loudly, heckling a player, etc.), and spectator audio output of the interesting audio inputs may be provided by the game spectating system via an audio channel of the broadcast. In some embodiments, the spectator audio output may be generated from or as a mix of the spectator audio input(s). In some embodiments, the spectator audio output may be "canned", pre-recorded, or synthesized sounds or sound tracks (e.g., crowd cheers or boos) that are played in response to the analysis information 427. In some embodiments, the analysis information 427 indicating different groups' current responses to the game such as cheering, enthusiasm, or disappointment may be used to generate inputs to the game systems via the game system API of the spectating system, for example inputs to a particular game system indicating how different groups of spectators are currently responding. The game system may use this input in various ways, for example by rewarding at least some of the players by providing boosts, gear, or other in-game benefits to the players' in-game characters or avatars based on their fan base's current level of enthusiasm, or by providing visual and/or audio indications of the groups' current responses, for example as illustrated in FIG. 22.

As another example of detecting and applying broadcast-related analysis information 427 within a game spectating system, the spectators' audio and/or text chat inputs 465 for a game or broadcast may be analyzed to detect currently interesting spectators, for example particular spectators who are cheering or chanting loudly or heckling a player, or spectators who are particularly happy, angry, or excited. The spectator's interesting audio input may be provided to other participants (spectators and/or broadcasters) by the game spectating system via an audio channel of the broadcast. In addition, in some embodiments, video or images of spectators who are identified as currently interesting based upon their audio input may be provided to the spectators and/or broadcasters, for example in a picture-on-picture window overlaid on the broadcast video. The video may be video of the interesting spectator(s) captured by video cameras in their spectating environment or simulated video or images of avatars representing the spectator(s) and simulating their detected emotional state.

Figure 6A:
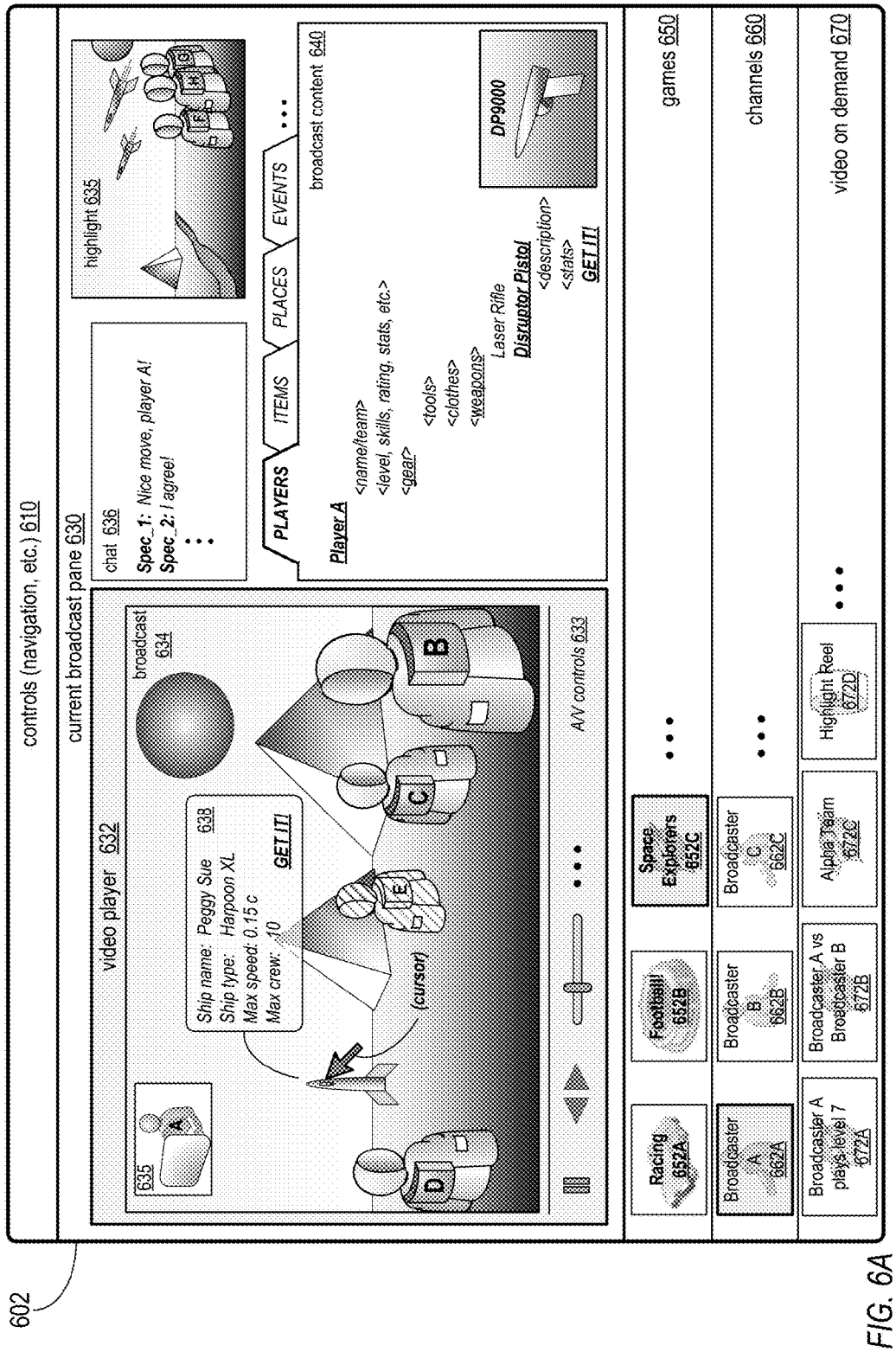
FIGS. 6A and 6B provide non-limiting examples of a spectating user interface for a game spectating system, according to some embodiments.

FIG. 6A provides a non-limiting example of a spectating user interface for a game spectating system, according to some embodiments. A spectating UI 602 may, for example be presented as a Web page of a game spectating system website via a Web browser, as an interface to a game spectating Web application or mobile application, or as an interface to other network-based game spectating applications. A spectating UI 602 may include one or more panes or regions including one or more of, but not limited to, controls 610, current broadcast pane 630, games 650, channels 660, and video on demand 670. Controls 610 may include one or more UI elements for navigating or otherwise interacting with the game spectating system. Games 650 may display UI elements corresponding to one or more online games 652 supported by or currently available through the game spectating system. This example shows a racing 652A game, a football 652B game, and a space explorer 652C game. Channels 660 may display UI elements corresponding to one or more currently active (or upcoming) broadcasts or channels 662, for example channels 662 corresponding to broadcasters for a currently selected game 652. In this example, the space explorer 652C game is selected, and channels 662 shows three broadcasters 662A, 662B, and 662C for the currently selected game 652C. Video on demand 670 may, for example, display UI elements corresponding to one or more videos 672, including but not limited to previously recorded broadcasts and/or highlight reels that are available for viewing. In this example, video on demand 670 shows example pre-recorded videos 672A-672C and a highlight reel 672D for the currently selected game 652C. While not shown, in some embodiments, a spectating UI 602 may include a recommendations pane that may display UI elements corresponding to one or more of recommended games 652, channels 662 (broadcasters), and recorded videos 672 including but not limited to highlight reels.

In some embodiments, content of recommendations, channels 660 and/or video on demand 670 may be determined at least in part according to a currently selected game 652. For example, in some embodiments, a spectator may select a game 652C to view the currently active channels 662 for the selected game 652C, and to view recordings of broadcasts for the selected game 652. While not shown, in some embodiments, the UI 602 may allow the spectator to select particular broadcasters, and the content of recommendations, channels 660 and/or video on demand 670 may be determined at least in part according to the currently selected broadcaster.

Current broadcast pane 630 may include a video player 632 with A/V controls 633 that displays the video stream (shown as broadcast 634) for a currently selected live broadcast or channel 662 (in this example, channel 662A), or a currently selected video 672 being played to the respective spectator device. The broadcast 634 may include game play video, for example shown from the broadcaster/player's viewpoint or perspective or from a bird's eye view, and a window 635 showing a live view of the broadcaster/player, in this example broadcaster/player A. The video player 632 typically also plays an audio stream that may include one or more of the in-game audio, broadcaster audio, and the audio commentary or "crowd noise" from the spectators. In some embodiments, the audio may also include commentary or play-by-play calls from a commentator. In some embodiments, current broadcast pane 630 may also include a chat 636 pane in which broadcaster and/or spectator text chat may be displayed. In some embodiments, current broadcast pane 630 may also include a highlight 635 pane that displays highlights, for example a highlight from a currently active or selected highlight reel or a highlight from the current broadcast. In some embodiments, current broadcast pane 630 may also include one or more UI elements via which a spectator can control the highlight 635 display.

In some embodiments, current broadcast pane 630 may include or provide UI elements that may display broadcast content based at least in part on game metadata for the game being broadcast 634. At least some of the UI elements may be or may include active UI elements that initiate or perform some action when selected. In this example, game play in the space explorer 652C game is currently being broadcast, so the broadcast content includes content related to the space explorer 652C game.

As shown in this example, in some embodiments, current broadcast pane 630 may include a broadcast content 640 pane via which spectators may view information about different categories of game content. For example, broadcast content 640 pane may include tabs via which spectators may view information about players, items, places, events, or other categories of game content as described in the game metadata. For a category of content, the spectators may select and view information about particular instances of the content, for example particular players. For a particular instance of content, the spectators may view further details.

As shown in this example, information about player A in the space explorer 652C game being broadcast is shown. The player information may include information such as the player's name and affiliations (e.g., team), the player's skills or powers, the player's skill or experience levels, the player's ratings, accomplishments, and other statistics, the player's gear such as tools, outfit/clothes, and weapons, or any other information that a game may keep or track about players. In this example, the viewer has interacted with the broadcast content 640 to view the player's gear, and has further selected to view the player's weapons. In the displayed list of weapons that player A currently possesses, the viewer has selected Disrupter Pistol to view descriptive information about this particular item of the player's in-game gear. The descriptive information may, for example, include image(s) ("DP9000") and a textual description of the item. For example, for a weapon, the descriptive information may indicate the range, capacity, and effectiveness of the weapon. In some embodiments, the descriptive information may include usage information for a particular item or type of item. For example, a list of all the players who use an item such as a particular sword or other weapon may be provided. In some embodiments, the descriptive information may include statistical data about the in-game content. For example, for a weapon or other piece of in-game gear, popularity or ratings based on player usage and/or participant voting may be provided.

In some embodiments, the broadcast content 640 pane may include UI elements via which the viewer can order, purchase, or otherwise obtain game-related content. The game-related content may include virtual game items or objects (e.g., digital representations of physical objects) such as in-game gear, clothing, weapons, characters, avatars, powers, and so on, that may be acquired for use within the games, physical items such as physical representations of virtual objects from within the games (e.g., physical representations of in-game weapons such as swords, action figures, toys, etc.), and/or game-related physical merchandise such as t-shirts or hats. In some embodiments, the spectating system may provide, or may provide access to, a "print on demand" service whereby 3D printing technology may be used to print physical objects based on input designs or specifications of game-related objects or items (e.g., in-game characters, weapons, vehicles, monsters, etc.). The designs or specifications for the objects may be obtained from the game systems in the game metadata, or may be otherwise obtained. For example, in the broadcast content 640 pane shown in FIG. 6A, the viewer may select the "GET IT!" UI element to obtain a virtual DP9000 pistol for use within the Space Explorers game and/or to order or purchase a physical model of the DP9000 pistol from a game system provider, online merchant, manufacturer, or other entity.

In some embodiments, broadcast content based at least in part on game metadata for the game being broadcast 634 may be overlaid, blended, or composited into the video stream content to be displayed in broadcast 634. This broadcast content may be referred to herein as overlay content. In some embodiments, overlay content may be added to the video stream by a spectating service 100 as illustrated in FIGS. 1A and 1B. In some embodiments, overlay content may instead or in addition be added to the video stream by a broadcast content service 113 between spectating service 100 and at least some of the spectator devices 160. The overlay content may include textual and/or graphical content. As a non-limiting example, text tags or captions may be added to objects or scenes in the video stream. For example, as shown in FIG. 6A, name tags (shown as A, B, C, D, and E in FIG. 6A) may be added to characters in the video stream so that spectators may identify the players in the game. As another example, objects or characters of interest may be identified from the game metadata and/or broadcast metadata, and those objects or characters may be visually indicated using overlay content in the video stream. For example, the game metadata and/or broadcast metadata may indicate an emotion or emotional state (e.g., stress, excitement, anger, sadness, happiness, frustration, etc.) for one or more of the players, and the players' avatars or online characters as displayed in the game universe may be visually modified, for example using colors, to indicate the respective players' emotions or emotional states. For example, as shown in FIG. 6A, character E in broadcast 634 has been highlighted using overlay content that changes the visual appearance of the character in the video stream.

As another example of using overlay content, in some embodiments, objects or regions in broadcast 634 may be made interactive using overlays. For example, in some embodiments, at least some objects displayed in broadcast 634 may be interactive so that a spectator may select the objects in broadcast 634 to open an overlay window 638 that provides information about the object. For example, in FIG. 6A, the spectator has used a cursor to select the spaceship and open a window 638 that shows the ship's name, type, and capabilities. In some embodiments, the overlay content on broadcast 634 may include UI elements via which the viewer can order, purchase, or otherwise obtain game-related content. For example, in FIG. 6A, the viewer may select a "GET IT!" UI element in overlay window 638 to obtain a virtual Harpoon XL ship for use within the "Space Explorers" game and/or to order or purchase a physical model of the Harpoon XL ship from a merchant or manufacturer.

Figure 6B:
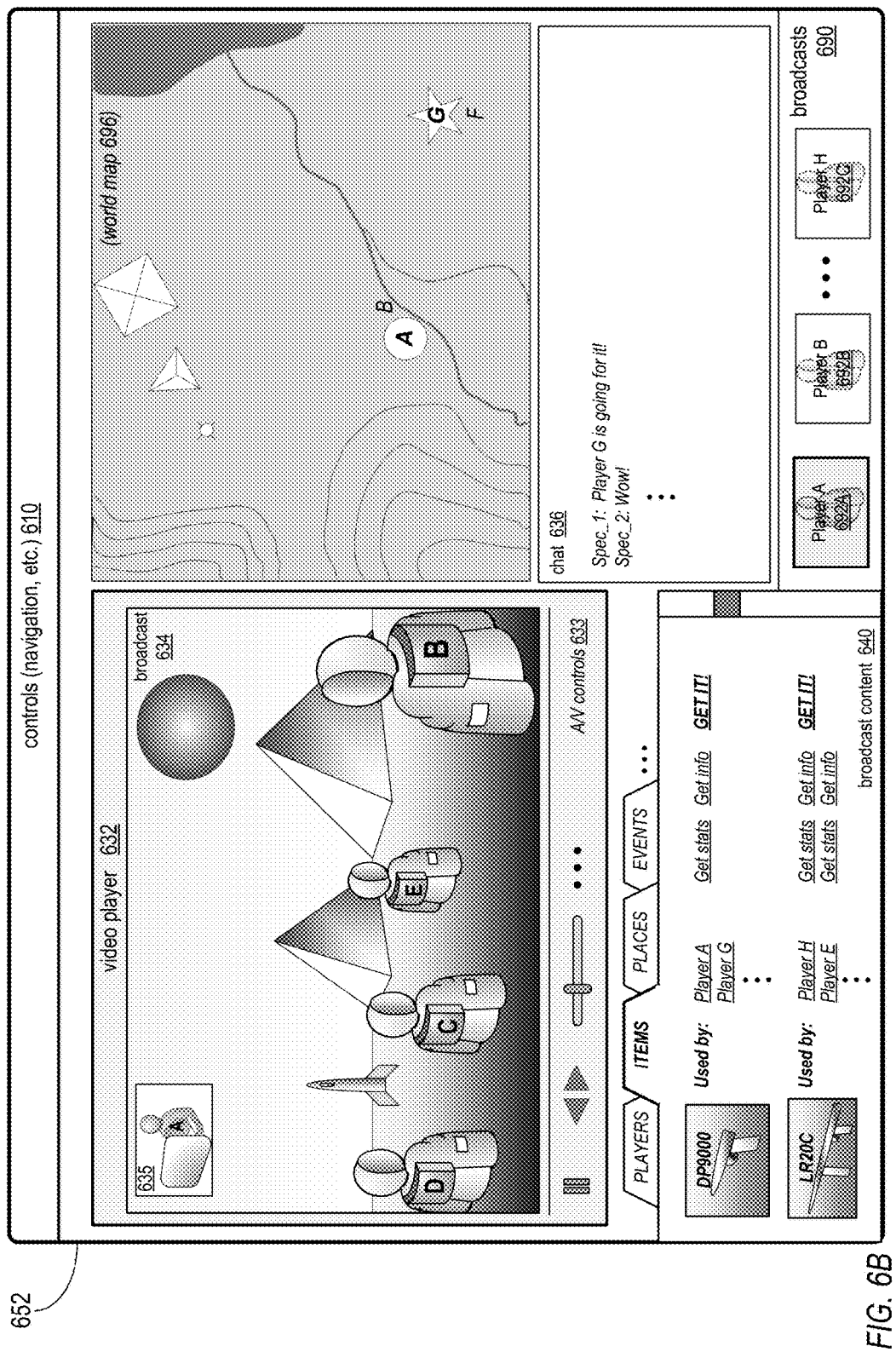

FIG. 6B provides another non-limiting example of a spectating UI for a game spectating system, according to some embodiments. In some embodiments, a spectating UI 652 may include or provide UI elements that may display broadcast content based at least in part on metadata for the game being broadcast 634 (in this example, the Space Explorers game), for example game metadata received from a respective game system or other source as illustrated in FIG. 1C. At least some of the UI elements may be or may include active UI elements that initiate or perform some action when selected. FIG. 6B provides examples of spectating user interface elements and methods for exploring a game being broadcast, or a replay of a previously recorded broadcast, that are based at least in part on the game metadata. A spectating UI 652 may, for example be presented as a Web page of a game spectating system website via a Web browser, as an interface to a game spectating Web application or mobile application, or as an interface to other network-based game spectating applications. A spectating UI 652 may include panes or regions including one or more of, but not limited to, controls 610, a video player 632 with A/V controls 633, broadcast content 640, world map 696, broadcasts 690, and a chat window 636.

Controls 610 may include one or more UI elements for navigating or otherwise interacting with the game spectating system. Video player 632 may display the video stream (shown as broadcast 634) for a currently selected broadcast 692 (in this example, broadcast 692A) or for a replay of a previously selected broadcast. The broadcast 634 may include game play video, for example shown from the broadcaster/player's viewpoint or perspective or from a bird's eye view, and a window 635 showing a live view of the broadcaster/player, in this example broadcaster/player A. Video player 632 typically also plays an audio stream that may include one or more of the in-game audio, broadcaster audio, and the audio commentary or "crowd noise" from the spectators. In some embodiments, the audio may also include commentary or play-by-play calls from a commentator. In some embodiments, spectating UI 652 may also include a chat 636 pane in which broadcaster and/or spectator text chat may be displayed. Broadcasts 690 pane may display UI elements corresponding to one or more players in the current game that are broadcasting for the game, or that broadcasted for a game being replayed. In this example, player A's broadcast 692A is currently selected. In some embodiments, the viewer or spectator can switch to a different player's live or previously recorded broadcast 692 by selecting the respective UI element in broadcasts 690.

As shown in this example, in some embodiments, spectating UI 652 may include a broadcast content 640 pane via which spectators may view information about different categories of game content. For example, broadcast content 640 pane may include tabs via which spectators may view information about players, items, places, events, or other categories of game content as described in the game metadata. For a category of content, the spectators may select and view information about particular instances of the content, for example particular players or game-related content or items. For a particular instance of content, the spectators may obtain or view further details.

As shown in this example, a tab displaying information about items in the game being broadcast is shown as selected in broadcast content 640. The tab pane may include control or navigation UI elements such as a scroll bar. In this example, the displayed list of items includes a disrupter pistol ("DP9000") and a laser rifle ("LR20C"). In some embodiments, for at least some of the displayed items, a list of players who possess or use the respective item may be provided. In some embodiments, the spectator can select a player in the list to switch to the player's live or previously recorded broadcast 692. Once at the other player's broadcast 692, the viewer can watch the player use the item, view statistics for the player, request more information about or the player's opinion of or advice for using the item, obtain, copy, or clone the player's gear, and so on. While this example describes switching to other players' broadcasts from the items tab of the in broadcast content 640 pane, in some embodiments viewers can switch broadcasts by selecting players from lists on the other panes. For example, the "places" pane and "events" pane may provide lists of players at or associated with various places and events in the game, and the viewer may select a player from the list to switch to the selected player's broadcast.

In some embodiments, a player in the list for an item may not be a broadcaster. In this case, selecting the player from the list may provide the option to switch to a broadcast of another player who may be associated with the first player, for example another player on the same team or at the same general location in the game being broadcast or replayed.

As shown in FIG. 6B, UI elements may also be provided in the broadcast content 640 items tab via which information about the respective items may be viewed or obtained. In some embodiments, the information may include statistical data about the item. For example, for a weapon or other piece of in-game gear, popularity or ratings based on player usage and/or participant voting may be provided. In some embodiments, the broadcast content 640 pane may include UI elements via which the viewer can order, purchase, or otherwise obtain the respective item. For example, in the broadcast content 640 pane shown in FIG. 6B, the viewer may select a respective "GET IT!" UI element to obtain a virtual DP9000 pistol for use within the Space Explorers game and/or to order or purchase a physical model of the DP9000 pistol from a game system provider, online merchant, manufacturer, or other entity.

In some embodiments, the spectating system may detect the locations for various game content in the game universe, including the location of the players who are broadcasters for the game, at least in part from the game metadata received from various sources as illustrated in FIG. 1C. In some embodiments, a world map 696 or portion of a map of the game world may be displayed on UI 652. In some embodiments, the locations of players, teams, areas, events, regions, or locations may be marked or highlighted or otherwise visually indicated on the map 696. In some embodiments, the locations of players who are broadcasters for the game may be highlighted or otherwise visually indicated on a world map 696. For example as illustrated in FIG. 6B, players A, B, G, and F are shown as broadcasters. In some embodiments, the viewer or spectator can switch to a different player's live or previously recorded broadcast 692 by selecting the respective broadcaster/player in map 696. In some embodiments, analysis of game metadata and/or broadcast metadata as described herein (for example, analysis of text chat 636 and/or audio chat or crowd noise) may identify active or exciting broadcasts, and the broadcaster/player's location indicator on the map 696 may be highlighted. For example, in FIG. 6B, broadcaster/player A's broadcast is the broadcast being viewed in video player 632, and that player's indicator on map 696 is indicated by a circle. However, broadcaster/player E's broadcast is drawing a lot of attention from spectators, and so that player's indicator on the map 696 is highlighted with a star. The viewer may select broadcaster/player E on the map 696 to switch to that broadcast.

Figure 7A:
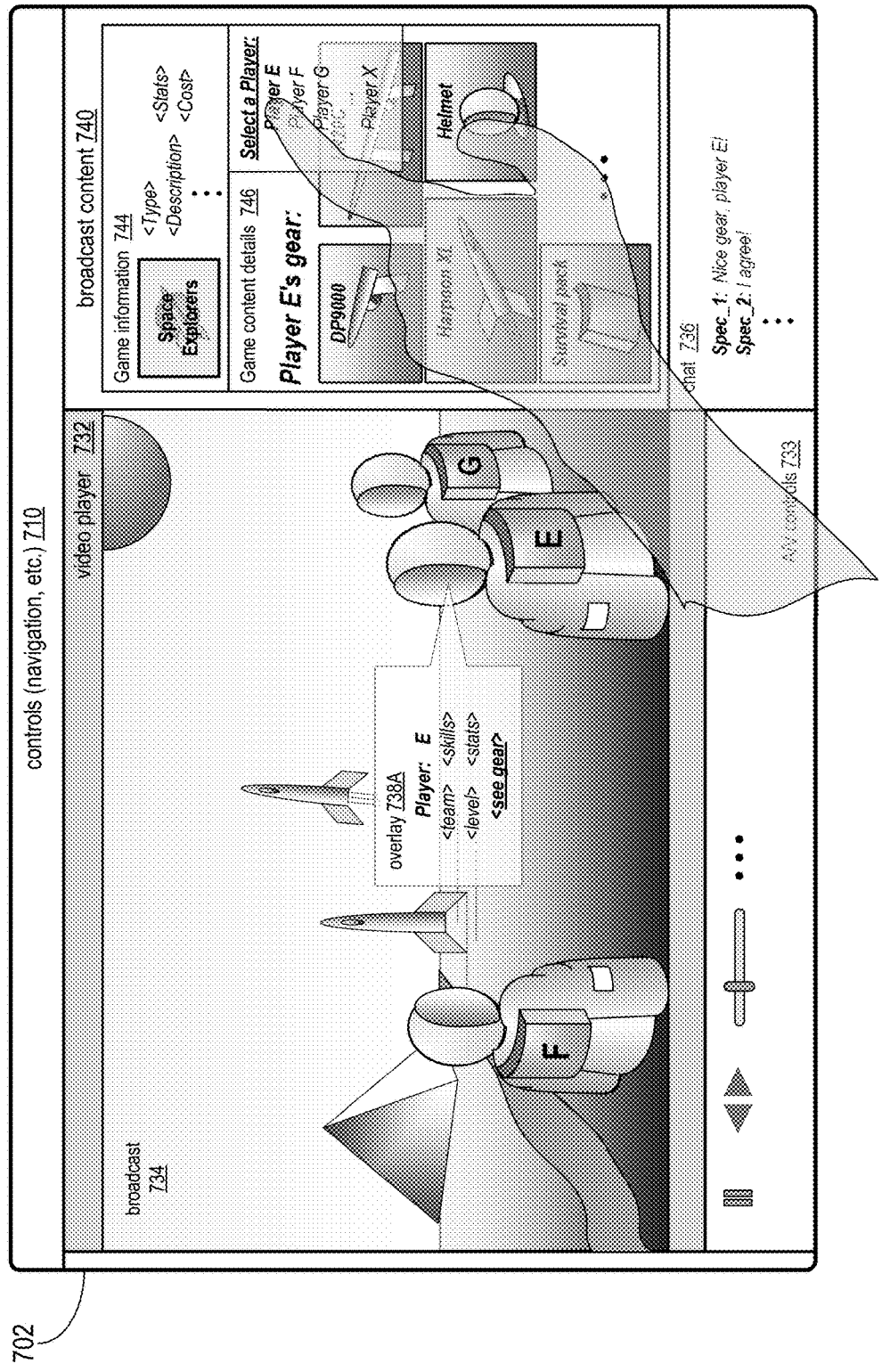
FIGS. 7A and 7B provide non-limiting examples of a spectating user interface for a game spectating system, according to some embodiments.
Figure 7B:
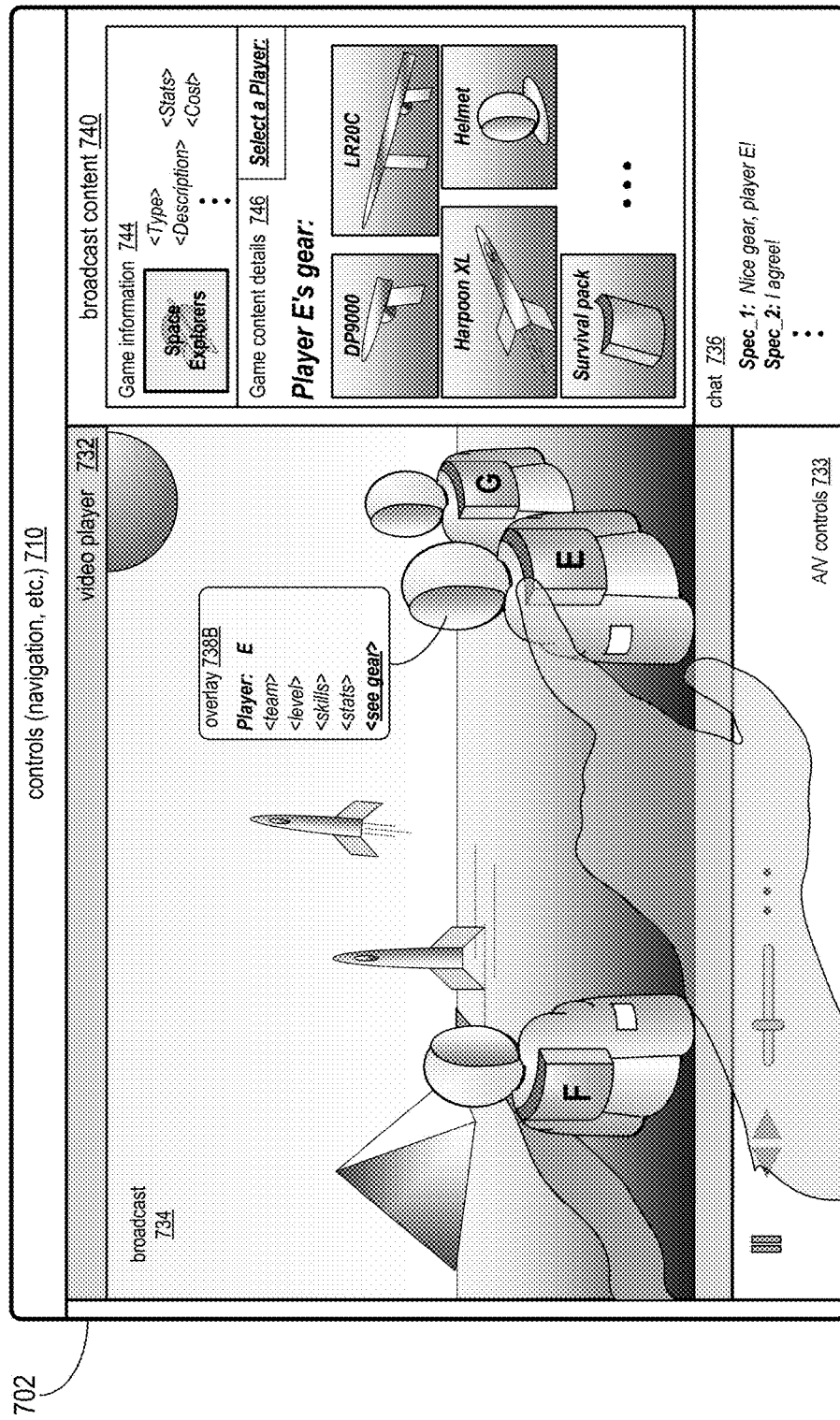

FIGS. 7A and 7B provide non-limiting examples of a spectating user interface for a game spectating system, according to some embodiments. A spectating UI 702 may, for example be presented as a Web page of a game spectating system website via a Web browser, as an interface to a game spectating Web application or mobile application, or as an interface to other network-based game spectating applications. A spectating UI 702 may include one or more panes or regions including one or more of, but not limited to, controls 710, a video player 732 with A/V controls 733, and a broadcast content pane 740 via which a spectator may view and interact with broadcast content based at least in part on game metadata for the game being broadcast 734. Controls 710 may include one or more UI elements for navigating or otherwise interacting with the game spectating system. Video player 732 displays the video stream (shown as broadcast 734) for a live broadcast or channel or for a replay of a previously recorded broadcast. In some embodiments, spectating UI 702 may also include a chat 736 pane in which broadcaster and/or spectator text chat may be displayed, for example spectator chat discussing game information and content such as in-game gear displayed in broadcast content pane 740.

Broadcast content pane 740 may, for example, include a game information 744 pane that displays information for the game being broadcast based at least in part on the game metadata received from the respective game system, and a game content details 746 pane via which the viewer may explore, view, and interact with detailed information about game content (objects, gear, characters, players, locations, events, etc.) based at least in part on the game metadata for the game being broadcast 734.

As shown in FIG. 7A, in some embodiments, game content details 746 pane may include UI elements that the spectator may interact with to view various game content and to obtain more information about the game content. For example, as shown in FIG. 7A, game content details 746 pane includes a "Select a player" UI element that the spectator may select to view a list of players; the spectator may select one of the players to view additional information about the player. For example, in FIG. 7A, the viewer has selected "Player E" from the list to view the items currently in player E's gear set in game content details 746 pane (DP9000 disruptor pistol, LR20C laser rifle, Harpoon XL ship, helmet, survival pack, etc.). Note that the players in the list may be, but are not necessarily, players in the current game being broadcast or replayed.

In some embodiments, the spectator system 100 and/or a broadcast content service 113 may add content to or change content of the broadcast content pane 740 in response to events detected in the broadcast 734. The events may, for example, be detected by one or more methods as illustrated in FIGS. 3A through 3D. For example, information about game content, game events, players, and so on may be added to or changed in the broadcast content pane 740 based at least in part on the game metadata. For example, in FIG. 7A, information about a player or other game content may be added to or changed in game content details 746 pane in response to an event in the broadcast, for example an event involving Player E such as Player E's first appearance in the game or in the current scene.

As shown in FIG. 7A, in some embodiments, broadcast content may include overlays 738 on the broadcast 734. In some embodiments, the spectator system 100 and/or a broadcast content service 113 may add overlays 738 to the broadcast 734 in response to events detected in the broadcast 734. The events may, for example, be detected by one or more methods as illustrated in FIGS. 3A through 3D. An overlay window 738 may provide additional information about game content, game events, players, and so on based at least in part on the game metadata obtained from the game system. For example, as shown in FIG. 7A, an overlay window 738A has been added to broadcast 734 in response to an event involving Player E, such as Player E's first appearance in the game or in the current scene. The example overlay window 738A shows the player's attributes (name, team, level, skills, etc.), statistics (ratings, accomplishments, kills, experience, etc.) and gear (weapons, clothing, tools, vehicles, etc.). The content of overlay windows 738 may be obtained from the spectating system, game system, game developer, game servers, broadcaster devices, third parties such as online merchants, or in general from any source as illustrated in FIG. 1C. In addition to overlay windows 738 that show additional information about game content, game events, and so on, overlay windows 738 may include images, video clips, advertisements, titles or labels, links to external websites, or in general any type of content. In some embodiments, an overlay window 738 may include active UI elements that the viewer can interact with to display additional information about the selected game content in broadcast content 740 pane. For example, in FIG. 7A, the viewer may select a "see gear" UI element in overlay window 738A to view the items currently in player E's gear set in game content details 746 pane.

As shown in FIG. 7B, in some embodiments, broadcast 734 may include overlay content that allows the viewer to interact with the broadcast 734, for example to open an overlay window 738B that provides additional information about the content based at least in part on the game metadata obtained from the game system. For example, as shown in FIG. 7B, the spectating UI 702 is displayed on a touch-enabled device, and the spectator has used touch gestures to select Player E and open an overlay window 738B that shows the player's attributes (name, team, level, skills, etc.), statistics (ratings, accomplishments, kills, experience, etc.) and gear (weapons, clothing, tools, vehicles, etc.). In some embodiments, the overlay window 738B may include active UI elements that the viewer can interact with to display additional information about the selected game content in broadcast content 740 pane. For example, in FIG. 7B, the viewer has selected a "see gear" UI element in overlay window 738B to view the items currently in player E's gear set in game content details 746 pane (DP9000 disruptor pistol, LR20C laser rifle, Harpoon XL ship, helmet, survival pack, etc.).

In some embodiments, at least some of the UI elements displayed in broadcast content 740 pane may be interactive elements that, for example, allow the viewer to get additional information about the game or game content based at least in part on the game metadata obtained from the game system, or to order, purchase, or otherwise obtain the game or game content. For example, in some embodiments, the viewer may interact with the UI elements displayed in game content details 746 pane to obtain additional details about the items, to obtain the virtual item for use within the "Space Explorers" game and/or to order or purchase a physical model of the virtual item from a merchant or manufacturer. As another example, the viewer may interact with the UI elements displayed in game information 744 pane to get more information about the game, or to obtain or purchase the game, from the game system provider or from some other source.

FIG. 8 provides a non-limiting example of a broadcaster user interface for a game spectating system, according to some embodiments. A broadcaster's device 800 may implement a game and broadcasting UI 802, and may include or be coupled to an A/V device 808 (e.g., a video camera with microphone) to collect broadcaster/player 820 audio and video input and speakers 804 to output game audio (including spectator audio and/or crowd noise.). The broadcaster's device 800 may also include or be coupled to a keyboard 809 or other input device(s) via which the broadcaster/player 820 may enter text input such as player chat or broadcast chat. In some embodiments, the broadcaster's device 800 may also include or be coupled to input devices and technologies such as controllers or joysticks, motion tracking systems, gesture-based input systems, and so on.

In some embodiments, broadcasting UI 802 may include a game play window 810 that displays a current view of the game universe for the broadcaster/player 820. Note that the broadcaster's view of the game universe as shown in window 810 may be included in the broadcast and shown to spectators, for example as shown in FIG. 9. In some embodiments, UI 802 may also include game controls 814 via which the broadcaster/player 820 may interact with the game system. In some embodiments, UI 802 may include in-game chat 814 via which the broadcaster/player 820 may communicate to other players in the game via text. In some embodiments, UI 802 may also include broadcast controls 818 via which the broadcaster/player 820 may interact with the spectating system to control the broadcast. In some embodiments, UI 802 may include broadcast chat 818 via which the broadcaster/player 820 and spectators may communicate via text.

In some embodiments, a world map 812 or portion of a map of the online game world may be displayed on UI 802, for example as a window within or overlaying the game play window 810. Broadcaster/player A's team location is shown by the oval marked with an "A". In some embodiments, players, teams, areas, regions, or locations corresponding to current or potential events that have been identified by one or more of the methods as described herein may be marked or highlighted or otherwise visually indicated on the map 812. Broadcaster/player A and his team may, in some cases, take action based upon the visual indications of events displayed on the map 812.

As shown in FIGS. 1A and 1B, in some embodiments, the spectating system may provide broadcast feedback to the broadcast device 800 based at least in part on spectator interactions with the broadcast content generated from the game metadata and/or broadcast metadata. In some embodiments, at least some of the broadcast feedback may be provided to the broadcaster 820 via a broadcasting feedback 817 pane or window of broadcasting UI 802.

FIG. 9 provides another non-limiting example of a spectating user interface for a game spectating system, according to some embodiments. A spectator's device 900 may implement a spectating UI 902, and may include a microphone 906 to collect spectator audio input and speakers 904 to output game audio (including spectator audio and/or crowd noise, broadcaster audio commentary, etc.). The spectator's device 900 may also include or be coupled to a keyboard 909 or other input device(s) via which the spectator 960 may enter text input such as broadcast chat 918. In some embodiments, the spectator's device 900 may also include or be coupled to input devices and technologies such as controllers or joysticks, motion tracking systems, gesture-based input systems, and so on.

In some embodiments, UI 902 may include a game spectating window 910 that displays a current view of the game universe from the broadcaster/player's perspective. In this example, spectator 960 is currently viewing a group of players B, C and D from the perspective of player A (the broadcaster) in spectating window 910. In some embodiments, UI 902 may also include spectator controls 916 via which the spectator 960 may interact with the spectating system to control the broadcast, select other broadcasts, and so on. In some embodiments, UI 902 may include a broadcast chat 918 window via which the spectator 960 may communicate with the broadcaster/player and other spectators via text.

In some embodiments, UI 902 may include a window 914 showing a live view of the broadcaster/player, in this example broadcaster/player A. Window 914 may be displayed, for example, as a window within or overlaying the game spectating window 910. In some embodiments, a world map 912 or portion of a map of the online game world may be displayed on UI 902, for example as a window within or overlaying the game spectating window 910. Broadcaster/player A's team location is shown by the oval marked with an "A".

In some embodiments, UI 902 may include a broadcast content 940 pane or region in which broadcast content based at least in part on game metadata received from a respective game system may be displayed to and accessed by the spectator 960. The broadcast content 940 pane may, for example, show information about the game, game players, game objects or items, game events, and so on as provided by the game system in the game metadata. In some embodiments, UI 902 may instead or also include an overlay window 938 that shows broadcast content based at least in part on game metadata received from a respective game system. Overlay window 938 may be displayed, for example, as a window within or overlaying the game spectating window 910. In this example, overlay window 938 shows details (gear, health, statistics, etc.) about the currently selected player B.

In some embodiments, players, teams, areas, regions, or locations corresponding to current or potential events that have been identified by one or more of the methods as described herein may be marked or highlighted or otherwise visually indicated on the world map 912. For example, the oval marked "H!" may indicate a location for a past, current, or upcoming event. In some embodiments, the spectator 960 may select an indicated event from the world map 912 to view or replay the event in game spectating window 910 or in another window displayed on UI 902.

Game Merchandising Interface

In some embodiments, the spectating system may leverage the game metadata provided by the game system(s) to provide a virtual storefront for game-related content on the spectating user interface (UI) via which spectators may view, select, and order, purchase, or otherwise obtain game-related content. The game-related content may include virtual or digital game-related items or objects (e.g., digital representations of physical objects) such as in-game gear, clothing, weapons, characters, avatars, powers, and so on, that may be acquired for use within the games, physical items or objects such as physical representations of virtual objects from within the games (e.g., physical swords, action figures, toys, etc.), and/or game-related physical merchandise such as t-shirts or hats.

In some embodiments, the spectating system provider may provide at least some of the game-related content to the requesting spectators. In some embodiments, the virtual storefront of the spectating system may interface with one or more entities, including but not limited to the game systems or game system providers and online merchants, to provide requested game-related content to spectators. In some embodiments, the spectating system may provide, or may provide access to, a "print on demand" service whereby 3D printing technology may be used to print physical objects based on input designs or specifications of game-related objects or items (e.g., in-game characters, weapons, vehicles, monsters, etc.). The designs or specifications for the objects may be obtained from the game systems in the game metadata, or may be otherwise obtained.

In some embodiments, the virtual storefront may provide UI elements whereby spectators can view information about the in-game content, for example historical information and/or statistics on which characters/players use an item or object, how they use it, the item's history or success, and so on. The spectating system may provide text and/or voice chat channels via which the spectators and broadcasters may discuss the game-related items or objects available via the virtual storefront. In some embodiments, a broadcaster may select or specify particular game-related items or objects that are to be provided via the virtual storefront UI on the broadcaster's channel.

Figure 10:
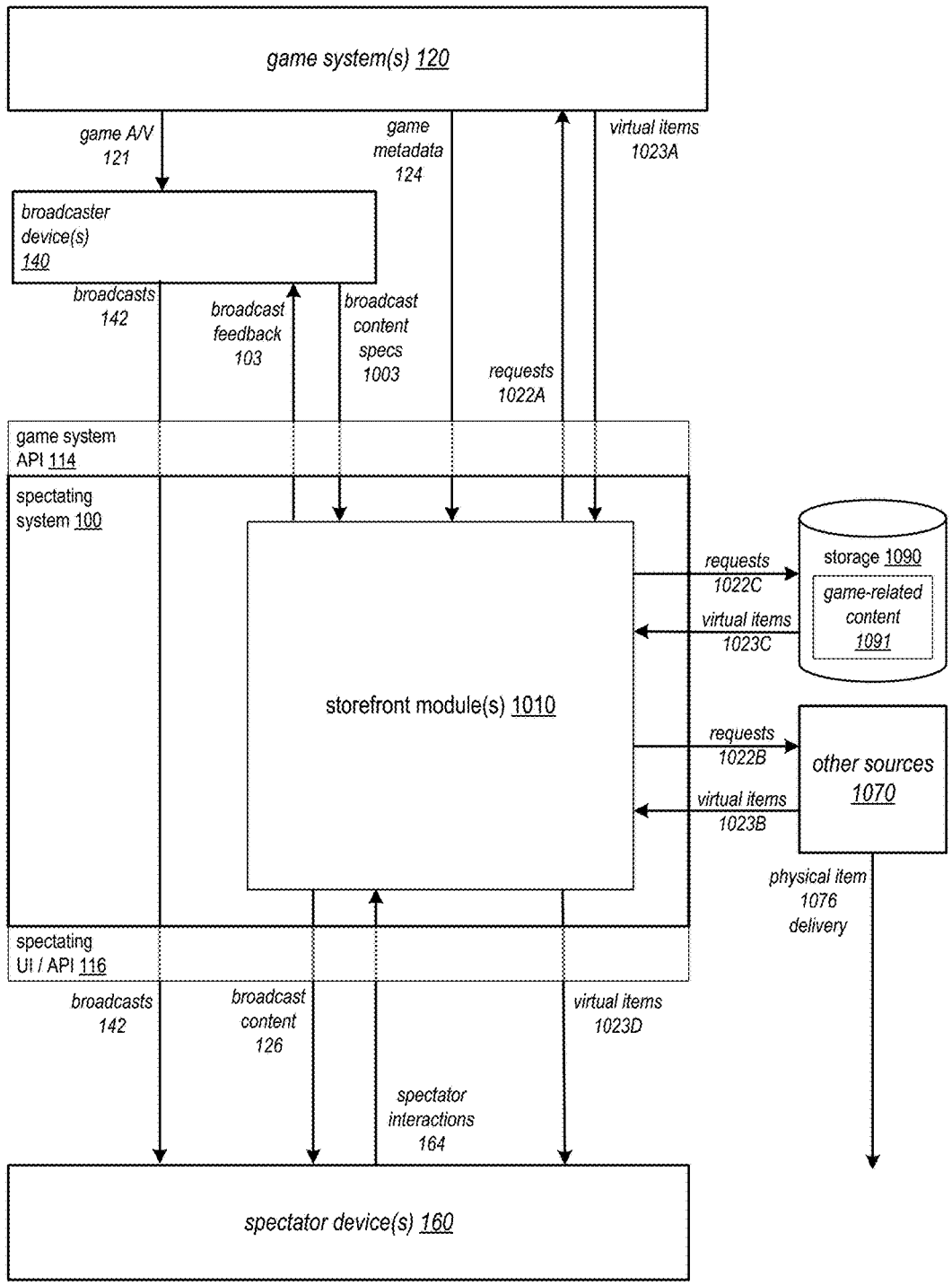
FIG. 10 illustrates an example virtual storefront module in a game spectating system, according to some embodiments.

FIG. 10 illustrates an example virtual storefront module in a game spectating system 100 that provides game-related merchandise to spectators via a spectating interface, according to some embodiments. A game spectating system 100 such as the game spectating system 100 as illustrated in and described for FIGS. 1A and 1B may implement one or more components or modules 1010 that may present broadcast content 126 to spectators via a spectating UI 116 on respective spectator devices 160. The broadcast content 126 may be determined at least in part from game metadata 124 received from the game system(s) 120 according to a game system API 114 provided by the spectating system 100. In some embodiments, the broadcast content 126 may be determined at least in part from game-related data acquired from one or more other sources such as online merchants. The spectators may view, explore, discuss, select, and order, purchase, or otherwise obtain game-related content via the spectating UI 116 and interactions with the broadcast content 126 presented on the spectator devices 160 according to the spectating UI 116. The storefront module(s) 1010 may obtain and process spectator interactions 164 with the broadcast content 126 presented on the spectator devices 160 to generate and send requests 1022 to order, purchase, or otherwise obtain selected virtual and/or physical game-related merchandise to merchandise sources such as the game system 120 providers (requests 1022A), to storage 1090 systems or services that store game-related content 1091 (requests 1022C), and/or to other sources 1070 of virtual 1023 and/or physical 1076 items or objects (requests 1022B) such as online merchants or 3D print-on-demand services, and may facilitate provisioning or delivery of the requested virtual items 1023A, 1023B, or 1023C as virtual items 1023D to the respective spectator devices 160, or physical 1076 game-related merchandise to the respective spectators. In some embodiments, virtual items 1023 may include game content (e.g., game characters, gear, avatars, game states, etc.) that is downloaded or otherwise provided to game clients on respective spectator devices 160.

In some embodiments, a broadcaster may select or specify 1003 particular game-related items or objects that are to be offered by the storefront module(s) 1010 via broadcast content 126 on the respective broadcast 142 channel. The storefront module(s) 1010 may obtain and process spectator interactions 164 with the broadcaster-specified content 126 presented on the spectator devices 160 to generate and send requests 1022 to order, purchase, or otherwise obtain selected game-related merchandise to respective merchandise sources 120, 1090, and/or 1070. In some embodiments, the spectating system 100 may also provide broadcast feedback 103 to the broadcast device(s) 140 based at least in part on the spectator interactions 164 with the broadcast content 126. In some embodiments, the broadcast feedback 103 may be provided to the broadcasters via a broadcasting UI/API 112 presented to the broadcast devices 140 by the spectating system 100, for example as illustrated in FIG. 9.

Figure 11:
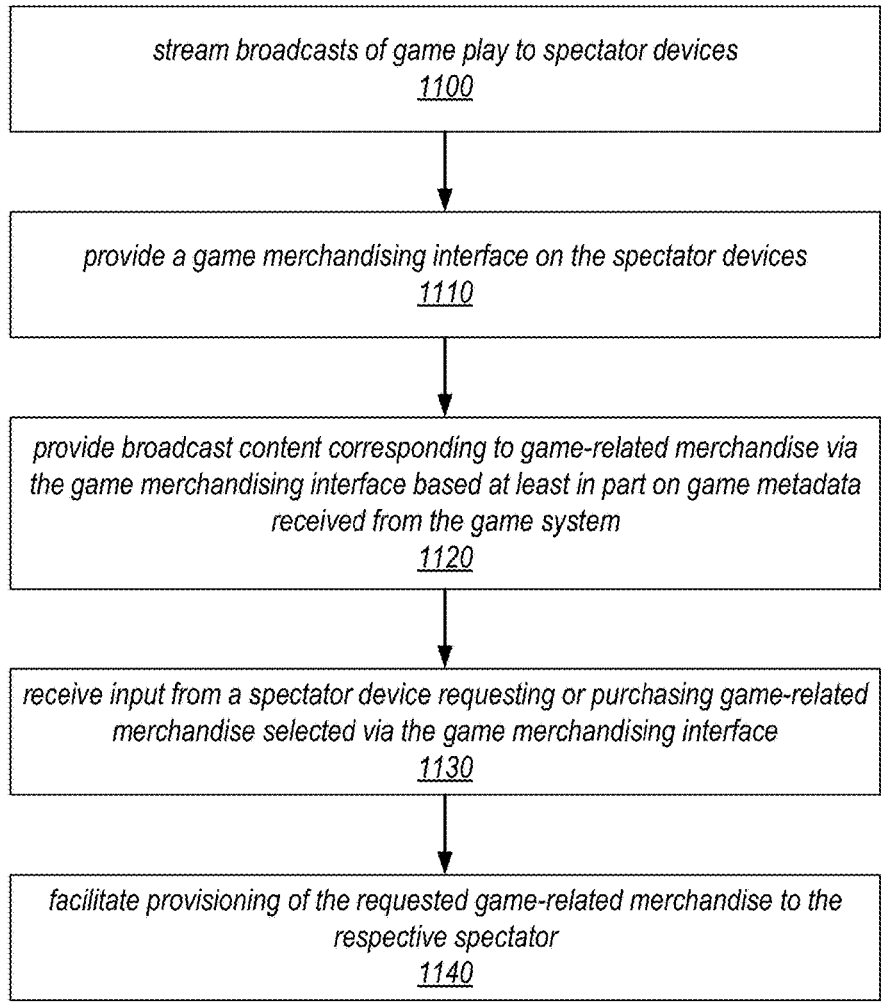
FIG. 11 is a flowchart of a method for providing game-related merchandise via a game spectating system, according to some embodiments.

FIG. 11 is a flowchart of a method for providing game-related merchandise via a game spectating system, according to some embodiments. The method of FIG. 11 may, for example, be implemented by a spectating system 100 as illustrated in FIG. 1A, 1B, or 10. As indicated at 1100 of FIG. 11, a spectating system may stream broadcasts of game play to spectator devices. A broadcast may include video showing game play of a respective broadcaster participating as a player in a game executing on a game system.

Figure 12:
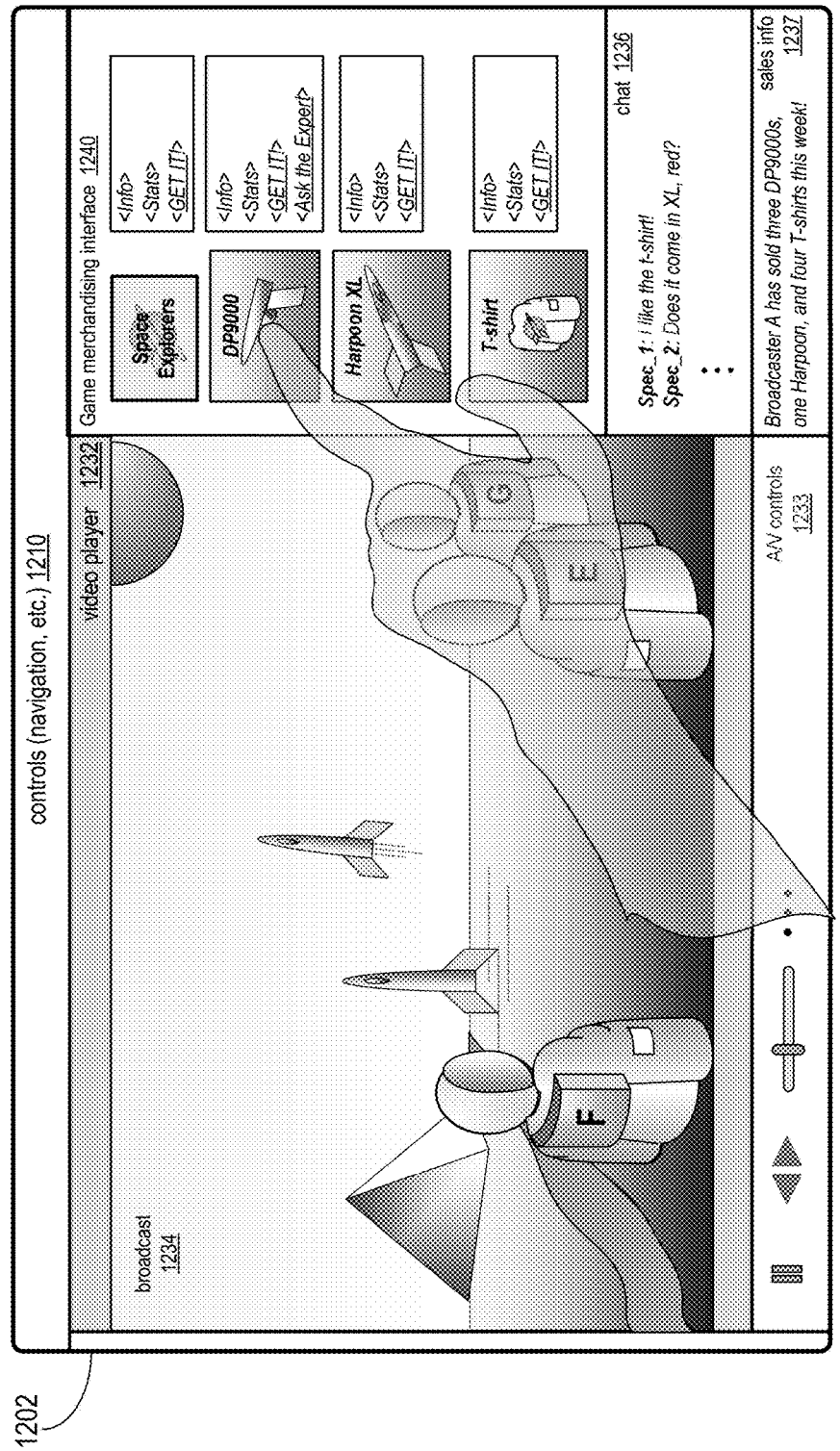
FIG. 12 provides a non-limiting example of a game merchandising interface for a game spectating system, according to some embodiments.

As indicated at 1110 of FIG. 11, the spectating system may provide a game merchandising interface on the spectator devices via which spectators may view, select, and order, purchase, or otherwise obtain game-related content. FIG. 12 provides a non-limiting example of a game merchandising interface or virtual storefront for a game spectating system. In some embodiments, a broadcaster may select or specify particular game-related content to be provided via the game merchandising interface for the broadcaster's channel.

As indicated at 1120 of FIG. 11, the spectating system may provide broadcast content corresponding to game-related content or merchandise via the game merchandising interface. The game-related content may include virtual or digital game-related items or objects (such as in-game gear, clothing, weapons, characters, avatars, powers, and so on, that may be acquired for use within the games, physical items or objects such as physical representations of virtual objects from within the games (e.g., physical representations of in-game weapons such as swords, game-related action figures, toys, etc.), and/or other game-related physical merchandise such as posters, books, t-shirts or hats. The broadcast content may be based at least in part on game metadata received from the game system according to a game system API provided by the spectating system. In some embodiments, the game metadata may include data describing or representing at least some of the game-related content that may be used in generating the broadcast content. In some embodiments, the spectating system may acquire and use descriptive data for game-related content from one or more other sources such as online merchants.

The broadcast content presented via the game merchandising interface may include one or more UI elements (e.g., buttons, dialogs, lists, tabs, menus, images, video clips, links, text, panes, etc.) presented on the game merchandising interface. In some embodiments, the broadcast content may also include one or more overlays on the broadcast video. In some embodiments, the broadcast content may include UI elements via which the viewer can order, purchase, or otherwise obtain the game-related content via the game merchandising interface. In some embodiments, the broadcast content may include or provide access to descriptive information about the game-related content, for example descriptions, images, and/or video clips of the game-related content. In some embodiments, the broadest content may include or provide access to historical information or statistics for the game-related content, for example statistics on which characters/players use an item or object, how they use it, the item's history or success, and so on. In some embodiments, the spectating system may provide text and/or voice chat channels via which the spectators and broadcasters may discuss the game-related content presented via the game merchandising interface.

As indicated at 1130 of FIG. 11, the spectating system may receive input from a spectator device requesting or purchasing game-related merchandise selected via the game merchandising interface of the spectating system. As indicated at 1140 of FIG. 11, the spectating system may facilitate provisioning or delivery of the requested game-related merchandise to the respective spectator. In some embodiments, the broadcast content may include UI elements with which the viewers/spectators can interact and via which the viewer can select, order, purchase, or otherwise obtain the game-related content via the game merchandising interface. The spectating system may obtain and process the spectator interactions with the broadcast content presented on the spectator devices via the game merchandising interface to generate and send requests for selected game-related content to various virtual game-related merchandise and/or physical game-related merchandise sources, and may facilitate provisioning or delivery of the requested virtual or physical game-related merchandise to the respective spectators. In some embodiments, the spectating system provider may provide at least some of the game-related content to the requesting spectators. In some embodiments, the spectating system may interface with one or more entities, including but not limited to game systems or game system providers and online merchants, to provide at least some of the requested game-related content to spectators. In some embodiments, the spectating system may provide, or may provide access to, a "print on demand" service whereby 3D printing technology may be used to print physical objects based on input designs or specifications of game-related objects or items (e.g., in-game characters, weapons, vehicles, monsters, etc.). The designs or specifications for the objects may be obtained from the game systems in the game metadata, or may be otherwise obtained.

In some embodiments, purchases of game-related merchandise via the game merchandising interface of the spectating system may be reflected in the spectating UI so that other spectators can see what's been purchased, and who purchased it. In some embodiments, the purchases may be reported back to the broadcaster(s) via the broadcaster client interface as broadcaster feedback. A broadcaster may thus see what is being purchased during a broadcaster. The broadcaster may, for example, do giveaways of virtual and/or physical merchandise as rewards based on how much merchandise is sold through the broadcaster's channel. Similarly, the purchases may be reported back to game systems, game developers, or third parties such as online merchants via respective feedback channels. Element 1237 of FIG. 12 shows an example "sales info" pane 1237 that may, for example, display statistics or history for the broadcaster's sales during the respective broadcast or through the respective channel.

FIG. 12 provides a non-limiting example of a game merchandising interface or virtual storefront for a game spectating system, according to some embodiments. A spectating UI 1202 may, for example be presented as a Web page of a game spectating system website via a Web browser, as an interface to a game spectating Web application or mobile application, or as an interface to other network-based game spectating applications. A spectating UI 1202 may include one or more panes or regions including one or more of, but not limited to, controls 1210, a video player 1232 with A/V controls 1233, and a game merchandising interface 1240 via which a spectator may view and interact with broadcast content based at least in part on game metadata for the game being broadcast 1234 to obtain information and statistics for game-related content, and to order, purchase, or otherwise obtain game-related content or merchandise. Controls 1210 may include one or more UI elements for navigating or otherwise interacting with the game spectating system. Video player 1232 displays the video stream (shown as broadcast 1234) for a live broadcast or channel or for a replay of a previously recorded broadcast. In some embodiments, spectating UI 1202 may also include a chat 1236 pane in which broadcaster and/or spectator text chat may be displayed, for example chat discussing game information and game-related content such as the game-related content displayed as broadcast content in game merchandising interface 1240.

Game merchandising interface 1240 may, for example, include broadcast content that provides information for the game being broadcast and for content of the game based at least in part on the game metadata received from the respective game system, and that the viewer may interact with to explore, view, and interact with detailed information about and statistics for game content (objects, gear, characters, players, locations, events, etc.) based at least in part on the game metadata for the game being broadcast 1234. At least some of the broadcast content displayed in game merchandising interface 1240 may be interactive UI elements that, for example, allow the viewer to get additional information about the game or game content based at least in part on the game metadata obtained from the game system, and to order, purchase, or otherwise obtain the game or game content. For example, in some embodiments, the viewer may interact with the UI elements displayed in game merchandising interface 1240 to obtain information about and/or statistics for game-related content or merchandise, to order, purchase, or otherwise obtain virtual items for use within the game (a DP9000 disruptor pistol or Harpoon XL ship, in this example), to order or purchase a physical model of a virtual item from a merchant or manufacturer (a model of a DP9000 disruptor pistol or Harpoon XL ship, in this example), and/or to order, purchase, or otherwise obtain game-related merchandise such as t-shirts or hats. As another example, the viewer may interact with the UI elements displayed in game merchandising interface 1240 to get more information about or statistics for the game ("Space Explorers", in this example), or to obtain or purchase the game, from the game system provider or from some other source.

In some embodiments, the game merchandising interface 1240 may include UI elements via which the spectators may obtain more information from a broadcaster or other expert. For example, as shown in FIG. 12, the information box for the DP9000 Disrupter Pistol includes an "Ask the Expert" UI element that the spectator can select to message the broadcaster for more information about the item. Selecting the "Ask the Expert" UI element may cause a message to be displayed on the broadcaster's device requesting more information about the particular item. The broadcaster may then respond in audio or text commentary to describe the item, or provide the information through other sources such as e-mail or links to pages that include descriptive information.

As shown in this example, the viewer has interacted with the broadcast content displayed in game merchandising interface 1240 to select the DP9000 Disrupter Pistol to view descriptive information about this particular game-related item. The descriptive information may, for example, include image(s) and a textual description of the item. For example, for a weapon, the descriptive information may indicate the range, capacity, and effectiveness of the weapon. In some embodiments, the descriptive information may include usage information for a particular item or type of item. For example, a list of all the players who use an item such as a particular sword or other weapon may be provided. In some embodiments, the descriptive information may include statistical data about the in-game item, for example statistics on which characters/players use an item, how they use it, the item's history or success, and so on. In some embodiments, for a weapon or other piece of in-game gear, popularity or ratings based on player usage and/or participant voting may be provided. In this example, the viewer may select the "GET IT!" UI element associated with the item to obtain a virtual DP9000 pistol for use within the Space Explorers game and/or to order or purchase a physical model of the DP9000 pistol from a game system provider, online merchant, manufacturer, or other entity.

In some embodiments, broadcast 1234 may include overlay content that allows the viewer to interact with the broadcast 1234, for example as illustrated in FIG. 7B. For example, in some embodiments, the viewer may select content in broadcast 1234 to open an overlay window that provides additional information about the content based at least in part on the game metadata obtained from the game system as illustrated in FIG. 7B. As another example, in some embodiments, the viewer may select game content in broadcast 1234 to display broadcast content related to the selected game content in game merchandising interface 1240. For example, the spectator may select a particular in-game character to display broadcast content for the selected character's gear in game merchandising interface 1240. FIG. 7B provides an example where the viewer has selected player E in the overlay window to view the items currently in player E's gear set in a game content details pane.

Game Participation Interface

Embodiments of a spectating system are described that may interact with game systems to allow viewers or spectators to join or "step into" games being broadcast via the spectating system in a game spectating environment. In some embodiments, the spectating system may also facilitate acquisition and provisioning of game records or game states for previously played game sessions that allow the spectators to replay the session. A spectating user interface (UI) may display broadcast content including UI elements via which spectators can obtain game client software for participating in trial or full versions of a game, as well as game states for games currently being broadcast and game records for previously played game sessions. Game client software, game states, and/or game records may be downloaded to the spectator's devices in response to spectator requests via the spectating UI. The spectators can obtain characters, avatars, gear, and/or other game content for use in the games via the spectating UI. Using the spectating system to facilitate acquisition of game client software and game states, spectators may join live game sessions of online games, start new game sessions, or replay previously recorded game sessions. A spectator can obtain an in-game character and "load out" or equip the character, obtain an executable version of the game, obtain and "step into" game states, and step into or become characters or clones of characters in the game sessions, all via the spectating system interfaces.

In some embodiments, the spectating system may leverage game metadata to allow spectators to join or "step into" games being broadcast via the spectating system. In some embodiments, the broadcast content presented to the spectators on a spectating UI may include user interface elements via which spectators can order, purchase, or otherwise obtain demo, trial, or full versions of games. In some embodiments, game client software and game data for participating in demo, trial, or full versions of online games may be obtained and downloaded to the spectator's devices via the spectating system interfaces and broadcast streams. In some embodiments, the broadcast content presented to the spectators on a spectating UI may include UI elements via which spectators can order, purchase, or otherwise obtain characters, avatars, gear, or other game content for participation in particular games. In some embodiments, he obtained game content may be downloaded to the spectators' devices via the spectating system interfaces and broadcast streams. In some embodiments, using the spectating UI to obtain the game client software, game data, and game content via the broadcast streams, the spectators may join live game sessions of online games, start new game sessions, and/or replay previously recorded game sessions.

In some embodiments, the spectators may use the spectating UI to obtain the game client software, game data, and game content (e.g., game characters and gear) via the broadcast streams, and may also obtain, "step into", and replay game records of previous game sessions. In some embodiments, game records and/or game states can be purchased or otherwise obtained via the spectating system interfaces and broadcast streams. In some embodiments, the broadcast content presented to the spectators on a spectating UI may include user interface elements via which one or more game records and/or game states may be advertised, obtained by the spectator, and used to regenerate the game session universe and start or resume game play at a point in the game session timeline. In some embodiments, the spectator may become a player and step into the game session universe and timeline either using their own in-game character or avatar or stepping into and taking control of a character that is already in the game session. In some embodiments, the broadcast content presented to the spectators on a spectating UI may include user interface elements via which spectators can view, order, purchase, or otherwise obtain game content including but not limited to characters, avatars, and gear of other players, including but not limited to broadcasters, that participate in particular games. Thus, in some embodiments, a spectator can obtain an in-game character and "load out" or equip the character, obtain an executable version of the game, obtain and "step into" game records or game states, and step into or become characters or clones of characters in the game sessions, all via the spectating system interfaces and broadcast streams.

In at least some embodiments, indications of player inputs to the game for at least some of the players in the game may be received from the game systems according to the game system API presented to the game systems by the spectating system. A player input may be a single command or action input to the game from a respective player's game client or game controller. A player input or a combination of player inputs may cause, be involved in, or be associated with a game event. In some embodiments, player inputs to a game may be stored as part of a game record with one or more game states and other game information to form a record of a particular game session (referred to as a game record) that may, for example, be vended to clients including but not limited to spectators. A game record including player inputs may be replayed, and in some embodiments a viewer of a replay may "step into" the replay as described later in this document.

In some embodiments, a "ghosting" mode may be supported when joining game sessions from obtained game records or game states. In ghosting mode, a player may jump into a game being broadcast, or replay a previously recorded game session of a broadcaster/player, via the spectating system interface. The original player's character/gear (e.g., racecar) may still be visible as a "ghost" to the new player. Thus, the new player may compare their performance to that of the original player by viewing the original player's "ghost" during replay. In addition, the original player's broadcast commentary (video, audio, and/or text) may be played or displayed to the new player. As an example, the new player may use the ghosting mode as a training tool to learn how a skilled or accomplished broadcaster/player has played a difficult level or challenge within the game.

Figure 13A:
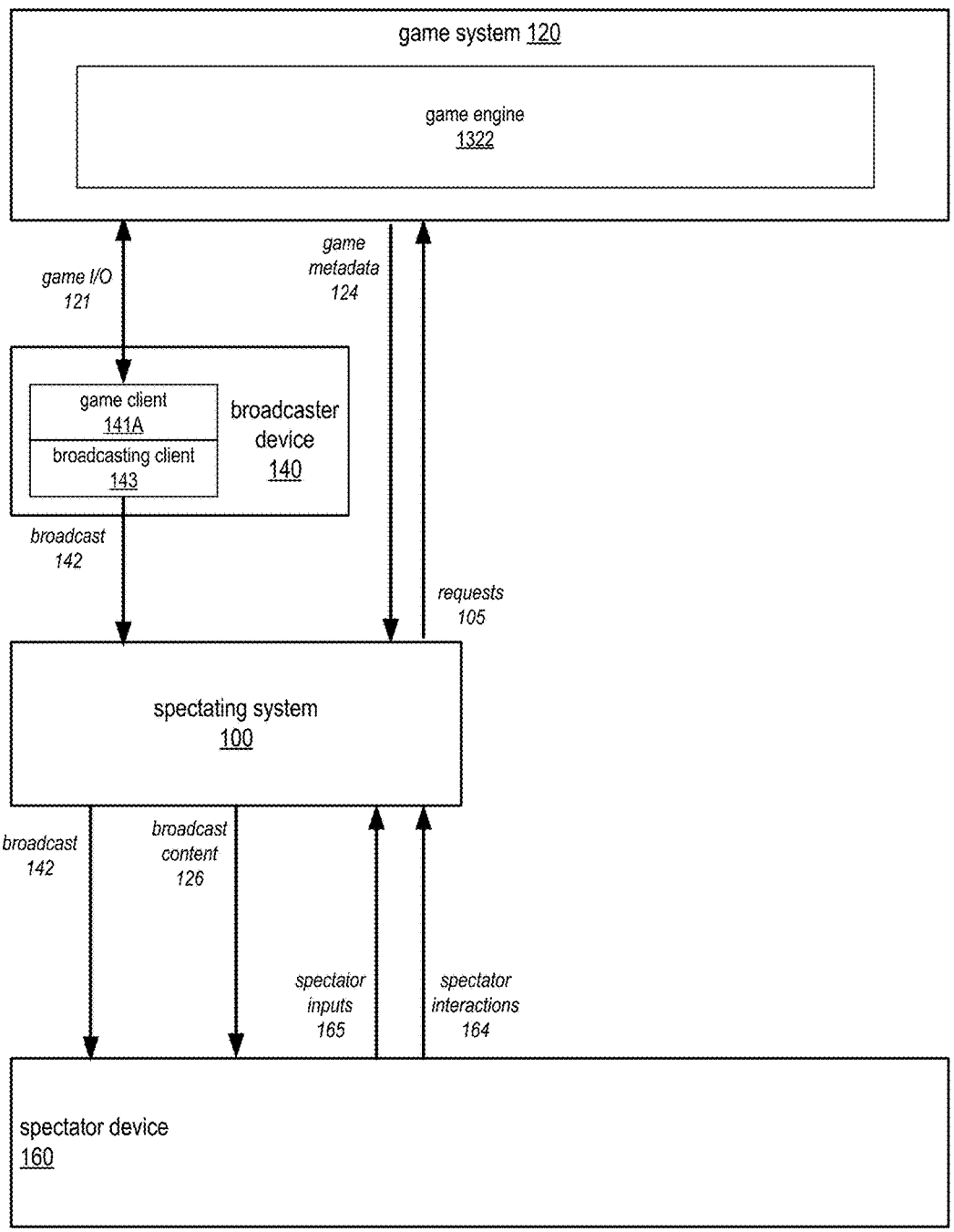
FIGS. 13A through 13E illustrate provisioning game client software and game states to a spectator device in a game spectating environment, according to some embodiments.

FIGS. 13A through 13E illustrate provisioning game client software and game states to a spectator device in a game spectating environment, for example a game spectating environment as illustrated in FIG. 1A or FIG. 1B, according to some embodiments. As shown in FIG. 13A, a game spectating environment may include a spectating system 100, a game system 120, a broadcaster device 140, and a spectator device 160.

Typically, a game system 120 may include a game engine 1322 that, for example, renders a 2D or 3D representation of a game universe based on the current state of the universe, generates video and sound, and sends or streams the video and sound (A/V) output 121 to client devices including but not limited to broadcaster device(s) 140 for display. The game supported by game engine 1322 may be a multiplayer online game in which two or more players remotely participate in online game sessions, a single-player online game, or a single-player or multiplayer game that is or can be played locally/offline.

A broadcaster device 140 may include, but is not limited to, input and output components (including but not limited to input devices and technologies such as controllers or joysticks, motion tracking systems, gesture-based input systems, etc.) and game client 141A software and/or hardware for at least one game system 120 via which respective players can participate in game sessions currently being executed by the game system(s) 120. A broadcaster device 140 may also include input and output components (e.g., video cameras and microphones) and broadcasting client software and/or hardware 143 for the spectating system 100 via which respective players may generate live A/V streams of their online game play (broadcasts 142) and other broadcaster input including but not limited to audio and textual commentary for broadcasting to spectators via the spectating system 100.

Figure 14:
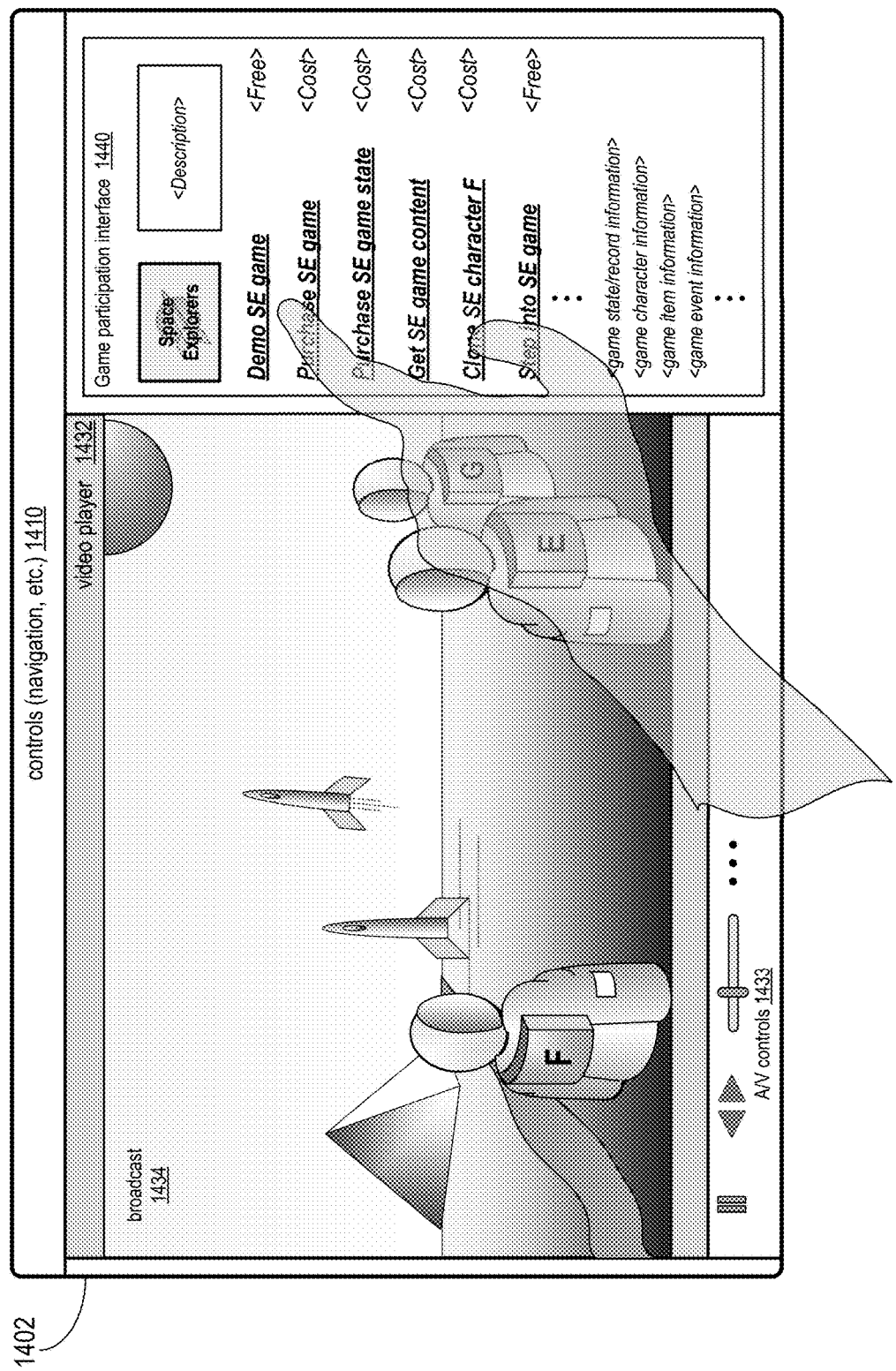
FIG. 14 provides a non-limiting example of a game participation interface for a game spectating system, according to some embodiments.

A spectating system 100 such as the spectating system 100 as illustrated in and described for FIGS. 1A and 1B may implement one or more components or modules that may stream broadcasts 142 and present broadcast content 126 to spectators via a spectating UI on respective spectator devices 160. FIG. 14 provides a non-limiting example of a spectating UI, according to some embodiments. The broadcast content 126 may be determined at least in part from game metadata 124 received from the game system(s) 120 according to a game system API provided by the spectating system 100. In some embodiments, the broadcast content 126 may be determined at least in part from game-related data acquired from one or more other sources such as online merchants or data stores of game-related data.

A spectator device 160 may include, but is not limited to, input and output components (including but not limited to input devices and technologies such as controllers or joysticks, motion tracking systems, gesture-based input systems, etc.) and may include spectating client software and/or hardware via which respective spectators may interact with the spectating system 100 to select, receive, and view broadcasts 142 from the broadcaster devices 140 or playbacks of previously recorded broadcasts, and via which the spectators may provide spectator inputs 165 including but not limited to audio or textual chat or "crowd noise" for broadcasts 142 and spectator interactions 164 with broadcast content 126 including but not limited to content generated at least in part from game metadata 124 received from game system(s) 120 by the spectating system 100 and presented on the spectator device 160 via a spectating UI. FIG. 14 provides a non-limiting example of a spectating UI that may be provided on a spectator device 160 by the spectating system 100, according to some embodiments. In some embodiments, spectator inputs and interactions may also include inputs from and/or interactions with input devices and technologies such as controllers or joysticks, motion tracking systems, gesture-based input systems, and so on.

Figure 13B:
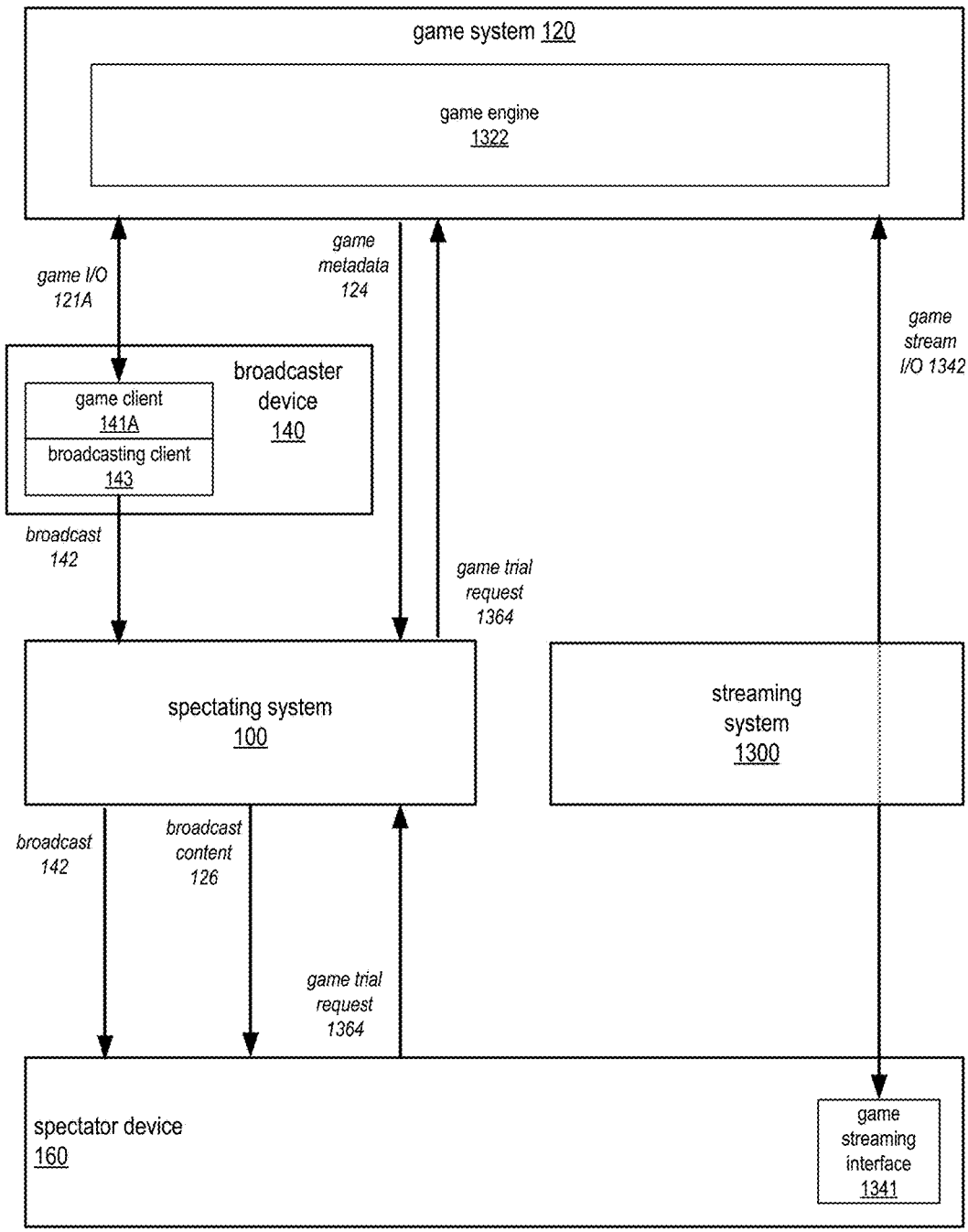
Figure 13C:
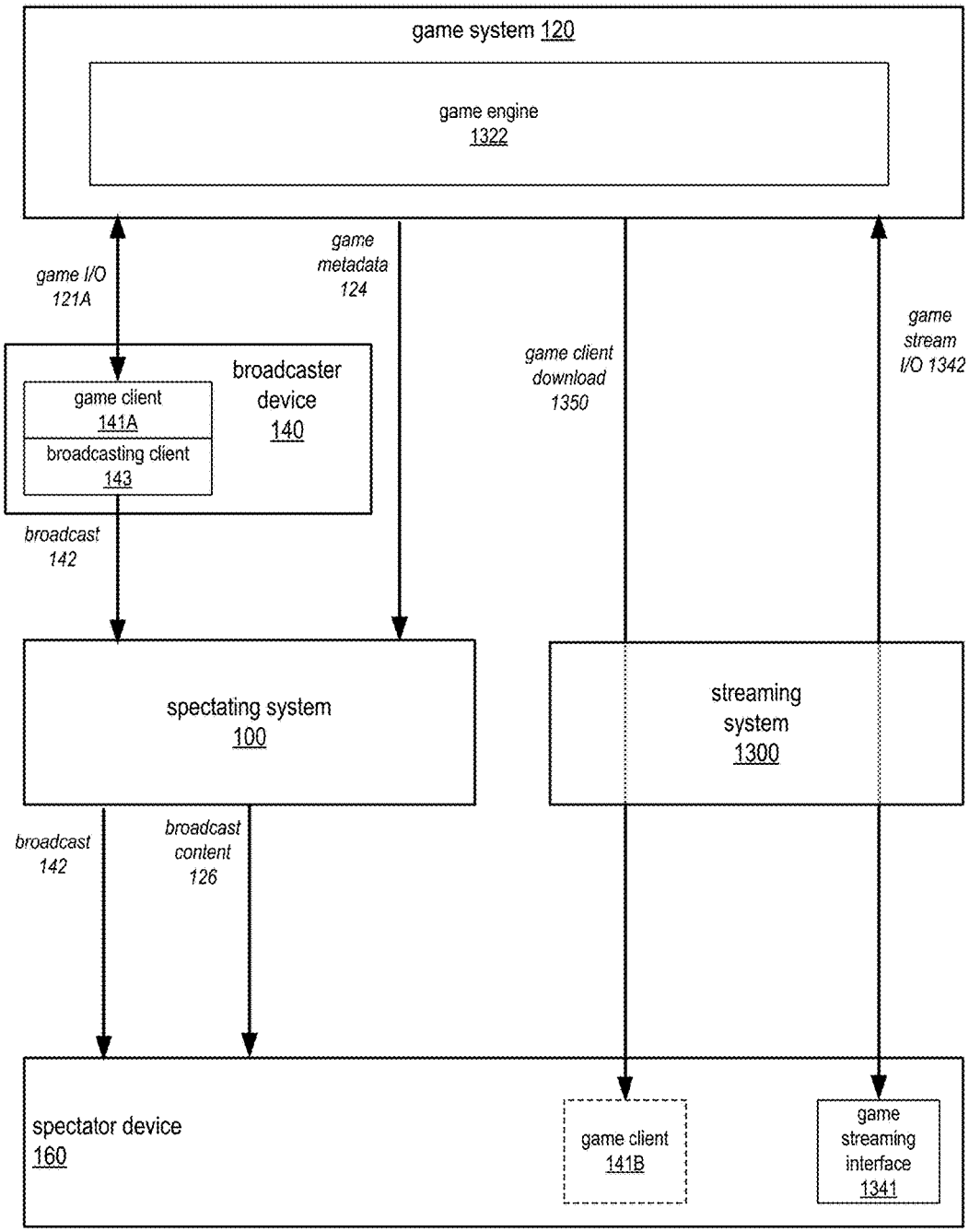

In some embodiments, spectating system 100 may process at least some of the spectator inputs 165 and/or interactions 164 to generate requests 105 to the game system 140, for example requests for particular game metadata 124 or requests to obtain game client software, game states, and game content. As shown in FIG. 14, the spectating UI may include a game participation interface that provides broadcast content including UI elements with which the spectator can interact to generate various requests for game client software, game states, and game content FIGS. 13B and 13C illustrate providing access to the game via a streaming system 1300 and game streaming interface 1341. In some embodiments, full game play may be provided to a spectator device 160 via a streaming service or system 1300 and game streaming interface 1341, as illustrated in FIG. 13B. In some embodiments, demo or trial access to the game may be provided via the streaming system 1300 and game streaming interface 1341. In FIG. 13B, a spectator viewing a broadcast 142 via spectator device 160 has interacted with a game participation interface of the spectating UI, for example as illustrated in FIG. 14, to generate a request 1364 to participate in a trial version of the game executing on game system 120. A trial version of the game may be provided via the streaming system 1300 and game streaming interface 1341 for a specified time period, and may be provided for a fee or for free. In response to the request 1364, a trial streaming version of the game may be initiated to the game streaming interface 1341 (e.g., a Web page) on the spectator device 160 via streaming system 1300. Game stream I/O 1342 from the spectator device 160 to the game system 120 may include, but is not limited to, player inputs to the game. Game stream I/O 1342 to the spectator device 160 may include, but is not limited to, streamed video of at least partially rendered game graphics that are presented on the game streaming interface 1341. In addition, game software, game data, game records, game states, and/or game content may be included in the game stream I/O 1342 to the spectator device 160.

FIG. 13C illustrates downloading a native game client to the spectator device 160 with the game stream I/O 1342, according to some embodiments. In some embodiments, a "background" download 1350 of native game client 141B software for the spectator device 160 may be initiated to the spectator device 160 in response to the game trial request 1364, or alternatively may be initiated in response to additional or other spectator interactions with the game streaming interface 1341. In some embodiments, the native game client 141B software may be downloaded in the stream 1342 from the game system 120. In some embodiments, the native game client 141B software may instead be downloaded in the broadcast 142 stream from the spectating system 100. A download 1350 of the game client 141B software may typically take a significant amount of time (e.g., 15-20 minutes or longer), so initiating the download 1350 in response to the game trial request 1364 or during the game trial period may allow a seamless switch from the trial version provided by the game streaming interface 1341 to the native game client 141B if and when the spectator decides to purchase the full version of the game, for example via the game participation interface of the spectating UI as illustrated in FIG. 14. Note that the downloaded game client 141B software may not be activated until the spectator purchases the full version of the game.

Figure 13D:
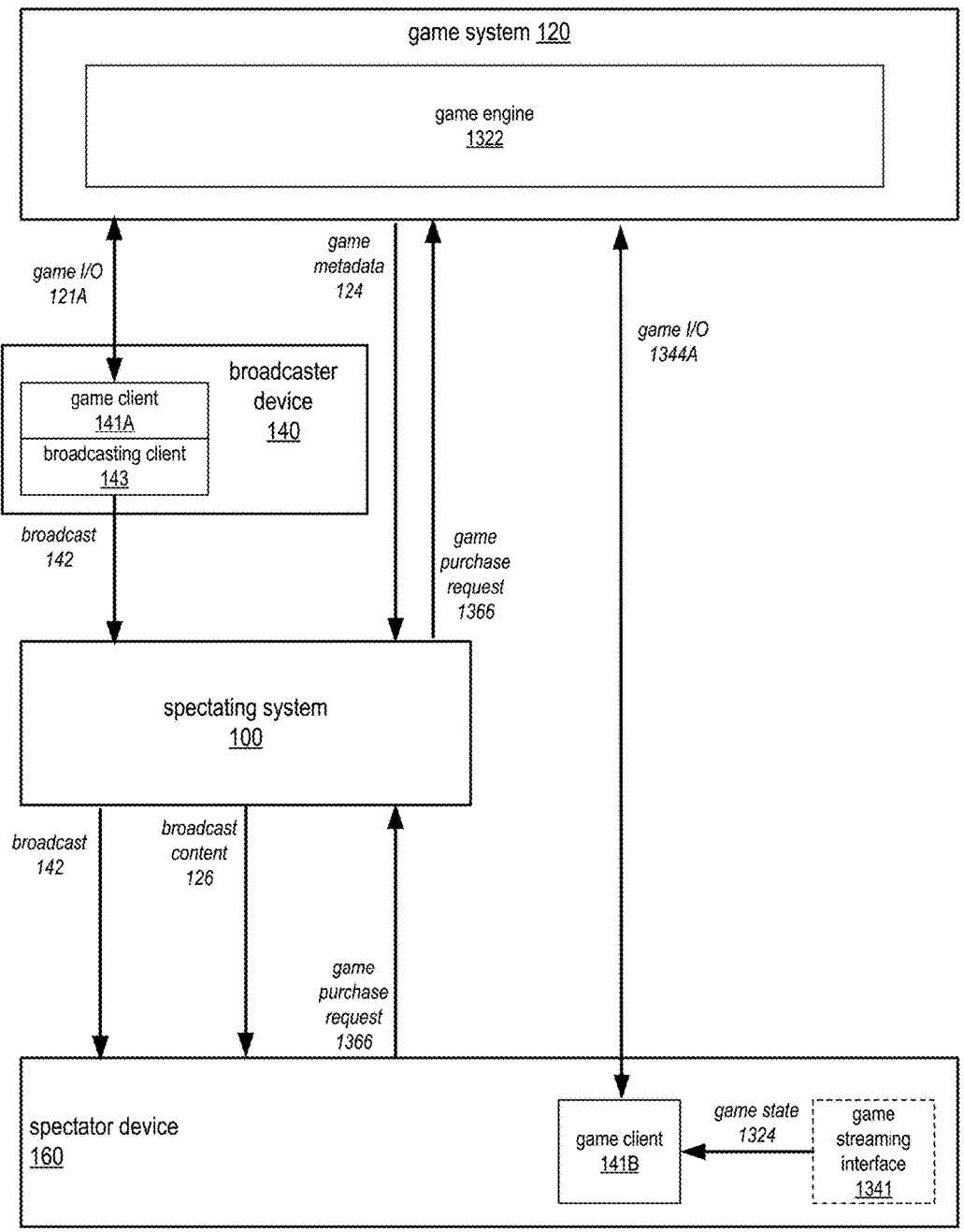

FIG. 13D illustrates switching from the game client streaming interface to the native game client 141B on the spectator device 160, according to some embodiments. At some point during or after the trial period, the spectator may interact with a game participation interface of the spectating UI, for example as illustrated in FIG. 14, to generate a request 1366 to purchase the full version of the game executing on game system 120. In response, the game client 141B, downloaded with the stream 1342 during the trial period, may be activated. In some embodiments, a current game state 1324 for the game may be obtained by the game client 141B, either from the game streaming interface 1341 on spectator device 160 or from some other source including but not limited to game system 140. The spectator may thus seamlessly continue playing participating in the game that was being played via the streaming system 1300 and game streaming interface 1341. In some embodiments, the game state 1324 may be provided in the broadcast 142 stream from the spectating system 100.

The game supported by game client 141B may be a multiplayer online game in which two or more players remotely participate in online game sessions, a single-player online game, or a single-player or multiplayer game that is played locally/offline. For online games, game I/O 1344A may include at least player inputs to the game executing on game system 140, as well as graphics data or rendered graphics for display on spectator device, and may also include game software, game data, game records, game states, and/or game content obtained by the spectator/player either via spectating system 100 or from other source including but not limited to game system 140. For offline games, there may be no game I/O 1344A to a remote game system 160, or game I/O 1344A may include game software, game data, game records, game states, and/or game content obtained by the spectator/player either via spectating system 100 or from other source including but not limited to game system 140.

Figure 13E:
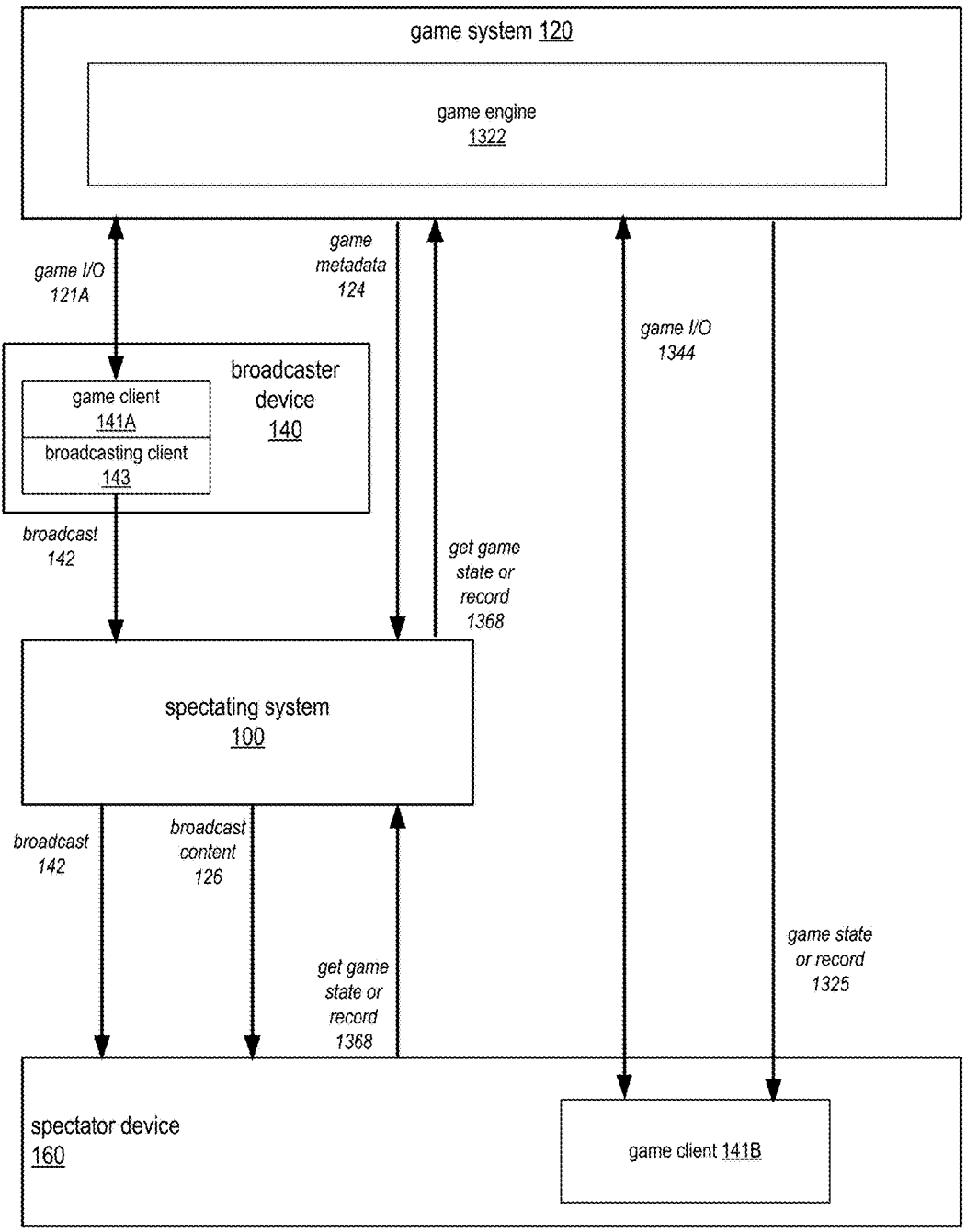

FIG. 13E illustrates getting a game state and stepping into a game from a game client 141B on a spectator device 160, according to some embodiments. A spectator may interact with a game participation interface of the spectating UI, for example as illustrated in FIG. 14, to generate a request 1368 to purchase or otherwise obtain a game state or game record for the game executing on game system 120. In response, a requested game state or game record 1325 (and possibly other game metadata) may be provisioned to the spectator device 160, either from the game system 140 or from some other source such as a data store of the spectating system 100, a third-party merchant, or a third-part storage system. In some embodiments, the game state or record 1325 may be provided in the broadcast 142 stream from the spectating system.

In some embodiments, for online games the spectator/player may use the game client 141B and game state or record 1325 to join a game currently executing on spectating system 120 as a new character, or "step into" and take control of a character already in the game. In some embodiments, the spectator/player may use the game client 141B and game state or record 1325 to replay a game or portion of a previously recorded game. In at least some embodiments, the game record is not simply a video recording of the game play, but instead is an executable record of game play that may include data and information including but not limited to the original player inputs that allow the previously recorded game session to be replayed or re-executed by the game client 141B or engine 1322. In some embodiments, the spectator/player may "jump into" the replay as a new character, or "step into" and take control of a character already in the game replay.

FIG. 14 provides a non-limiting example of a game participation interface for a game spectating system, according to some embodiments. A spectating UI 1402 may, for example be presented as a Web page of a game spectating system website via a Web browser, as an interface to a game spectating Web application or mobile application, or as an interface to other network-based game spectating applications. A spectating UI 1402 may include one or more panes or regions including one or more of, but not limited to, controls 1410, a video player 1432 with A/V controls 1433, and a game participation interface 1440. Controls 1410 may include one or more UI elements for navigating or otherwise interacting with the game spectating system. Video player 1432 may display the video stream (shown as broadcast 1434) for a live broadcast or channel or for a replay of a previously recorded broadcast.

While not shown, in some embodiments, spectating UI 1402 may also include a chat pane in which broadcaster and/or spectator text chat may be displayed, for example chat discussing game information and game-related content such as the game software, game states, game records, and/or game content displayed as broadcast content in game participation interface 1440. In addition, in some embodiments, the game participation interface 1440 may include UI elements such as an "Ask the Expert" UI element via which the spectators may obtain more information about the game or game content from a broadcaster or other expert. Selecting the "Ask the Expert" UI element may cause a message to be displayed on the broadcaster's device requesting more information about the game or particular game content. The broadcaster may then respond in audio or text commentary, or may provide information through other sources.

The spectating UI 1402 may include a game participation interface 1440 via which spectators may view and interact with broadcast content based at least in part on game metadata for the game being broadcast 1434 to obtain information and statistics for the game and game-related content, and to order, purchase, or otherwise obtain access to game software, game states, game records, and/or game content that may allow the spectator to participate in the game, for example to join or "step into" the current game or to replay previously recorded games. At least some of the broadcast content displayed in game participation interface 1440 may be interactive UI elements that, for example, allow the viewer to get additional information about the game or game content based at least in part on the game metadata obtained from the game system, and to order, purchase, or otherwise obtain the game, game states, game records, or game content.

In the non-limiting example shown in FIG. 14, game participation interface 1440 shows broadcast content for the example "Space Explorers" (SE) game. Note that similar interfaces 1440 may be provided for other games, at least in part according to respective game metadata for the games. The viewer may interact with UI elements displayed in game participation interface 1440 to obtain descriptive information about and/or statistics for the SE game and game-related content, software, and data. In addition, the viewer may select a "Demo SE game" UI element to obtain or access a demo or trial version of the SE game, for example as described in reference to FIGS. 13A-13E.

In some embodiments, the viewer may select a "Purchase SE game" UI element to purchase, download, or activate a full version of the SE game client, for example as described in reference to FIGS. 13A-13E. In some embodiments, the viewer may select a "Purchase SE game state" UI element to purchase or otherwise obtain game states and/or game records that may allow the viewer, via a demo or trial version or the full version of the game client, to join current games, replay previously recorded games, step into games or game characters, and so on, for example as described in reference to FIGS. 13A-13E. In some embodiments, the viewer may select a "Get SE game content" UI element to purchase or otherwise obtain game content, including but not limited to gear, avatars, maps, and the like. For example, in some embodiments, selecting the "Get SE game content" UI element may take the viewer to a game merchandising interface 1240 as illustrated in FIG. 12. In some embodiments, the viewer may select a "Clone SE character" UI element to purchase or otherwise obtain a clone of a specific game character (in this example, player F's character). Obtaining the clone may, for example, provision the viewer's game client or game account with the character/avatar of the player F, and may also "load out" or provide at least some of the gear belonging to the player F to the viewer's game client or game account.

In some embodiments, the viewer may select a "Step into SE game" UI element to step into the game session being broadcast 1434. The game session being broadcast 1434 may be may be a live game session executing on a game system, or may be a replay of a previously played session, for example a session being replayed from a game record. Stepping into the game session may start the local game client on the spectator device to execute the game from a respective game state or game record, or alternatively the game may be stepped into and played using a streaming client, for example as illustrated in FIGS. 13A-13E.

Figure 15A:
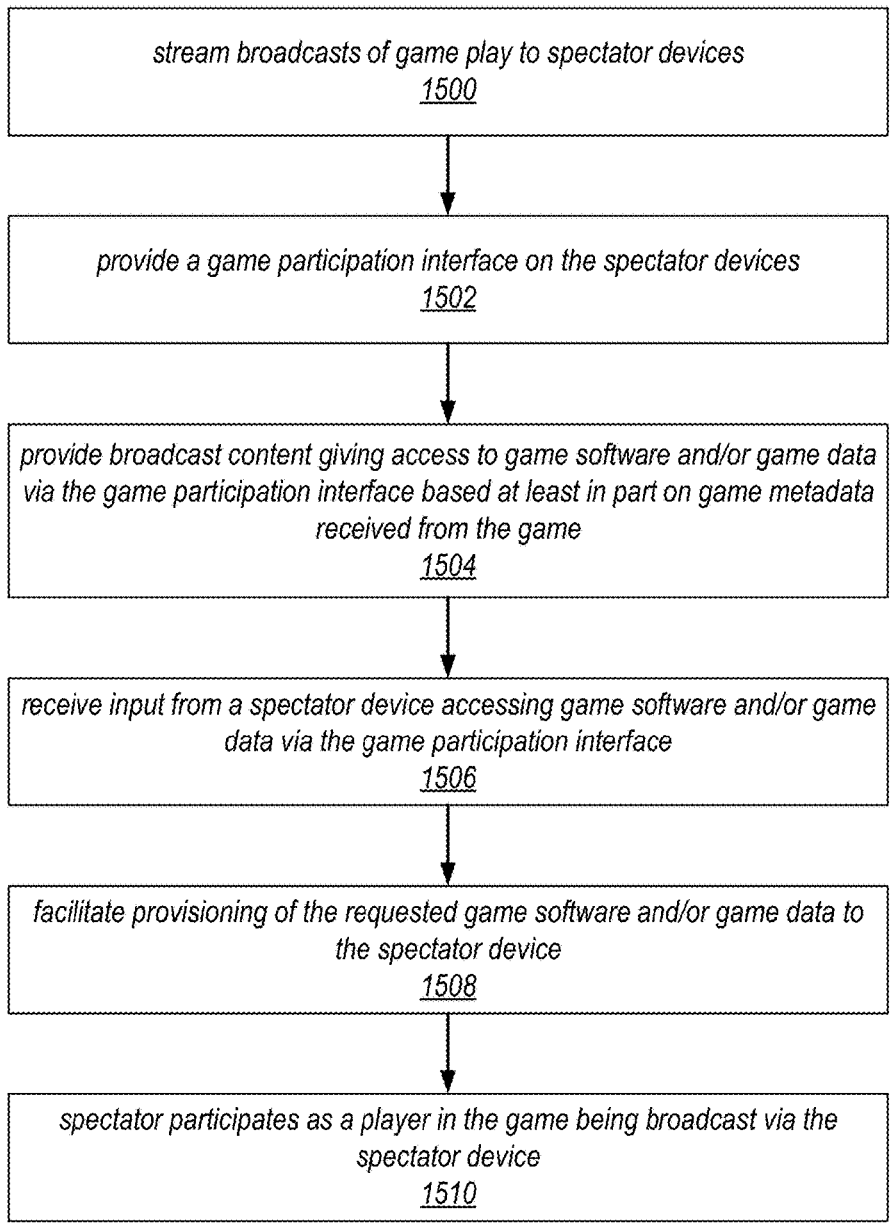
FIG. 15A is a flowchart of a method for facilitating game acquisition and participation via a game spectating system, according to some embodiments.

FIG. 15A is a flowchart of a method for facilitating game acquisition and participation via a game spectating system, according to some embodiments. The method of FIG. 15A may, for example, be implemented by a spectating system 100 as illustrated in FIG. 1A, FIG. 1B, or FIGS. 13A-13E. As indicated at 1500 of FIG. 15A, the spectating system may stream broadcasts of game play to spectator devices. As indicated at 1502 of FIG. 15A, the spectating system may provide a game participation interface on the spectator devices. FIG. 14 shows an example game participation interface. As indicated at 1504 of FIG. 15A, the spectating system may provide broadcast content giving access to game software and/or game data via the game participation interface based at least in part on game metadata received from the game, for example as described in reference to FIG. 14. As indicated at 1506 of FIG. 15A, the spectating system may receive input from a spectator device accessing game software and/or game data via the game participation interface, for example as described in reference to FIGS. 13A-13E and FIG. 14. As indicated at 1508 of FIG. 15A, the spectating system may facilitate provisioning of the requested game software and/or game data to the spectator device, for example as described in reference to FIGS. 13A-13E. As indicated at 1510 of FIG. 15A, the spectator may begin participating as a player in the game, for example as described in reference to FIGS. 13A-13E.

Figure 15B:
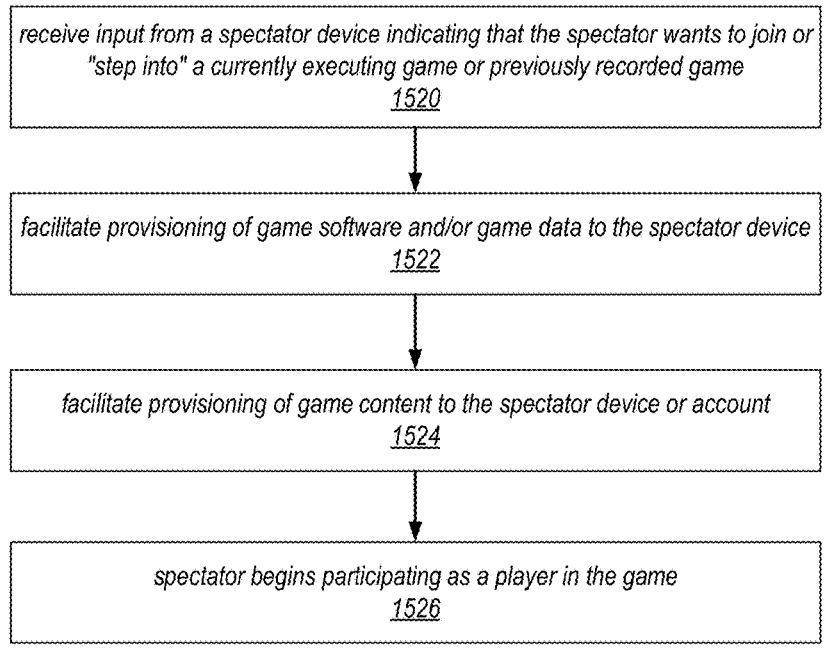
FIG. 15B is a flowchart of a method for stepping into a game via a game spectating system, according to some embodiments.

FIG. 15B is a flowchart of a method for stepping into a game via a game spectating system, according to some embodiments. The method of FIG. 15B may, for example, be implemented by a spectating system 100 as illustrated in FIG. 1A, FIG. 1B, or FIGS. 13A-13E. As indicated at 1520 of FIG. 15B, the spectating system may receive input from a spectator device indicating that the spectator wants to join or "step into" a currently executing game or previously recorded game, for example as described in reference to FIG. 14. As indicated at 1522 of FIG. 15B, in response to the input, the spectating system may facilitate provisioning of game software and/or game data to the spectator device, for example as described in reference to FIGS. 13A-13E. Note that the spectator device may already include game client software, in which case game data (e.g., one or more game states) may be downloaded or otherwise provisioned to the game client. As indicated at 1524 of FIG. 15B, the spectating system may facilitate provisioning of game content to the spectator device or account, for example in response to input to a game participation interface as described in reference to FIG. 14. As indicated at 1526 of FIG. 15B, the spectator may begin participating as a player in the game, for example as described in reference to FIGS. 13A-13E.

Figure 15C:
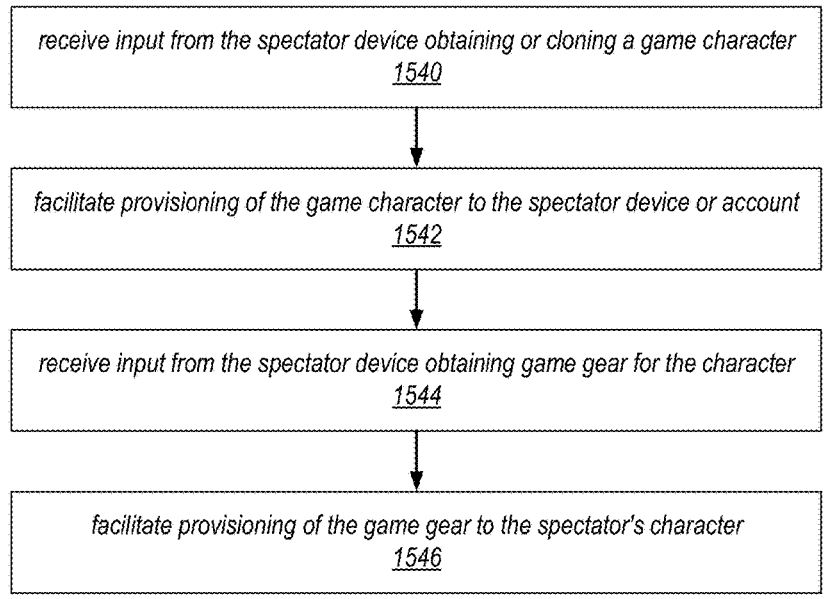
FIG. 15C is a flowchart of a method for cloning and provisioning a game character, according to some embodiments.

FIG. 15C is a flowchart of a method for cloning and provisioning a game character, according to some embodiments. The method of FIG. 15C may, for example, be implemented by a spectating system 100 as illustrated in FIG. 1A, FIG. 1B, or FIGS. 13A-13E. As indicated at 1540 of FIG. 15C, the spectating system may receive input from the spectator device obtaining or cloning a game character, for example input to a game participation interface as described in reference to FIG. 14. As indicated at 1542 of FIG. 15C, the spectating system may facilitate provisioning of the game character to the spectator device or account, for example as described in reference to FIG. 14. As indicated at 1544 of FIG. 15C, the spectating system may receive input from the spectator device obtaining game gear for the character, for example as described in reference to FIG. 14 or FIG. 12. As indicated at 1546 of FIG. 15C, the spectating system may facilitate provisioning of the game gear to the spectator's character, for example as described in reference to FIG. 14 or FIG. 12.

Figure 15D:
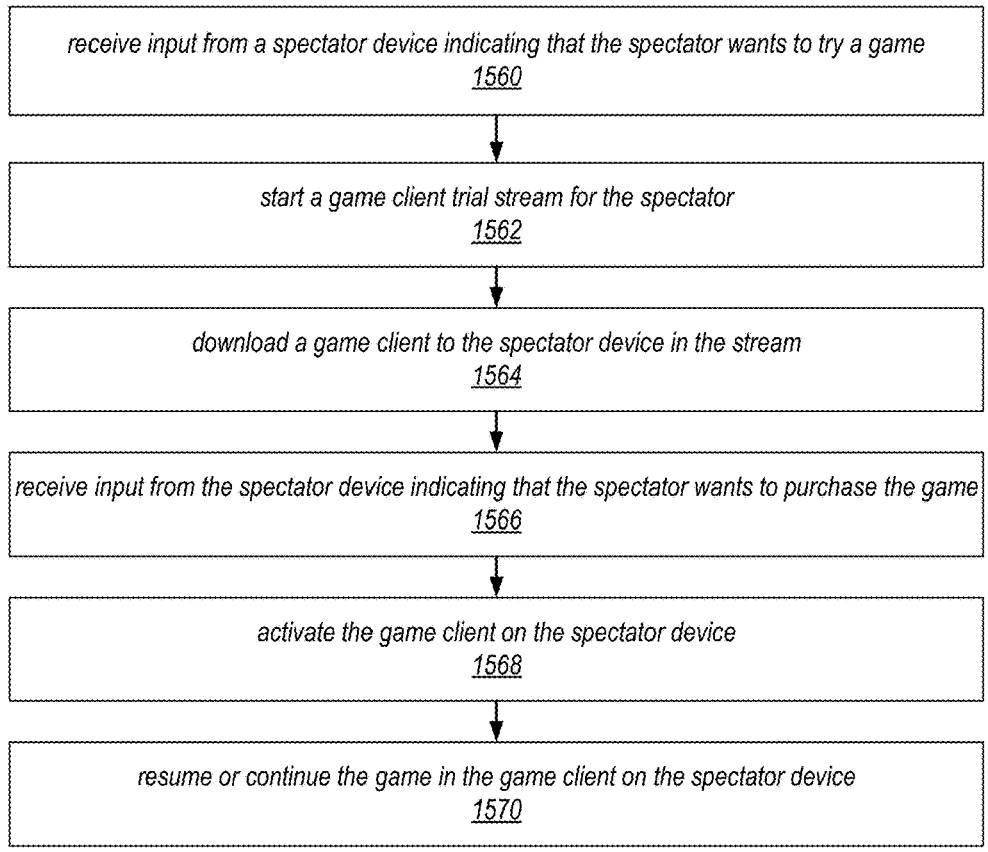
FIG. 15D is a flowchart of a method for provisioning game client software to a spectator device in a game spectating environment, according to some embodiments.

FIG. 15D is a flowchart of a method for provisioning game client software to a spectator device in a game spectating environment, according to some embodiments. The method of FIG. 15C may, for example, be implemented by a spectating system 100 as illustrated in FIG. 1A, FIG. 1B, or FIGS. 13A-13E. As indicated at 1560 of FIG. 15D, the spectating system may receive input from a spectator device indicating that the spectator wants to try or demo a game, for example as illustrated in FIG. 13B. As indicated at 1562 of FIG. 15D, in response to the request, the spectating system may initiate a game client trial stream to the spectator's device for the spectator, for example as illustrated in FIG. 13B. As indicated at 1564 of FIG. 15D, the spectating system may download a native game client to the spectator device in the stream, for example as illustrated in FIGS. 13C and 13D. As indicated at 1566 of FIG. 15D, the spectating system may receive input from the spectator device indicating that the spectator wants to purchase or activate the game, for example as illustrated in FIG. 13D. As indicated at 1568 of FIG. 15D, the native game client may be activated on the spectator device in response to the spectator's purchase of the game. As indicated at 1570 of FIG. 15D, the spectator may resume or continue the game in the native game client on the spectator device, for example as illustrated in FIGS. 13D and 13E.

Figure 15E:
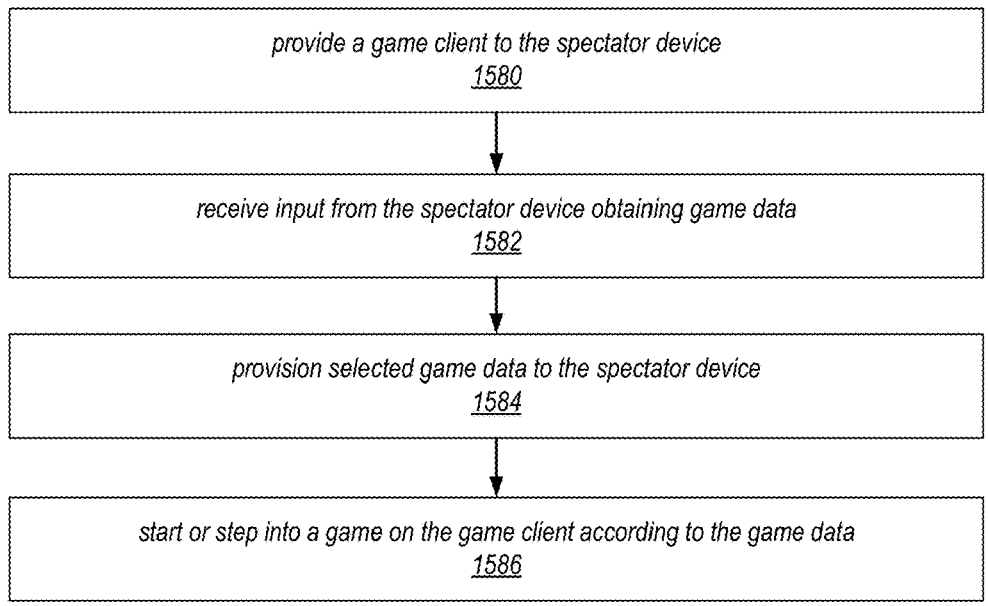
FIG. 15E is a flowchart of a method for obtaining game data on a spectator device, according to some embodiments.

FIG. 15E is a flowchart of a method for obtaining game data on a spectator device, according to some embodiments. The method of FIG. 15E may, for example, be implemented by a spectating system 100 as illustrated in FIG. 1A, FIG. 1B, or FIGS. 13A-13E. As indicated at 1580 of FIG. 15E, a game client may be provided or provisioned to a spectator device, for example as illustrated in FIGS. 13A-13E. As indicated at 1582 of FIG. 15E, the spectating system may receive input from the spectator device obtaining game data, for example as illustrated in FIGS. 12 and/or 14. The game data may include, but is not limited to, game state(s) that allow the spectator to join a game, game records that allow the spectator to replay game sessions, and/or various game content that may be used in a game. As indicated at 1584 of FIG. 15E, the spectating system may provision the selected game data to the spectator device, for example as illustrated in FIG. 13A-13E, 12, or 14. As indicated at 1586 of FIG. 15E, the spectator may start or step into a game on the game client according to the game data, for example as illustrated in FIGS. 13D-13E.

Participant Achievements and Rewards

In some embodiments, the spectating system may leverage the game metadata and/or broadcast metadata to provide rewards or otherwise acknowledge spectating system participants (broadcaster/players, spectators, and/or commentators). In some embodiments, spectators may be rewarded for participating in broadcasts or in particular events in broadcasts or games being broadcast. In some embodiments, the spectating system may analyze the game metadata and/or broadcast metadata to detect big or significant events or highlights in broadcast streams, and may reward at least some spectators for "being there" or viewing the big events. In some embodiments, spectators may be rewarded for interacting with broadcasters, for example for actively participating in broadcast audio or text chat channels.

Examples of spectator rewards may include but are not limited to acknowledgements or "badging" on the game spectating system interface, virtual or digital items such as in-game virtual gear, discounts or free access to spectating system or game content, physical items such as t-shirts or hats, and points that may be collected and used to purchase items or win prizes.

In some embodiments, the spectating system may allow broadcasters to reward or promote particular spectators, for example by selecting a spectator who shows good knowledge of the game to be a commentator for the game. In some embodiments, broadcaster/players may be rewarded for particular accomplishments, for example in-game achievements such as performing certain feats in front of crowds of certain sizes, or achieving certain levels of audience participation or support (audience size, enthusiasm, voting, etc.). As non-limiting examples, a broadcaster/player may be given an in-game health or strength boost or may be rewarded with in-game powers, gear, weapons, or information based on a growing audience size or audience enthusiasm as expressed through audio and/or textual spectator chat input. As another example, a broadcaster may get special or exclusive broadcast content added to their broadcast channel display based on their achievements. As another example, a broadcaster may receive monetary or other rewards for bringing in new follower or subscribers to the spectating system through their broadcast channel.

FIG. 16 illustrates a participant rewards module in a game spectating environment, according to some embodiments. A game spectating system 100 such as the game spectating system 100 as illustrated in and described for FIGS. 1A and 1B may implement or have access to one or more components or modules 1610 that may obtain achievement inputs from one or more sources. The module 1610 may process the inputs to determine participants or groups of participants to receive rewards, and may also process the inputs to determine events and/or achievements for which rewards are to be given. The module 1610 may also determine what the rewards are that are to be provided to determined participants or groups of participants, and generates reward outputs that are provided to one or more destinations. While FIG. 16 shows the participant rewards module 1610 as a component of spectating system 100, in some embodiments the participant rewards module 1610 may be implemented as an external service, or as a module of a game system 120 as illustrated in FIGS. 1A and 1B.

Participant Reward Module Inputs

In some embodiments, the achievement inputs to a participant rewards module 1610 may include one or more of, but are not limited to, the following. The various achievement inputs may be considered alone or in combination to determine participants or groups of participants to receive rewards, events and/or achievements for which rewards are to be given, and/or rewards to provide to participants or groups of participants.

Game Metadata 1624.

In some embodiments, the spectating system 100 may obtain game metadata 1624 from game systems for which broadcasts are being streamed or from one or more other sources, for example as illustrated in FIG. 1C. In some embodiments, the game metadata 1624 for a game may include, but is not limited to, indications and descriptions of events in the respective game. FIGS. 1A, 1B, 3A, and 3B show examples of receiving and processing game metadata 1624 including game event data, according to some embodiments. In some embodiments, the game metadata 1624 may also include other information about the game and game players, for example identities of players in the game, player accomplishments, player statistics and history, player inputs to the game, and so on. Game metadata 1624 may be provided to or obtained by participant rewards module 1610 and used in determining events or achievements to be rewarded, rewards, and reward recipients.

Broadcast Metadata 1630.

In some embodiments, the spectating system 100 may obtain and analyze various inputs from participants (players, broadcasters, commentators, and/or spectators) in the game spectating environment to detect events in or determine other information about the broadcasts and/or games executing on the game systems. The events and other information determined from analyzing the participant inputs may collectively be referred to as broadcast metadata 1630. FIGS. 3A, 3C, 3D, and 4 show examples of obtaining and analyzing various inputs from participants to generate broadcast metadata 1630 including broadcast events 494 as illustrated in FIG. 3D and other broadcast-related analysis information 427 as illustrated in FIG. 4. Broadcast metadata 1630 may be provided to or obtained by participant rewards module 1610 and used in determining events or achievements to be rewarded, rewards, and reward recipients.

Time and Location 1635.

In some embodiments, temporal information (e.g., time of day, day of week or month, time zone, etc.) and/or geographical location information (e.g., city, state, region, country) for participants may be obtained by participant rewards module 1610 and used in determining events or achievements to be rewarded, rewards, and reward recipients.

Broadcast Statistics 1640.

In some embodiments, the spectating system 100 may collect or determine spectating statistics based on spectator participation in broadcasts. For example, the spectating system 100 may track the size of a particular broadcaster's audience, or the combined size of the audiences for all broadcasters of a particular game. As another example, the spectating system may track subscribing spectators vs. non-subscribing spectators who are watching particular broadcasts or games. As another example, statistics for the broadcasters' merchandise sales, audience retention, audience subscription, and other statistics for broadcasts or respective broadcaster channels may be collected. The various statistics may be provided to or obtained by participant rewards module 1610 and used in determining events or achievements to be rewarded, rewards, and reward recipients.

Participant History 1645.

In some embodiments, the spectating system 100 may maintain or obtain historical information for participants, for example players in games being broadcast. As described above, in some embodiments, player and/or broadcaster historical and statistical information may be obtained from the game system or from other sources, for example as illustrated in FIG. 1C. Participant history 1645 may be provided to or obtained by participant rewards module 1610 and used in determining events or achievements to be rewarded, rewards, and reward recipients.

Participant Status, Profile, and Preferences 1650.

In some embodiments, participants' status information in the spectating system 100 may be provided to or obtained by participant rewards module 1610 and used in determining events or achievements to be rewarded, rewards, and reward recipients. The status information for a spectator may, for example, indicate whether the spectator is a viewer, follower, subscriber, non-subscriber, and so on. Participant status may, for example, be maintained in or with participant account, subscription, or registration information. In some embodiments, participant status may instead or also include a participant's approval rating as determined from other participants, for example ratings of broadcasters and/or players based on spectators' inputs. As another example of status, a broadcaster may be ranked at different levels according to audience size, number of followers, amount of sales, retention rate, and/or other metrics or broadcast statistics.

In some embodiments, the spectating system 100 and/or game system(s) may maintain profile and/or account information for participants that may include information for the participants such as various demographic and location information that may be leveraged by participant rewards module 1610 in determining events or achievements to be rewarded, rewards, and reward recipients.

In some embodiments, participants' preferences, for example spectator viewing, game or game genre, broadcaster/channel, or other preferences as specified by spectators via the spectating UI, determined from spectator inputs and interactions, or obtained from other sources, may be used by participant rewards module 1610 in determining events or achievements to be rewarded, rewards, and reward recipients.

Participant Recommendation Inputs 1655.

Figure 18:
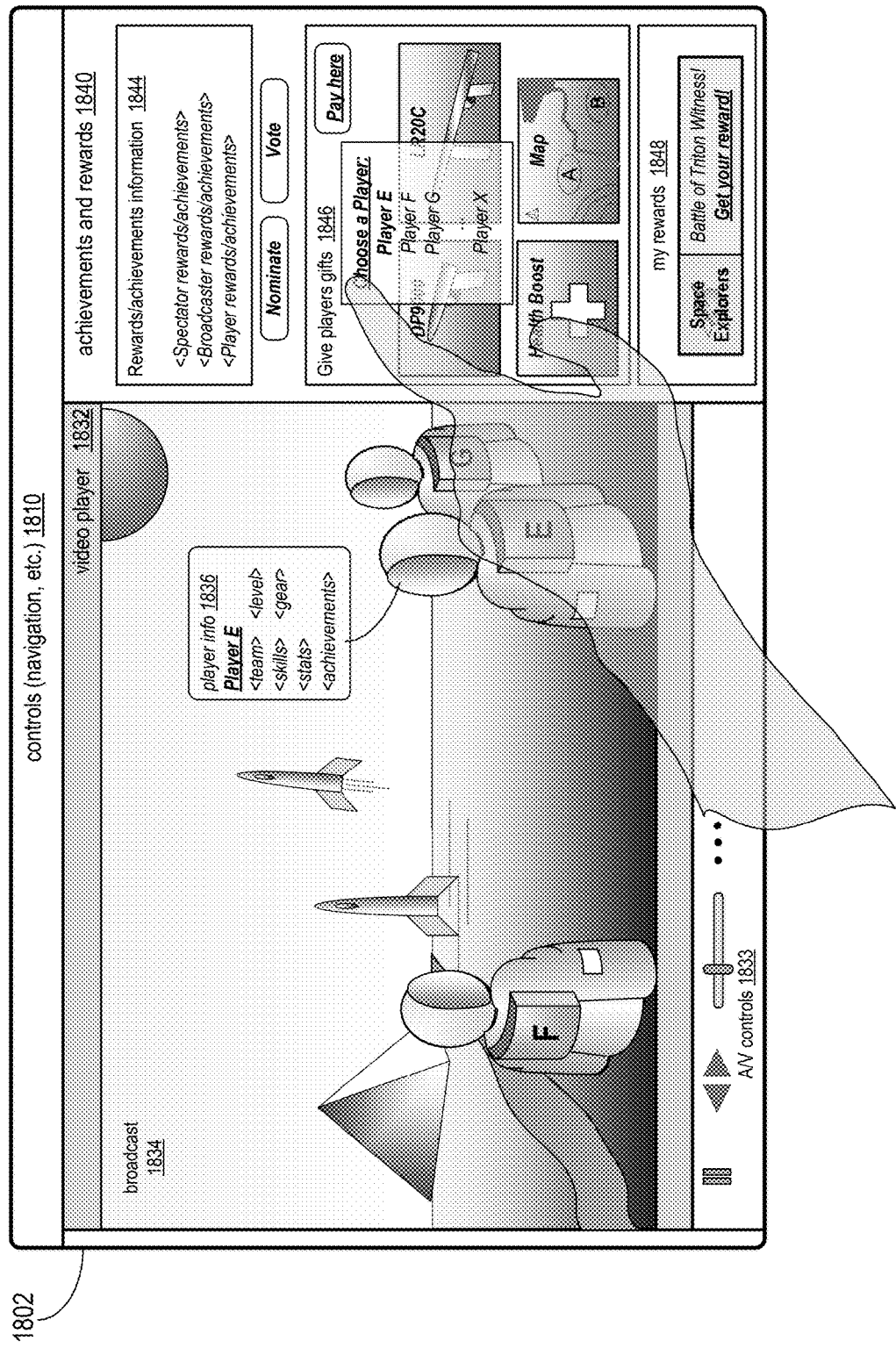
FIG. 18 provides a non-limiting example of achievements and rewards interfaces for a game spectating system, according to some embodiments.

In some embodiments, participants (broadcasters/players, spectators, commentators) may make recommendations or nominations for participants or groups of participants to receive recognitions or rewards, and/or for rewards to be given to recognized recipients. In some embodiments, the participants may vote on participants or groups of participants to receive recognitions or rewards, or on the rewards to be given. In some embodiments, participants may specify, nominate, and/or vote on particular events and/or achievements for which rewards are to be given. In some embodiments, the spectating system 100 may provide an achievements and rewards interface to spectators and/or broadcasters, for example as illustrated in FIG. 18, via which participants may nominate and vote on other participants to be recognized and/or rewarded. In some embodiments, a participant or group of participants may individually or collectively pay for merchandise that is selected to be given as a reward to other participant(s). In some embodiments, participants may provide inputs to participant rewards module 1610 for recommendations and rewards via other input channels, including but not limited to email and social media channels such as "tweets" or instant messaging (IMs).

Participant Gift Inputs 1660.

In some embodiments, participants (spectators, broadcasters/players, commentators) may individually or collectively select or specify other participants or groups of participants to receive rewards, recognition, or gifts of game-related merchandise including but not limited to game content that players can use within a game or other in-game benefits such as health boosts, information (e.g., maps), or lives. In some embodiments, the spectating system 100 may provide an achievements and rewards interface to spectators and/or broadcasters, for example as illustrated in FIG. 18, via which participants may give gifts to players or other participants. In some embodiments, a participant or group of participants may individually or collectively pay for the merchandise that is given as a gift to other participant(s). In some embodiments, participants may provide inputs to participant rewards module 1610 to give gifts to participants via other input channels, including but not limited to email and social media channels such as "tweets" or instant messaging (IMs).

Third-Party Inputs 1665.

In some embodiments, third parties including but not limited to game developers, online merchants, game fan sites, and so on may provide inputs 1665 to the participant rewards module 1610. The inputs from third parties may include, but are not limited to, indications of events and/or achievements for which rewards are to be given, indications of participants to be rewarded, and/or indications of rewards to be given to selected participants.

Participant Reward Module Outputs

In some embodiments, the various achievement inputs to a participant rewards module 1610 may be processed to determine reward outputs as illustrated in FIG. 16. The determined reward outputs may indicate events or achievements to be rewarded, participants or groups of participants to receive rewards, and/or rewards to provide to participants or groups of participants. In some embodiments, the reward outputs may include one or more of, but are not limited to, the following.

Game Feedback 1670.

In some embodiments, the participant rewards module 1610 may provide feedback 1670 to the game system(s) 120. In some embodiments, the feedback 1670 may indicate participants (e.g., players) that are to be rewarded or recognized in the game, and/or may indicate particular rewards (e.g., in-game gear, health boosts, lives, maps, etc.) to be given to specified participants in the game. In some embodiments, the game may provide in-game audio and/or visual effects in response to the game feedback 1670; these effects may be reflected in the broadcast streams, and thus may provide visual and/or audio indications to broadcast viewers of the in-game rewards and/or recipients.

Broadcast Content 1626.

In some embodiments, the participant rewards module 1610 may generate broadcast content 1626 based on one or more of the achievement inputs, and may present the broadcast content 1626 to at least some participants via spectating system user interface(s), for example as illustrated in FIGS. 8, 9, and 18. In some embodiments, the spectating system 100 may provide an achievements and rewards interface to spectators and/or broadcasters, for example as illustrated in FIG. 18, via which the broadcast content 1626 may be presented. The broadcast content 1626 may be targeted to particular spectators or groups of spectators, for example according to the spectators' current selections, profiles, or preferences, or according to who was rewarded, what they were rewarded for, and with what they were rewarded. For example, the broadcast content 1626 may include UI elements presented on a UI that indicate past events for which rewards or recognitions will be given. As another example, the broadcast content 1626 may include UI elements that indicate upcoming or current events for which rewards or recognitions will or may be given. As another example, the broadcast content 1626 may include UI elements that indicate participants (broadcasters, spectators, etc.) to which rewards or recognitions will or may be given. As another example, the broadcast content 1626 may include UI elements that indicate particular rewards or recognitions that will or may be given, and the conditions or achievements for which the rewards or recognitions will be granted. As another example, the broadcast content 1626 may include active UI elements that indicate to particular participants or groups of participants that they have been given a reward, and that provide a method and/or instructions for the participant(s) to obtain the reward, for example a link to a Web page via which the participant(s) can obtain the reward.

In some embodiments, at least some rewards may be given or obtained for free. In some embodiments, at least some rewards may be given or obtained for a fee or cost. For example, discounts for certain items may be given as rewards. As another example, exclusive virtual and/or physical items or merchandise, access to game content or information, participation or spectating privileges for restricted game events, or other benefits and content including but not limited to game-related benefits and content may be provided to participant(s) for a fee.

In some embodiments, the broadcast content 1626 may include overlays (e.g., overlay video, text, etc.) that may be added to the broadcast video. For example, overlay text may be provided that announces past, present, or future events for which rewards will or may be given to participants. As another example, overlay text may be provided that announces participants (players, broadcasters, and/or spectators) that have been granted rewards, that have been given gifts by other participants or rewards by third parties, or participants or third parties that have given gifts or rewards to participants.

Broadcaster/Player Rewards 1680.

Broadcaster/player rewards 1680 may include, but are not limited to, rewards presented for participating in particular events in games or broadcasts, or for reaching certain achievements in games or broadcasts. Broadcaster/player rewards 1680 may also include rewards granted or given by other participants, or rewards determined in various other ways. Broadcaster/player rewards 1680 may, for example, include game-related physical and/or virtual items or merchandise including but not limited to game content that players can use within a game or other in-game benefits such as health boosts, information (e.g., maps), or lives. As another example, broadcaster/player rewards 1680 may include special content or recognitions presented on the broadcasters' channels. As another example, broadcaster/player rewards 1680 may include special content or recognitions such as "badges" presented on the broadcasters' channels, either temporarily or permanently. As another example, broadcaster/player rewards 1680 may include promoting or highlighting the broadcaster's channel, broadcasts, highlight reels, and/or recordings of broadcasts presented in "broadcasters", "channels", "highlights", or "video on demand" panes of the spectating UI, for example as illustrated in FIG. 6A.

In some embodiments, participant rewards module 1610 may provide broadcaster/player rewards 1680 or notifications thereof via the broadcast user interface(s). In some embodiments, the spectating system 100 may provide an achievements and rewards interface to spectators and/or broadcasters, for example as illustrated in FIG. 18, via which broadcaster/player rewards 1680 or notifications thereof may be provided. In some embodiments, participant rewards module 1610 may also provide broadcaster/player rewards 1680 or notifications thereof via one or more other channels, including but not limited to email and social media channels such as "tweets" or instant messaging (IMs).

In some embodiments, at least some broadcaster/player rewards 1680 may be given or obtained for free. In some embodiments, at least some broadcaster/player rewards 1680 rewards may be given or obtained for a fee or cost. In some embodiments, the broadcaster/player rewards 1680 may include discounts, coupons, special offers, or the like for various goods, merchandise, or services.

In some embodiments, at least some broadcaster/player rewards 1680 may be recorded by the spectating system 100 or by other systems including but not limited to the game system(s) 120, for example in participants' profile and/or history information maintained by the spectating system 100, game system(s) 120, or a third party.

Spectator Rewards 1685.

Spectator rewards 1685 may include, but are not limited to, rewards presented for participating in particular events in games or broadcasts, or for "being there" when certain achievements were reached in games or broadcasts. Spectator rewards 1685 may also include rewards granted or given by other participants, or rewards determined in various other ways. Spectator rewards 1685 may, for example, include free or discounted game-related physical and/or virtual items or merchandise including but not limited to game content that can be used within a game. As another example, spectator rewards 1685 may include special content or recognitions presented on the spectating UI of the spectating system 100; the special content or recognitions may be temporary or permanent. For example, spectator rewards 1685 may include special content or recognitions such as "badges" presented on the broadcasters' channels, either temporarily or permanently, whenever the spectator(s) are participating in a broadcast. As another example, spectator rewards 1685 may include special, discounted, or limited access to broadcasts, highlight reels, and/or recordings of broadcasts presented in "broadcasters", "channels", "highlights", or "video on demand" panes of the spectating UI, for example as illustrated in FIG. 6A.

In some embodiments, participant rewards module 1610 may provide spectator rewards 1685 or notifications thereof via the broadcast user interface(s). In some embodiments, the spectating system 100 may provide an achievements and rewards interface to spectators and/or broadcasters, for example as illustrated in FIG. 18, via which spectator rewards 1685 or notifications thereof may be provided. In some embodiments, participant rewards module 1610 may also provide spectator rewards 1685 or notifications thereof via one or more other channels, including but not limited to email and social media channels such as "tweets" or instant messaging (IMs).

In some embodiments, at least some spectator rewards 1685 may be given or obtained for free. In some embodiments, at least some spectator rewards 1685 rewards may be given or obtained for a fee or cost. In some embodiments, the spectator rewards 1685 may include discounts, coupons, special offers, or the like for various goods, merchandise, or services.

In some embodiments, at least some spectator rewards 1685 may be recorded by the spectating system 100 or by other systems including but not limited to the game system(s) 120, for example in participants' profile and/or history information maintained by the spectating system 100, game system(s) 120, or a third party.

Participant Feedback 1690.

In some embodiments, participant rewards module 1610 may provide feedback to at least some participants for at least some of the broadcaster/player 1680 and spectator 1685 rewards. The feedback 1690 may, for example, include various visual and/or audio effects presented to at least some participants via spectating system user interface(s), for example as illustrated in FIGS. 8, 9, and 18. The feedback may, for example, announce or display rewards and reward recipients, announce or promote upcoming events for which rewards may be given, or in general provide various information about rewards, recipients, and reward-related events to participants via audio and/or visual channels. In some embodiments participant rewards module 1610 may also provide feedback 1690 to participants via one or more other channels, including but not limited to email and social media channels such as "tweets" or instant messaging (IMs).

Participant Reward Processing

Embodiments of a participant reward module or service 1610 may obtain various achievement inputs as described above from one or more sources, and may process the inputs to determine participants or groups of participants to receive rewards, events and/or achievements for which rewards are to be given, and what the rewards are that are to be provided to determined participants or groups of participants. The participant reward module 1610 generates reward outputs as describe above, and provides the outputs to one or more destinations.

As a non-limiting example of a participant reward module 1610 processing the achievement inputs to generate rewards outputs, game developers, the spectating system provider, or other entities may provide specifications for particular events or achievements in games or broadcasts that are to be rewarded. The specifications may indicate an event or achievement to be rewarded if accomplished (as non-limiting examples, a player accomplishing a feat, overcoming an obstacle, or gaining a level in the game; a broadcaster's audience reaching a threshold size; a player performing a feat before an audience of a particular size; a broadcaster selling a certain amount of merchandise in a specified period; a particular potential or upcoming event in a game or broadcast for which participants are to be rewarded; a spectator or spectators that have achieved some spectating system participation threshold; etc.) The specifications may indicate other parameters, such as time, location, and demographics parameters. The specifications may also indicate rewards and recognitions (e.g., virtual or physical merchandise, spectating interface badges, coupons or discounts, special or exclusive offers, etc.) that are to be provided for the specified events or achievements. The specifications may also indicate destination(s) for the reward outputs. The participant reward module 1610 may receive various achievement inputs from the spectating system, game system(s), or other sources, for example game metadata and/or broadcast metadata that indicates events in games and/or broadcasts, and may compare those to the specified events and accomplishments. When an event or accomplishment is identified, the participant reward module 1610 may obtain or determine the participants (e.g., broadcaster, players, and spectators) that have achieved the accomplishment or participated in the event. The specified reward(s) may then be mapped to recipients of the rewards. In some embodiments, different recipients may receive different rewards for the same event or accomplishment, for example based on the recipients' profiles, preferences, or spectator grouping (e.g., viewer, follower, or subscriber). Reward outputs may then be provided to appropriate ones of the output destinations to facilitate provisioning of the rewards to the recipients. Note that other methods may be used to process at least some of the achievement inputs to determine and generate reward inputs.

Figure 17A:
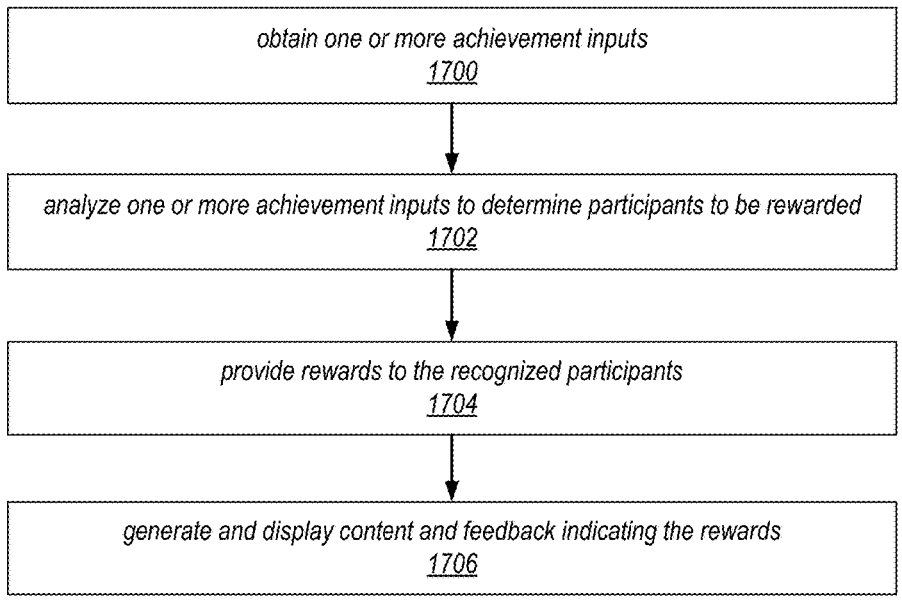
FIG. 17A is a high-level flowchart of a method for recognizing or rewarding participants in a game spectating environment, according to some embodiments.

FIG. 17A is a high-level flowchart of a method for recognizing or rewarding participants in a game spectating environment, according to some embodiments. As indicated at 1700 of FIG. 17A, various achievement inputs or metrics may be obtained. As indicated at 1702 of FIG. 17A, the achievement inputs may be analyzed to determine participants to be rewarded, for example by a participant rewards module 1610 as illustrated in FIG. 16. In some embodiments, for example, the participant rewards module 1610 may analyze the achievement inputs, including but not limited to broadcast metadata and game metadata, to determine past, present, and/or future events in games or broadcasts for which rewards may or will be given, to determine the participant(s) to which rewards may or will be given, and to determine what the respective rewards may or will be. As indicated at 1704 of FIG. 17A, rewards may be provided to the recognized participants, for example as described in reference to FIG. 16. As indicated at 1706 of FIG. 17A, content and feedback indicating and/or or announcing the rewards may be provided, for example as described in reference to FIG. 16. The indications and/or feedback may be provided to the participants, game system(s), and one or more third parties, and may be provided via one or more channels including one or more of but not limited to UIs, APIs, and social media channels.

Figure 17B:
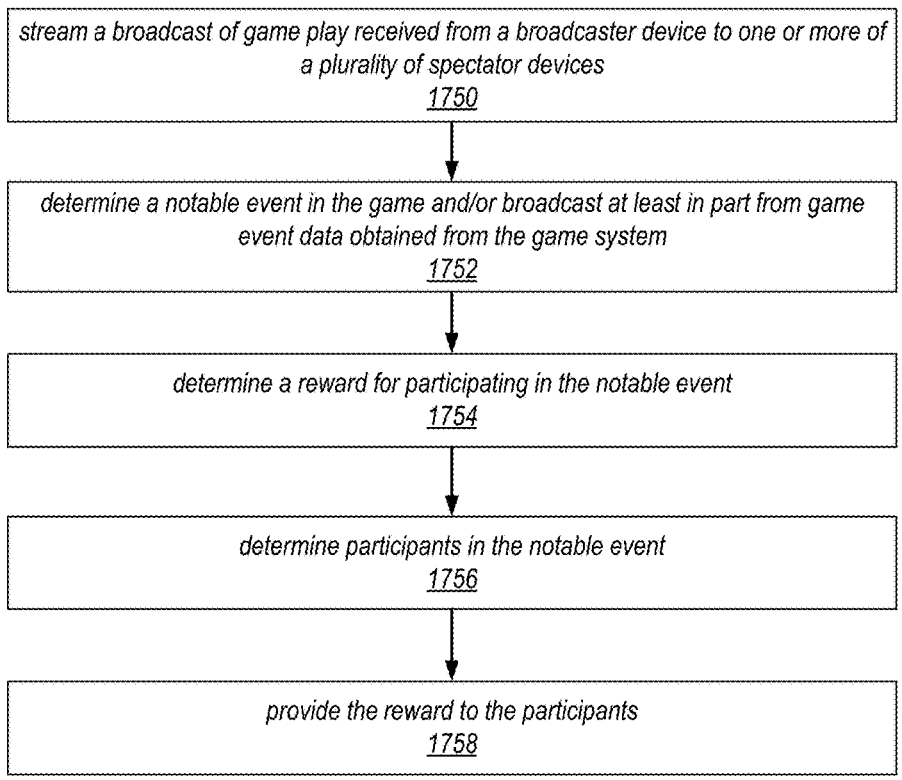
FIG. 17B is a flowchart of a method for rewarding participants in notable events in games being broadcast, according to some embodiments.

FIG. 17B is a high-level flowchart of a method for rewarding participants in notable events in games being broadcast, according to some embodiments. As indicated at 1750 of FIG. 17B, the spectating system may stream a broadcast of game play received from a broadcaster device to one or more of a plurality of spectator devices, for example as illustrated in FIG. 1A and FIG. 18. The broadcast may be of a live session in an online game or a replay of a previously recorded game. As indicated at 1752 of FIG. 17B, a notable event in the game and/or broadcast may be determined at least in part from game event data obtained from the game system. Other data, including but not limited to data indicating broadcast and/or game events determined from analysis of broadcast audio, text, and/or other inputs, may also be used in determining notable events. Notable events may be determined, for example by a participant rewards module 1610 as illustrated in FIG. 16 that processes various achievement inputs to determine reward outputs. As indicated at 1754 of FIG. 17B, a reward for participating in the notable event may be determined, for example by a participant rewards module 1610 as illustrated in FIG. 16. As indicated at 1756 of FIG. 17B, participants in the notable event may be determined, for example by a participant rewards module 1610 as illustrated in FIG. 16. As indicated at 1758 of FIG. 17B, the reward may be provided to the participants, for example by one or more channels or methods as described in reference to FIG. 16.

FIG. 18 provides a non-limiting example of achievements and rewards interfaces for a game spectating system, according to some embodiments. A participant UI 1802 may, for example be presented to participants (e.g., spectators and broadcasters) as a Web page of a game spectating system website via a Web browser, as an interface to a game spectating Web application or mobile application, or as an interface to other network-based game spectating applications. A participant UI 1802 may include one or more panes or regions including one or more of, but not limited to, controls 1810, a video player 1832 with A/V controls 1833, and an achievement and awards interface 1840. Controls 1810 may include one or more UI elements for navigating or otherwise interacting with the game spectating system. Video player 1832 may display the video stream (shown as broadcast 1834) for a live broadcast or channel or for a replay of a previously recorded broadcast. While not shown, in some embodiments, participant UI 1802 may also include other content or panes, such as a chat pane in which broadcaster and/or spectator text chat may be displayed, for example chat discussing the game and players in the game, and other game-related information, events, and content.

The participant UI 1802 may include an achievement and awards interface 1840 via which participants may view and interact with broadcast content related to rewards and achievements for the game and/or the broadcast. At least some of the broadcast content displayed in achievement and awards interface 1840 may be interactive UI elements that, for example, allow participants to nominate or vote on other participants for recognition or reward, to nominate or vote on broadcast or game events for which rewards should be given, or to nominate or vote on the rewards to be given. As another example, the broadcast content may include UI elements, as shown in the "give player gifts" 1846 pane, that allow participants to provide gifts to selected participants (e.g., players or broadcasters). For example, as shown in FIG. 18, "give player gifts" 1846 pane includes a "Choose a player" UI element that the participant may select to view a list of players or teams of players; the participant may select one of the players or teams to view additional information about the player or team (e.g., via a player info 1836 window overlaid on the broadcast or presented in achievement and awards interface 1840). Note that the players or teams in the list may be, but are not necessarily, players in the current game being broadcast or replayed. For example, in FIG. 18, the participant has selected "Player E" from the list to view information on player E, including the player's achievements, statistics, and gear. The participant may select a piece of gear to give to the selected player. In some embodiments, instead of or in addition to selecting players to receive gifts from a list as illustrated in FIG. 18, the spectating system may support drag and drop functionality whereby the spectator can drag items shown in the gifts 1846 pane and drop the items onto a player's avatar or character on broadcast 1834 pane to provide gifts to selected players.

FIG. 18 shows some non-limiting example gifts for the "Space Explorers" game, including gear such as a DP9000 disruptor pistol or LR20C laser rifle, a boost such as a health boost, and information such as a game map. In some embodiments, the participant(s) may pay for the gift(s), for example via a "Pay here" UI element as illustrated in FIG. 18. As another example of active broadcast content, the broadcast content may include UI elements, as shown in the "my rewards" 1848 pane, via which participants can obtain rewards that they have been granted or given, for example links to other pages or Web sites of third parties or game developers that provide the rewards, or links to pages where the participants can pay for, redeem, or otherwise obtain rewards. In addition to active broadcast content, the achievement and awards interface 1840 may include content that announces or publishes reward and/or achievement information to the participants, for example as shown in the broadcast content of panes 1844, 1836, and 1848.

Game Effects from Spectating Community Inputs to the Spectating System

Using embodiments of methods and apparatus for integrating game systems with a game spectating system in a game spectating environment as described herein, games may be developed to be played in the game spectating environment and interfaced with the game spectating system. For example, the game spectating system may provide an application programming interface (API) for game systems (referred to herein as a game system API). A software development kit (referred to herein as a game system SDK) may be provided to game developers that may assist the developers in developing and programming games to support and interface with the game system API.

In some embodiments, the game system API and SDK may allow games executing on game systems to obtain various inputs from the game spectating system. In some embodiments, the game spectating system may generate various game inputs based on spectating community inputs. The spectating community inputs may include, but are not limited to, spectator participation statistics or metrics, spectator text chat inputs, spectator audio inputs, and spectating UI inputs. In some embodiments, the game inputs may include random number inputs generated from one or more of the spectating community inputs that may be used as an entropy source for randomizing functions in a game. For example, at a game level where enemies are spawned for the player(s) to fight, a random input from the spectating system based on spectating community inputs may be used in determining the number, type, and/or strength of the enemies that are spawned. In some embodiments, the game inputs may include parameter inputs that provide values for parameters in the game based on spectating community inputs. For example, at a game level where enemies are spawned for the player(s) to fight, a parameter input from the spectating system may specify the number type, and/or strength of the enemies based on spectating community inputs.

Thus, embodiments may provide methods via which broadcast spectators may become involved in the games being broadcast by influencing game play via their various inputs, while also enhancing game play for the players by providing interesting variations in game play that are influenced by their spectating audience. For example, spectator text and/or audio chat in a broadcast streamed through the spectating system may be analyzed by the spectating system to determine game inputs that influence certain decisions made by the game engine. The analysis may, for example, measure metrics for the chat such as quantity or volume and provide the metrics as randomizing or parametric inputs to the game engine. As another example, the analysis may determine content (e.g., keywords or phrases) from the chat and collect and quantify the content to generate randomizing or parametric inputs to the game engine. As another example, the analysis may determine metrics for crowd emotions or excitement from the chat and provide the metrics as randomizing or parametric parameter inputs to the game engine. One or more of the various metrics may be determined and provided to the game engine as randomizing or parametric inputs in real- or near-real time to be applied in making or influencing decisions for game play. The game play may thus be influenced in very real and visible ways by the spectators' inputs in real- or near-real time, allowing the spectators to view their influence on and thus sense and increase their involvement in the game.

Figure 19A:
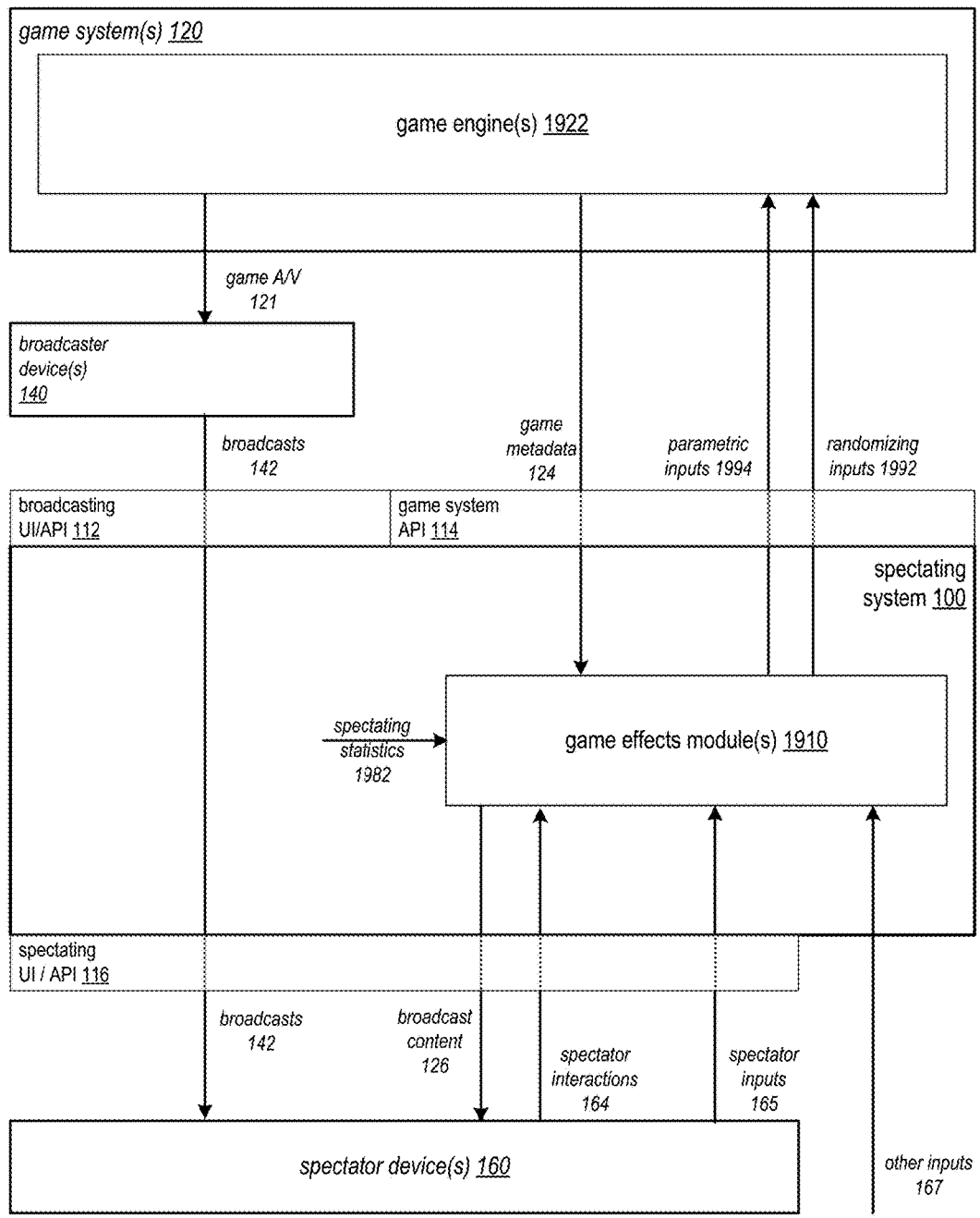
FIG. 19A illustrates an example game effects module in a game spectating system that provides inputs to a game being broadcast via the game spectating system based on spectator inputs to and interactions with the broadcast, according to some embodiments.

FIG. 19A illustrates an example game effects module in a game spectating system 100 that provides inputs to a game being broadcast via the game spectating system based on spectator inputs to and interactions with the broadcast, according to some embodiments. A game spectating system 100 such as the game spectating system 100 as illustrated in and described for FIGS. 1A and 1B may implement one or more components or modules 1910 that may provide randomizing 1992 and/or parametric 1994 game inputs to a game engine 1922 according to a game system API 114. The randomizing 1992 and/or parametric 1994 game inputs may be determined from or based on spectator inputs 165 such as text or audio chat inputs, spectator interactions 164 with broadcast content 126 determined at least in part from game metadata 124, spectating statistics 1982 collected by the game spectating system 100, and/or other inputs 167 including but not limited to inputs from social media such as "tweets" or instant messaging (IMs). In some embodiments, the spectating system 100 may obtain the game metadata 1624 from game system(s) 120 for which broadcasts 124 are being streamed according to game system API 114, or from one or more other sources as illustrated in FIG. 1C.

In some embodiments, the spectating system 100 may enable spectator participation in broadcasts 142 to affect the game being executed by the game engine 1922 in various ways. In some embodiments, the spectating system 100 may determine information based on spectator participation in broadcasts 142 and provide the information as feedback to the game systems 140 according to a game system API 114 presented to the game systems 140 by the spectating system 100. Spectator participation metrics that may be used include but are not limited to crowd or audience size for broadcasts or games, and spectator audio and/or text inputs 165 to broadcast "chat", "crowd noise", or other audio and textual channels.

In some embodiments, the spectating system 100 may collect or determine spectating statistics 1982 based on spectator participation in broadcasts. For example, in some embodiments, the spectating system 100 may track the size of a particular broadcaster's audience, or the combined size of the audiences for all broadcasters of a particular game. As another example, the spectating system may track subscribing spectators vs. non-subscribing spectators who are watching particular broadcasts or games. The statistics 1982 may be provided to or obtained by game effects module(s) 1910 and used to determine randomizing 1992 and/or parametric 1994 game inputs that are provided to the game engine 1922 according to the game system API 114.

In some embodiments, the spectating system 100 may obtain and analyze spectator inputs including but not limited to spectator audio and/or text inputs 165 to broadcast chat, "crowd noise", or other audio and textual channels of the broadcasts 142. In some embodiments, the spectating system 100 may instead or also include one or more interfaces that can obtain, process, and analyze inputs from other input 167 sources or channels, including but not limited to inputs from social media such as "tweets" or instant messaging (IMs). The analysis may, for example, determine metrics for the inputs 165 and/or 167 such as quantity or volume in chat channels, and may provide the metrics as randomizing 1992 and/or parametric 1994 game inputs to the game engine 1922 according to the game system API 114. As another example, the analysis may determine content (e.g., keywords or phrases) from one or more audio and/or textual chat channels or from a social media channel 167 and collect and quantify the content to generate randomizing 1992 and/or parametric 1994 game inputs to the game engine 1922. As another example, the analysis may determine metrics for crowd emotions or excitement from one or more spectator inputs 165 and/or other inputs 167 and provide the metrics as randomizing 1992 and/or parametric 1994 game inputs to the game engine 1922. FIG. 4 illustrates an example participant input processing component of a spectating system 100 that may obtain and analyze inputs including but not limited to spectator audio and/or text inputs 165 or other inputs 167 such as social media inputs to determine broadcast-related analysis information. The broadcast-related analysis information may be used by the game effects module(s) 1910 in generating randomizing 1992 and/or parametric 1994 game inputs to the game engine 1922 according to the game system API 114. The description of FIG. 4 also provides several examples of detecting and applying broadcast-related analysis information within a game spectating system to generate various randomizing 1992 and/or parametric 1994 game inputs.

In some embodiments, spectator participation in broadcasts may be used to determine randomizing inputs 1992 to the game engine 1922 that may be used as randomizing factors in the game currently being executed and broadcast. For example, one or more aspects or metrics of spectator participation in a broadcast or broadcasts (crowd or audience size, crowd noise, chat level or volume, emotion or excitement level, etc.) may be measured or tracked and provided as feedback to the game system 120 via the game system API 114 for use in the game engine 1922 as a game randomizing factor. For example, at a game level where enemies are spawned for the player(s) to fight, a randomizing input 1992 from the spectating system 100 based on spectator participation in one or more broadcasts 142 of the game may be used in determining the number, type, and/or strength of the enemies that are spawned.

In some embodiments, spectator participation in broadcasts may be used to determine parametric inputs 1994 to the game engine 1922 that non-randomly affect the game players and/or games being executed and broadcast in various ways. As a non-limiting example, the size of a crowd or audience watching a broadcast 142 or broadcasts 142 of an event in a game may be fed back to the game engine 1922, and may be used by the game engine 1922 in determining the size or appearance of the stadium, arena or other event venue, the size of a virtual crowd of spectators shown as viewing the event, and/or the volume of the crowd noise provided as audio output with the game A/V 121 that is included in the broadcast(s) 142. As another example, the level of crowd enthusiasm or support, for example as measured from the volume, quantity, or content of audio and/or text chat channel inputs 165 to a broadcast 142, may be fed back to the game engine 1922 to affect the number of "bad guys" or monsters that appear at the current level that the broadcaster/player is at, or may be used to reward the broadcaster at the level by giving the broadcaster's in-game character or avatar access to certain weapons, or may have various other in-game effects. As another example, spectators' audio and/or textual inputs 165 may be analyzed to detect content or emotion (keywords, cheers, boos, happiness, etc.); the analysis may be fed back to the game and used to affect players' in-game status, health, power, weapons, etc.

In some embodiments, spectator participations in broadcasts that are used to determine randomizing 1992 and/or parametric 1994 game inputs to the game engine 1922 may include spectator interactions 164 with broadcast content 126 presented via the spectating UI 116 on the spectator devices 160. For example, the broadcast content 126 may include one or more UI elements that allow the spectating community to specify, select, or vote on game elements or events such as what type and how many enemies will appear at a level, what type of weapons or other gear players are given, difficulty levels, and so on.

In some games, for example as shown in FIG. 22, spectators may be fans of different teams, with different players on the different teams, and with two or more different game engine instances executing to support the different teams and/or players. Different teams and/or players, and thus different game engines, may be affected by inputs to and interactions with the same broadcast (or with different broadcasts of the same game). While FIG. 19A shows the game effects module(s) 1910 of spectating system 100 communicating with a game engine 1922 of a game system 120 via the game system API 114, in some embodiments, the game effects module(s) 1910 of spectating system 100 may instead communicate with one or more game servers of the game system 120 to provide inputs 1992 and 1994 to multiple game engine(s) 1922. The game server(s) may in turn communicate the inputs 1992 and 1994 to one, two, or more game engine instances, as shown in FIG. 1D. The game engine instances may be instantiated on one or more servers of the game system 120, or alternatively at least some of the game engine instances may be running on the broadcaster devices 140 as illustrated in FIG. 19A. In some embodiments, the inputs 1992 and 1994 received from the game effects module(s) 1910 of spectating system 100 may include at least some data specific to particular game engines (e.g., specific to different teams and/or players), and the game server(s) may handle distribution of the data to the target engines.

Figure 19B:
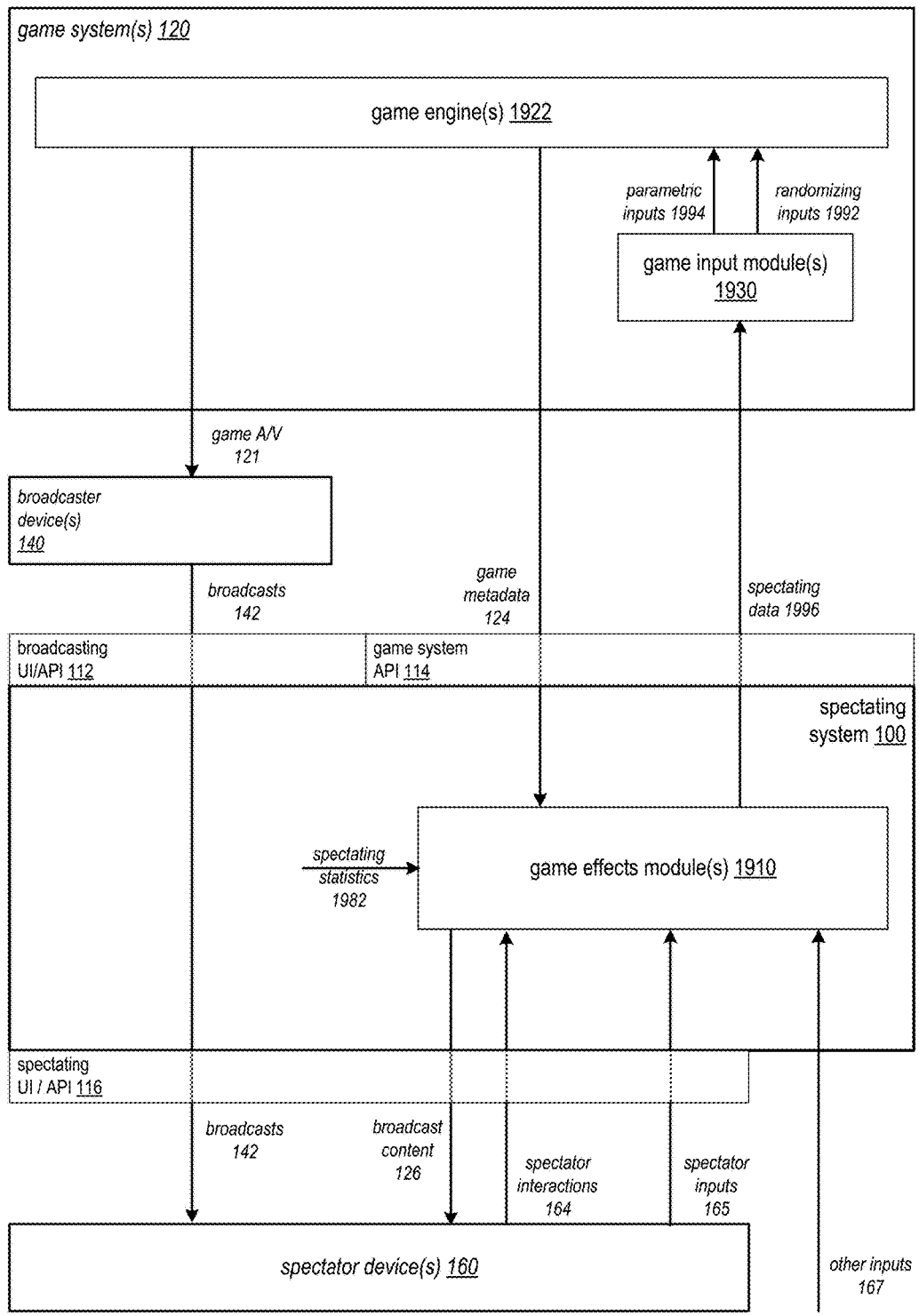
FIG. 19B illustrates example game input modules on a game system that process spectating data received from a spectating system to generate inputs to a game being broadcast via the game spectating system, according to some embodiments.

FIG. 19B illustrates example game input modules on a game system that process spectating data received from a spectating system to generate inputs to a game being broadcast via the game spectating system, according to some embodiments. In some embodiments, in addition to or instead of the game effects module(s) 1910 of a spectating system generating values for parametric inputs 1994 and/or randomizing inputs 1992 for a game engine(s) 1922, the game effects module(s) 1910 may process the various inputs and interactions 164, 165, 167, and 1982 as shown in FIG. 19A to generate spectating data 1996, and may provide the spectating data 1996 to one or more game input module(s) 1930 of game system(s) 120 according to game system API 114. The game input module(s) 1930 may then generate values for parametric inputs 1994 and/or randomizing inputs 1992 for the game engine(s) 1922. In some embodiments, instead of processing the various inputs and interactions 164, 165, 167, and 1982, the game effects module(s) 1910 may collect one or more of the inputs and/or interactions (e.g., audio or text chat inputs) and forward the inputs and/or interactions with little or no processing to the game input module(s) 1930 of game system(s) 120 according to game system API 114.

FIGS. 20A through 20D are flowcharts of methods for generating inputs to a game system from spectators' interactions with and inputs to broadcasts in a game spectating system, according to some embodiments. The methods of FIGS. 20A through 20D may, for example, be implemented in a spectating system environment as illustrated in FIG. 19A to generate randomizing 1992 and/or parametric 1994 game inputs to a game engine 1922.

Figure 20A:
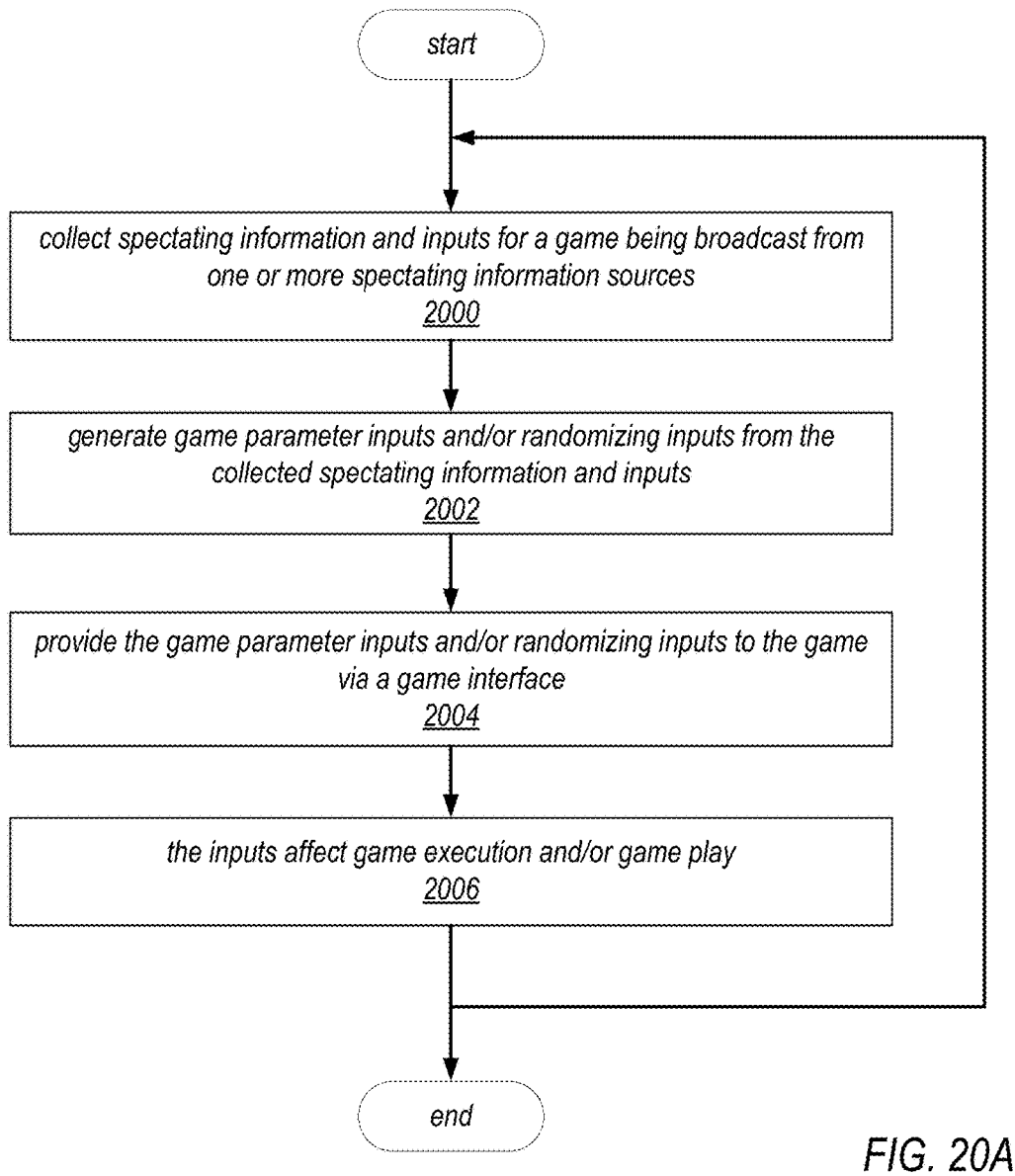
FIGS. 20A through 20D are flowcharts of methods for generating inputs to a game system from spectators' interactions with broadcasts in a game spectating system, according to some embodiments.

FIG. 20A is a high-level flowchart of a method for generating inputs to a game system from spectators' interactions with and inputs to a broadcast in a game spectating system, according to some embodiments. As indicated at 2000 of FIG. 20A, the spectating system may collect spectating information and inputs for a game being broadcast from one or more spectating information sources. The spectating information and inputs may include, but are not limited to, spectator participation statistics or metrics, spectator text chat inputs, spectator audio inputs, and spectating UI inputs.

Figure 20B:
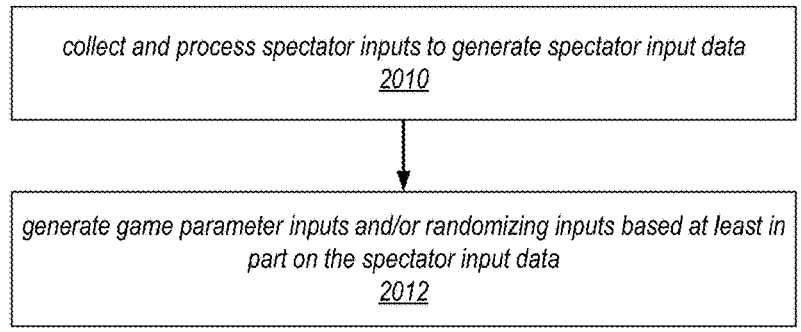
Figure 20C:
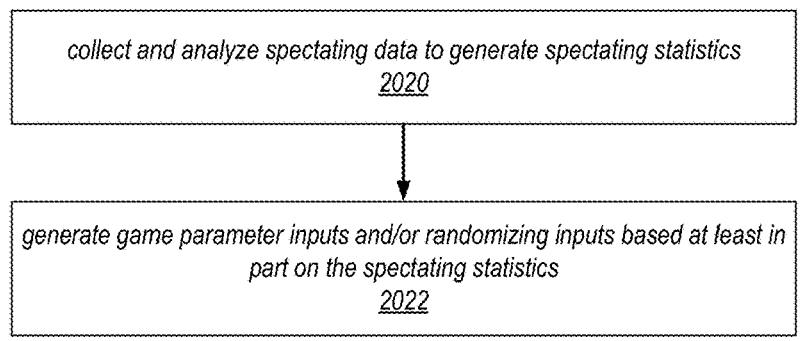
Figure 20D:
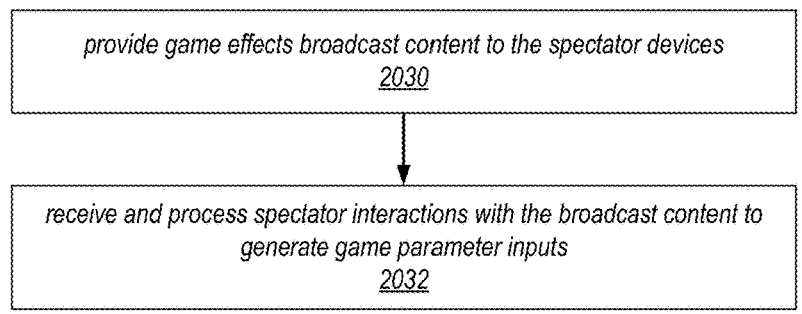

As indicated at 2002 of FIG. 20A, the spectating system may generate game parametric inputs and/or randomizing inputs from the collected spectating information and inputs. FIGS. 20B through 20D describe example methods for generating parametric inputs and/or randomizing inputs from the collected spectating information and inputs, according to embodiments.

As indicated at 2004 of FIG. 20A, the spectating system may provide the parametric and/or randomizing inputs to the game via a game interface. In some embodiments, the spectating system may provide a game system API for game systems via which the game engines may specify and obtain parametric and/or randomizing inputs. In some embodiments, a game system SDK may be provided to game developers that may assist the developers in developing and programming games to support and interface with the game system API. The game system API and SDK may allow games executing on game systems to specify and obtain parametric and/or randomizing inputs from the game spectating system.

As indicated at 2006 of FIG. 20A, the inputs may affect game execution and/or game play in various ways. For example, at a game level where enemies are spawned for the player(s) to fight, a random input from the spectating system based on spectating community inputs or spectating statistics may be used in determining the number, type, and/or strength of the enemies that are spawned. As another example, at a game level where enemies are spawned for the player(s) to fight, a parametric input from the spectating system may specify the number type, and/or strength of the enemies based on spectating community inputs or interactions with broadcast content.

FIG. 20B is a high-level flowchart of a method for generating inputs to a game system from spectator inputs to a broadcast in a game spectating system, according to some embodiments. As indicated at 2010 of FIG. 20B, the spectating system may collect and process spectator inputs to generate spectator input data. The spectator inputs may include, but are not limited to, spectator audio and/or text inputs to broadcast chat, "crowd noise", or other audio and textual channels of the broadcasts. As indicated at 2012 of FIG. 20B, the spectating system may generate game parameter inputs and/or randomizing inputs based at least in part on the spectator input data. For example, the analysis of the inputs may, for example, determine metrics for the inputs such as quantity or volume of spectator chat in chat channels, and may generate randomizing and/or parametric game inputs according to the metrics. As another example, the analysis may determine content (e.g., keywords or phrases) from one or more audio and/or textual chat channels, and may collect and quantify the content to generate randomizing and/or parametric game inputs. As another example, the analysis may determine metrics for crowd emotions or excitement from one or more spectator inputs and provide the metrics as randomizing and/or parametric game inputs to the game.

In some embodiments, to generate a randomizing input for the game system, the spectating system may collect and process spectator audio and/or text chat inputs to generate an integer value that is passed to the game engine as a randomizing input via the game system API. In some embodiments, the spectating system may be continuously receiving and processing spectator text and/or audio inputs to generate or change the values for the randomizing inputs. In some embodiments, the spectating system may generate a value for a randomizing input in response to a request for a random number received from the game engine via the game system API.

In some embodiments, generating random values based on analysis of spectator inputs may be leveraged to produce some interesting behaviors in games. For example, a randomizing input may be weighted to have more of an influence on the game as the number of spectators watching the broadcasts of a particular game increases or crosses a threshold. As another example, when randomizing enemies or challenges in a game based on analysis of spectator chat inputs, the spectator chat may increase or become more frequent or loud as the game gets more exciting. This change in spectator chat may be used to make the game more difficult, for example by increasing the influence of the randomizing input, by raising the number of enemies that may be spawned, or by raising the difficulty level that may be set. Thus, using spectators' inputs to randomize game play may provide a feedback loop in which changes in the spectators' inputs result in corresponding changes in game play. For example, as the players are playing the game, more enemies may be spawned. The increased action would be exciting for the viewers, which would be reflected in the text and/or audio chat channels. The viewers' text and/or audio chat inputs are analyzed to provide randomizing inputs to the game engine that may be influenced by the viewer's excitement level. So as the viewers' excitement level goes up, more enemies are spawned, and the game gets more challenging and more exciting, and so on.

FIG. 20C is a high-level flowchart of a method for generating inputs to a game system from spectator statistics in a game spectating system, according to some embodiments. As indicated at 2020 of FIG. 20C, the spectating system may collect and analyze spectating data to generate spectating statistics. For example, in some embodiments, the spectating system may track the size of a particular broadcaster's audience, or the combined size of the audiences for all broadcasters of a particular game. As indicated at 2022 of FIG. 20C, the spectating system may generate game parameter inputs and/or randomizing inputs based at least in part on the spectating statistics. For example, a random value may be generated based on the number of spectators currently viewing a particular broadcasts or the number of spectators viewing all broadcasts of a particular game. As another example, a parametric input value may be generated based on the current number of spectators. In some embodiments, the magnitude of the statistical value being monitored may be used to apply weighting to the randomization effect in the game.

FIG. 20D is a high-level flowchart of a method for generating inputs to a game system from spectator interactions with broadcast content in a game spectating system, according to some embodiments. In some embodiments, spectator participation in broadcasts that are used to determine randomizing and/or parametric game inputs to the game engine may include spectator interactions with UI elements in the spectating UI on the spectator devices. As indicated at 2030 of FIG. 20D, the spectating system may provide game effects broadcast content to the spectator devices. For example, the broadcast content may include one or more UI elements presented via the spectating UI on the spectator devices that allow the spectating community to specify, select, or vote on game elements or events. As indicated at 2032 of FIG. 20D, the spectating system may receive and process spectator interactions with the broadcast content to generate game parameter inputs. As non-limiting examples, the UI elements may allow the spectators to specify, select, or vote on what type and how many enemies will appear at a level, what type of weapons or other gear players are given, difficulty levels, and so on. The spectating system may collect and analyze the spectators' inputs to the UI elements to generate parametric inputs to the game engine that indicate the spectators' specifications or choices for the game elements or events as indicated by the broadcast content.

Figure 21:
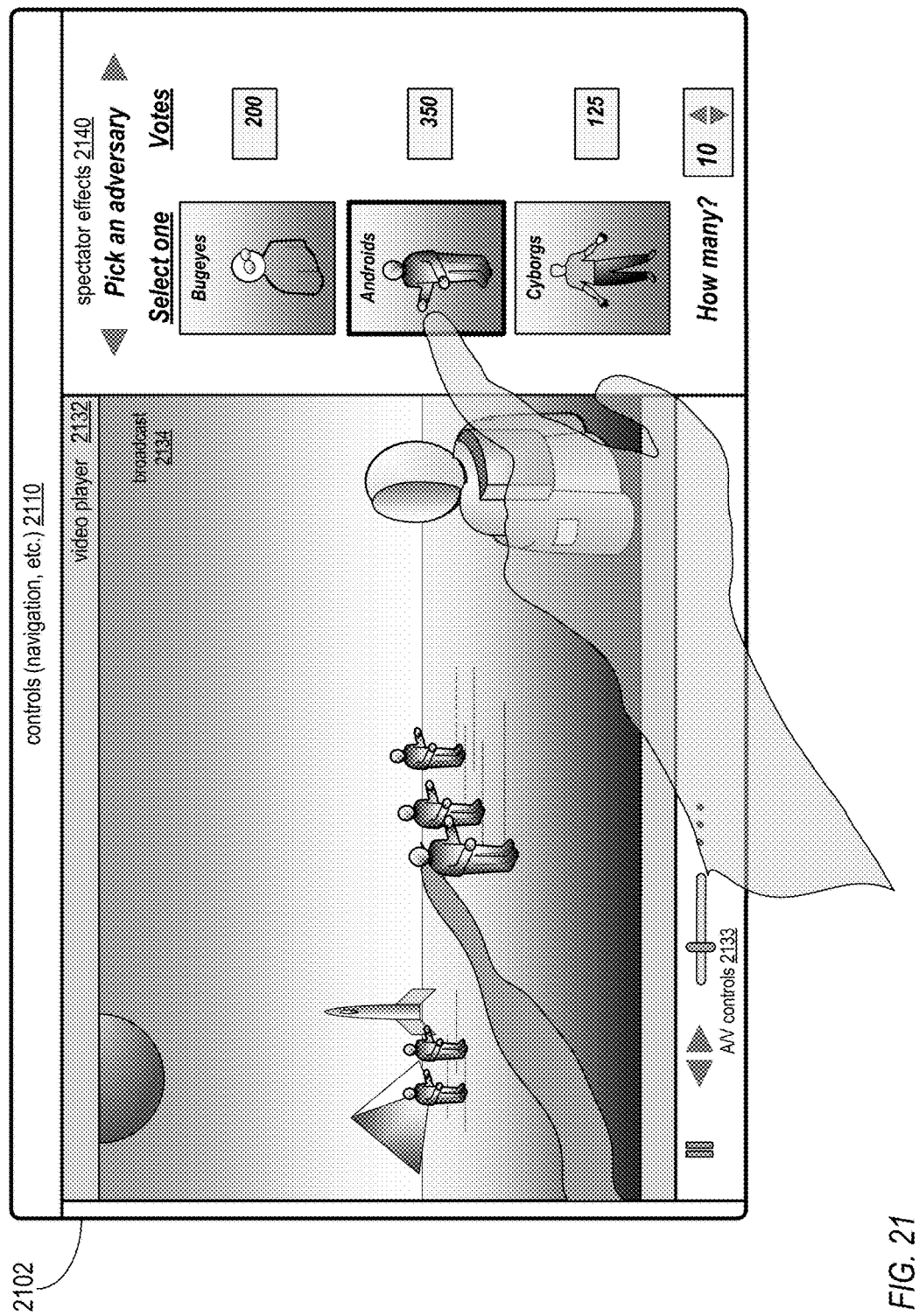
FIG. 21 provides a non-limiting example of a game spectating system interface that allows spectators to collectively affect a game being broadcast via the game spectating system, according to some embodiments.

FIG. 21 provides a non-limiting example of a game spectating system interface that allows spectators to collectively affect a game being broadcast via the game spectating system, according to some embodiments. A spectating UI 2102 may, for example be presented as a Web page of a game spectating system website via a Web browser, as an interface to a game spectating Web application or mobile application, or as an interface to other network-based game spectating applications. A spectating UI 2102 may include one or more panes or regions including one or more of, but not limited to, controls 2110, a video player 2132 with A/V controls 2133, and a spectator effects pane 2140 via which a spectator may view and interact with broadcast content based at least in part on game metadata for the game being broadcast 2134. Controls 2110 may include one or more UI elements for navigating or otherwise interacting with the game spectating system. Video player 2132 displays the video stream (shown as broadcast 2134) for a live broadcast or channel or for a replay of a previously recorded broadcast.

Spectator effects pane 2140 may include broadcast content based at least in part on the game metadata for the game being broadcast. The broadcast content displayed in spectator effects pane 2140 may include interactive UI elements via which spectators may specify, select, or vote on game content, game elements, or game events such as what type and how many enemies will appear at a level, what type of weapons or other gear players are given, difficulty levels, when or where enemies or other game content will appear, and so on. Referring to FIG. 19A, spectators' interactions 164 with the broadcast content displayed in spectator effects pane 2140 of the spectating UI 2102 may be collected and analyzed by the game spectating system 100 to determine values for parametric 1994 and/or randomizing 1992 inputs to the game engine 1922. In the non-limiting example spectating UI 2102 of FIG. 21, the broadcast content may include one or more UI elements that allow the spectating community to select what type of adversaries ("Bugeyes", "Androids", or "Cyborgs") are to appear at a level of the game based on community votes as shown in the "Votes" column. The spectating system 100 collects and analyzes the spectator votes, and provides the results to the game engine 1922 as parametric input. In addition, the spectators may specify how many of the adversaries are to appear; the spectators' inputs to the "How many?" UI element are collected and analyzed (e.g., averaged), and the results are provided to the game engine 1922 as parametric input. The spectating community may thus influence game play in very real and visible ways in real- or near-real time via the spectating UI 2102 provided by the spectating service 100, allowing the spectating community to view their influence on and thus sense their involvement in the game. In addition, the game may be enhanced for the players by providing interesting variations in game play that are influenced by their spectating audience.

FIG. 22 provides a non-limiting example of spectators' inputs to a broadcast in a game spectating system collectively affecting a game being broadcast via the game spectating system, according to some embodiments. FIG. 22 provides a non-limiting example of a spectating user interface (UI) 2202 for a game spectating system on a device 2200 in which spectators' inputs may result in visual and/or audio effects in the game being broadcast. As shown in FIG. 22, a spectator's device 2200 may implement a spectating UI 2202, and may include a microphone 2206 to collect spectator 2220 audio and speakers 2204 to output game audio (including spectator audio and/or crowd noise, broadcaster commentary, etc.). The spectator's device 2200 may also include or be coupled to a keyboard 2209 or other input device(s) via which the broadcaster/player 820 may enter text input such as broadcast chat 2218. In some embodiments, the spectator's device 2200 may also include or be coupled to input devices and technologies such as controllers or joysticks, motion tracking systems, gesture-based input systems, and so on.

In some embodiments, spectating UI 2202 may include a broadcast content 2240 pane or region in which broadcast content based at least in part on game metadata received from a respective game system may be displayed to and accessed by the spectator 2260. The broadcast content 2240 pane may, for example, show information about the game, game players, game objects or items, game events, and so on as provided by the game system in the game metadata. In some embodiments, spectating UI 2202 may include spectator controls 2216 via which the spectator 2260 may interact with the spectating system to control the broadcast, select other broadcasts, and so on. In some embodiments, spectating UI 2202 may include a broadcast chat 2218 window via which the spectator 2260 may communicate with the broadcaster/player and other spectators via text.

As described in reference to FIG. 4, in some embodiments, a participant input processing component of the spectating system may obtain and analyze spectator inputs including but not limited to spectator audio and/or text inputs to determine broadcast-related analysis information that may be used to generate randomizing 1992 and/or parametric 1994 game inputs to the game engine 1922 according to the game system API 114. For example, as shown in FIG. 22, virtual representations 2222 of spectators (e.g., spectator avatars) may be divided into two or more groups (e.g., fans of particular players or teams, in this example fans of teams A and B) in response to parametric 1994 game inputs based on profile information for the respective spectators 2220 and/or analysis of the spectators' audio and/or textual inputs to detect the spectators' affiliations or preferences as described in reference to FIG. 4. As shown in the example of FIG. 22, the virtual representations 2222 of the spectators on one side of a football stadium or basketball arena in an online sports game (team B fans, in this example) may be made to stand up, wave flags, or otherwise visually respond when the spectators 2220 who are fans of a particular team and/or player are cheering or booing loudly in response to parametric 1994 game inputs as determined from analysis of the spectators' audio and/or textual inputs as described in reference to FIG. 4. In some embodiments, instead of or in addition to visual indications, spectator audio output indicating sounds or noises generated by the spectators or by particular groups of the spectators may be provided to the spectators 2220 via the spectators' devices 2200 in response to parametric 1994 game inputs as determined from analysis of the spectators' audio and/or textual inputs as described in reference to FIG. 4.

Note that the content of the spectating UI 2202 may vary for different spectators 2220, for example based upon profile, preference, and/or UI options and configuration information for the individual spectators 2220 or group profile information for groups of spectators 2220. For example, the view of the game displayed in UI 2202 may vary based upon a spectator 2220's team affiliation. In addition, the audio output by the game spectating system, for example via device 2200, may vary for different spectators 2220 based upon profile, preference, and/or UI options and configuration information for the individual spectators 2220 or group profile information for groups of spectators 2220. For example, in the example of FIG. 22, fans of team A may hear different crowd noise than fans of team B.

Spectator Interactions with Games Via the Spectating System

Using embodiments of methods and apparatus for integrating game systems with a game spectating system in a game spectating environment as described herein, games may be developed to be played in the game spectating environment and interfaced with the game spectating system. For example, the game spectating system may provide an application programming interface (API) for game systems (referred to herein as a game system API). A software development kit (referred to herein as a game system SDK) may be provided to game developers that may assist the developers in developing and programming games to support and interface with the game system API.

In some embodiments, the game system API and SDK may allow games executing on game systems to provide game metadata to the spectating system that may be used to generate game-related broadcast content that is presented on a spectating user interface (UI), and to obtain various spectator inputs to and interactions with the spectating UI from the spectating system according to the game system API. In some embodiments, the spectating system may generate various game inputs based on the spectating community inputs to and interactions with the spectating UI. In some embodiments, the spectating system may enable spectators to interact with and affect the games being broadcast via the spectating UI, and/or to interact with the broadcasters and players within the games, in various ways. In some embodiments, individual spectators may interact with the games via the spectating UI to cause in-game effects. In some embodiments, groups of spectators may cause in-game effects or otherwise influence the game via the spectating UI, for example based on voting. In some embodiments, the spectating system may leverage the game metadata to provide spectating UI elements with which spectators can interact to provide inputs to interact with and affect respective games. In some embodiments, the spectating system may provide the spectator interactions as game inputs or feedback to the game systems according to a game system API presented to the game systems by the spectating system.

In some embodiments, spectators may affect or influence the game, objects within the game universe, events within the game, or the players in the game via the UI elements on the spectating UI. As non-limiting examples, spectators may build buildings, hide weapons, set difficulty levels, select weather or other environmental factors, or otherwise affect game content and events via UI elements presented on the spectating UI. In some embodiments, spectators may provide game content to or "gift" particular players or teams of players within a game via the spectating UI, for example with objects, boosts, weapons, medicine, health points, strength levels, etc. In some embodiments, spectators can provide information, for example maps, warnings, or advice, to players or teams of players in a game via the spectating UI. In some embodiments, spectators may introduce challenges and difficulties to the games or players within the games via the spectating UI, for example by causing storms or other catastrophes, by increasing difficulty of game levels, tasks, or challenges, by taking objects from players, by reducing players' strength or limiting their powers, and so on. The game play may thus be influenced in very real and visible ways by the spectators' inputs to and interactions with the spectating UI in real- or near-real time, allowing the spectators to view their influence on and thus sense and increase their involvement in the game. In some embodiments, the UI elements may include UI elements that provide methods for spectators to purchase or otherwise pay for in-game content or information to be provided to the players, and/or for other effects on the games that are provided via the UI elements.

In some embodiments, in addition to providing UI elements on the spectating UI via which spectators may affect or influence the game executing on the game system, game inputs that affect or influence the game may be determined from analysis of spectator inputs to the spectator devices including but not limited to text or audio inputs to the spectator devices. For example, keywords or key phrases that indicate spectator instructions to the game system may be determined from analysis of text, audio, and/or other inputs such as social media inputs as illustrated in FIG. 4. In some embodiments, spectator inputs from which game inputs may be determined may also include inputs from devices and technologies such as controllers or joysticks, motion tracking systems, gesture-based input systems, and so on.

Figure 25:
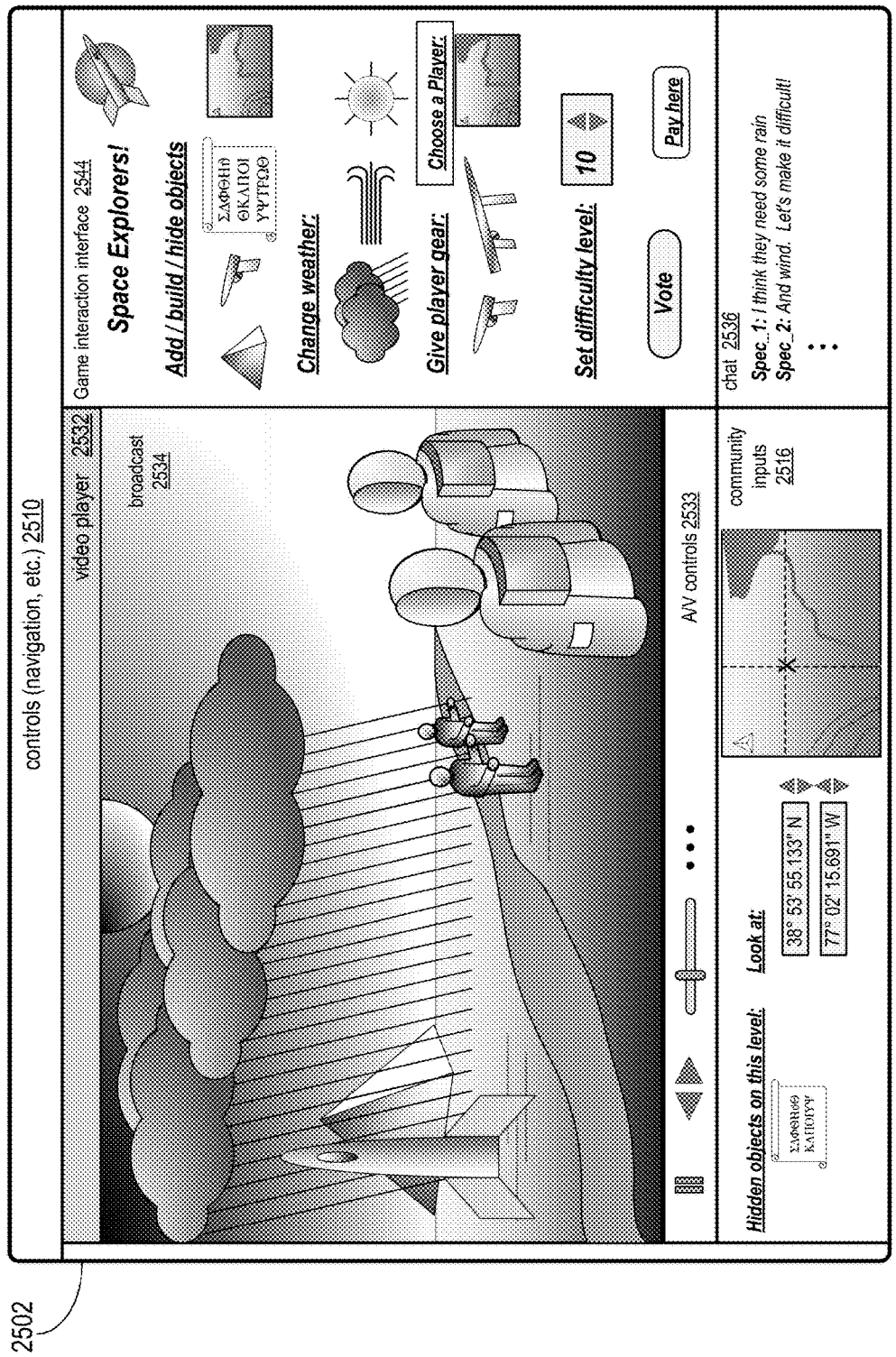
FIG. 25 provides a non-limiting example of a spectating user interface for a game spectating system that allows spectators to provide inputs that affect a game being broadcast via a game spectating system, according to some embodiments.
Figure 26A:
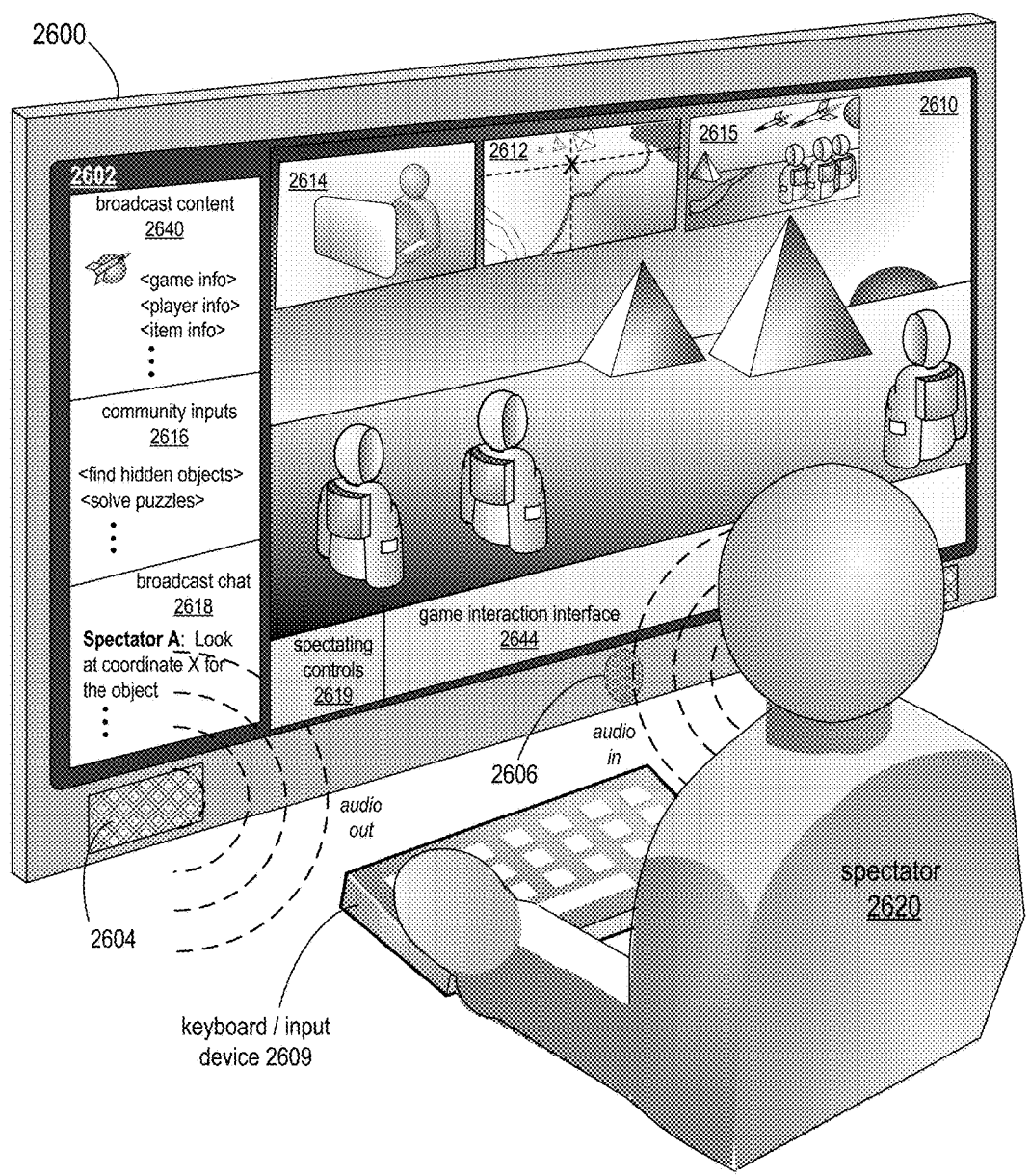
FIG. 26A provides another non-limiting example of a spectating user interface for a game spectating system that allows spectator and spectating community inputs to affect a game being broadcast via the game spectating system, according to some embodiments.
Figure 26B:
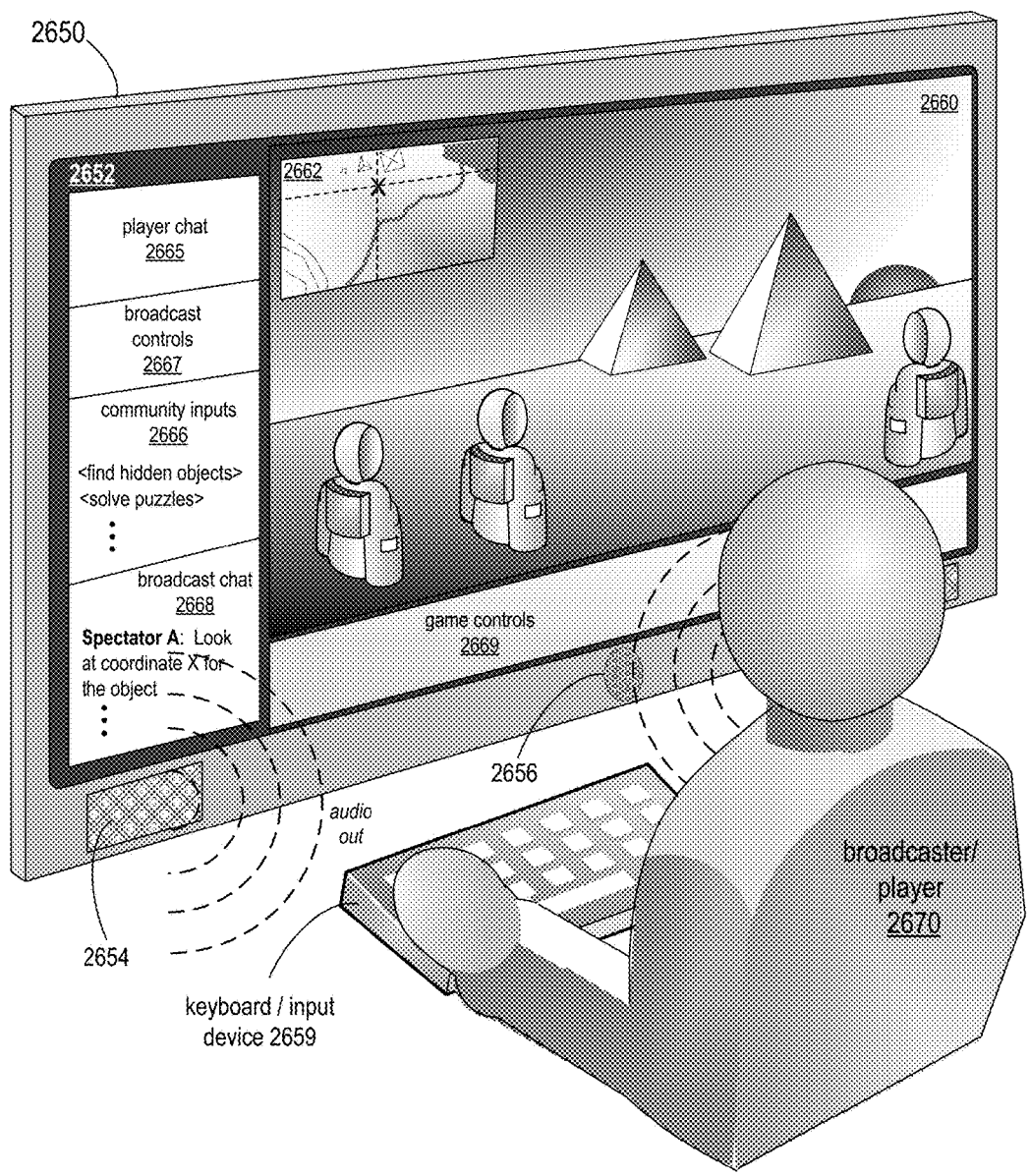
FIG. 26B provides a non-limiting example of a broadcaster user interface for a game spectating system that allows spectator and spectating community inputs to affect a game being broadcast via the game spectating system, according to some embodiments.

In some embodiments, in addition to allowing spectators to affect or influence the game executing on the game system via inputs to and interactions with the spectating UI, the spectating system may provide one or more UI elements via which the spectators may individually or collectively provide information to the broadcaster. For example, as shown in FIGS. 25 and 26A, a community inputs pane includes "Look at:" UI elements via which a spectator can provide information to the broadcaster, in this example location information for a hidden object. Inputs to the UI elements on the spectator device may cause the input information to be displayed on the broadcaster's device, for example as text in a community inputs 2666 pane and/or as graphics in a map overlay window 2662 as shown in FIG. 26B. The information may be, but is not necessarily, displayed on other spectators' devices. Note that the spectator devices and broadcast device may also include broadcast chat windows via which spectators and broadcaster can communicate, and that the spectating system may also support audio chat via an audio chat channel, as illustrated in FIGS. 25, 26A, and 26B.

In some embodiments, the spectating system may include one or more components or modules, referred to herein as game interaction modules, that may provide game inputs to game engines executing on game systems according to a game system API. In some embodiments, at least some of the game interaction modules may be provided by the spectating system. However, in some embodiments, at least some of the game interaction modules may be developed according to the game system SDK and provided to the spectating system by third parties including but not limited to the game developers. The game interaction modules may, for example, define the UI elements for interacting with the game, define the game inputs for the game, and map inputs to and interactions with the UI elements to values for the game inputs. In some embodiments, the game metadata received from the game system according to the game system API includes information describing or representing game content for the game, and at least some of the UI elements defined by the game interaction module(s) correspond to or represent the game content.

Figure 23:
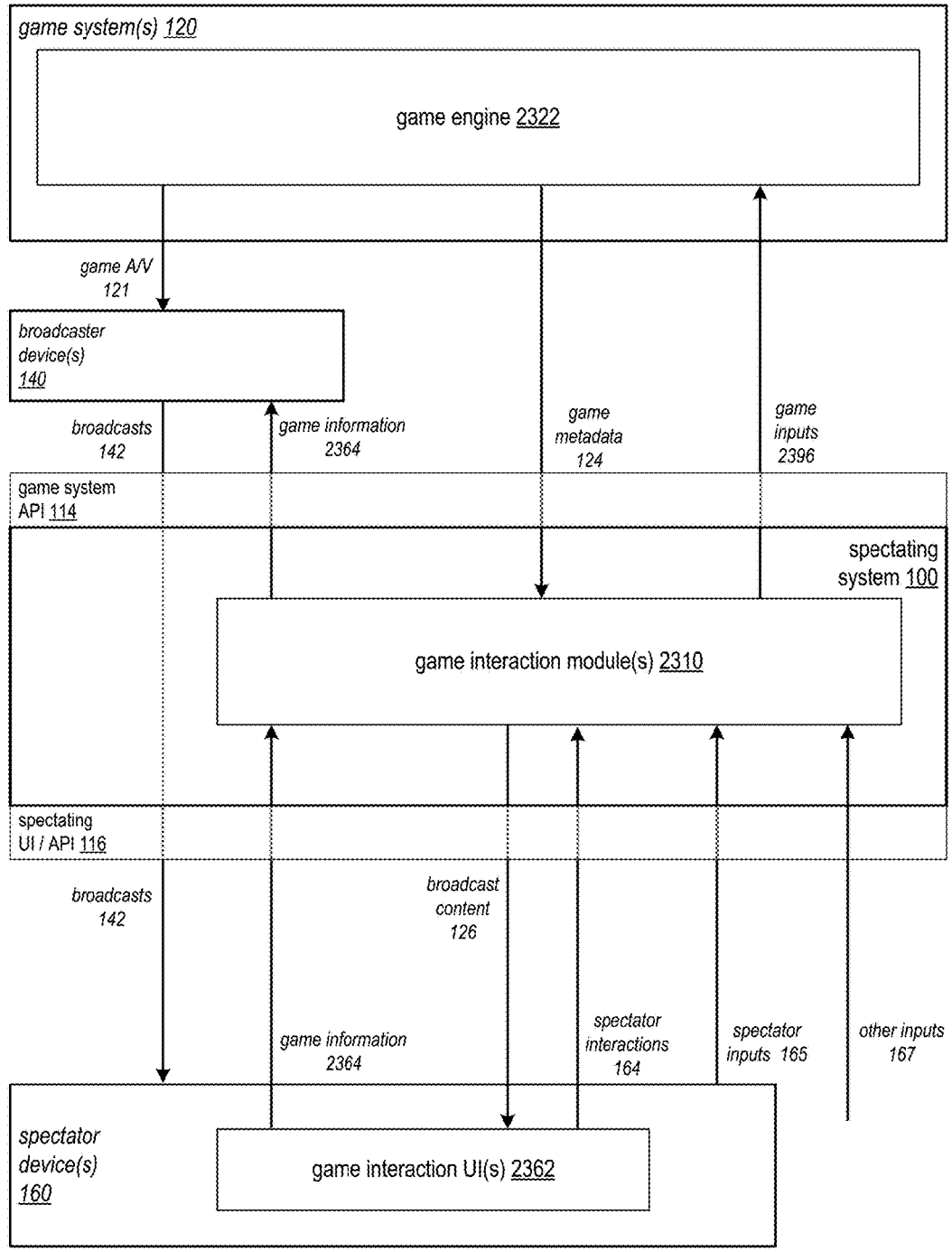
FIG. 23 illustrates an example game interaction module in a game spectating system that allows a spectator to provide inputs that affect a game being broadcast via the game spectating system, according to some embodiments.

FIG. 23 illustrates a game interaction module in a game spectating system that allows spectators to provide inputs that affect a game being broadcast via the game spectating system, according to some embodiments. A game spectating system 100 such as the game spectating system 100 as illustrated in and described for FIGS. 1A and 1B may include or implement one or more components or modules 2310 that may provide game inputs 2396 to a game engine 2322 according to a game system API 114. At least some of the game inputs 2396 may be determined from or based on spectator interactions 164 with broadcast content 126 determined at least in part from game metadata 124 and presented to spectators via game interaction UI(s) 2362 on the spectator device(s) 160. In some embodiments, the spectating system 100 may obtain the game metadata 1624 from game system(s) 120 for which broadcasts 124 are being streamed according to game system API 114, or from one or more other sources as illustrated in FIG. 1C. In some embodiments, at least some of the game inputs 2396 may be determined from spectator inputs 165 such as text or audio chat inputs to the spectator device(s) 160. In some embodiments, values for game inputs 2396 may also be determined from other inputs to the spectator device(s) 160 or spectating system 100 including but not limited to inputs from social media such as "tweets" or instant messaging (IMs). In some embodiments, the spectating system may obtain video or image inputs of spectator eye motion, body motion, or facial expression from the spectator devices 160, process the video or image inputs to determine metrics specifying interactions with the game executing on the game system 120, and generate values for one or more game inputs 2396 according to the determined metrics.

In some embodiments, the spectating system 100 may enable spectators to interact with and affect the game being executed by the game engine 2322 and broadcast 142 to the spectator device(s) 160 in various ways. In some embodiments, the game interaction module(s) 2310 of spectating system 100 may determine values for game inputs 2396 based on spectator interactions 164 and/or inputs 165, and provide the game inputs 2396 to the game systems 140 according to a game system API 114 presented to the game systems 140 by the spectating system 100.

In some embodiments, spectator inputs and interactions that determine values for game inputs 2396 to the game engine 2322 may include spectator interactions 164 with broadcast content 126 presented via the spectating UI 116 on the spectator devices 160, for example on game interaction UI(s) 2362. FIG. 25 illustrates an example spectating UI that includes a game interaction user interface. In some embodiments, the game system API 114 and SDK may allow games executing on game systems 120 to provide game metadata 124 to the spectating system 100 that may be used to generate game-related broadcast content 126 that is presented on game interaction UI(s) 2362, and to obtain game inputs 2396 determined according to various spectator inputs to and interactions with the broadcast content of game interaction UI(s) 2362 from the spectating system 100 according to the game system API 114. In some embodiments, the spectating system 100 may generate various game inputs 2396 based on the spectator and spectating community inputs to and interactions with the game interaction UI(s) 2362. In some embodiments, the spectating system 100 may enable spectators to interact with and affect the games being broadcast 142 via the game interaction UI(s) 2362, and/or to interact with the broadcasters and players within the games, in various ways. In some embodiments, individual spectators may interact with the games via the game interaction UI(s) 2362 to cause in-game effects. In some embodiments, groups of spectators may cause in-game effects or otherwise influence the game via the game interaction UI(s) 2362, for example based on voting.

In some embodiments, individual spectators and/or groups of spectators may affect or influence the game, objects within the game universe, events within the game, or the players in the game via the UI elements on the game interaction UI(s) 2362. As non-limiting examples, spectators may build buildings, hide weapons, set difficulty levels, select weather or other environmental factors, or otherwise affect game content and events via UI elements presented on the game interaction UI(s) 2362. In some embodiments, spectators may provide game content to or "gift" particular players or teams of players within a game via the game interaction UI(s) 2362, for example with objects, boosts, weapons, medicine, health points, strength levels, etc. In some embodiments, spectators can provide information, for example maps, warnings, or advice, to players or teams of players in a game via the game interaction UI(s) 2362. In some embodiments, spectators may introduce challenges and difficulties to the games or players within the games via the game interaction UI(s) 2362, for example by causing storms or other catastrophes, by increasing difficulty of game levels, tasks, or challenges, by taking objects from players, by reducing players' strength or limiting their powers, and so on. The game play may thus be influenced in very real and visible ways by the spectators' inputs to and interactions with the game interaction UI(s) 2362 in real- or near-real time, allowing the spectators to view their influence on and thus sense and increase their involvement in the game.

In some embodiments, the spectating system 100 may also obtain and analyze spectator inputs including but not limited to spectator audio and/or text inputs 165 to broadcast chat or other audio and textual channels of the broadcasts 142. In some embodiments, the spectating system 100 may instead or also include one or more interfaces that can obtain, process, and analyze inputs from other input 167 sources or channels, including but not limited to inputs from social media such as "tweets" or instant messaging (IMs). The analysis may, for example, determine content (e.g., keywords or phrases) from one or more audio and/or textual chat channels or from a social media channel 167 and collect and quantify the content to generate game inputs 2396 to the game engine 2322. FIG. 4 illustrates an example participant input processing component of a spectating system 100 that may obtain and analyze inputs including but not limited to spectator audio and/or text inputs 165 or other inputs 167 such as social media inputs to determine broadcast-related analysis information. In some embodiments, the broadcast-related analysis information may be used by the game interaction module(s) 2310 in generating game inputs 2396 to the game engine 2322 according to the game system API 114.

In some embodiments, the spectating system 100 may provide one or more UI elements via which the spectators may individually or collectively provide information 2364 to the broadcaster. For example, as shown in FIGS. 25 and 26A, a community inputs pane includes UI elements via which a spectator can provide information 2364 to the broadcaster. Inputs to the UI elements on the spectator device 160 may cause the input information 2364 to be displayed on the broadcaster device 140, for example in a community inputs pane as shown in FIG. 26B. In some embodiments, the information 2364 may be, but is not necessarily, displayed on other spectators' devices 140. Note that the spectator devices 160 and broadcast device 140 may also include broadcast chat windows via which spectators and broadcaster can communicate, and that the spectating system may 100 also support audio chat via an audio chat channel, as illustrated in FIGS. 25, 26A, and 26B.

In some games, for example as shown in FIG. 22, spectators may be fans of different teams, with different players on the different teams, and with two or more different game engine instances executing to support the different teams and/or players. Different teams and/or players, and thus different game engines, may be affected by inputs to and interactions with the same broadcast (or with different broadcasts of the same game). While FIG. 23A shows the game interaction module(s) 2310 of spectating system 100 communicating with a game engine 2322 of a game system 120 via the game system API 114, in some embodiments, the game interaction module(s) 2310 of spectating system 100 may instead communicate with one or more game servers of the game system 120 to provide game inputs 2396 to multiple game engine(s) 2322. The game server(s) may in turn communicate the game inputs 2396 to one, two, or more game engine instances, as shown in FIG. 1D. The game engine instances may be instantiated on one or more servers of the game system 120, or alternatively at least some of the game engine instances may be running on the broadcaster devices 140 as illustrated in FIG. 23A. In some embodiments, the game inputs 2396 received from the game interaction module(s) 2310 of spectating system 100 may include at least some data specific to particular game engines (e.g., specific to different teams and/or players), and the game server(s) may handle distribution of the data to the target engines.

Figure 24A:
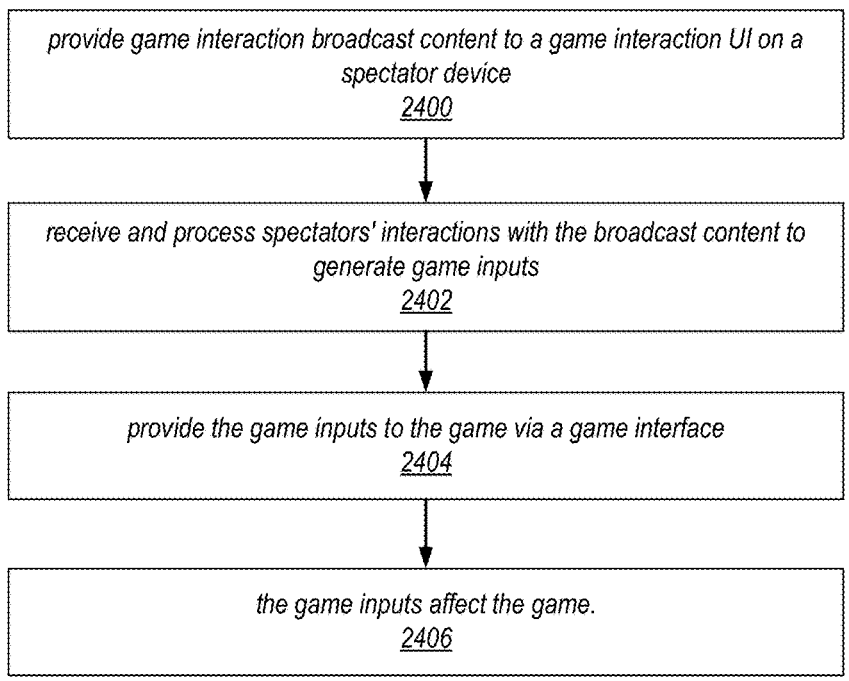
FIG. 24A is a flowchart of a method for allowing spectators to provide inputs that affect a game being broadcast in a game spectating system, according to some embodiments.

FIG. 24A is a flowchart of a method for allowing a spectator to provide inputs that affect a game being broadcast in a game spectating system, according to some embodiments. The method of FIG. 24A may, for example, be implemented by a spectating system 100 as illustrated in FIG. 1A, FIG. 1B, or FIG. 23. As indicated at 2400 of FIG. 24A, the spectating system may provide game interaction broadcast content to a game interaction UI on a spectator device, for example as illustrated in FIGS. 23 and 25. The broadcast content may be based at least in part on game metadata received from a game system, or from one or more other sources as illustrated in FIG. 1C. As indicated at 2402 of FIG. 24A, the spectating system may receive and process spectators' interactions with the broadcast content to generate game inputs, for example as illustrated in FIG. 23. As indicated at 2404 of FIG. 24A, the spectating system may provide the game inputs to the game via a game interface, for example a game system API as illustrated in FIG. 23. As indicated at 2406 of FIG. 24A, the game inputs may affect the game in various ways, for example as described in reference to FIGS. 23 and 25.

Figure 24B:
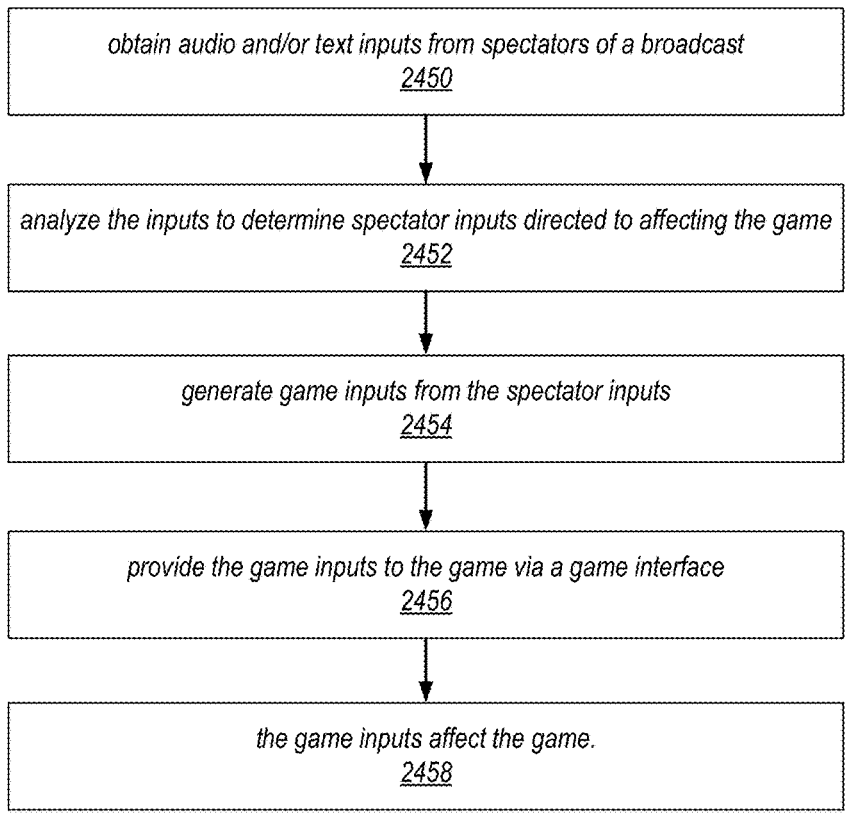
FIG. 24B is a flowchart of a method for analyzing spectator audio or text inputs to affect a game being broadcast in a game spectating system, according to some embodiments.

FIG. 24B is a flowchart of a method for analyzing spectator audio or text inputs to affect a game being broadcast in a game spectating system, according to some embodiments. The method of FIG. 24B may, for example, be implemented by a spectating system 100 as illustrated in FIG. 1A, FIG. 1B, or FIG. 23. As indicated at 2450 of FIG. 24B, the spectating system may obtain audio and/or text inputs from spectators of a broadcast, for example as illustrated in reference to FIGS. 26A and 26B. In some embodiments, other inputs may be obtained by the spectating system, such as social media inputs and inputs from devices and technologies such as controllers or joysticks, motion tracking systems, gesture-based input systems, and so on. As indicated at 2452 of FIG. 24B, the spectating system may analyze the inputs to determine spectator inputs directed to affecting the game. For example, keywords or key phrases that indicate spectator instructions to the game system may be determined from analysis of text, audio, and/or other inputs such as social media inputs as illustrated in FIG. 4, which illustrates an example participant input processing component of a spectating system that may obtain and analyze inputs including but not limited to spectator audio and/or text inputs or other inputs such as social media inputs to determine broadcast-related analysis information. As indicated at 2454 of FIG. 24B, the spectating system may generate game inputs from the spectator inputs, for example as illustrated in FIG. 23. As indicated at 2456 of FIG. 24B, the spectating system may provide the game inputs to the game via a game interface, for example a game system API as illustrated in FIG. 23. As indicated at 2458 of FIG. 24B, the game inputs may affect the game in various ways, for example as described in reference to FIGS. 23 and 25.

FIG. 25 provides a non-limiting example of a spectating user interface for a game spectating system that allows spectators to provide inputs that affect a game being broadcast via the game spectating system, according to some embodiments. A spectating UI 2502 may, for example be presented as a Web page of a game spectating system website via a Web browser, as an interface to a game spectating Web application or mobile application, or as an interface to other network-based game spectating applications. A spectating UI 2502 may include one or more panes or regions including one or more of, but not limited to, controls 2510, a video player 2532 with A/V controls 2533, a chat 2536 window, a game interaction pane 2540 via which spectators may view and interact with broadcast content based at least in part on game metadata for the game being broadcast 2534 to affect the game in various ways, and a community inputs 2516 pane via which spectators can provide information to broadcasters. Controls 2510 may include one or more UI elements for navigating or otherwise interacting with the game spectating system. Video player 2532 displays the video stream (shown as broadcast 2534) for a live broadcast or channel or for a replay of a previously recorded broadcast.

Game interaction pane 2540 may include broadcast content based at least in part on the game metadata for the game being broadcast. The broadcast content displayed in game interaction pane 2540 may include interactive UI elements via which spectators may affect the game being broadcast 2534. As shown in this example for the "Space Explorers!" game, the game interaction pane 2540 may include one or more of, but is not limited to, UI elements via which spectators can add, build, or hide objects in the game (e.g., buildings, terrain, weapons, other objects such as scrolls, information such as maps, etc.), UI elements via which spectators can affect the game environment (e.g., the weather) in various ways, UI elements via which spectators can give selected players gear, information, or other game content, and UI elements via which spectators can set game parameters such as difficulty level, number of enemies, and so on. As shown in FIG. 25, the game interaction pane 2540 may also include a "Choose a player" UI element that the spectator may use to select a player or players to give gear or other game content to. In some embodiments, the spectator(s) may pay for the gear or other game content, for example via a "Pay here" UI element as illustrated in FIG. 25. In some embodiments, the game interaction pane 2540 may provide UI elements via which spectators may vote on one or more of the game-altering options provided via the game interaction pane 2540.

In some embodiments, in addition to the broadcast content in the game interaction pane 2540 that allows spectators to interact with and affect games in various ways, the spectating UI 2502 may provide one or more UI elements via which the spectators may individually or collectively provide information to the broadcaster. For example, as shown in FIG. 25, a community inputs 2516 pane includes "Look at:" UI elements via which a spectator can provide information to the broadcaster, in this example location information for a hidden object. Inputs to the UI elements on the spectator device may cause the input information to be displayed on the broadcaster's device, for example in a community inputs pane as shown in FIG. 26B. The information may be, but is not necessarily, displayed on other spectators' devices. Note that the spectator devices and broadcast device may also include broadcast chat windows via which spectators and broadcaster can communicate, and that the spectating system may also support audio chat via an audio chat channel, as illustrated in FIGS. 25, 26A, and 26B.

Referring to FIG. 23, spectators' interactions 164 with the broadcast content displayed in game interaction pane 2540 of the spectating UI 2502 may be collected and analyzed by game interaction module(s) 2310 of spectating system 100 to determine values for game inputs 2396 to the game engine 2322. The game interaction module(s) 2310 collect and analyze the spectator interactions 164, and provide the results to the game engine 2322 as game inputs 2396. In addition, text inputs via a chat 2536 window, audio chat, and other inputs may be analyzed, for example as illustrated in reference to FIG. 4, to generate game inputs 2396. The spectating community may thus influence game play in very real and visible ways in real- or near-real time via the spectating UI 2502 provided by the spectating service 100, allowing the spectating community to view their influence on and thus sense their involvement in the game. In addition, the game may be enhanced for the players by providing interesting variations in game play that are influenced by their spectating audience.

FIG. 26A provides another non-limiting example of a spectating user interface for a game spectating system that allows spectator and spectating community inputs to affect a game being broadcast via the game spectating system, according to some embodiments. A spectator's device 2600 may implement a spectating UI 2602, and may include a microphone 2606 to collect spectator audio input and speakers 2604 to output game audio (including spectator audio and/or crowd noise, broadcaster audio commentary, etc.). The spectator's device 2600 may also include or be coupled to a keyboard 2609 or other input device(s) via which the spectator 2660 may enter text input such as broadcast chat 2618. In some embodiments, the spectator's device 2600 may also include or be coupled to input devices and technologies such as controllers or joysticks, motion tracking systems, gesture-based input systems, and so on.

In some embodiments, UI 2602 may include a game spectating window 2610 that displays a current view of the game universe, for example from the broadcaster/player's perspective. In some embodiments, UI 2602 may also include a spectator controls 2619 window or pane via which the spectator 2660 may interact with the spectating system to control the broadcast, select other broadcasts, and so on. In some embodiments, UI 2602 may include a broadcast content 2640 pane or region in which broadcast content based at least in part on game metadata received from a respective game system may be displayed to and accessed by the spectator 2660. The broadcast content 2640 pane may, for example, show information about the game, game players, game objects or items, game events, and so on as provided by the game system in the game metadata. In some embodiments, UI 2602 may include a broadcast chat 2618 window via which the spectator 2660 may communicate with the broadcaster/player and other spectators via text.

In some embodiments, UI 2602 may include a window 2614 showing a live view of the broadcaster/player, for example as a window within or overlaying the game spectating window 2610. In some embodiments, a world map 2612 or portion of a map of the online game world may be displayed on UI 2602, for example as a window within or overlaying the game spectating window 2610. In some embodiments, a window 2615 may show a different perspective of the game as selected by the spectator, or alternatively may show video on demand content such as highlight reels or replays of previously recorded game sessions.

In some embodiments, UI 2602 may include a game interaction interface 2644 via which the spectator may interact with UI elements to affect the game in various ways, for example as described in reference to FIG. 25. In some embodiments, UI 2602 may also include a community inputs 2616 interface via which the spectator may interact with UI elements to communicate with the broadcaster, for example as described in reference to FIG. 25.

FIG. 26B provides a non-limiting example of a broadcaster user interface for a game spectating system that allows spectator and spectating community inputs to affect a game being broadcast via the game spectating system, according to some embodiments. A broadcaster's device 2650 may implement a game and broadcasting UI 2652, and may include or be coupled to an A/V device 2656 (e.g., a video camera with microphone) to collect broadcaster/player 2670 audio and video input and speakers 2654 to output game audio (including spectator audio and/or crowd noise.). The broadcaster's device 2650 may also include or be coupled to a keyboard 2659 or other input device(s) via which the broadcaster/player 2670 may enter text input such as player chat or broadcast chat. In some embodiments, the broadcaster's device 2650 may also include or be coupled to input devices and technologies such as controllers or joysticks, motion tracking systems, gesture-based input systems, and so on.

In some embodiments, broadcasting UI 2652 may include a game play window 2660 that displays a current view of the game universe for the broadcaster/player 2670. Note that the broadcaster's view of the game universe as shown in window 2660 may be included in the broadcast and shown to spectators, for example as shown in FIG. 9. In some embodiments, UI 2652 may also include game controls 2669 via which the broadcaster/player 2670 may interact with the game system. In some embodiments, UI 2652 may include in-game chat 2665 via which the broadcaster/player 2670 may communicate to other players in the game via text. In some embodiments, UI 2652 may also include broadcast controls 2667 via which the broadcaster/player 2670 may interact with the spectating system to control the broadcast. In some embodiments, UI 2652 may include broadcast chat 2668 via which the broadcaster/player 2670 and spectators may communicate via text. In some embodiments, UI 2652 may also include a community inputs 2666 pane via which information provided to specific broadcasters by spectators via the spectating interfaces as illustrated in FIGS. 25 and 26A may be displayed. In some embodiments, the provided information may instead or also be graphically provided, for example as graphics in a world map overlay window 2662 as shown in FIG. 26B.

Collecting and Providing Game Spectating Data to Consumers

Embodiments of a spectating system are described that collect and store spectating data from broadcasts in a game spectating environment, and vend the collected data to consumers including but not limited to game developers, online merchants, and broadcasters. In some embodiments, the spectating system may obtain broadcasts including but not limited to A/V content from broadcast devices. In some embodiments, the spectating system may also obtain game metadata from game systems for which the broadcasts are being streamed or from one or more other sources as illustrated in FIG. 1C. The spectating system stores audio-visual (A/V) content for broadcasts, and collects and stores spectating data including but not limited to game metadata and spectator interactions with the broadcasts and broadcast content. The spectating system exposes the spectating data and A/V content to consumers, for example via a user interface (UI), query interface, and/or an application programming interface (API). The spectating system may provide the spectating data to consumers in raw or unprocessed form, for example via an API. Instead or in addition, the spectating system may perform processing and analysis on at least some of the spectating data, and may provide access to the processed data and/or analysis data via one or more interfaces including but not limited to query interfaces and UIs such as Web pages.

In some embodiments, the spectating data stored by the spectating system may also include broadcast or spectating statistics. The spectating system may collect or determine the statistics based on spectator participation in broadcasts and store the statistics data with the game metadata, spectator interaction data, and other spectating data. For example, in some embodiments, the spectating system may track the size of a particular broadcaster's audience, or the combined size of the audiences for all broadcasters of a particular game. As another example, the spectating system may track subscribing spectators vs. non-subscribing spectators who are watching particular broadcasts or games.

In some embodiments, audience or crowd state or emotion may be tracked by the spectating system, and may be stored as additional spectating data. For example, spectators' video, audio and/or textual inputs may be analyzed as illustrated in FIG. 4 to detect content or emotion (keywords, cheers, boos, happiness, etc.); the analysis information may be used to determine audience state or emotion metrics during the broadcasts, and the metrics may be stored with the spectating data.

In some embodiments, speech recognition technology may be applied to one or more of the audio inputs to broadcasts to recognize and convert the spoken words to text, and the text may be stored as additional spectating data. For example, the broadcaster's audio channel may be converted to text and stored as spectating data. As another example, the audio channel for a commentator may be converted to text and stored as spectating data. The text may then be exposed to the consumers via the API, UI, and/or query interface, and may also be correlated temporally to events in the game stream or to other spectating data such as the spectators' text chat inputs.

The spectating system may correlate the spectating data and A/V content, for example using timestamps, so that consumers can review portions of video, audio, and/or text from broadcasts that may be related to particular spectator behaviors, broadcast statistics (e.g., audience size), or spectating events as indicated by the respective spectating data. The spectating data may also be spatially mapped to the spectating interface so that consumers can determine spectator interest in and interactions with various broadcast content. The spectating data may include data for single broadcasts, broadcasters, or games, or for multiple broadcasts, broadcasters, or games.

Figure 30:
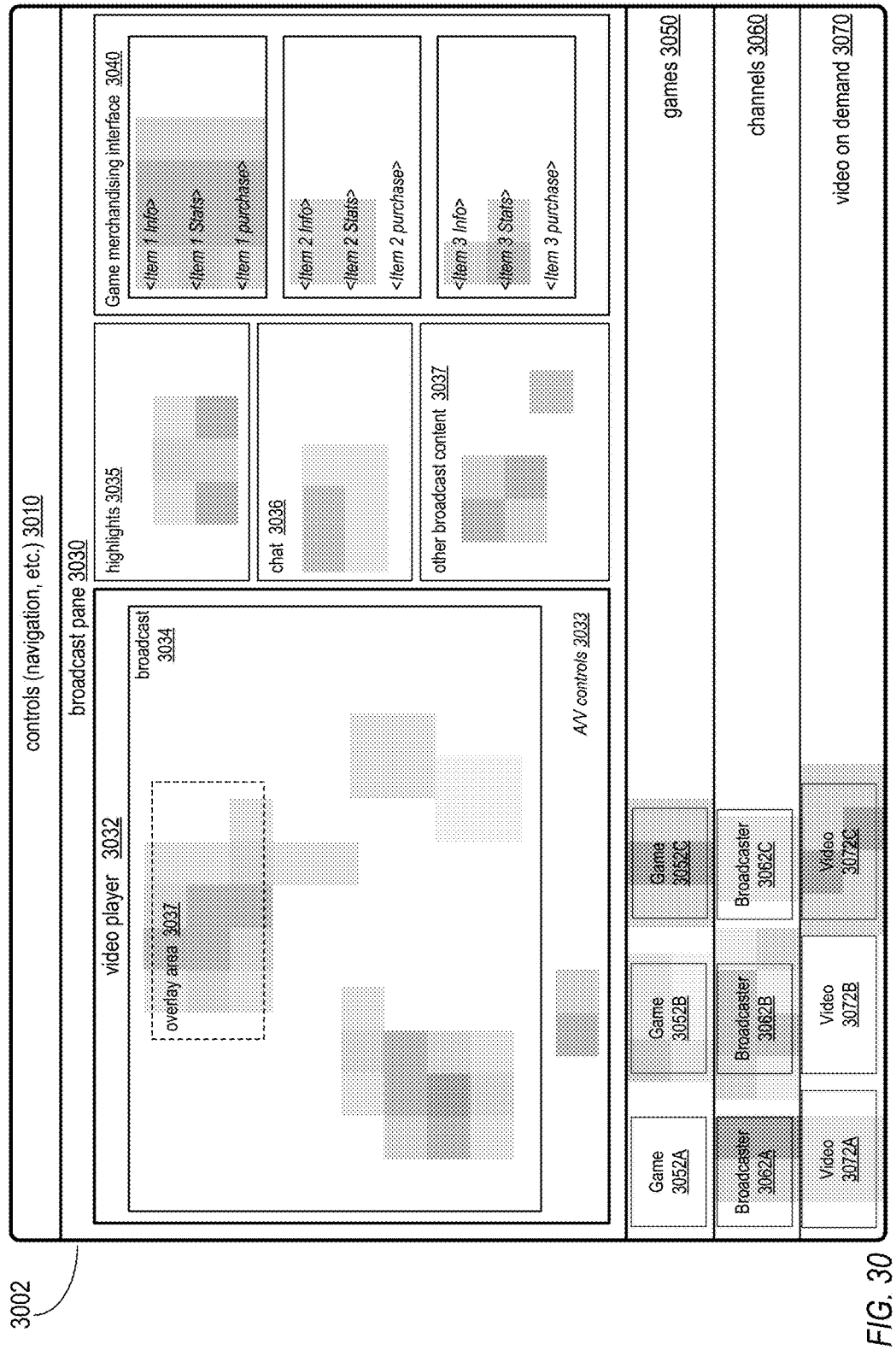
FIG. 30 is a non-limiting example of a game spectating data consumer interface that shows a heat map overlaid on a spectating interface indicating spectator interactions with broadcast content, according to some embodiments.

In some embodiments the spectating system may store at least part of the game metadata and broadcast metadata for broadcasts, including but not limited to spectator interactions with respective broadcast content, as game spectating data. The spectating system may also record audiovisual (A/V) content for at least some broadcasts. The game spectating system may provide one or more UIs, query interfaces, and/or APIs via which consumers (e.g., game developers) may obtain or view the game spectating data for individual broadcasts, broadcasters, or aggregated spectating data for broadcasts, broadcasters, or games. The spectating data may be analyzed, presented, and viewed in various ways, and may be applied by the consumers for various purposes, for example for use in analyzing online game usage and performance for applications in game development, advertising, and/or marketing, or for use in analyzing vending of game-related content and merchandise via the spectating interface. Note that the spectating system provider may also leverage the spectating data, for example to evaluate the spectating system UIs and UI content. For example, the spectating system provider may use heat maps as illustrated in FIG. 30 to evaluate layout and content of spectating interfaces.

In some embodiments, the spectating system may perform at least some processing and analysis on the spectating data, and may provide interface methods (e.g., UIs) via which the consumers may obtain and/or view the pre-processed data. In some embodiments, the spectating system may instead or in addition provide an interface, for example a query interface, that allows the consumers to obtain, process, and analyze the spectating data according to their own custom purposes. The query interface may, for example, provide a query language that allows the consumers to make queries or requests for information to a database or data store that stores the spectating data, e.g. to perform searches of the spectating data.

Figure 27:
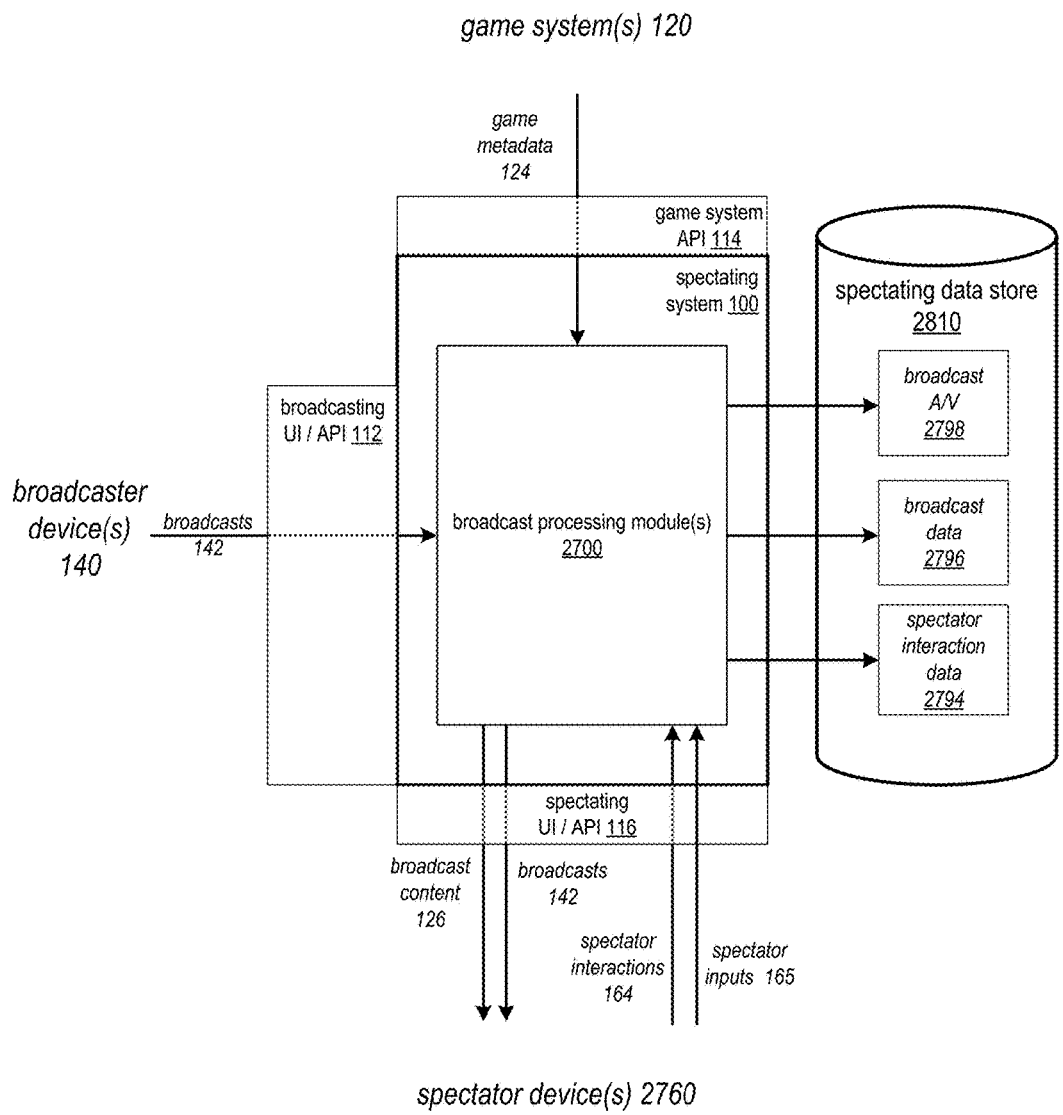
FIG. 27 illustrates collecting and storing game spectating data in a game spectating system, according to some embodiments.

FIG. 27 illustrates collecting and storing game spectating data in a game spectating system, according to some embodiments. As shown in FIG. 27, a game spectating system 100 such as the spectating system 100 as illustrated in and described for FIGS. 1A, 1B, and 10 may implement one or more broadcast processing modules 2700 that may collect and store broadcast A/V content 2798 from broadcasts 142 including video, audio, and text (e.g., chat) channels, broadcast data 2796 including but not limited to at least some of the game metadata 124 and broadcast metadata for the broadcasts 142, and data 2794 describing spectator interactions 164 with broadcasts 142 and broadcast content 126. The spectating-related data may be stored to a spectating data store 2810. Spectating data store 2810 may be implemented by one or more storage devices, systems, or services, for example by storage service(s) implemented as or by provider network services 4192 in a provider network 4190 as illustrated in FIG. 32.

The game spectating system 100 may implement one or more components or modules 2700 that may present broadcast content 126 to spectators via a spectating UI 116 on respective spectator devices 160. The broadcast content 126 may be determined at least in part from game metadata 124 received from the game system(s) 120 according to a game system API 114 provided by the spectating system 100. In some embodiments, the broadcast content 126 may be determined at least in part from game-related data acquired from one or more other sources such as online merchants. The spectators may view, explore, discuss, select, and order, purchase, or otherwise obtain game-related content via the spectating UI 116 and interactions with the broadcast content 126 presented on the spectator devices 160 according to the spectating UI 116. The module(s) 2700 may obtain and process spectator interactions 164 with the broadcast content 126 presented on the spectator devices 160 to generate spectator interaction data 2794.

In some embodiments, spectator interactions with the broadcasts 142 and broadcast content 126 may be tracked, processed, and recorded as spectator interaction data 2794 in a spectating data store 2810. The spectator interactions may include one or more of, but are not limited to, selecting a UI element, manipulating a UI element (e.g., by scrolling, clicking, sliding, turning, etc.), hovering (e.g., with a cursor)

over or near a UI element, inputting to a UI element (e.g., entering text in a text box), and focusing on one or more UI elements (e.g., as detected via eye tracking technology).

In some embodiments, obtaining and recording spectator interactions with the broadcasts 142 and broadcast content 126 may include tracking spectator navigation to other pages or sites from the spectating UI. For example, in some embodiments, the spectating UI may be a Web page presented on a Web browser, and obtaining and recording spectator interactions with the broadcasts 142 and broadcast content 126 may include tracking spectator navigation to one or more other Web pages from the spectating UI.

In some embodiments, obtaining and recording spectator interactions with the broadcasts 142 and broadcast content 126 may include tracking and recording one or both of eye motion or head motion with respect to the spectating UI, broadcasts 142, and broadcast content 126.

Figure 28:
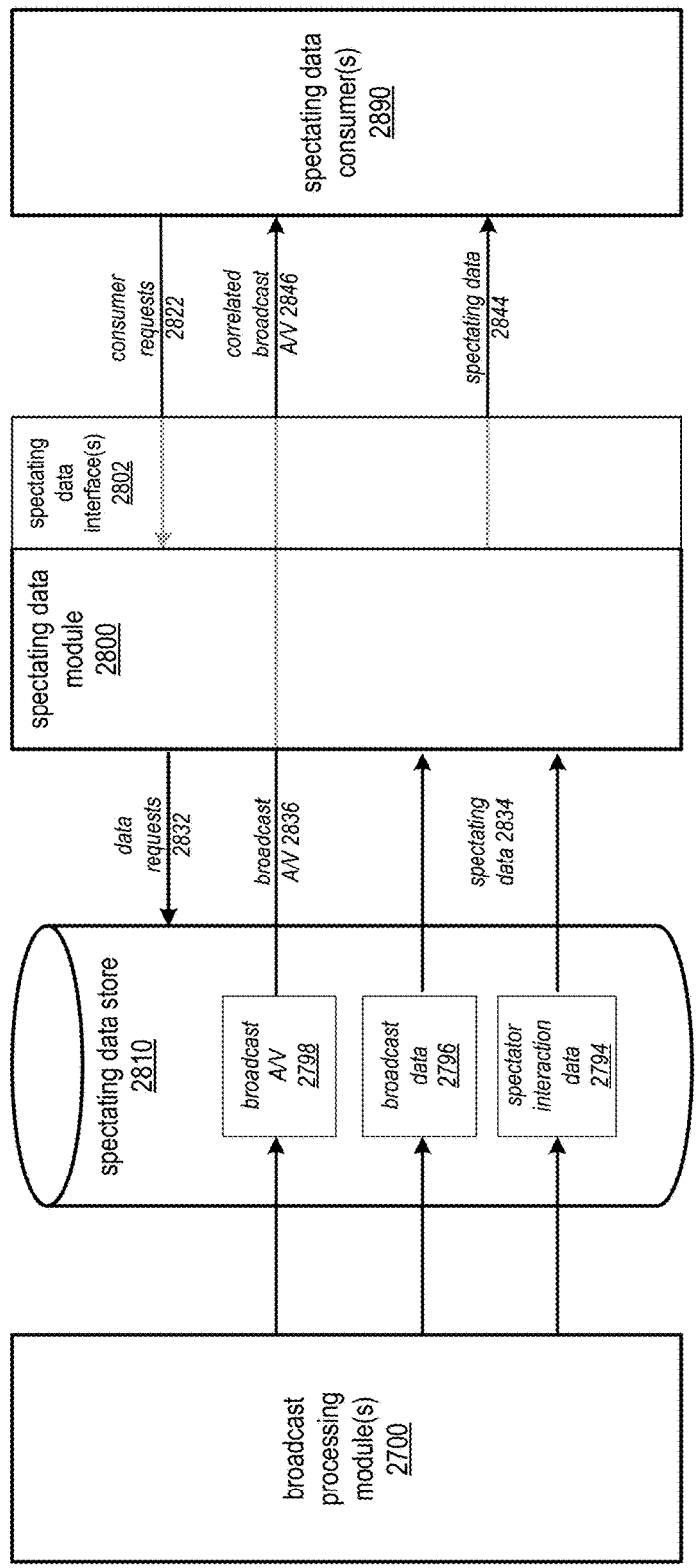
FIG. 28 illustrates an example game spectating module or service that exposes game spectating data to consumers in a game spectating system, according to some embodiments.

FIG. 28 illustrates a game spectating module or service that exposes game spectating data to consumers in a game spectating system, according to some embodiments. As shown in FIG. 27, a game spectating system 100 such as the spectating system 100 as illustrated in and described for FIGS. 1A, 1B, and 10 may implement one or more broadcast processing modules 2700 that may collect and store broadcast A/V content 2798 from broadcasts 142 including video, audio, and text (e.g., chat) channels, broadcast data 2796 including but not limited to at least some of the game metadata 124 and broadcast metadata for the broadcasts 142, and data 2794 describing spectator interactions 164 with broadcasts 142 and broadcast content 126. The spectating-related data may be stored to a spectating data store 2810. Spectating data store 2810 may be implemented by one or more storage devices, systems, or services, for example by storage service(s) implemented as or by provider network services 4192 in a provider network 4190 as illustrated in FIG. 32.

As shown in FIG. 28, a game spectating module 2800 may expose the broadcast A/V content 2798, broadcast data 2796, and spectator interaction data 2794 to one or more spectating data consumers 2880 via one or more spectating data interfaces 2802. The game spectating module 2800 may be a module or service of a spectating system 100 as illustrated in FIG. 1A, 1B, or 27, or alternatively may be a separate module or service, for example a service implemented as or by provider network services 4192 in a provider network 4190 as illustrated in FIG. 32.

Spectating data interfaces 2802 may include, but are not limited to, user interfaces (UIs) such as Web pages, query interfaces, and/or application programming interfaces (APIs). Via the interface(s) 2802, consumers 2890 may generate requests 2822 for spectating data 2832 (including data from broadcast data 2796 and/or spectator interaction data 2794) and/or broadcast A/V 2836.

Figure 31:
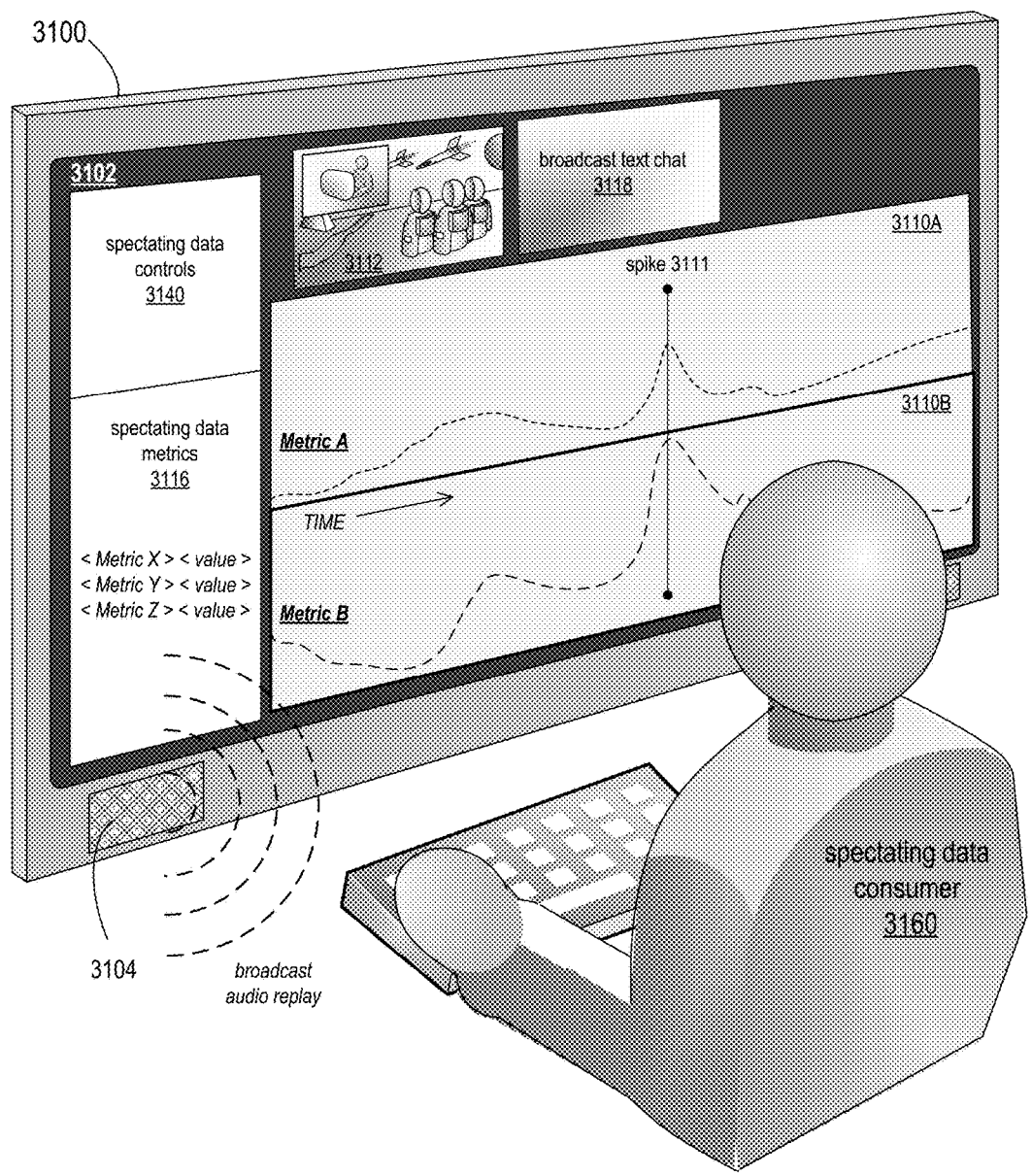
FIG. 31 is a non-limiting example of a game spectating data consumer interface that shows game spectating metrics correlated with broadcast A/V content, according to some embodiments.

In some embodiments, game spectating module 2800 may temporally correlate the broadcast A/V 2836 data and spectating data 2832, for example using timestamps, so that consumers 2890 can review portions of video, audio, and/or text (correlated broadcast A/V 2846) from broadcasts that may be related to particular spectator behaviors or spectating events as indicated by respective (correlated) spectating data 2844. FIG. 31 shows an example of temporally correlating spectating data to broadcast A/V. In some embodiments, the spectating data 2844 may also be spatially mapped to the spectating UIs on which the broadcasts and broadcast content were presented so that consumers 2890 can determine spectator interest in and interactions with various broadcast content, for example as shown in FIG. 30. The requested spectating data 2844 and correlated broadcast A/V 2846 may include data and A/V for single broadcasts, broadcasters, or games, or for multiple broadcasts, broadcasters, or games.

Figure 29:
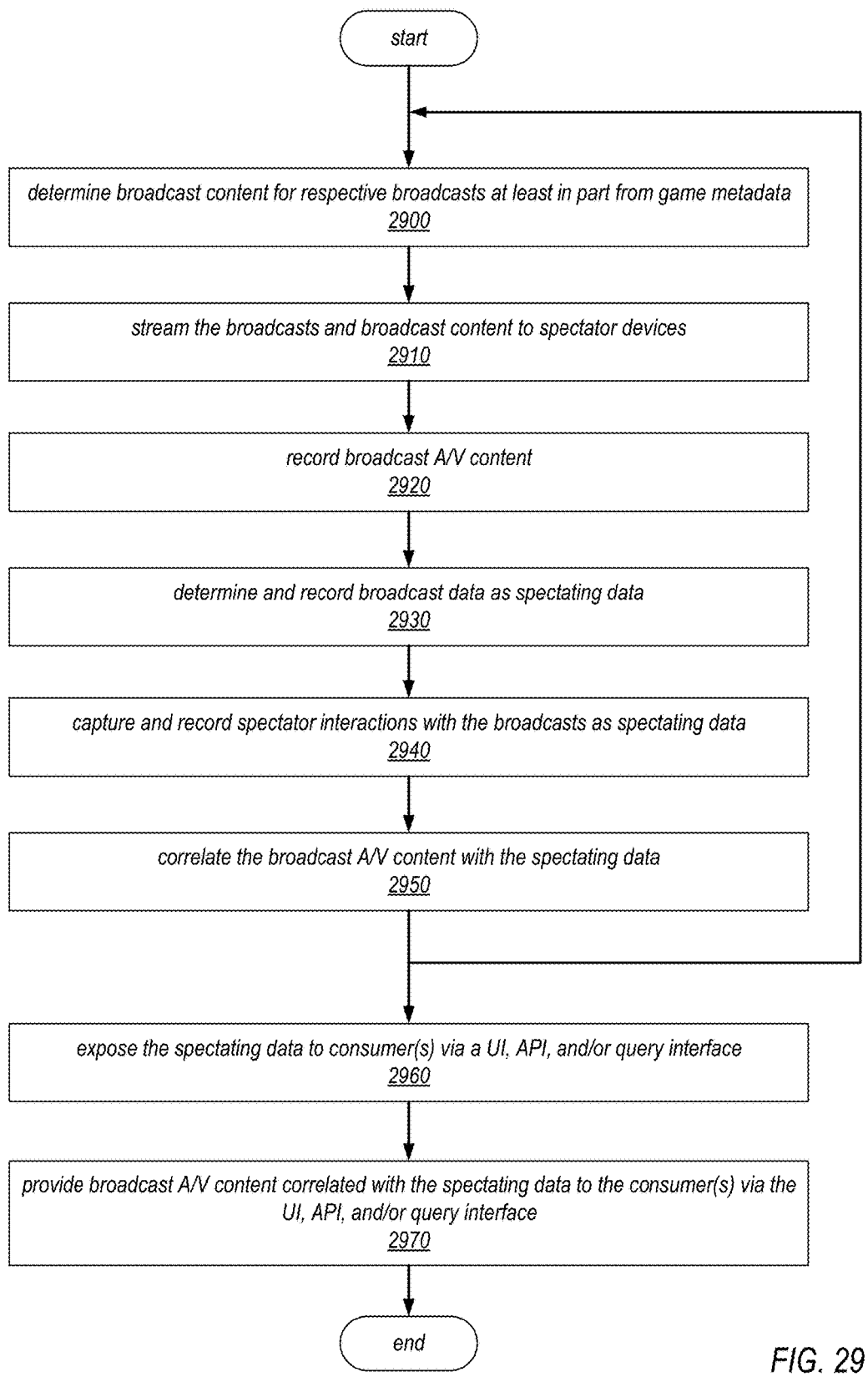
FIG. 29 is a flowchart of a method for collecting game spectating data and exposing the data to consumers in a game spectating system, according to some embodiments.

FIG. 29 is a flowchart of a method for collecting game spectating data and exposing the data to consumers in a spectating system, according to some embodiments. The method of FIG. 29 may, for example, be implemented by a spectating system 100 as illustrated in FIGS. 1A, 1B, and 27. As indicated at 2900 of FIG. 29, the spectating system may determine broadcast content for respective broadcasts at least in part from game metadata, for example as described in reference to FIG. 1A, 1B, or 27. As indicated at 2910 of FIG. 29, the spectating system may stream the broadcasts and broadcast content to spectator devices, for example as described in reference to FIG. 1A, 1B, or 27.

As indicated at 2920 of FIG. 29, the spectating system may record broadcast A/V content, for example as described in reference to FIGS. 27 and 28. As indicated at 2930 of FIG. 29, the spectating system may determine and record broadcast data as spectating data, for example as described in reference to FIGS. 27 and 28. As indicated at 2940 of FIG. 29, the spectating system may capture and record spectator interactions with the broadcasts as spectating data, for example as described in reference to FIGS. 27 and 28.

As indicated at 2950 of FIG. 29, the broadcast A/V content may be correlated with the spectating data, for example according to timestamps provided as metadata with the A/V content and game metadata. In some embodiments, a game spectating module or service as illustrated in FIG. 28 may perform the correlation, for example in response to consumer requests for spectating data. As indicated at 2960 of FIG. 29, the spectating data may be exposed to consumer(s) via a UI, API, and/or query interface, for example via the interface(s) as illustrated in FIG. 28. As indicated at 2970 of FIG. 29, the spectating system may provide broadcast A/V content correlated with the spectating data to the consumer(s) via the UI, API, and/or query interface, for example in response to requests to the interface(s) as illustrated in FIG. 28.

As indicated by the arrow returning from element 2950 to element 2900, in at least some embodiments, the method of FIG. 29 may be an iterative process in which spectating data and A/V content for broadcasts is obtained, stored and correlated to be exposed to consumer(s) via the interfaces.

FIG. 30 is a non-limiting example of a game spectating data consumer interface that shows a heat map overlaid on a spectating interface 3002 template or layout indicating spectator interactions with broadcast content during at least a portion of a broadcast, according to some embodiments. FIG. 30 shows an example spectating UI 3002 template or layout that may include a video player 3032 with controls 3033 and a broadcast 3034 pane, a highlight 3034 pane, and a chat 3036 pane, for example as illustrated in FIG. 6A. The spectating UI 3032 may also include a games 3050 pane showing one or more games 3052, a channels 3060 pane showing one or more broadcasters 3062, and a video on demand 3070 pane showing one or more videos 3072 such as previously recorded broadcasts and highlight reels, for example as illustrated in FIG. 6A. The spectating UI 3032 may also include a game merchandising interface 3040 that includes UI elements for obtaining game-related content and merchandise, for example as illustrated in FIG. 12. The spectating UI 3032 may also include other broadcast content 3037 as described herein, for example UI elements for obtaining, joining, or stepping into games as illustrated in FIG. 14. The broadcast content for the respective broadcast for which this heat map was generated may also include one or more overlays 3037 on the broadcast 3034, for example text or banner ads added to the broadcast stream by the spectating system as illustrated in FIGS. 1A and 27 or by a broadcast content service as illustrated in FIG. 1B.

A heat map is overlaid on the spectating interface 3002 that shows spectator activity relative to the interface 3002 as illustrated by the shaded areas. The heat map may indicate activity during a broadcast or portion of a broadcast, or during two or more broadcasts. While shown in grayscale, with darker shading indicating areas of higher activity, in practice the shading may be in color, for example with "hotter" colors indicating higher activity. The shaded areas correspond to regions or content of the spectating interface 3002 that the spectators tended to focus on or interact with during a broadcast or portion of a broadcast, or during two or more broadcasts, as determined by analysis of the spectating data 2834 as illustrated in FIG. 28, for example spectator interaction data 2794 collected for one, two, or more broadcasts. Spectator interactions with the spectating interface 3002 that are tracked and analyzed to generate the heat map may include one or more of, but are not limited to, selecting a UI element, manipulating a UI element (e.g., by scrolling, clicking, sliding, turning, etc.), hovering (e.g., with a cursor) over or near a UI element, inputting to a UI element (e.g., entering text in a text box), and focusing on one or more UI elements (e.g., as detected via eye tracking technology).

The heat map may, for example indicate items in a merchandising interface 3040 that spectators tended to focus on but not purchase (e.g., items 2 and 3), or tended to purchase more often than other items (e.g., item 1). As another example, the heat map may indicate games 3052, broadcasters 3062, and/or videos 3072 that tend to generate more or less activity. The heat map may also indicate regions in the broadcast 3034 that tend to generate more activity. Consumers may, for example, use this information to evaluate spectating interface 3002 content and layout including but not limited to products, product placement, advertisements, and so on. As non-limiting examples, broadcasters may use the heat map to evaluate content they select to place on their channels, and game developers and/or online merchants may use the heat map to evaluate game-related content and merchandise that is vended via the spectating interface 3002.

While FIG. 30 shows the heat map as static, in some embodiments the heat map may be dynamic; the recorded spectator interactions may be played back, with the heat map changing to reflect changes in focus. In addition, the spectating data from which the heat map is generated may be temporally correlated with the A/V content for the broadcast(s), and the A/V content may be played back with the heat map display, which for example may allow the consumer can see and hear what was happening during the broadcast(s) during periods of high and/or low activity.

FIG. 31 is a non-limiting example of a game spectating data consumer interface 3102 provided to a consumer 3160's device 3100 that shows game spectating metrics correlated with broadcast A/V content, according to some embodiments. Spectating data controls 3140 may, for example, include various UI elements that allow the consumer 3160 to control display and content of the interface 3102, for example UI elements that allow the consumer 3160 to query the spectating data module or service as illustrated in FIG. 28. Metric graph panes 3110A and 3110B show plots of spectating metrics A and B, respectively, over time. Spectating metrics A and B may be any of various metrics determined from spectating data 2834 as illustrated in FIG. 28. As non-limiting examples, metric A may indicate audience size, and metric B may indicate an audience excitement or activity metric, plotted over time. Spike 3111 indicates a high point in the metrics plotted in 3110A and 3110B. Spectating data metrics 3116 may textually display values for one or more metrics (X, Y, and Z, in this example) determined from spectating data 2834 obtained from the spectating data store via the spectating data module or service as illustrated in FIG. 28. Pane 3112 may replay video from the broadcast that corresponds to the metrics plotted in 3110A and 3110B and shown in spectating data metrics 3116. Broadcast text chat 3118 may replay the text chat from the broadcast displayed in pane 3112. In addition, broadcast audio corresponding to the broadcast may be replayed via speaker(s) 3104. Some or all of the data or information visually or audibly provided via elements 3110A and 3110B, 3112, 3118, 3116, and 3104 may be temporally correlated so that the consumer 3160 may view and hear what was happening during the broadcast 3112 and/or at particular moments in the broadcast 3112, such as at spike 3111. For example, the consumer 3160 may use this example interface to correlate particular events in the broadcast A/V content with audience activities, spectator interactions and inputs, spectating statistics, and other information from the spectating data.

Example Network-Based Game Spectating Environments

FIG. 32 illustrates an example network-based game and game spectating environment, according to some embodiments. Embodiments of game systems, game spectating systems, and other systems and services in game spectating environments as described herein in reference to FIGS. 1A through 29 may be implemented in the context of a service provider that provides virtualized resources (e.g., virtualized computing resources, virtualized storage resources, virtualized database (DB) resources, etc.) on a provider network 4190 to clients of the service provider, for example as illustrated in FIG. 32. Virtualized resource instances may be provisioned via one or more provider network services 4192, and may be rented or leased to the clients of the service provider, for example to developer 4170 clients that develop and provide game systems 4100 or other systems or services via the provider network 4190 and services 4192.

In at least some embodiments, one or more developers 4170 may access one or more of services 4192 of the provider network 4190 via application programming interfaces (APIs) to the services 4192 to configure a game system 4100 and/or game spectating service 4130 on the provider network 4190. A game system 4100 or game spectating service 4130 may include multiple virtualized resource instances (e.g., computing resources, storage resources, DB resources, etc.).

At least some of the resource instances on the provider network 4190 (e.g., computing resources) may be implemented according to hardware virtualization technology that enables multiple operating systems to run concurrently on a host computer, i.e. as virtual machines (VMs) on the host. The provider network 4190, via the services 4192, may enable the provisioning of logically isolated sections of the provider network 4190 to particular clients as client private networks on the provider network 4190. At least some of a client's resources instances on the provider network 4190 may be provisioned in the client's private network. For example, in FIG. 32, one or more game systems 4100 may be implemented as or in private networks of respective developers 4170 that are provisioned on provider network 4190 via one or more of the services 4192. As another example, a game spectating service 4130 may be provisioned in private networks on provider network 4190 via one or more of the services 4192.

The provider network 4190, via the services 4192, may provide flexible provisioning of resource instances to clients in which virtualized resource instances can be automatically added to or removed from a configuration on the provider network 4190 in response to changes in demand or usage, thus enabling an implementation on the provider network 4190 to automatically scale to handle computation and/or storage needs. For example, one or more additional computing and/or storage resources may be automatically added to a game system 4100 and/or to game spectating service 4130 in response to an increase in game playing, broadcasting, and/or game spectating from player/broadcaster devices 4120 and/or spectator devices 4180. Conversely, if and when usage drops below a threshold, resources can be removed from a game system 4100 and/or game spectating service 4130.

Illustrative System

In at least some embodiments, a computing device that implements a portion or all of the methods and apparatus for integrating game systems with a game spectating system in game spectating environments as described herein may include a general-purpose computer system that includes or is configured to access one or more computer-accessible media, such as computer system 4300 illustrated in FIG. 33. In the illustrated embodiment, computer system 4300 includes one or more processors 4310 coupled to a system memory 4320 via an input/output (I/O) interface 4330. Computer system 4300 further includes a network interface 4340 coupled to I/O interface 4330.

In various embodiments, computer system 4300 may be a uniprocessor system including one processor 4310, or a multiprocessor system including several processors 4310 (e.g., two, four, eight, or another suitable number). Processors 4310 may be any suitable processors capable of executing instructions. For example, in various embodiments, processors 4310 may be general-purpose or embedded processors implementing any of a variety of instruction set architectures (ISAs), such as the x86, PowerPC, SPARC, or MIPS ISAs, or any other suitable ISA. In multiprocessor systems, each of processors 4310 may commonly, but not necessarily, implement the same ISA.

System memory 4320 may be configured to store instructions and data accessible by processor(s) 4310. In various embodiments, system memory 4320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described herein for integrating game systems with a game spectating system in a game spectating environment, are shown stored within system memory 4320 as code 4325 and data 4326.

In one embodiment, I/O interface 4330 may be configured to coordinate I/O traffic between processor 4310, system memory 4320, and any peripheral devices in the device 4300, including network interface 4340, input/output (I/O) devices, or other peripheral interfaces. In some embodiments, I/O interface 4330 may perform any necessary protocol, timing or other data transformations to convert data signals from one component (e.g., system memory 4320) into a format suitable for use by another component (e.g., processor 4310). In some embodiments, I/O interface 4330 may include support for devices attached through various types of peripheral buses, such as a variant of the Peripheral Component Interconnect (PCI) bus standard or the Universal Serial Bus (USB) standard, for example. In some embodiments, I/O interface 4330 may support one or more input/output peripheral devices or components 4370 of system 4300, such as cursor control, keyboard, display, video, and/or audio I/O devices 4370 or components, and/or input devices such as controllers or joysticks, motion tracking systems, and gesture-based input systems. In some embodiments, the function of I/O interface 4330 may be split into two or more separate components, such as a north bridge and a south bridge, for example. Also, in some embodiments some or all of the functionality of I/O interface 4330, such as an interface to system memory 4320, may be incorporated directly into at least one processor 4310.

Network interface 4340 may be configured to allow data to be exchanged between computer system 4300 and other devices 4360 attached to a network or networks 4350, such as other computer systems or devices as illustrated in FIGS. 1A through 30, for example. In various embodiments, network interface 4340 may support communication via any suitable wired or wireless general data networks, such as types of Ethernet network, for example. Additionally, network interface 4340 may support communication via telecommunications/telephony networks such as analog voice networks or digital fiber communications networks, via storage area networks such as Fibre Channel SANs, or via any other suitable type of network and/or protocol.

In some embodiments, system memory 4320 may be one embodiment of a computer-accessible medium configured to store program instructions and data as described above for FIGS. 1A through 30 for implementing embodiments of methods and apparatus for integrating game systems with a game spectating system in a game spectating environment. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 4300 via I/O interface 4330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 4300 as system memory 4320 or another type of memory. Further, a computer-accessible medium may include transmission media or signals such as electrical, electromagnetic, or digital signals, conveyed via a communication medium such as a network and/or a wireless link, such as may be implemented via network interface 4340.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to implement a spectating system configured to:
stream a broadcast received from a broadcaster device to one or more of a plurality of spectator devices, wherein the broadcast shows game play of a respective broadcaster participating as a player in a game executing on a game system;
obtain game event data for the game from the game system according to an application programming interface (API) of the spectating system, wherein the game event data indicates a notable event in the game that was included in the broadcast;
determine a reward for participating in the notable event;
receive one or more votes indicating one or more participants in the notable event that are nominated to receive the reward for participating in the notable event, wherein the one or more votes are received from one or more other participants in the notable event;
determine the one or more participants in the notable event from participation data for the broadcast to receive the reward based at least in part on the one or more votes, wherein the one or more participants include one or more spectators, wherein the one or more spectators do not participate as players in the game, wherein the participation data indicates the one or more spectator devices to which the broadcast including the notable event was streamed, and wherein the spectators are associated with the one or more spectator devices; and
provide, to the one or more spectators, access to the reward for participating in the notable event via a spectating user interface (UI) on the one or more spectator devices associated with the one or more spectators.

2. The system as recited in claim 1, wherein the broadcaster is a broadcasting participant included in the one or more participants in the notable event, and wherein the spectating system is further configured to:
determine a broadcaster reward for the notable event; and
provide access to the broadcaster reward via a broadcasting UI on the broadcaster device.

3. The system as recited in claim 2, wherein the broadcaster reward includes game content for the game, wherein the spectating system is further configured to facilitate delivery of the game content to the broadcaster device.

4. The system as recited in claim 1, wherein the participation data includes spectating statistics based on participation in the broadcast, wherein the spectating system is further configured to:
determine a broadcaster achievement based on the spectating statistics for the broadcast; and
provide access to a reward for the broadcaster achievement via a broadcasting UI on the broadcaster device.

5. The system as recited in claim 1, wherein the reward is a virtual object or a physical object corresponding to in-game content.

6. The system as recited in claim 1, wherein the reward includes a virtual object configured for use within the game, wherein the spectating system is further configured to facilitate delivery of the virtual object to at least one of the one or more spectator devices.

7. The system as recited in claim 1, wherein the spectating system is further configured to provide one or more indications of the reward for participating in the notable event to the broadcaster device and to the plurality of spectator devices via one or more broadcasts, wherein the one or more indications include one or both of visual indications or audio indications.

8. The system as recited in claim 1, wherein the spectating UI includes one or more UI elements for selecting participants to be rewarded and for specifying rewards for the selected participants, wherein the spectating system is further configured to:
obtain spectator inputs to the UI elements;
determine one or more participants selected to be rewarded according to the spectator inputs;
determine one or more rewards for the one or more selected participants according to the spectator inputs; and
provide access to the one or more rewards to the one or more selected participants via the spectating UI.

9. The system as recited in claim 1, wherein the spectating UI includes one or more UI elements for selecting players in the game executing on a game system to be rewarded and for specifying rewards for the selected players, wherein the rewards include virtual objects configured for use within the game, and wherein the spectating system is further configured to:
obtain spectator inputs the UI elements;
determine one or more players selected to be rewarded according to the spectator inputs;
determine one or more virtual objects for the one or more selected players according to the spectator inputs; and
facilitate provisioning of the one or more virtual objects to the one or more selected players in the game.

10. The system as recited in claim 1, wherein the reward is provided by the spectating system, the game system, the broadcaster system, a game developer system, or a third-party system.

11. The system as recited in claim 1, wherein the spectating system is further configured to provide the reward to the one or more participants for a fee.

12. A method, comprising:
performing, by a spectating system implemented on one or more computing devices:
streaming one or more broadcasts received from one or more broadcaster devices to a plurality of spectator devices, wherein each broadcast shows game play of a respective broadcaster participating as a player in a game executing on a game system;
determining a notable event in at least one of the one or more broadcast at least in part according to game event data for the game received from the game system, wherein the game event data indicates one or more events in the game;
receiving one or more votes indicating one or more participants in the notable event that are nominated to receive a reward for participating in the notable event, wherein the one or more votes are received from one or more other participants in the notable event;

determining the one or more participants in the notable event from participation data for the broadcasts to receive the reward based at least in part on the one or more votes, wherein the one or more participants includes one or more spectators associated with one or more spectator devices to which the at least one broadcast including the notable event was streamed, wherein the one or more spectators do not participate as players in the game; and providing the reward for participating in the notable event to the one or more spectators via the one or more spectator devices.

13. The method as recited in claim 12, further comprising receiving the game event data from the game system according to an application programming interface (API) of the spectating system.

14. The method as recited in claim 12, wherein the one or more participants in the notable event include at least one broadcaster participant, the method further comprising providing a broadcaster reward for participating in the notable event to the broadcaster device of the at least one broadcaster participant.

15. The method as recited in claim 14, wherein the broadcaster reward includes game content for the game, the method further comprising delivering the game content to the broadcaster device.

16. The method as recited in claim 12, wherein the participation data includes spectating statistics based on participation in the broadcasts, the method further comprising:

determining an achievement for a particular broadcaster based on the spectating statistics for the broadcast; and providing a recognition or reward for the achievement to at least the broadcaster device of the particular broadcaster.

17. The method as recited in claim 12, further comprising receiving a plurality of event tags from the one or more spectator participants indicating a tagged event, wherein determining the notable event comprises:

determining whether the plurality of event tags satisfies a tag threshold; and identifying the tagged event as the notable event.

18. The method as recited in claim 12, wherein the reward includes a virtual object configured for use within the game, the method further comprising delivering the virtual object to at least one of the one or more spectator devices.

19. The method as recited in claim 12, further comprising providing one or more indications of the reward for participating in the notable event to the plurality of spectator devices via the one or more broadcasts, wherein the one or more indications include one or both of visual indications or audio indications.

20. The method as recited in claim 19, wherein the one or more indications include one or both of persistent indications or temporary indications.

21. The method as recited in claim 12, further comprising providing one or more indications of the reward for participating in the notable event to at least one of the one or more broadcaster devices, wherein the one or more indications include one or both of visual indications or audio indications.

22. The method as recited in claim 12, further comprising:

providing one or more user interface (UI) elements for selecting participants to be rewarded and for specifying rewards for the selected participants via a spectating UI on the spectator devices;

obtaining spectator inputs to the UI elements;

determining one or more participants selected to be rewarded according to the spectator inputs;

determining one or more rewards for the one or more selected participants according to the spectator inputs; and providing the one or more rewards to the one or more selected participants.

23. The method as recited in claim 12, further comprising:

providing one or more user interface (UI) elements for selecting players in the game executing on a game system to be rewarded and for specifying rewards for the selected players via a spectating UI on the spectator devices;

obtaining spectator inputs the UI elements;

determining one or more players selected to be rewarded according to the spectator inputs;

determining one or more virtual objects for the one or more selected players according to the spectator inputs; and facilitating provisioning of the one or more virtual objects to the one or more selected players in the game.

24. The method as recited in claim 12, further comprising:

providing one or more user interface (UI) elements for selecting participants to be rewarded and for specifying rewards for the selected participants via a broadcasting UI on the broadcaster devices;

obtaining broadcaster inputs to the UI elements;

determining one or more participants selected to be rewarded according to the broadcaster inputs;

determining one or more rewards for the one or more selected participants according to the broadcaster inputs; and providing the one or more rewards to the one or more selected participants.

25. The method as recited in claim 12, wherein the reward is provided by the spectating system, the game system, the broadcaster system, a game developer system, or a third-party system.

26. The method as recited in claim 25, wherein the two or more groups include subscribers and non-subscribers to the spectating system.

27. The method as recited in claim 12, wherein the spectators are segmented into two or more groups, the method further comprising the spectating system determining and providing different rewards for participating in the notable event to the two or more groups.

28. A non-transitory computer-readable storage medium storing program instructions that when executed on one or more computers cause the one or more computers to implement a participant rewards module for a spectating system configured to:

obtain game event data for a game from a game system according to an application programming interface (API) of the spectating system, wherein the game event data includes an indication of a notable event in a game that was included in a broadcast received from a broadcaster device and streamed to one or more of a plurality of spectator devices, wherein the broadcast shows game play of a respective broadcaster participating as a player in a game executing on a game system;

determine a reward for participating in the notable event;
receive one or more votes indicating one or more participants in the notable event that are nominated to receive the reward for participating in the notable event, wherein the one or more votes are received from one or more other participants in the notable event;
determine the one or more participants in the notable event from participation data for the broadcast to receive the reward based at least in part on the one or more votes, wherein the participation data indicates the one or more spectator devices to which the broadcast including the notable event was streamed, and wherein the participants include one or more spec spectators associated with the one or more spectator devices, wherein the one or more spectators do not participate as players in the game; and
provide the reward for participating in the notable event to the one or more spectators.

29. The non-transitory computer-accessible storage medium as recited in claim 28, wherein, to provide the reward for participating in the notable event to the one or more participants, the participant rewards module is configured to provide a user interface (UI) element for obtaining the reward to one or more devices associated with the one or more participants.

30. The non-transitory computer-accessible storage medium as recited in claim 28, wherein the broadcaster is a broadcaster participant of the one or more participants in the notable event, wherein the participant rewards module is further configured to:
determine a broadcaster reward for the notable event, wherein the broadcaster reward includes a virtual object configured for use within the game; and
facilitate delivery of the virtual object to the broadcaster device.

* * * * *